United States Patent
Ito et al.

(10) Patent No.: US 7,788,487 B2
(45) Date of Patent: Aug. 31, 2010

(54) DATA PROCESSING APPARATUS

(75) Inventors: Takayuki Ito, Osaka (JP); Teruto Hirota, Osaka (JP); Kouichi Kanemura, Osaka (JP); Tomoyuki Haga, Nara (JP); Yoshikatsu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1132 days.

(21) Appl. No.: 10/580,818

(22) PCT Filed: Nov. 26, 2004

(86) PCT No.: PCT/JP2004/017614

§ 371 (c)(1),
(2), (4) Date: May 26, 2006

(87) PCT Pub. No.: WO2005/052769

PCT Pub. Date: Jun. 9, 2005

(65) Prior Publication Data

US 2007/0113079 A1    May 17, 2007

(30) Foreign Application Priority Data

Nov. 28, 2003  (JP) .............................. 2003-399055

(51) Int. Cl.
*H04L 29/06* (2006.01)
*G06F 7/04* (2006.01)
*G06F 13/00* (2006.01)

(52) U.S. Cl. .......................... 713/164; 713/167; 726/2; 711/5; 711/152

(58) Field of Classification Search .................. 713/164, 713/167; 718/108; 711/5, 152
See application file for complete search history.

(56) References Cited

U.S. PATENT DOCUMENTS 5,311,591 A   5/1994 Fischer (Continued)

FOREIGN PATENT DOCUMENTS

JP   62-103146   5/1987

(Continued)

OTHER PUBLICATIONS

Shinji Itoh et al., "Hysteresis Signature System using Multi OS", Oct. 2002, pp. 65-69, English Abstract.

(Continued)

*Primary Examiner*—William R Korzuch
*Assistant Examiner*—Trang Doan
(74) *Attorney, Agent, or Firm*—Wenderoth, Lind & Ponack, L.L.P.

(57) ABSTRACT

In a data processing apparatus that switches between a secure mode and a normal mode during execution, the secure mode allowing access to secure resources to be protected, the normal mode not allowing access to the secure resources, when the secure resources increase in the secure mode, the load on a protection mechanism for protecting the resources becomes large. Thus, there is a demand for data processing apparatuses that are able to reduce secure resources.

The present invention relates to a data processing apparatus that stores therein a secure program including one or more processing procedures which use secure resources and a call instruction for calling a normal program to be executed in a normal mode. While executing the secure program, the data processing apparatus calls the normal program with the call instruction and operates according to the called normal program.

60 Claims, 72 Drawing Sheets

U.S. PATENT DOCUMENTS

| | | | |
|---|---|---|---|
| 5,412,717 A | 5/1995 | Fischer | |
| 7,076,637 B2 * | 7/2006 | Kelley et al. | 712/43 |
| 7,120,771 B2 * | 10/2006 | Dahan et al. | 711/163 |
| 7,120,794 B2 * | 10/2006 | Kelley et al. | 713/164 |
| 7,127,579 B2 * | 10/2006 | Zimmer et al. | 711/163 |
| 7,191,440 B2 * | 3/2007 | Cota-Robles et al. | 718/1 |
| 7,237,081 B2 * | 6/2007 | Dahan et al. | 711/163 |
| 7,290,284 B1 * | 10/2007 | Wettergren | 726/27 |
| 7,370,210 B2 * | 5/2008 | Symes | 713/189 |
| 7,475,398 B2 * | 1/2009 | Nunoe | 718/104 |
| 7,533,276 B2 * | 5/2009 | Matsushima et al. | 713/194 |
| 2001/0018717 A1 | 8/2001 | Shimotono | |
| 2002/0116632 A1 | 8/2002 | Itoh et al. | |
| 2002/0184046 A1 * | 12/2002 | Kamada et al. | 705/1 |
| 2004/0139346 A1 | 7/2004 | Watt et al. | |
| 2004/0153593 A1 | 8/2004 | Watt et al. | |
| 2004/0153672 A1 * | 8/2004 | Watt et al. | 713/201 |
| 2004/0153807 A1 | 8/2004 | Watt et al. | |
| 2004/0158736 A1 | 8/2004 | Watt et al. | |
| 2004/0187117 A1 | 9/2004 | Orion et al. | |

FOREIGN PATENT DOCUMENTS

| | | | |
|---|---|---|---|
| JP | 62-205443 | | 9/1987 |
| JP | 06-103058 | | 4/1994 |
| JP | 08-227356 | | 9/1996 |
| JP | 11-175355 | | 7/1999 |
| JP | 2001-256066 | | 9/2001 |
| JP | 2002-189633 | | 7/2002 |
| JP | 2002189633 | * | 7/2002 |
| JP | 2002-251326 | | 9/2002 |
| JP | 2003-280756 | | 10/2003 |

OTHER PUBLICATIONS

Richard York, "A New Foundation for CPU Systems security" Security Extensions to the ARM Architecture, May 2003, pp. 1-8.

* cited by examiner

FIG.5

APPLICATION MANAGEMENT TABLE  166

| ENTRY | | |
|---|---|---|
| HANDLE VALUE | DAEMON ADDRESS | APPLICATION CONTEXT ADDRESS |
| 1 | 0000BBBB | 0000AAEE |
| 2 | 0000CCCC | 0000BBCC |
| ⋮ | ⋮ | ⋮ |

SECURE APPLICATION MANAGEMENT TABLE  /186

| ENTRY | | |
|---|---|---|
| SECURE APPLICATION HANDLE | SECURE APPLICATION ADDRESS | SECURE APPLICATION CONTEXT ADDRESS |
| 1 | 1111EEEE | 11AADDDE |
| 2 | 1111EFFG | 11ADDEE |
| ⋮ | ⋮ | ⋮ |

SECURE DEVICE DRIVER MANAGEMENT TABLE  231

| SECURE DEVICE DRIVER MANAGEMENT INFORMATION ||
| ENTRY DEVICE DRIVER IDENTIFIER | SECURE DEVICE DRIVER IDENTIFIER |
| ID_B | 100 |
| ID_C | 101 |

232

234

SECURE OS CERTIFICATE

FIG.59

APPLICATION UNIQUE KEY MATRIX 592

| COLUMN NUMBER | ROW NUMBER | ISSUED KEY |
|---|---|---|
| 1 | 1 | Key_11 | 901
| 2 | 3 | Key_32 | 902
| 3 | 2 | Key_23 | 903
| 4 | 1 | Key_14 | 904

OS UNIQUE KEY MATRIX 597

| COLUMN NUMBER | ROW NUMBER | ISSUED KEY |
|---|---|---|
| 1 | 2 | Key_21 | 906
| 2 | 3 | Key_32 | 907
| 3 | 1 | Key_13 | 908
| 4 | 4 | Key_44 | 909

FIG.60

| COLUMN NUMBER j / ROW NUMBER i | 1 | 2 | 3 | 4 |
|---|---|---|---|---|
| 1 | M11 =ENC(Key_11, DECRYPTION KEY) | M12 =ENC(Key_12, DECRYPTION KEY) | M13 =ENC(Key_13, DECRYPTION KEY) | M14 =ENC(Key_14, DECRYPTION KEY) |
| 2 | M21 =ENC(Key_21, 0000) | M22 =ENC(Key_22, DECRYPTION KEY) | M23 =ENC(Key_23, DECRYPTION KEY) | M24 =ENC(Key_24, DECRYPTION KEY) |
| 3 | M31 =ENC(Key_31, DECRYPTION KEY) | M32 =ENC(Key_32, 0000) | M33 =ENC(Key_33, 0000) | M34 =ENC(Key_34, DECRYPTION KEY) |
| 4 | M41 =ENC(Key_41, DECRYPTION KEY) | M42 =ENC(Key_42, DECRYPTION KEY) | M43 =ENC(Key_43, DECRYPTION KEY) | M44 =ENC(Key_44, 0000) |

FIG.70

SECURE MEMORY INFORMATION TABLE ~811

| SECURE MEMORY INFORMATION | | |
|---|---|---|
| PROGRAM ID | CODE ADDRESS | DATA ADDRESS |
| A | A000~A111 | A222~A333 | ~812
| B | A444~A555 | A666~A777 | ~813
| ⋮ | ⋮ | ⋮ |

NORMAL MEMORY INFORMATION TABLE ~861

| NORMAL MEMORY INFORMATION | | |
|---|---|---|
| PROGRAM ID | CODE ADDRESS | DATA ADDRESS |
| OS | B000~B111 | B222~B333 | ~862
| E | B444~B555 | B666~B777 | ~863
| ⋮ | ⋮ | ⋮ |

DATA PROCESSING APPARATUS

TECHNICAL FIELD

The present invention relates to a technique which is used with an apparatus that executes programs while switching between a secure mode and a normal mode and which is for having a program executed in the secure mode and a program executed in the normal mode operate in correspondence with each other, the secure mode being a mode in which secure resources are accessible, and the normal mode being a mode in which only normal resources other than secure resources are accessible.

BACKGROUND ART

In recent years, digital contents including music and images are dealt with in various types of devices. Such devices are able to duplicate and edit digital contents without degrading the contents. It is necessary, however, that these digital contents are dealt with while being protected, from the viewpoint of copyrights.

A conventional technique is disclosed in which a data processing apparatus switches between a secure mode and a normal mode by a monitor, the secure mode being a mode in which secure data that needs to be protected and a secure application that needs to be protected are accessible, and the normal mode being a mode in which the secure data and the secure application are not accessible. According to this technique, the application that operates in the normal mode requests the secure application to process data via an operating system that operates in the normal mode. The operation system requests the monitor to switch the execution modes, and the monitor switches the execution modes. The secure application performs the requested processing and returns the processing results to the application via a secure operating system that operates in the secure mode. The secure operating system requests the monitor to switch the execution modes, and the monitor switches the execution modes. With this configuration, since execution is switched between the secure mode and the normal mode, it is not possible to access the secure data and the secure application directly from the application that operates in the normal mode. Accordingly, it is possible to protect the secure data and the secure application.

Non-Patent Document 1: A New Foundation for CPU Systems Security (searched on Nov. 20, 2003—URL: http://www.arm.com/armtech.nsf/htmlall/FC4C07580E29428080256D1A004A2345/$File/TrustZone_WP.pdf?OpenElement)

DISCLOSURE OF THE INVENTION

According to the method disclosed as the conventional technique, however, it is necessary to reserve a memory for storing data and programs used in the secure mode, separately from a memory used in the normal mode. The memory used in the secure mode needs to have a protection mechanism for protecting the memory from unauthorized accesses. Accordingly, when the memory to be used in the secure mode increases, the load on the protection mechanism becomes large, and a need arises to make the scale of the protection mechanism larger. Consequently, there are demands for a data processing apparatus in which the memory to be used in the secure mode can be reduced.

In view of this problem, the present invention aims to provide a data processing apparatus, a data processing method, a data processing program, and a recording medium with which it is possible to reduce the memory used in the secure mode.

Means for Solving the Problem

In order to solve the problem, the present invention provides a data processing apparatus that executes programs while switching between a secure mode and a normal mode, the secure mode being a mode in which use of a secure resource to be protected is permitted and the normal mode being a mode in which only use of a normal resource outside of protection is permitted, the data processing apparatus comprising: a normal storing unit storing therein a normal program that includes one or more processing procedures which use the normal resource; a secure storing unit storing therein a secure program that includes one or more processing procedures which use the secure resource and includes a call instruction for calling at least the normal program; a judgment unit operable to judge, in the secure mode, whether or not an instruction to be executed next is the call instruction; an output unit operable to output, in the secure mode, in a case where the next instruction is judged to be the call instruction, a piece of identification information which indicates the normal program to be called by the call instruction; a switching unit operable to, in the case where the next instruction is judged to be the call instruction, protect the secure resource and switch from the secure mode to the normal mode; a receiving unit operable to receive, in the normal mode, the piece of identification information; a reading unit operable to read, in the normal mode, the normal program indicated by the received piece of identification information from the normal storing unit; and a processing unit operable to operate, in the normal mode, according to the read normal program.

Effects of the Invention

With the arrangement described above, in the case where the secure program includes the call instruction and an instruction to be executed next is the call instruction, the switching unit switches from the secure mode to the normal mode. In the normal mode, the receiving unit receives the piece of identification information, and the reading unit reads the normal program indicated by the received piece of identification information from the normal storing unit, so that the processing unit operates according to the read normal program. Accordingly, by executing the call instruction, the secure program is able to request the normal program operating in the normal mode to perform the processing. In other words, since a processing that does not use the secure resource is performed by the normal program, the program size of the secure program itself is reduced. Further, in the secure mode, it is possible to reduce the memory used by the secure program.

The data processing apparatus may have an arrangement wherein the switching unit switches from the secure mode to the normal mode by halting a secure operating system that controls the secure program and activating a normal operating system that controls the normal program.

With this arrangement, the switching unit activates the normal operating system after halting the secure operating system. Consequently, the data processing apparatus is able to, while operating in the normal mode, completely cut off the access route to the secure resource and to realize the secure mode and the normal mode selectively.

The data processing apparatus may comprise a shared storage area which is accessible in both the secure mode and the normal mode, wherein the output unit outputs the piece of identification information in the secure mode, by writing the piece of identification information to the shared storage area, and the receiving unit receives the piece of identification information in the normal mode, by reading the piece of identification information from the shared storage area.

With this arrangement, the shared storage area is accessible in the normal mode and in the secure mode. Accordingly, the data processing apparatus of the present invention is able to realize the secure mode and the normal mode selectively so that information is exchanged between the secure mode and the normal mode in an assured manner while the secure resource is protected.

It is also acceptable to have an arrangement wherein the reading unit (i) stores therein the piece of identification information in correspondence with a piece of positional information which indicates a location within the normal storing unit at which the normal program is positioned and (ii) reads the normal program from the location indicated by the piece of positional information corresponding to the received piece of identification information.

With this arrangement, the reading unit stores therein the pieces of identification information in correspondence with the pieces of positional information each of which indicates a location at which each normal program is positioned with the normal storing unit; therefore, it is possible to read the normal program in an assured and prompt manner with the use of a piece of positional information that corresponds to the received piece of identification information.

The data processing apparatus may have an arrangement wherein one of the processing procedures included in the normal program includes a plurality of functions constituting a library, whereas another one of the processing procedures included in the normal program calls one of the plurality of functions, and the processing unit operates according to the one of the plurality of functions called by said another one of the processing procedures in a case where the processing unit operates according to said another one of the processing procedures.

With this arrangement, one of the processing procedures included in the normal program includes a plurality of functions that constitute a library. Another one of the processing procedure calls one of the plurality of functions. Accordingly, the secure program is able to request the normal program to perform a processing which uses one of the functions constituting the library. Thus, there is no need for the memory to have a library in the secure mode.

The data processing apparatus may further comprise an instruction obtaining unit operable to obtain, in the secure mode, a writing instruction to instruct that the secure program should be written to the secure storing unit; and a secure loading unit operable to, in the secure mode, in a case where the writing instruction has been obtained, write the secure program to the secure storing unit and output a piece of writing completion information which indicates that the writing is completed, wherein the switching unit further switches from the secure mode to the normal mode in a case where the piece of writing completion information has been outputted, and the data processing apparatus further comprises a normal loading unit operable to, in the normal mode, receive the piece of writing completion information and write the normal program to the normal storing unit.

With this arrangement, in the case where the instruction obtaining unit has obtained a writing instruction, when the secure loading unit has received, in the secure mode, a writing instruction to instruct that the secure program should be written into the secure storing unit, the secure loading unit writes the secure program into the secure storing unit. The normal loading unit writes the normal program into the normal storing unit. Because of this arrangement, while the secure program is being executed, the normal program is always stored in the normal storing unit; therefore, when a call instruction included in the secure program is executed, it is possible to immediately move to execution of the normal program.

The data processing apparatus may have an arrangement wherein the reading unit further stores therein, in the normal mode, in a case where the normal loading unit has written the normal program to the normal storing unit, the piece of identification information in correspondence with a piece of positional information which indicates a location within the normal storing unit at which the normal program is positioned.

With this arrangement, in the case where the normal program has been written into the normal storing unit, the reading unit stores therein the pieces of identification information in correspondence with the piece of positional information which indicates a location within the normal storing unit at which the normal program is positioned. Because of this arrangement, immediately after the secure program is loaded, the reading unit stores therein the piece of identification information in correspondence with the piece of positional information which indicates the location within the normal storing unit at which the normal program is positioned. Accordingly, when the call instruction included in the secure program is executed, it is possible to read the normal program immediately.

The data processing apparatus may further comprise a deletion instruction obtaining unit operable to obtain, in the secure mode, a deletion instruction to instruct that the secure program should be deleted; and a secure deleting unit operable to, in a case where the deletion instruction has been obtained, in the secure mode, delete the secure program from the secure storing unit and output a piece of deletion completion information which indicates that the deletion is completed, wherein the switching unit further switches from the secure mode to the normal mode in a case where the piece of deletion completion information has been outputted, and the data processing apparatus further comprises a normal deletion unit operable to, in the normal mode, obtain the piece of deletion completion information and delete the normal program from the normal storing unit.

With this arrangement, when the deletion instruction obtaining unit has obtained a deletion instruction to instruct that the secure program should be deleted, the secure deleting unit deletes the secure program from the secure storing unit, whereas the normal deleting unit deletes the normal program from the normal storing unit.

Accordingly, while the secure program is not loaded, there is no need to load the normal program, either. Because of this arrangement, it is possible to prevent the normal program from wasting the memory area used in the normal mode.

The data processing apparatus may have an arrangement wherein the reading unit (i) stores therein the piece of identification information in correspondence with a piece of positional information which indicates a location within the normal storing unit at which the normal program is positioned and (ii) reads the normal program from the location indicated by the piece of positional information corresponding to the received piece of identification information.

With this arrangement, the reading unit stores therein the piece of identification information in correspondence with the piece of positional information which indicates a location within the normal storing unit at which the normal program is positioned; therefore, with the use of the piece of positional information corresponding to the received piece of identification information, it is possible to read the normal program in an assured and prompt manner.

The data processing apparatus may further comprise a boot program storing unit storing therein a boot program which includes an initialization procedure for initializing one or more devices included in the data processing apparatus comprising the processing unit and an activation procedure for activating the secure operating system; and an initializing unit operable to read the boot program from the boot program storing unit and to initialize the one or more devices according to the read boot program, and after the initialization is completed, to activate the secure operating system.

With this arrangement, the initializing unit initializes the device according to the boot program when the power source is turned on and activates the secure operating system after the initialization processing is completed. Because the data processing apparatus of the present invention activates the secure operating system before activating programs executed in the normal mode this way, it is possible to prevent, when the data processing apparatus is activated, unauthorized use of programs executed in the secure mode and the secure resource which may be caused by unauthorized operations of the programs executed in the normal mode.

The data processing apparatus may further comprise a normal output unit operable to output, in the normal mode, a processing result by the processing unit and a piece of secure identification information that indicates the secure program, wherein the switching unit further switches, in a case where the processing result has been outputted, from the normal mode to the secure mode, the data processing apparatus further comprises: a secure receiving unit operable to, in the secure mode, receive the processing result and the piece of secure identification information; and a secure reading unit operable to read the secure program that corresponds to the received piece of secure identification information from the normal storing unit, and the processing unit further operates, in the secure mode, according to the secure program using the processing result.

With this arrangement, the normal output unit outputs, in the normal mode, the processing result by the processing unit and secure identification information indicating the secure program. The secure receiving unit receives, in the secure mode, the processing result and the secure identification information. The secure reading unit reads the secure program that corresponds to the received secure identification information from the normal storing unit. The processing unit further operates, in the secure mode, according to the secure program with the use of the processing result. Thus, in the data processing apparatus of the present invention, a processing requested by the secure program executed in the secure mode is performed by the processing unit in the normal mode according to the normal program, and the processing result is returned to the secure program with accuracy.

The data processing apparatus may have an arrangement wherein the switching unit disconnects the secure resource from the processing unit when switching from the secure mode to the normal mode.

With this arrangement, the switching unit disconnects the secure resource from the processing unit when switching from the secure mode to the normal mode; therefore, the processing unit is notable to access the secure resource in the normal mode. Accordingly, it is possible to maintain security of the secure resource.

The processing apparatus may have an arrangement wherein the switching unit encrypts secure information held by the secure resource when switching from the secure mode to the normal mode.

With this arrangement, the switching unit encrypts the secure information held by the secure resource when switching from the secure mode to the normal mode; therefore, the processing unit is not able to use the secure data in the normal mode. Thus, it is possible to, in the normal mode, maintain security of the secure data held by the secure resource.

The data processing may have an arrangement wherein the secure information held by the secure resource includes a program that is executed in the secure mode and is made up of an instruction code portion, a data portion, and a stack portion, and the switching unit encrypts the instruction code portion when switching from the secure mode to the normal mode.

Alternatively, it is acceptable to have an arrangement wherein the secure information held by the secure resource includes a program that is executed in the secure mode and is made up of an instruction code portion, a data portion, and a stack portion, and the switching unit encrypts the data portion when switching from the secure mode to the normal mode.

Further alternatively, it is acceptable to have an arrangement wherein the secure information held by the secure resource includes a program that is executed in the secure mode and is made up of an instruction code portion, a data portion, and a stack portion, and the switching unit encrypts the stack portion when switching from the secure mode to the normal mode.

With these arrangements, the switching unit encrypts the instruction code portion when switching from the secure mode to the normal mode. Alternatively, the switching unit encrypts the data portion when switching from the secure mode to the normal mode. Further alternatively, the switching unit encrypts the stack portion when switching from the secure mode to the normal mode.

By encrypting only the part of the program that needs to be protected, it is possible to reduce the processing load related to the encryption processing.

The data processing apparatus may have further comprise a debug receiving unit operable to receive a debug actuation signal from a debug apparatus that monitors and controls an operation of the processing unit, wherein the switching unit connects the processing unit to the debug receiving unit when switching from the secure mode to the normal mode and disconnects the processing unit form the debug receiving unit when switching from the normal mode to the secure mode.

With this arrangement, the switching unit disconnects the processing unit from the debug receiving unit when switching from the normal mode to the secure mode; therefore, while operating in the secure mode, the operation of the data processing apparatus of the present invention will not be monitored or manipulated by an external debug apparatus. Thus, it is possible to protect the secure resource from such a debug apparatus.

The data processing apparatus may have an arrangement wherein the reading unit (i) stores therein the piece of identification information in correspondence with a piece of positional information which indicates a location within the normal storing unit at which the normal program is positioned and (ii) reads the normal program from the location indicated by the piece of positional information corresponding to the received piece of identification information.

With this arrangement, the reading unit stores therein the piece of identification information in correspondence with the positional information indicating a location within the normal storing unit at which the normal program is positioned; therefore, it is possible to read the normal program in an assured and prompt manner with the use of the piece of positional information that corresponds to the received piece of identification information.

The data processing apparatus of the present invention may be operable to switch between a first operating system and a second operating system and to execute and manage processes generated in the first and second operating systems by causing each of the processes to make a state transition into one of an execution state, an execution wait state, and a halt state, the data processing apparatus comprising: a first generating unit operable to, in the first operating system, generate a first process; a second generating unit operable to, in the second operating system, generate a second process that is in correspondence with the first process; a first detecting unit operable to, in the first operating system, detect a state transition of the first process; a first output unit operable to, in the first operating system, output transition information indicating the detected state transition; an OS switching unit operable to switch the first operating system to the second operating system; a second obtaining unit operable to, in the second operating system, obtain the transition information; and a second transition unit operable to cause the second process to make a state transition according to the obtained transition information.

With this arrangement, the first output unit outputs, in the first operating system, the transition information. The OS switching unit switches from the first operating system to the second operating system. The second transition unit causes, in the second operating system, the second process to make a state transition according to the transition information. Accordingly, in the data processing apparatus in which one of the two operating systems selectively executed is in operation, it is possible to monitor the operational state of the first process controlled by the first operating system, also in the second operating system via the second process.

The data processing apparatus may further comprise: a second detecting unit operable to, in the second operating system, detect a state transition of the second process; and a second output unit operable to, in the second operating system, output transition information indicating the detected state transition, wherein the OS switching unit further switches the second operating system to the first operating system, and the data processing apparatus further comprises: a first obtaining unit operable to obtain, in the first operating system, the transition information; and a first transition unit operable to cause the first process to make a state transition according to the obtained transition information.

With this arrangement, the second output unit outputs, in the second operating system, the transition information. The first transition unit causes the first process to make a state transition according to the transition information. Because of this arrangement, it is possible to monitor the operational state of the second process controlled by the second operating system, also in the first operating system via the first process. Accordingly, the first and second operating systems are able to mutually monitor the operational state of the first process and the second process that are controlled by them respectively.

The data processing apparatus may comprise a shared storage area which is accessible by both the first operating system and the second operating system, wherein the first output unit outputs the transition information by writing the transition information to the shared storage area, and the second obtaining unit obtains the transition information by reading the transition information from the shared storage area.

With this arrangement, the first output unit and the second obtaining unit give and receive the transition information via the shared storage area that are accessible by both the first operating system and the second operating system. Since the shared storage area is accessible by both the first operating system and the second operating system, the data processing apparatus of the present invention is able to transfer information from the first operating system to the second operating system while executing the first and operating systems selectively.

The data processing apparatus may have an arrangement wherein the second output unit outputs the transition information by writing the transition information to the shared storage area, and the first obtaining unit obtains the transition information by reading the transition information from the shared storage area.

With this arrangement, the data processing apparatus is able to transfer information from the second operating system to the first operating system while executing the first and second operating systems selectively.

The data processing apparatus may comprise a device that operates under management of the second operating system, wherein the second process is a device driving program that controls driving of the device, and the second detecting unit detects the state transition of the second process due to the operation of the device.

With this arrangement, the second process is a device driving program that controls the driving of the device. The second detecting unit detects the state transition of the second process due to the operation of the device. Accordingly, the first process also makes a state transition along with the state transition of the device driving program, and it is possible to monitor the driving state of the device also in the first operating system.

The data processing apparatus may have an arrangement wherein in a case where the first process make a state transition from a halt state to an execution state in the first operating system, the data processing apparatus operates according to the first process which performs an exclusion processing to avoid duplication of processing requests to the device, and in the first operating system, the first output unit outputs the transition information after the exclusion processing is finished.

Normally, such an exclusion processing is executed by a device driving program that controls the driving of the device; however, according to this arrangement, in the data processing apparatus, after the first process performs an exclusion processing to avoid duplication of processing requests made to the device, the first output unit outputs the transition information in the first operating system. Due to the outputted transition information, the second process makes a state transition to the execution state and starts to control the driving of the device. When a case is imagined where it is necessary to have separate memory spaces to be used by the first operating system and the second operating system respectively, and especially, the memory used by the second operating system needs to be protected from external accesses, since first process performs the exclusion processing, the second process does not have to perform the exclusion processing. Accordingly, the memory space used by the second process in order to perform the exclusion processing is reduced. Thus, it is possible to reduce memory that needs to be protected, and it is possible to reduce the load on the protection mechanism for protecting the memory from the outside.

The data processing apparatus may further comprise: an interrupt detecting unit operable to detect occurrence of interrupts in the first and second operating systems; an interrupt investigating unit operable to, in a case where an interrupt has been detected in the first operating system, investigate a cause of occurrence of the detected interrupt; and an interrupt transition unit operable to, in a case where in the first operating system the interrupt investigating unit judges that the interrupt is caused by the device, cause the first process to make a state transition from a halt state to an execution state.

Further, the data processing apparatus may further comprise a notification unit operable to, in a case where an interrupt has been detected in the second operating system, output a piece of interrupt notification information which indicates a detection of the interrupt, wherein the OS switching unit switches from the second operating system to the first operating system, the first obtaining unit further obtains, in the first operating system, the piece of interrupt notification information, and in a case where the interrupt investigating unit has obtained the piece of interrupt notification information in the first operating system, the interrupt investigating unit further investigates a cause of occurrence of the interrupt.

With these arrangements, in the case where an interrupt is detected in the first operating system, the interrupt investigating unit investigates the interrupt occurrence cause. Further, in the case where an interrupt is detected in the second operating system, the notification unit outputs interrupt notification information indicating a detection of the interrupt so that the interrupt investigating unit investigates the interrupt occurrence cause in the first operating system.

Because of this arrangement, there is no need to have an interrupt investigating unit under the management of the second operating system. Accordingly, the data processing apparatus of the present invention needs to have only one interrupt investigating unit.

The data processing apparatus may have an arrangement wherein when an interrupt has been detected, the notification unit suspends detection of interrupts performed by the interrupt detecting unit, and when having obtained the piece of interrupt notification information, the first obtaining unit releases the suspension of the detection of interrupts performed by the interrupt detecting unit.

With this arrangement, when an interrupt has been detected, the notification unit suspends the detection of interrupts performed by the interrupt detecting unit. When having obtained the interrupt notification information, the first obtaining unit releases the suspension of the detection of interrupts performed by the interrupt detecting unit. Accordingly, until the first obtaining unit obtains the interrupt notification information outputted by the notification unit, there is no possibility that the interrupt detecting unit obstructs the operation of the switching from the second operating system to the first operating system. In addition, it is possible to prevent the interrupt detecting unit from detecting an interrupt in duplication during the period when the second operating system is switched to the first operating system.

The data processing apparatus may be operable to operate according to a program and comprising: a storing unit storing therein the program including a plurality of processing procedures; a validity judgment unit operable to judge whether or not the program stored in the storing unit is invalid; and a revocation unit operable to, in a case where the program is judged to be invalid, revoke the program.

With this arrangement, the validity judgment unit judges whether or not the program is invalid. In the case where the judgment result is that the program is invalid, the revocation unit is able to revoke the program. Thus, in the data processing apparatus of the present invention, it is possible to prevent invalid programs from being executed.

The data processing apparatus may have an arrangement wherein the validity judgment unit includes: a program information obtaining subunit operable to obtain program identification information indicating the program stored in the storing unit; a revocation information obtaining subunit operable to obtain revocation identification information indicating one or more revoked programs; and a judgment subunit operable to judge whether or not the obtained program identification information matches the revocation identification information; and the validity judgment unit judges that the program is invalid in a case where the obtained program identification information matches the obtained revocation identification information.

With this arrangement, by judging whether or not the program identification information obtained by the program information obtaining subunit matches the revocation identification information obtained by the revocation information obtaining subunit, it is possible to easily determine whether or not the program is invalid.

The data processing apparatus may have an arrangement wherein the program information obtaining subunit includes: an identification information storing sub-subunit storing therein the program identification information indicating the program; and a reading sub-subunit operable to read and obtain the program identification information from the identification information storing sub-subunit, and the revocation information obtaining subunit includes: a revocation information storing sub-subunit storing therein the revocation identification information indicating the one or more revoked programs; and a reading sub-subunit operable to read and obtain the revocation identification information from the revocation information storing sub-subunit.

With this arrangement, the program information obtaining subunit is able to obtain the program identification information indicating the program in a prompt manner from the identification information storing sub-subunit which prestores therein the program identification information. Further, the revocation information obtaining subunit is able to obtain the revocation identification information indicating the one or more revoked programs in a prompt manner from the revocation information storing sub-subunit which prestores therein the revocation identification information.

The data processing apparatus may have an arrangement wherein the validity judgment unit judges whether or not the program is invalid based on a public key certificate certifying validity of a public key assigned to the program.

With this arrangement, the validity judgment unit makes the judgment based on the public key certificate which certifies the validity of the public key assigned to the program. Since the public key certificate that has been issued by an official third-party organization is used, it is possible to make the judgment on validity of the program in a more assured manner.

The data processing apparatus may have an arrangement wherein the validity judgment unit includes: a certificate storing subunit storing therein the public key certificate that includes public key identification information for identifying the public key; a public key information obtaining subunit operable to obtain the public key identification information out of the public key certificate; a revocation information storing subunit storing therein revocation identification information which indicates a revoked public key; a revocation information reading subunit operable to read the revocation identification information from the revocation information storing subunit; and a judgment subunit operable to judge whether the obtained public key identification information matches the read revocation identification information, and the validity judgment unit judges that the program is invalid in a case where the obtained public key identification information is judged to match the read revocation identification information.

With this arrangement, the judgment subunit is easily able to determine if the program is invalid by comparing the public key identification information included in the public key certificate stored in the certificate storing subunit with the revocation identification information stored in the revocation information storing subunit.

The data processing apparatus may have an arrangement wherein the validity judgment unit further includes an updating subunit operable to obtain most updated revocation identification information from an external source and write the obtained most updated revocation identification information to the revocation information storing subunit.

With this arrangement, the updating subunit obtains the most updated revocation identification information from an outside source and writes the obtained most updated revocation identification information to the revocation information storing subunit. Generally speaking, since an issuing organization of public key certificates regularly updates revocation identification information by adding information that indicates public keys that are revoked afterward. Because the most updated revocation identification information obtained from such an issuing organization is used, it is possible to cope with some programs that are found to be invalid after the data processing apparatus is sold.

The data processing apparatus may have an arrangement wherein the updating subunit obtains most updated revocation identification information every time detecting an access request for accessing the storing unit.

With this arrangement, the updating subunit obtains the most updated revocation identification information every time detecting an access request for accessing the storing unit; therefore, the judgment subunit is able to make the judgment on validity of the program always using the most updated revocation identification information.

The data processing apparatus may have an arrangement wherein the updating subunit receives the revocation identification information, (a) from a certificate revocation list [CRL] issuing apparatus via a network, or (b) from a CRL issuing apparatus via a network and a server apparatus, or (c) by reading from a recording medium.

With this arrangement, the updating subunit receives the revocation identification information from the CRL issuing apparatus via the network; therefore, the updating subunit is able to obtain the most updated revocation identification information.

Alternatively, the updating subunit receives the revocation identification information from the CRL issuing apparatus via the network and the server; therefore, even if the data processing apparatus does not have a communication function with external networks, the updating subunit is able to update the revocation identification information via the server apparatus.

Further alternatively, the updating subunit reads the revocation identification information from a recording medium; therefore, even if the data processing apparatus is not in an environment to be able to communicate with the CRL issuing apparatus, the data processing apparatus is able to update the revocation identification information.

The data processing apparatus may have an arrangement wherein the updating subunit further obtains, from an external source, signature data generated by computing a digital signature on the most updated revocation identification information, performs a signature verification on the obtained signature data, and writes, in a case where the signature verification has been successful, the obtained revocation identification information to the revocation information storing subunit.

With this arrangement, the updating subunit obtains the signature data, performs signature verification on the obtained signature data, and writes, if the signature verification has been successful, the obtained revocation identification information to the revocation information storing subunit; therefore, it is possible to obtain revocation identification information that has been issued by an authorized issuer of the revocation identification information.

The data processing apparatus may have an arrangement wherein the validity judgment unit includes: a certificate storing subunit storing therein the public key certificate that includes signature data generated by computing a digital signature on at least the public key; a public key certificate obtaining subunit operable to obtain the public key certificate from the certificate storing subunit; and a verification subunit operable to verify whether the public key certificate is valid by performing a signature verification on the signature data included in the obtained public key certificate, and the validity judgment unit judges that the program is invalid in a case where the public key certificate is judged to be not valid.

With this arrangement, the validity judgment unit verifies whether or not the obtained public key certificate is valid by performing signature verification on the signature data. In the case where the public key certificate is judged to be not valid, the validity judgment unit judges that the program is invalid. Accordingly, the data processing apparatus is able to judge whether the public key certificate assigned to the program has been generated invalidly by an unauthorized third party and is able to execute only programs having a valid public key certificate.

The data processing apparatus may have an arrangement wherein the validity judgment unit judges whether or not the program is invalid using at least two public key certificates which certify validity of at least two public keys, respectively.

With this arrangement, the validity judgment unit judges whether or not the program stored in the storing unit is invalid using at least two public key certificates. Since a plurality of public key certificates are used for the judgment, it is possible to judge whether the program is invalid more accurately.

The data processing apparatus may have an arrangement wherein the two public keys are a first public key assigned to the program and a second public key assigned to either the data processing apparatus or an operating system controlling operation of the program, and the validity judgment unit includes: a certificate storing subunit storing therein (i) a second public key certificate which includes second signature data generated by computing a digital signature on the second public key with use of a secret key from an authorized authentication organization and a second public key and (ii) a first public key certificate which includes first signature data generated by computing a digital signature on at least the first public key with use of a secret key of either the data processing apparatus or the operating system and the first public key; a public key certificate obtaining subunit operable to obtain the first public key certificate and the second public key certificate from the certificate storing subunit; and a verification subunit operable (i) to verify whether or not the obtained second public key certificate is valid by performing a signature verification on the second signature data included in the obtained second public key certificate, with use of the public key from the authorized authentication organization (ii) to obtain, in a case where the obtained second public key certificate is judged to be valid, the second public key out of the second public key certificate, and (iii) to verify whether or not the obtained first public key certificate is valid by performing a signature verification on the first signature data included in the obtained first public key certificate with use of the obtained second public key, and the validity judgment unit judges that the program is invalid in a case where the second public key certificate is judged to be not valid or where the first public key certificate is judged to be not valid.

With this arrangement, the validity judgment unit verifies whether or not the second public key certificate is valid by performing signature verification on the second signature data included in the obtained second public key certificate with the use of the public key from the authentication organization. In the case where the second public key certificate is judged to be valid, the validity judging unit verifies whether or not the obtained first public key certificate is valid by obtaining the second public key from the second public key certificate and performing signature verification on the first signature data included in the obtained first public key certificate with the use of the obtained second public key. Since the verification processing uses such a plurality of public key certificates forming a hierarchical structure, even if a public key certificate in the upper layer is invalid, in other words, even if the operating system that controls the program is invalid, it is possible to revoke the program and avoid the situation where the program is executed under an unauthorized operating system.

In addition, even in the case where the data processing apparatus is invalid, it is possible to prevent the program from being executed.

The data processing apparatus may have an arrangement wherein the validity judgment unit judges whether or not the program is invalid every time detecting an access request for accessing the storing unit.

Further, the data processing apparatus may have an arrangement wherein the validity judgment unit judges whether or not the program is invalid every time detecting an access request for accessing the program stored in the storing unit.

Furthermore, the data processing apparatus may have an arrangement wherein the validity judgment unit judges whether or not the program is invalid immediately after electric power supply to the data processing apparatus is started.

With these arrangements, the validity judgment unit makes the judgment every time detecting an access request for accessing the storing unit. Alternatively, the validity judgment unit makes the judgment every time detecting an access request for accessing the program stored in the storing unit. Further alternatively, the validity judgment unit makes the judgment immediately after electric power supply to the data processing apparatus is started. Accordingly, it is possible to judge whether the program is invalid before the program is executed.

The data processing apparatus of the present invention may be operable to decrypt encrypted programs and execute the decrypted programs, wherein the storing unit stores therein, in place of the program, an encrypted program generated by performing an encryption algorithm on the program with use of a program key, and the validity judgment unit includes: an encryption key storing subunit storing therein as many as m encryption keys selected out of as many as p encryption keys; an encrypted information storing subunit storing therein m pieces of encrypted information generated by encrypting either the program key or predetermined detection information with use of each of the m encryption keys, in correspondence with the m encryption keys; a decryption subunit operable to generate m pieces of decrypted information by performing a decryption algorithm on each of the m pieces of encrypted information with use of corresponding one of the m encryption keys; and a judgment subunit operable to judge whether or not all the m pieces of generated decrypted information are the predetermined detection information, and the validity judgment unit judges that the program is invalid in a case where all the m pieces of generated decrypted information are judged to be the predetermined detection information.

Further, the data processing apparatus may have an arrangement wherein the p encryption keys are arranged at element positions in a first matrix having n rows by m columns where $p=n*m$, the m encryption keys are selected from the first matrix so that one encryption key is selected from each column of the first matrix, the encryption key storing subunit stores therein the element positions at which the encryption keys are arranged in the first matrix, in correspondence with the encryption keys, the encrypted information storing subunit stores therein the pieces of encrypted information in a second matrix having n rows by m columns at element positions being same as the element positions at which the encryption keys corresponding to the pieces of encrypted information are arranged, and the decryption subunit reads the element positions that correspond to the encryption keys from the encryption key storing subunit, reads the pieces of encrypted information arranged at the element positions being same as the read element positions in the second matrix stored by the encrypted information storing subunit, and performs the decryption algorithm on the read pieces of encrypted information with use of the read encryption keys.

With these arrangements, the validity judgment unit generates the m pieces of decrypted information by performing the decryption algorithm on each of the pieces of encrypted information using the corresponding one of the m encryption keys. In the case where all of the m pieces of generated decrypted information are judged to be the detection information, the validity judgment unit determines that the program is invalid. When the program is valid, the data processing apparatus generates an encryption key from the encrypted encryption key, decrypts the encrypted program with the generated encryption key so as to generate a program, and executes the generated program. Since such double encryption is performed, it is possible to protect the program against unauthorized use.

Further, the p encryption keys are selected so that one encryption key is selected from each column of the first matrix. Here, the following discussion is based on a case where there are a plurality of encrypted programs encrypted with one program key. When one of the programs is invalid, m pieces of decrypted information generated with m encryption keys assigned to this invalid program are all the detection information. Even if some of m encryption keys assigned to the other valid programs are identical to some of the m encryption keys for the invalid program, it is possible to generate the program key from the other encryption keys. This way, since m encryption keys are assigned to each program, so that different programs have different combinations of encryption keys, it is possible to revoke only invalid programs, and to use valid programs.

The data processing apparatus of the present invention may comprise: a memory unit operable to store data therein; a processor operable to operate according to a program including a plurality of processing procedures; and a monitoring unit that is provided between the memory unit and the processor and is operable to judge whether or not transfer data that is outputted from the processor, and is to be transferred to the memory unit satisfies a transfer restriction condition, to inhibit the transfer data from being transferred to the memory unit in a case where the transfer restriction condition is satisfied, and to allow the transfer data to be transferred to the memory unit in a case where the transfer restriction condition is not satisfied.

With this arrangement, the monitoring unit is provided between the memory unit and the processor and is operable to judge whether or not the transfer data outputted from the processing to be transferred to the memory unit satisfies the transfer restriction condition. In the case where the transfer restriction condition is judged to be satisfied, the monitoring unit inhibits the transfer data from being transferred to the memory unit. Because of this arrangement, it is possible to prevent unauthorized accesses to the memory unit from occurring while the program is in operation.

The data processing apparatus may have an arrangement wherein the monitoring unit stores therein transfer restriction conditions each of which is for a corresponding one of a plurality of application programs, selects one of the transfer restriction conditions depending on an application program being executed by the processor, and uses the selected transfer restriction condition as the transfer restriction condition for making the judgment.

With this arrangement, the monitoring unit selects a transfer restriction condition for each application program to be executed by the processor and uses the selected transfer restriction condition. In the case where a plurality of application programs are executed in the data processing apparatus, it is well likely that different applications use different pieces of data and/or devices. Accordingly, by using a different transfer restriction condition for each application program enables the data processing apparatus to securely execute the plurality of application programs.

The data processing apparatus may have an arrangement wherein each of the transfer restriction conditions is a piece of address range information that indicates a predetermined storage space within the memory unit, and the monitoring unit extracts a piece of address information from the transfer data and inhibits the transfer data from being transferred in a case where the extracted piece of address information is included in a corresponding one of the pieces of address range information.

With this arrangement, the monitoring unit inhibits the transfer data from being transferred in the case where the extracted piece of address information is included in the address range information. Accordingly, it is possible to block the processor from accessing the predetermined storage space.

The data processing apparatus may have an arrangement wherein each of the transfer restriction conditions is a limit number indicating an upper limit of how many times accesses are allowed to the predetermined storage space within the memory unit, and the monitoring unit stores therein an accumulative number of accesses made to the storage space in history, extracts a piece of address information from the transfer data, adds 1 to the accumulative number in a case where the extracted piece of address information is included in a corresponding one of the pieces of address information, and inhibits the transfer data from being transferred in a case where a number after the addition exceeds the limit number.

With this arrangement, the monitoring unit inhibits the transfer data from being transferred in the case where the number after the addition exceeds the limit number. Because of this arrangement, it is possible to overlook an unauthorized access that accidentally happens for some reason during execution of the program and, only when unauthorized accesses are constantly made to the predetermined storage space with, for example, a malicious tampering of the program, to inhibit the transfer data from being transferred during execution of the program.

The data processing apparatus may have an arrangement wherein the monitoring unit judges if the transfer data satisfies the transfer restriction condition, the transfer data being transferred on a bus connected to the processor.

With this arrangement, the monitoring unit judges whether or not the transfer data being transferred on the bus connected to the processor satisfies the transfer restriction condition; therefore, it is possible to make the judgment in an assured manner every time a piece of transfer data is outputted from the processor.

The data processing apparatus may have an arrangement wherein the memory unit stores therein an encrypted code and encrypted data respectively generated by encrypting, with use of an encryption key, a code portion and a data portion of an application program being different from a current program being currently executed by the processor, each of the transfer restriction condition is a piece of address range information that indicates a predetermined storage space within the memory unit in which the encrypted data is stored, and the monitoring unit stores therein a decryption key for decrypting the encrypted code and the encrypted data, extracts a piece of address information from the transfer data, (a) generates a decrypted code by decrypting the encrypted code stored in the storage space indicated by the transfer data with use of the decryption key in a case where the extracted piece of address information is within an address range indicating the storage space in which the encrypted code is stored, transfers the generated decrypted code to the processor, and (b) inhibits the transfer data from being transferred in a case where the extracted piece of address information is included in a corresponding one of the pieces of address range information.

With this arrangement, the monitoring unit stores therein the decryption key for decrypting the encrypted code and the encrypted data and, in the case where the piece of address information is within the address range indicating the storage space in which the encrypted code is stored, generates the decrypted code by decrypting the encrypted code stored in the storage space indicated by the transfer data, with the use of the decryption key, transfers the generated decrypted code to the processor. In the case where the extracted piece of address information is included in the address range information, the monitoring unit inhibits the transfer data from being transferred. Because of this arrangement, it is possible to have a limitation so that the data portion of the application program is used only by the application program.

The data processing apparatus may have an arrangement wherein in the case where the transfer restriction condition is satisfied, the monitoring unit further adds a piece of identification information identifying the program being executed by the processor to a program revocation list.

With this arrangement, in the case where the transfer restriction condition is judged to be satisfied, the monitoring unit adds a piece of identification information identifying the program being executed by the processor to the program revocation list; therefore, it is possible to prevent the program from being executed by the processor once again.

The data processing apparatus of the present invention may comprise: a memory unit operable to store data therein; a processor being operable to operate according to a program including a plurality of processing procedures and having a program counter in which an address of an instruction to be executed next is stored; and a monitoring unit operable to judge whether or not an address stored in the program counter is within a predetermined address range, and instruct the processor to put a predetermined value into the program counter in a case where the address stored in the program counter is within the predetermined address range, wherein the processor puts the predetermined value into the program counter when having received the instruction.

With this arrangement, the monitoring unit judges whether or not the address stored in the program counter is included in the predetermined address range, and in the case where the stored address in included in the predetermined address range, the monitoring unit instructs the processor to put a predetermined value into the program counter. Because of this arrangement, it is possible to prevent, in advance, the processor from accessing a storage area corresponding to the predetermined address range, and to discontinue execution of the program by, for example, transferring the execution right of the processor to another program such as an operating system.

BRIEF DESCRIPTION OF THE DRAWINGS

FIG. 5 shows the detail of an application management table 166;

FIG. 7 shows the detail of a secure application management table 186;

FIG. 48 shows the configuration of a secure device driver management table 231 owned by the normal OS 151 and the secure OS 171 in a modification example of the first embodiment;

FIG. 59 shows the configurations of an application unique key matrix 592 and an OS unique key matrix 597;

FIG. 60 shows the detailed configuration of the application matrix revocation list 611;

FIG. 70 shows the configurations of a secure memory table 811 and a normal memory table 861;

REFERENCE CHARACTERS

10: MOBILE PHONE NETWORK
15: BASE STATION
20: THE INTERNET
100: MOBILE PHONE
101: DEBUGGER IF
102: CPU
103: MMU
104: SECONDARY MEMORY UNIT
106: SWITCH CONTROL UNIT
107: INTERRUPT CONTROLLER
108: INPUT UNIT
109: DISPLAY UNIT
111: NORMAL MEMORY
112: SHARED MEMORY
113: SECURE MEMORY
114: MEMORY PROTECTION UNIT
116: INPUT OUTPUT UNIT
117: ENCRYPTION PROCESSING DEVICE
118: WIRELESS COMMUNICATION CONTROL UNIT
119: MICROPHONE
120: SPEAKER
121: COMMUNICATION UNIT
122: ANTENNA
123: BUFFER
124: ENCODING PROCESSING UNIT
126: D/A CONVERTING UNIT
130: BUS
131: ACCESS UNIT
132: NORMAL INPUT OUTPUT DEVICE
133: SECURE INPUT OUTPUT DEVICE
300: MEMORY CARD

BEST MODE FOR CARRYING OUT THE INVENTION

The following describes in detail embodiments of the present invention with reference to the drawings.

1. First Embodiment

The following describes an embodiment of the present invention.

Figure 1:
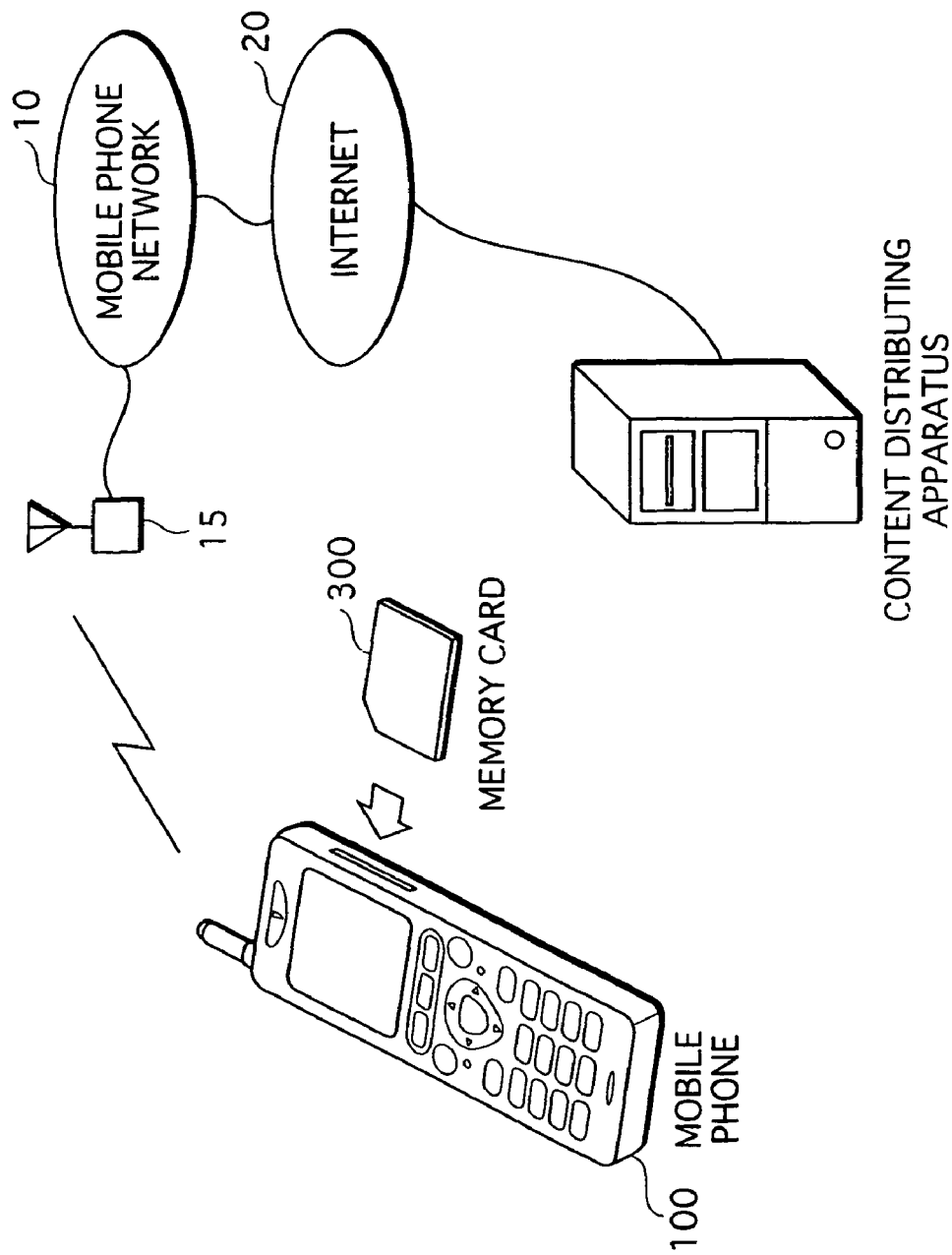
FIG. 1 shows an example of use of a mobile phone 100 in the first embodiment.

FIG. 1 shows an example of use of a mobile phone 100 of the present invention. The mobile phone 100 is configured to have a memory card 300 mounted thereto.

Encrypted music data is recorded on the memory card 300. The mobile phone 100 reads and plays back the music data from the memory card 300.

Further, the mobile phone 100 is connected to a content distributing apparatus via a base station 15, a mobile phone network 10, and the Internet 20. The mobile phone 100 obtains various types of contents that are constituted with music, images, and the like and are stored in the content distributing apparatus, via the Internet and the mobile phone network.

1.1 Memory Card 300

Figure 2:
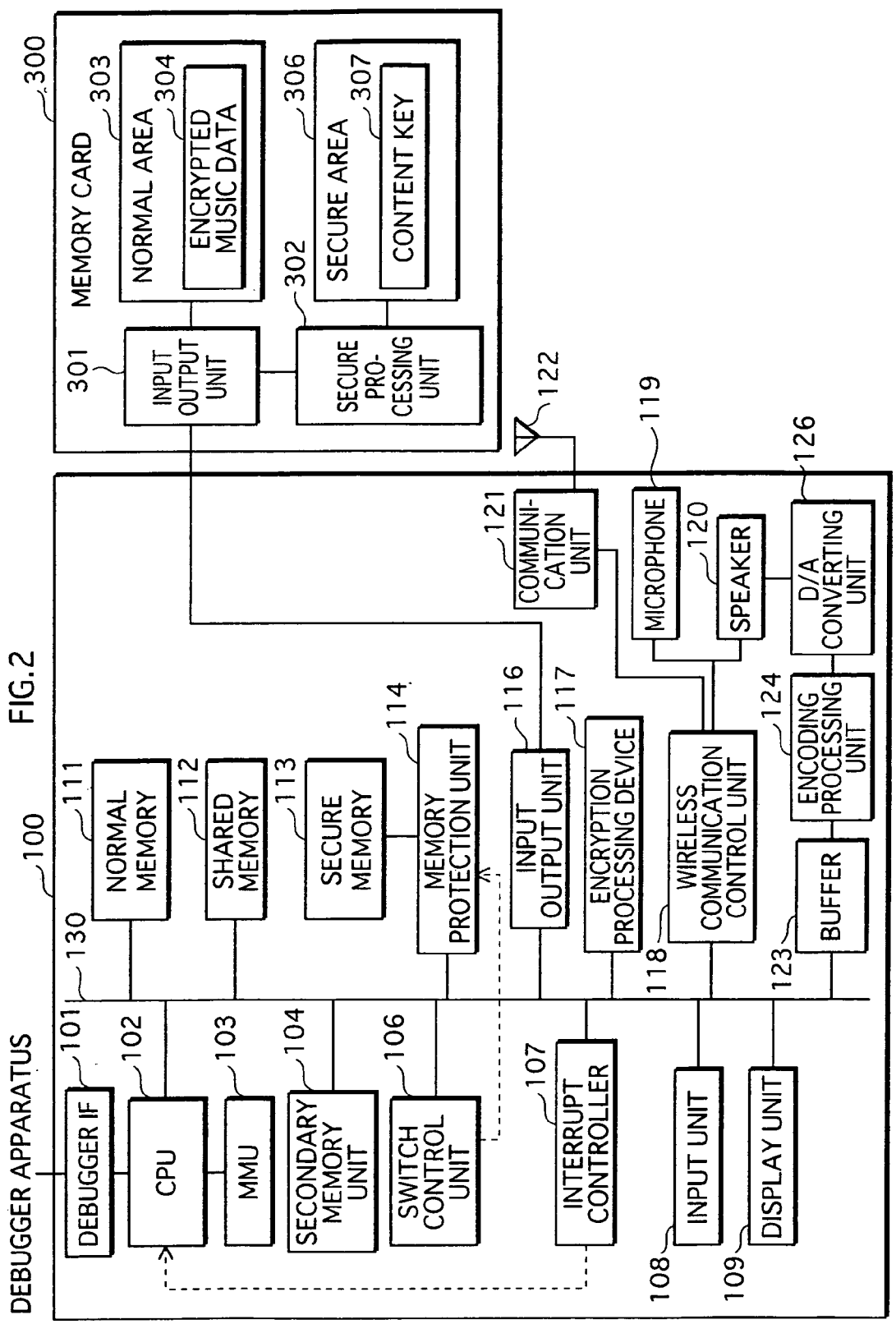
FIG. 2 is a block diagram that shows the configurations of the mobile phone 100 and the memory card 300.

The memory card 300 comprises, as shown in FIG. 2, an input output unit 301, a secure processing unit 302, a normal area 303, and a secure area 306.

The normal area 303 is a storage area which external devices are able to freely access and stores therein encrypted music data 304. The secure area 306 is a storage area which only external devices with permissions are able to access and stores therein a content key 307.

The encrypted music data 304 . . . is generated by performing an encryption algorithm E1 on music data for one piece of music, using the content key 307. Each piece of encrypted music data is identified with a music piece ID.

As the encryption algorithm E1, DES (Data Encryption Standard) is used, for example.

The input output unit 301 inputs and outputs various types of data to and from an external device, the normal area 303, and the secure processing unit 302.

The secure processing unit 302 performs mutual authentication based on a configuration of a CPRM (Content Protection for Recordable Media) with an external device. In the case where the authentication is successful, the secure processing unit 302 shares a key with the machine with which the authentication is performed. The secure processing unit 302 securely inputs and outputs data to and from the external device, using the shared key.

It should be noted that explanation of the CPRM will be omitted since it is publicly known. In addition, it is acceptable to perform authentication using other authentication methods.

1.2 Configuration of the Mobile Phone 100

The mobile phone 100 comprises, as shown in FIG. 2, a debugger IF 101, a CPU 102, an MMU 103, a secondary memory unit 104, a switch control unit 106, an interrupt controller 107, an input unit 108, a display unit 109, a normal memory 111, a shared memory 112, a secure memory 113, a memory protection unit 114, an input output unit 116, an encryption processing device 117, a wireless communication control unit 118, a microphone 119, a speaker 120, a communication unit 121, an antenna 122, a buffer 123, an encoding processing unit 124, and a D/A converting unit 126. Each of these circuits is connected to the bus 130.

The mobile phone 100 is specifically a computer system, and various types of computer programs are stored in the normal memory 111, the shared memory 112, the secure memory 113, and the secondary memory unit 104. As the CPU 102 operates according to these computer programs, the mobile phone 100 realizes some of its functions.

(1) The Secondary Memory Unit 104 and the Shared Memory 112

Figure 3:
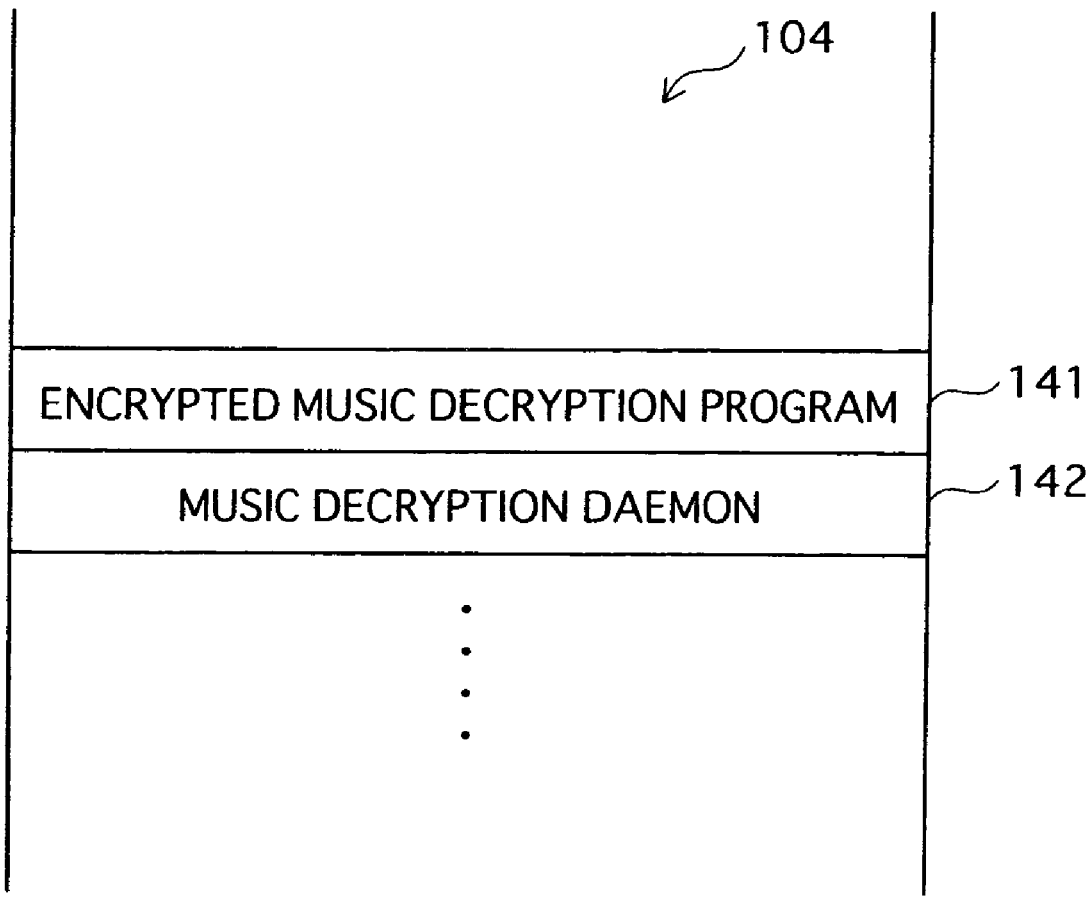
FIG. 3 shows an example of information stored in the secondary memory unit 104.

The secondary memory unit 104 is constituted with a ROM and, as shown in FIG. 3 for example, stores therein an encrypted music decryption program 141, a music decryption daemon 142, and the like.

The encrypted music decryption program 141 is generated by encrypting a music decryption program to be loaded into the secure memory 113 and executed. The music decryption program is a program for decrypting the encrypted music data 304 stored on the memory card 300. It will be explained in detail later.

The music decryption daemon 142 is a program to be loaded into the normal memory 111 and executed and is in one-to-one correspondence with the music decryption program.

Out of different types of processing performed in order to decrypt music, the music decryption program performs some processing that requires a high level of security and some processing which deals with data that needs to be protected, whereas the music decryption daemon performs other processing that does not require a high level of security. The details will be described later.

The shared memory 112 is constituted with a RAM and is a memory that may be used both by programs in the normal memory 111 and by programs in the secure memory.

It should be noted that although the secondary memory unit 104 is constituted with a ROM in the present example, it is also acceptable to constitute the secondary memory unit 104 with a hard disk unit.

(2) The Normal Memory 111 and the Secure Memory 113

Figure 4:
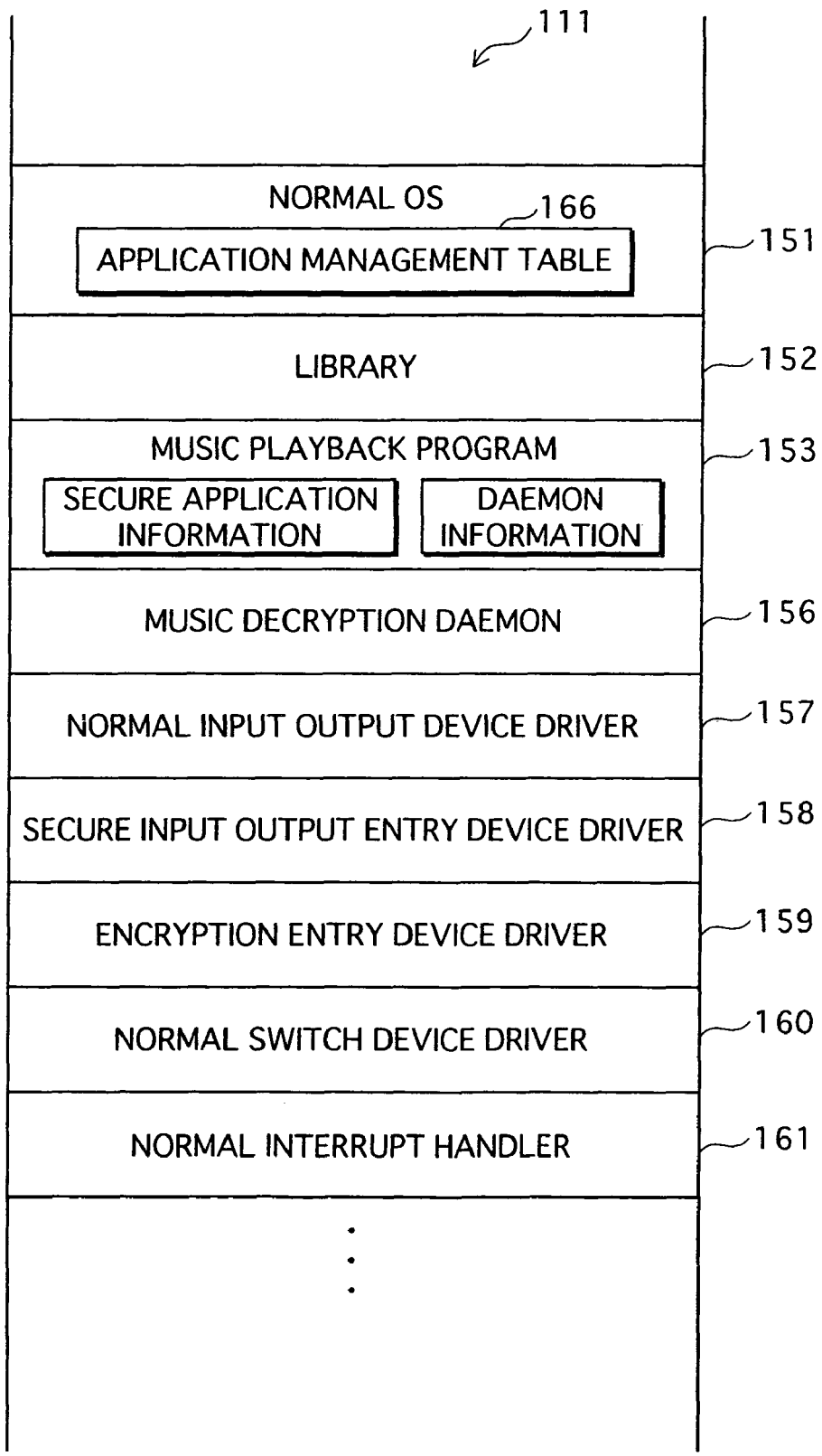
FIG. 4 shows an example of information stored in the normal memory 111.

The normal memory 111 is constituted with a RAM and a ROM and stores therein various types of programs to be executed by the CPU 102. As shown in FIG. 4 as an example, the normal memory 111 stores therein the normal OS 151, a library 152, a music playback program 153, a music decryption daemon 156, a normal input output device driver 157, a secure input output entry device driver 158, an encryption entry device driver 159, a normal switch device driver 160, and a normal interrupt handler 161.

The secure memory 113 is constituted with a RAM and stores therein various types of programs to be executed by the CPU 102. The secure memory 113 is connected to the bus 130 via the memory protection unit 114.

Figure 6:
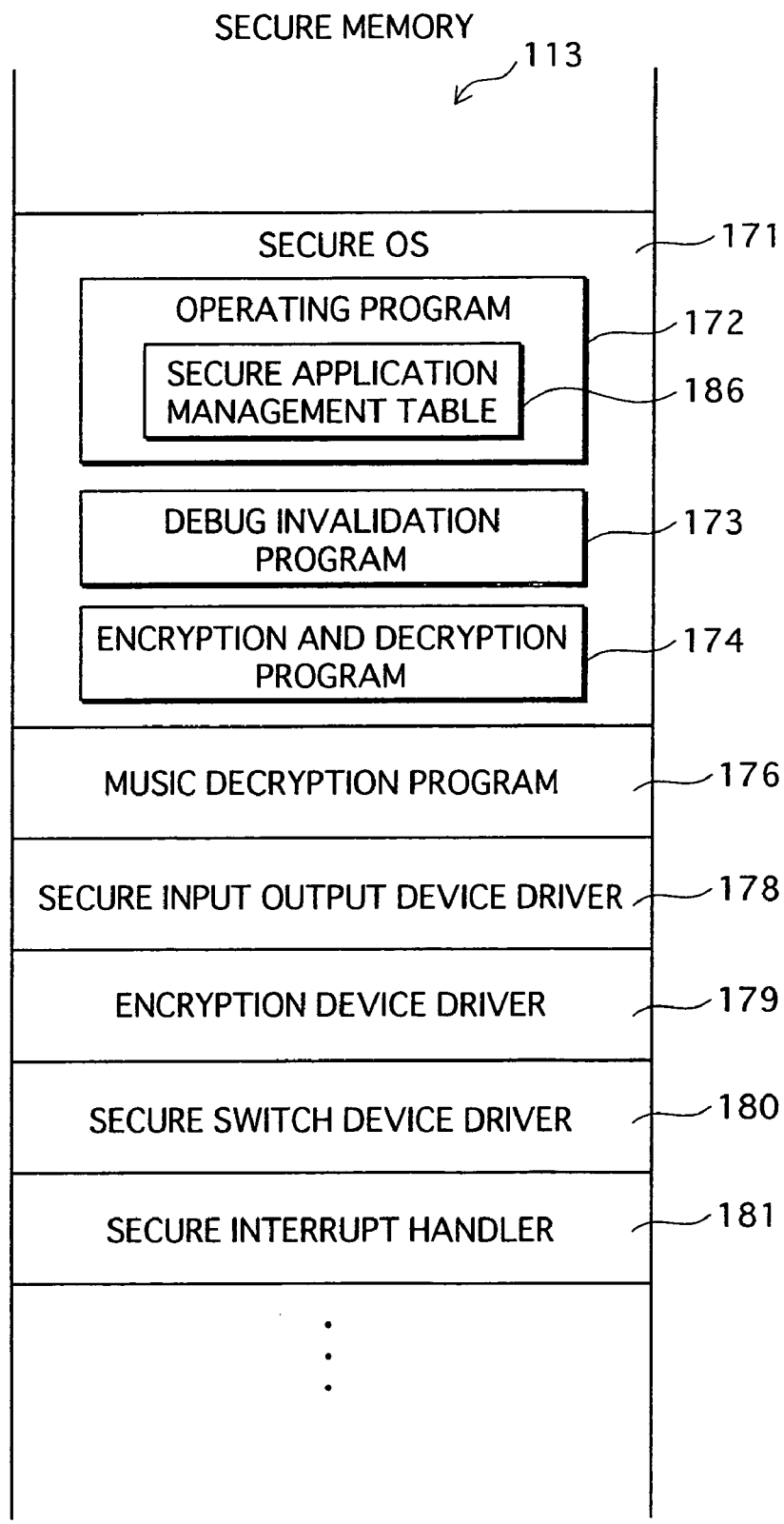
FIG. 6 shows an example of information stored in a secure memory 113.

The secure memory 113 stores therein, as shown in FIG. 6 as an example, the secure OS 171, a music decryption program 176, a secure input output device driver 178, an encryption device driver 179, a secure switch device driver 180, and a secure interrupt handler 181.

Figure 8:
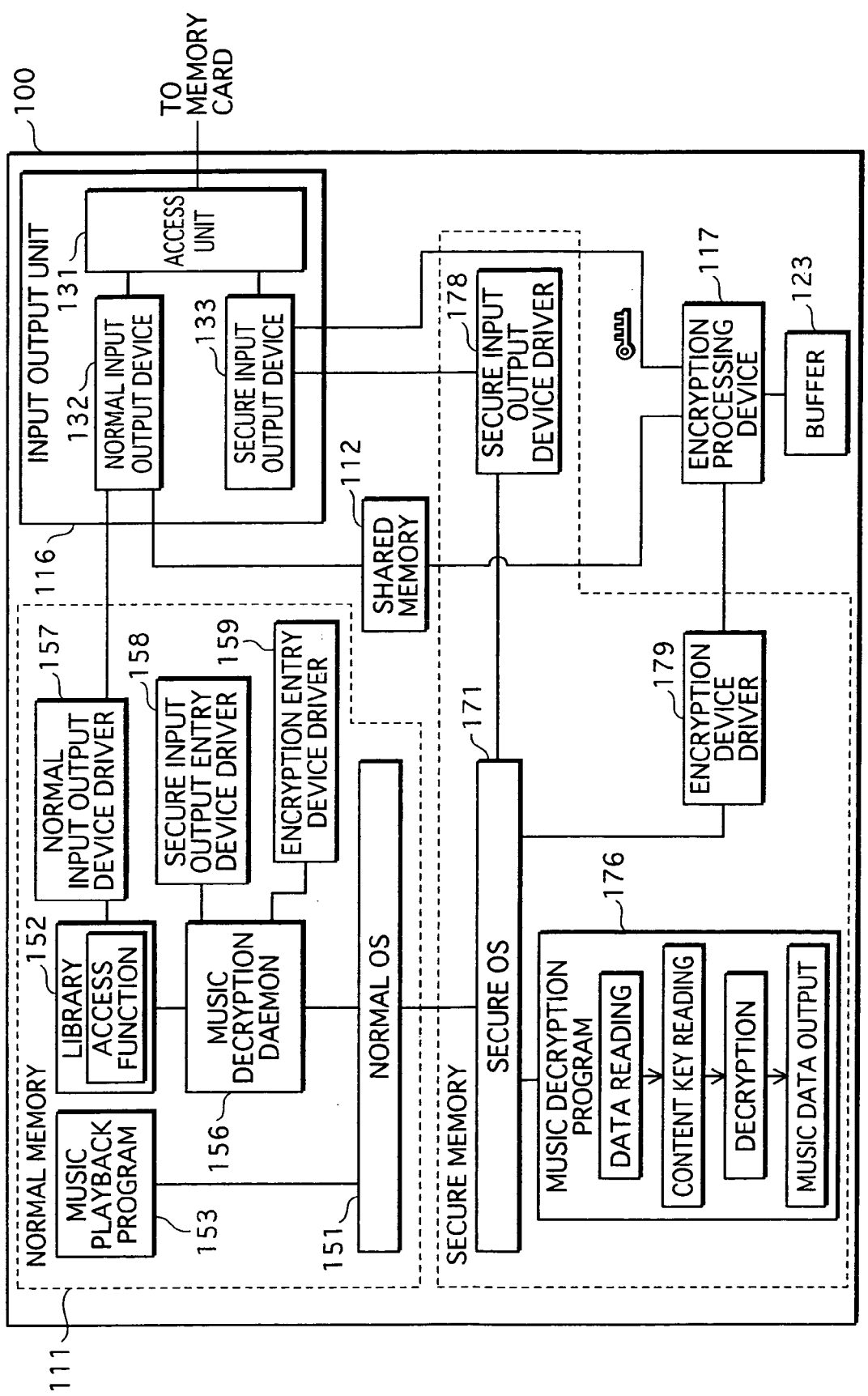
FIG. 8 is a block diagram that shows the correlation among the programs stored in the normal memory 111 and the secure memory 113.

FIG. 8 is a block diagram that shows the correlation between the programs stored in the normal memory 111 and the secure memory 113 in terms of their functions. In actuality, communication between programs in a same memory is realized by outputting a system call to the normal OS 151 and the secure OS 171. Further, switching between the normal OS 151 and the secure OS 171 is performed through the operations of the normal switch device driver 160, the secure switch device driver 180, and the switch control unit 106; however, mediation by the operating systems and programs related to the switching between the normal OS 151 and the secure OS 171 are omitted from FIG. 8.

In FIG. 8, the shared memory 112 is connected to the normal input output device 132 and the encryption processing device 117; however, the drawing is only to show a part of the roles played by the shared memory 112. The shared memory 112 is used by other programs, too.

<The Normal OS 151>

The normal OS 151 is basic software that controls various types of programs that are loaded into the normal memory 111 and executed. The normal OS 151 is constituted with a control program and control data.

The control data includes, as shown in FIG. 4, an application management table 166. The application management table 166 includes, as shown in FIG. 5, a plurality of entries 167, 168, and so on. Each entry is made up of a handle value, a daemon address, and an application context address.

A handle value is an identifier that is assigned to a secure application loaded into the secure memory 113.

In the following description, an application that performs a secure processing after being loaded into the secure memory 113 will be referred to as a secure application. Here, a secure processing includes a processing in which data that needs to be protected is dealt with and a processing in which an algorithm itself needs to be protected.

A daemon address is a load address within the normal memory 111 of a program that operates in correspondence with a secure application.

An application context address is an address within the normal memory 111 at which a context of an application is stored, the application requesting a secure application in correspondence with the handle value to perform a secure processing. The context includes a register value of the CPU 102, a stack pointer, and the contents of the MMU 103.

The following specifically describes the entry 167. The handle value "1" is an identifier that is assigned to the music decryption program 176 (to be described later) which is requested by the music playback program 153 to perform a secure processing. The daemon address "0000BBBB" is a load address within the normal memory 111 of the music decryption daemon 156 that operates in correspondence with the music decryption program 176. The application context address "0000AAEE" is an address within the normal memory 111 at which the context of the music playback program 153 is stored.

Further, the control data includes a device ID_A which is a piece of identification information that indicates the normal input output device driver 157, a device ID_B which is a piece of identification information that indicates the secure input output entry device driver 158, a device ID_C which is a piece of identification information that indicates the encryption entry device driver 159. In addition, these pieces of identification information are stored in correspondence with load addresses within the normal memory 111 of the normal input output device driver 157, the secure input output entry device driver 158, and the encryption entry device driver 159, respectively. The device ID_B is identical to a piece of identification information that indicates the secure input output device driver 178 (to be described later). The device ID_C is identical to a piece of identification information that indicates the encryption device driver 179.

The normal OS 151 transmits and receives various types of commands to and from the secure OS 171, via a predetermined area (called a command area) within the shared memory 112. Also, the normal OS 151 transmits and receives various types of commands to and from programs in the normal memory 111. In order for the normal OS 151 to transmit and receive commands to and from a program stored in the normal memory 111, either one of the shared memory 112 and the normal memory 111 may be used.

Figure 9A:
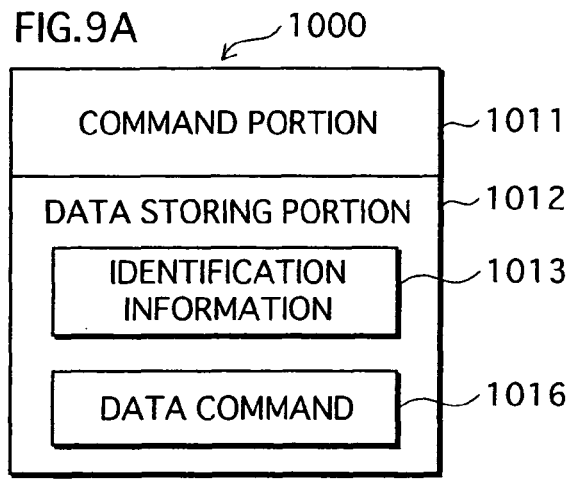
FIG. 9 shows the data structures of commands that are dealt with by a normal OS 151 and the secure memory 113.

FIG. 9A shows an example of a data structure of a command that is dealt with by the normal OS 151. The command 1000 is made up of a command portion 1011 and a data storing portion 1012.

Examples of commands to be stored in the command portion 1011 includes a secure application registration request, a registration completion notification, an application restoration request, a secure application deletion instruction, a deletion completion notification, a system call, a response notification, a secure processing request, an external processing request, a dormancy request, and an interrupt occurrence notification.

The data storing portion 1012 stores therein various types of data and commands 1016, a piece of identification information 1013 that indicates a program that receives the data and commands 1016, in accordance with the command stored in the command portion 1011.

Figure 9B:
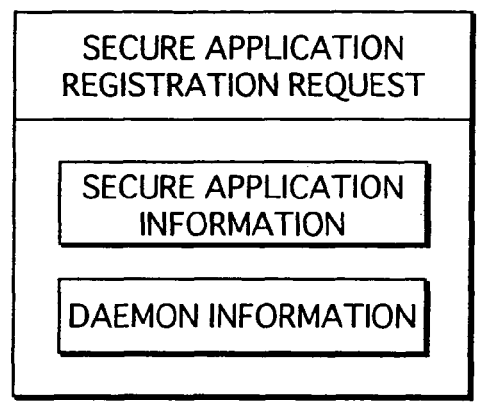

A secure application registration request is a command issued by an application operating in the normal memory 111 in order to request that a secure application requested to perform a secure processing should be loaded into the secure memory 113 and should be in a usable state. In such a situation, as shown in FIG. 9B, the data storing portion 1012 stores therein a piece of secure application information that indicates a secure application and a piece of daemon information that indicates a program which operates in correspondence with the secure application. When description is provided using an example of a secure application registration request outputted from the music playback program 153, the piece of secure application information is an address within the secondary memory unit 104 at which the encrypted music decryption program 141 is stored, and the piece of daemon information is an address at which the music decryption daemon 142 is stored. It should be noted that a piece of secure application information and a piece of daemon information may be an identifier that corresponds to the encrypted music decryption program 141 and an identifier that corresponds to the music decryption daemon 142, respectively.

A registration completion notification notifies that a secure application has been loaded into the secure memory 113 and that the registration into the secure application management table (to be described later) has been completed. In such a case, the data storing portion 1012 stores therein a handle value in correspondence with the registered secure application.

An application restoration request is a command issued by a secure application which has finished a requested processing, in order to request that an application which has requested the processing should be restored. In such a case, the data storing portion 1012 stores therein a piece of identification information indicating the secure application.

A secure application deletion instruction is for instructing that a secure application stored in the secure memory 113 should be deleted. In such a case, the data storing portion 1012 stores therein a handle value uniquely identifying the secure application to be deleted.

A deletion completion notification is for notifying that the secure application in the secure memory 113 has been deleted. In such a case, the data storing portion 1012 stores therein a handle value uniquely identifying the secure application that has been deleted.

A system call is a command issued by an application in the normal memory 111 in order to request the normal OS 151 to relay a command or a piece of data to another program in the normal memory 111. In such a case, the data storing portion 1012 stores therein a piece of identification information that indicates an application that has requested the relay, another piece of identification information that indicates a program being the relay destination, and the data and command to be relayed.

Figure 9C:
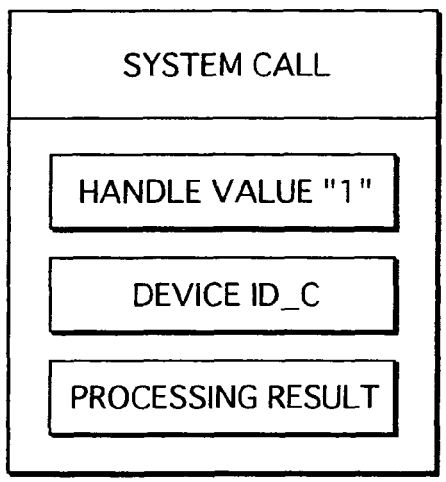

As an example, FIG. 9C shows a data structure of a system call outputted from the music decryption daemon 156. The command portion 1011 stores therein the system call. The data storing portion 1012 stores therein a handle value "1" indicating the music decryption daemon 156 being the issuer of the system call, the device ID_C indicating the encryption entry device driver 159 being the receiver of the data, and the data to be relayed "processing result".

A response notification is issued by a program that has received command or data from an application by way of a system call in order to request the normal OS 151 to notify the processing result to the application being the issuer of the system call, after performing the processing in accordance with the received command and data. The data storing portion 1012 stores therein a piece of identification information that indicates the program that has requested the notification, another piece of identification information that indicates the application being the receiver of the notification, the processing result, and the like.

As an example, by way of a system call shown in FIG. 9C, the encryption entry device driver 159 receives the handle value "1", the device ID_C, and the processing result and releases exclusion control (to be described later) and outputs a response notification including the handle value "1", the device ID_C, and the processing result, to the normal OS 151, and thereby notifies the handle value "1", the device ID_C, and the processing result to the music decryption daemon 156 via the normal OS 151 (the details will be described later).

Figure 9D:
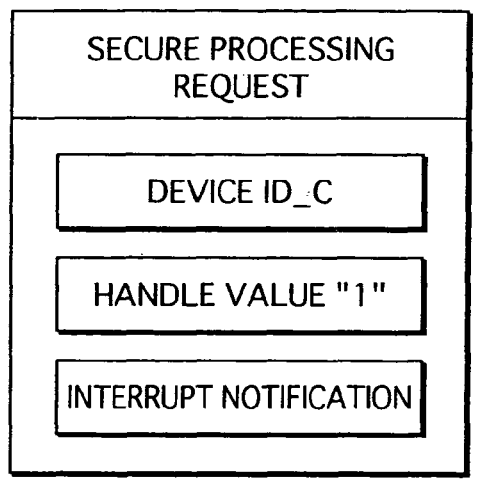

A secure processing request is a command issued by a program in the normal memory 111 to request that a command or data should be relayed to a program in the secure memory 113. In such a case, the data storing unit 1012 stores therein a piece of identification information that indicates a program that is the issuer of the external processing request, another piece of information that indicates a program being the relay destination, and the data and command to be relayed. FIG. 9D shows, as an example, a data structure of a secure processing request outputted from the music decryption daemon 156. The data storing portion 1012 stores therein the handle value "1" that indicates the music decryption daemon 156 which has requested the secure processing, the device ID_C that indicates the encryption device driver 179 as the receiver, and the relayed command "interrupt notification".

Figure 9E:
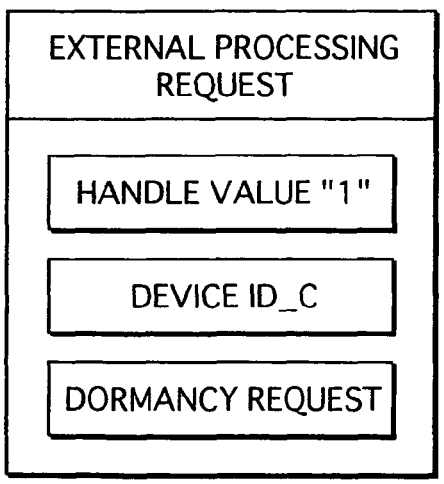

An external processing request is for requesting that a command and data should be relayed from a program within the secure memory 113 to a program within the normal memory 111. In such a case, the data storing unit 1012 stores therein a piece of identification information that indicates a program that is the issuer of the external processing request, another piece of identification information that indicates a program being the relay destination, and the data and command to be relayed. FIG. 9E shows, as an example, a data structure of a secure processing request outputted from the encryption device driver 179. The command portion stores there in an external processing request. The data storing portion stores therein the device ID_C that corresponds to the encryption device driver 179 which has requested the external processing, the handle value "1" that corresponds to the music decryption daemon 156 being the receiver, and the relayed command "dormancy request".

A dormancy request is a command for requesting that a device driver of a device, which is provided in the mobile phone 100, and a program, which requested the device to perform a process, are transferred into a dormancy state. In such a situation, the data storing portion 1012 stores therein a piece of identification information that indicates the device driver being the requester of the dormancy request and another piece of identification information that indicates the program having requested the device to perform a process.

An interrupt occurrence notification is for notifying that an interrupt has occurred.

Figure 10:
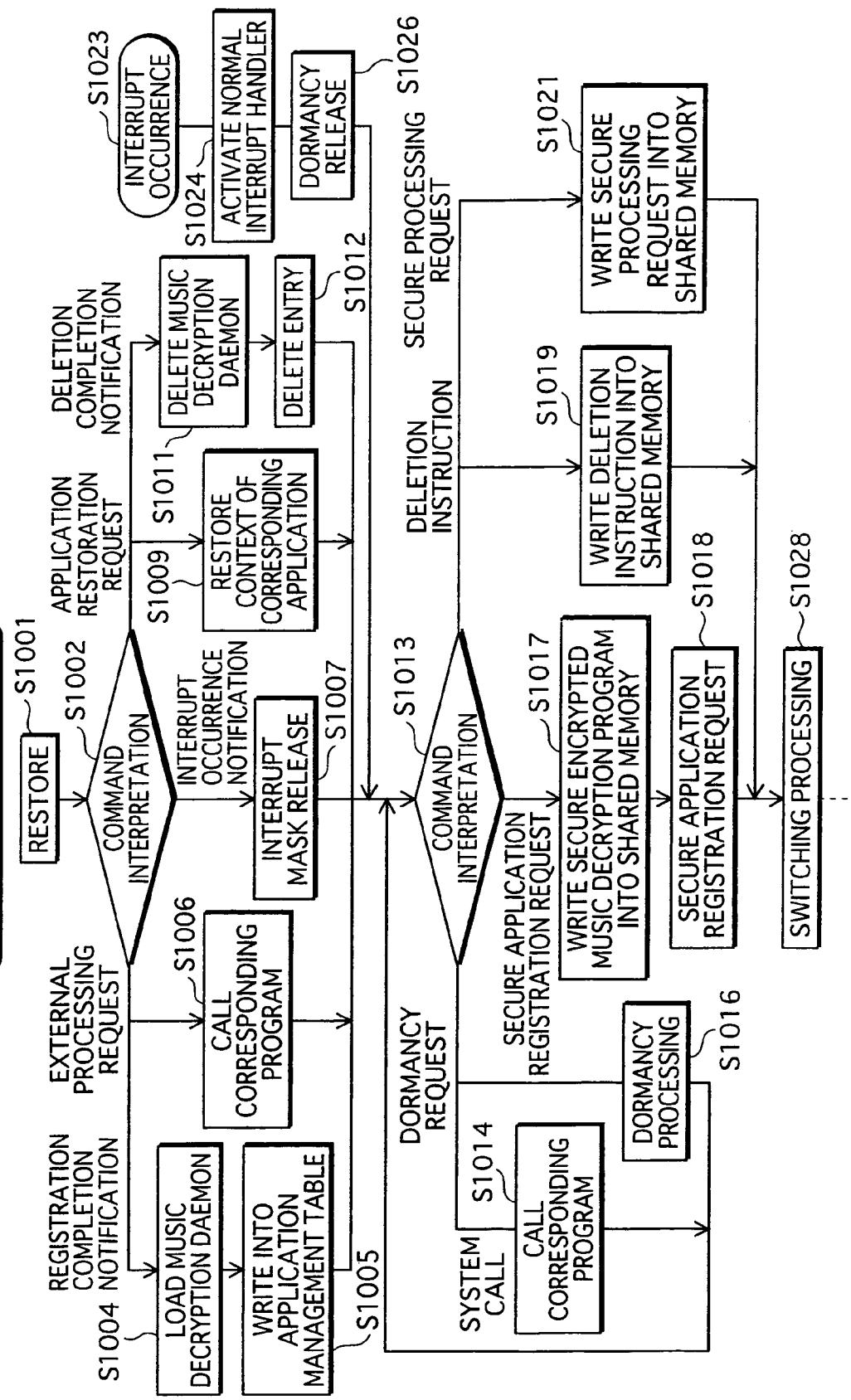
FIG. 10 is a flow chart that shows the operation of the normal OS 151.

The following describes the operation of the normal OS 151 with reference to the flow chart in FIG. 10. It should be noted that the normal OS 151 performs various types of processing besides the processing described in the flow chart.

Here, as for the secure application registration request, the registration completion notification, the application restoration request, the secure application deletion instruction, and the deletion completion notification, specific description is provided for a case where the application in the normal memory 111 is the music playback program 153, while the secure application is the music decryption program 176, and the program that operates in a pair with the secure application is the music decryption daemon 156.

When having been restored to the CPU 102 due to the switching processing, the normal OS 151 reads a command from the command area in the shared memory 112 (Step S1001). It should be noted that the switching processing will be described in detail in the section below that explains normal switch device driver 160 and the secure switch device driver 180.

The normal OS 151 interprets the read command (Step S1002). In the case where the interpreted command is a registration completion notification, the normal OS 151 loads the music decryption daemon 156 into the normal memory 111 (Step 1004), writes the loading address and the handle value "1" received as being contained in the data storing portion of the registration completion notification into the entry 167 of the application management table 166 (Step S1005), and outputs the handle value "1" to the music playback program 153.

In the case where the read command is an external processing request (Step S1002), the normal OS 151 calls a program that corresponds to the piece of identification information which is contained in the data storing portion and indicates the relay destination, and outputs the information received as being contained in the data storing portion of the external processing request to the called program (Step S1006).

In the case where the read command is an interrupt occurrence notification (Step S1002), the normal OS 151 releases an interrupt mask by erasing a piece of dummy data written in the interrupt register of the CPU 102 (Step S1007). The interrupt mask will be described later in the section that explains the secure interrupt handler 181.

In the case where the read command is an application restoration request (Step S1002), the normal OS 151 restores the context of the music playback program 153 based on the handle value "1" contained in the data storing portion and the application management table 166 (Step S1009).

In the case where the read command is a deletion completion notification (Step S1002), the normal OS 151 deletes the music decryption daemon 156 that corresponds to the handle value "1" contained in the data storing portion from the normal memory 111 (Step S1011), and deletes the entry 167 that contains the handle value "1" from the application management table 166 (Step S1012).

Subsequently, the normal OS 151 receives commands from the programs within the normal memory 111 (Step S1013).

When having received a system call (Step S1013), the normal OS 151 calls a program that corresponds to identification information such as a handle value or the device ID which indicates a relay destination and is written in the data storing portion, and outputs the information contained in the data storing portion (Step S1014). For example, in the case where a handle value "1" is contained, the normal OS 151 selects an entry 167 that contains the handle value "1" from the application management table 166, and calls the music decryption daemon 156 based on the daemon address of the selected entry 167. In the case where a device ID_C is contained, the normal OS 151 calls the encryption entry device driver 159.

In addition, although not shown in the drawings specifically, when having received a response notification, like when having received a system call, the normal OS 151 calls an application that corresponds to the identification information written in the data storing portion, and outputs the information contained in the data storing portion.

When having received a dormancy request (Step S1013), the normal OS 151 causes a program corresponding to the identification information such as a handle value or a device ID which is written in the data storing portion to make a transition into a dormancy state (Step S1016). To be in a dormancy state means to be in a state where no operation is performed.

When having received a secure application registration request containing secure application information and daemon information in the data storing portion from the music decryption program 176, as shown in FIG. 9B (Step S1013), the normal OS 151 saves the context of the music playback program 153 into the normal memory 111, writes the address of the saving destination to the application context address, and writes, to the shared memory 112, the encrypted music decryption program 141 having been read from the secondary memory unit 104 based on the secure application information (Step S1017). Subsequently, the normal OS 151 writes the secure application registration request to the shared memory 112 (Step S1018), and the procedure advances to Step S1028. The secure application registration request at this time contains, in the data storing portion, the address of the writing destination within the shared memory 112 for the encrypted music decryption program.

When having received a secure application deletion instruction from the music playback program 153 (Step S1013), the normal OS 151 writes the received secure application deletion instruction to the shared memory 112 (Step S1019). Here, the data storing portion contains a handle value "1" that indicates the music decryption program 176 which is the deletion target.

When having received a secure processing request (Step S1013), the normal OS 151 writes the received secure processing request to the shared memory 112 (Step S1021). Subsequently, the normal OS 151 performs a switching processing (Step S1028).

When an interrupt occurs, the normal OS 151 receives an interrupt occurrence notification from the interrupt controller 107 (Step S1023), and the normal OS 151 activates the normal interrupt handler 161 (Step S1024). The normal OS 151 releases the dormancy of the program that has been dormant based on the investigation result of the interrupt cause provided by the normal interrupt handler 161 (Step S1026), and the procedure advances to Step S1031.

It should be noted that, although in the present embodiment the normal OS 151 and the secure OS 171 exchange various types of commands with each other via the shared memory 112, it is also acceptable that they use a specific-purpose register instead of the shared memory 112.

<The Secure OS 171>

The secure OS 171 includes, as shown in FIG. 6, an operating program 172, a debug invalidation program 173, and an encryption and decryption program 174.

The debug invalidation program 173 is a program that writes a piece of dummy data to a register of the debugger IF 101 and invalidates the debugger IF 101 (i.e. makes the debugger IF 101 invalid). It should be noted that it is acceptable to have an arrangement wherein a switch is provided between the debugger IF 101 and the CPU 102 so that the debug invalidation program 173 invalidates the debugger IF 101 by opening and closing the switch.

The encryption and decryption program 174 generates a music decryption program by decrypting an encrypted music decryption program using a decryption key that is written in the program in advance.

The operating program 172 is basic software that controls various programs loaded into the secure memory 113 and is made up of a control program and control data. The control data includes, as shown in FIG. 6, a secure application management table 186.

The secure application management table 186 contains, as shown in FIG. 7, a plurality of entries 187, 188, and so on. Each of the entries is made up of a handle value, a secure application address, and a secure application context address and is in correspondence with a secure application loaded in the secure memory 113.

A handle value is an identifier assigned to each secure application.

A secure application address is an address within the secure memory 113 at which a secure application is loaded. A secure application context address is an address within the secure memory 113 at which a context of a secure application is saved.

As for some examples, the handle value "1" in the entry 187 is an identifier that is assigned to the music decryption program 176 by the operating program 172. The secure application address "1111EEEE" is an address within the secure memory 113 at which the music decryption program 176 is stored. The secure application context address "11AAD-DDE" is an address within the secure memory 113 at which the context of the music decryption program 176 is stored.

Further, the control data contains a device ID_B which is a piece of identification information that corresponds to the secure input output device driver 178 and a device ID_C which is a piece of identification information that corresponds to the encryption device driver 179. These device IDs are stored in the secure memory 113 in correspondence with loading addresses within the secure memory 113 of the secure input output device driver 178 and the encryption device driver 179, respectively.

The device ID_B and the device ID_C are identical to the device ID_B and the device ID_C that are contained in the control data owned by the normal OS 151, respectively.

The secure OS 171 gives and receives various commands to and from the normal OS 151 via a command area of the shared memory 112. Further, the secure OS 171 transmits and receives commands to and from programs in the secure memory 113 via a storage area owned by the operating program 172 in the secure memory 113.

In the following description, for the convenience of explanation, processing performed by the operating program 172 will be expressed as processing performed by the secure OS 171.

Each of various types of commands that are dealt with by the secure OS 171 has a structure shown in FIG. 9A, like the commands that are dealt with by the normal OS 151. Examples of the commands stored in the command portion 1011 includes: a secure application registration request, a registration completion notification, an application restoration request, a secure application deletion instruction, a deletion completion notification, a system call, a response notification, a secure processing request, an external processing request, and an interrupt occurrence notification. As for the secure application registration request, the registration completion notification, the application restoration request, the secure application deletion instruction, the deletion completion notification, the secure processing request, the external processing request, and the interrupt occurrence notification have already been described in the explanation of the normal OS 151 above. A system call is for requesting that data and command should be relayed from an application in the secure memory 113 to another program in the secure memory 113. A response notification is a request made by a program that has received a command and data by way of a system call, asking for a notification of, for example, a processing result from the secure OS 171.

Figure 11:
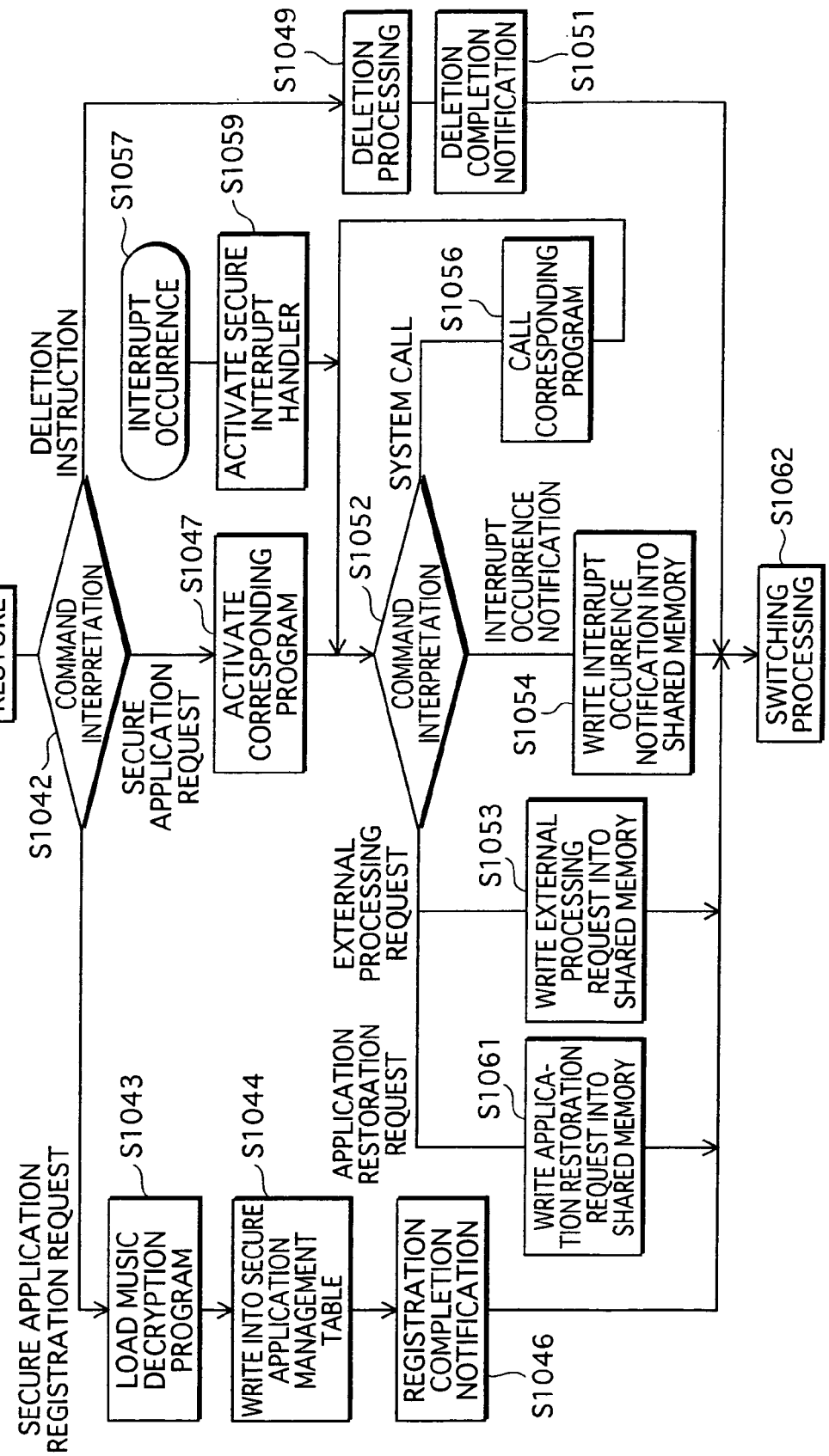
FIG. 11 is a flow chart that shows the operation of the secure OS 171.

The following describes the operation of the secure OS 171, with reference to the flow chart in FIG. 11. Here, as for a secure application registration request, a registration completion notification, a secure application deletion instruction, and a deletion completion notification, specific description is provided for a case where the application is the music playback program 153, while the secure application is the music decryption program 176, and the program that operates in a pair with the secure application is the music decryption daemon 156. It should be noted that although the secure OS 171 performs other kinds of processing than the ones shown in the flow chart, description will be omitted since those kinds of processing are not relevant to the present invention.

The secure OS 171 is restored into the CPU 102 due to the switching processing (Step S1041). The secure OS 171 reads and interprets a command from a command area of the shared memory 112 (Step S1042), and performs the processing described below according to the interpreted command.

In the case where the read command is a secure application registration request (Step S1042), the secure OS 171 decrypts the encrypted music decryption program in the shared memory 112 with the encryption and decryption program 174 so as to generate the music decryption program 176, and loads the generated music decryption program 176 into the secure memory 113 (Step S1043). The secure OS 171 writes the load address and the handle value "1" into an entry 187 in the secure application management table 186 (Step S1044). Subsequently, the secure OS 171 generates a registration completion notification in which a registration completion notification is stored in the command portion and a handle value "1" is stored in the data storing portion, and writes the registration completion notification to the shared memory 112 (Step S1046). Subsequently, the procedure advances to a switching processing (Step S1062).

In the case where the interpreted command is a secure processing request (Step S1042), the secure OS 171 calls a program that is in correspondence with identification information which is stored in the data storing portion and which indicates a program being a receiver (Step S1047). For example, in the case where the handle value "1" is stored, the secure OS 171 calls the music playback program 153.

In the case where the device ID_B is stored, the secure OS 171 calls the secure input output device driver 178. Subsequently, the procedure advances to Step S1052.

In the case where the read command is a secure application deletion instruction (Step S1042), the secure OS 171 extracts the handle value "1" indicating the program being a deletion target from the data storing portion and deletes the music decryption program 176 in correspondence with the extracted handle value "1" from the secure memory 113. Subsequently, the secure OS 171 deletes the entry 187 from the secure application management table 186 (Step S1049).

When having finished the deletion, the secure OS 171 writes a deletion completion notification to the shared memory 112 (Step S1051). At this time, the deletion completion notification is stored in the command portion, and the handle value "1" is stored in the data storing portion. Subsequently, the procedure advances to Step S1062.

Subsequently, the secure OS 171 receives commands from the programs in the secure memory 113 (Step S1052).

In the case where the received command is an external processing request (Step S1052), the secure OS 171 writes the received external processing request to the shared memory (Step S1053). The procedure then advances to Step S1062.

When having received an interrupt occurrence notification showing that an interrupt has occurred in a device, from the secure interrupt handler 181 (to be described later), the secure OS 171 writes the received interrupt occurrence notification to the shared memory 112 (Step S1054), and the procedure advances to Step S1062.

In the case where the received command is a system call (Step S1052), the secure OS 171 calls a corresponding program, according to the identification information which is stored in the data storing portion and which indicates a program being the receiver (Step S1056).

In the case where the received command is an application restoration request (Step S1052), the secure OS 171 writes the received application restoration request to the shared memory (Step S1061), and the procedure advances to Step S1062. In addition, although not shown in the drawing, in the case of a response notification, the secure OS 171 calls an application which is in correspondence with the identification information stored in the data storing portion.

In the case where an interrupt has occurred in the course of these processings, and the secure OS 171 receives an interrupt occurrence notification from the interrupt controller 107 (Step S1057), the secure OS 171 activates the secure interrupt handler 181 (Step S1059), and the procedure returns to Step S1052.

<The Library 152>

The library 152 contains a function that is used in common among various types of programs. As an example, an access function for accessing the memory card 300 is contained. An access function is a function for calling the normal input output device driver 157 and for instructing that data should be read.

<The Music Playback Program 153>

The music playback program 153 is an application that includes various types of image data to be displayed to users and plays back music stored in the memory card 300 in response to a user operation. The secure application information and the daemon information are written in the music playback program 153 in advance. The secure application information is information that indicates a program which the music playback program 153 requests to perform a secure processing. More specifically, secure application information is an address within the secondary memory unit 104 at which the encrypted music decryption program 141 is stored. Daemon information is information that indicates a program that is in a pair with a program indicated by the secure application information. More specifically, daemon information is an address within the secondary memory unit 104 at which the music decryption daemon 142 is stored.

<The Music Decryption Program 176 and the Music Decryption Daemon 156>

The music decryption program 176 and the music decryption daemon 156 operate in a pair with each other, so as to achieve decryption processing of encrypted music data.

The music decryption program 176 receives a decryption instruction from the music playback program 153 via the normal OS 151 and the secure OS 171, and as shown in FIG. 8, goes through the data reading step, the content key reading step, the decryption step, and the music data outputting step so as to generate music data. In the music data outputting step, the music decryption program 176 outputs a write-destination address within the buffer 123 for the music data, as a processing result.

The music decryption program 176 requests the music decryption daemon 156 to perform some processing that does not require a high level of security among these processings. More specifically, by outputting an external processing request to the secure OS 171, the music decryption program 176 outputs a data reading instruction to the music decryption daemon 156. As a processing result of the processing, the music decryption program 176 receives the write-destination address of the encrypted music data within the shared memory 112. Further, by way of the external processing request to the secure OS 171, the music decryption program 176 outputs a decryption instruction to the music decryption daemon 156, and, as a processing result, obtains the write-destination address within the buffer 123 for the music data.

Figure 12:
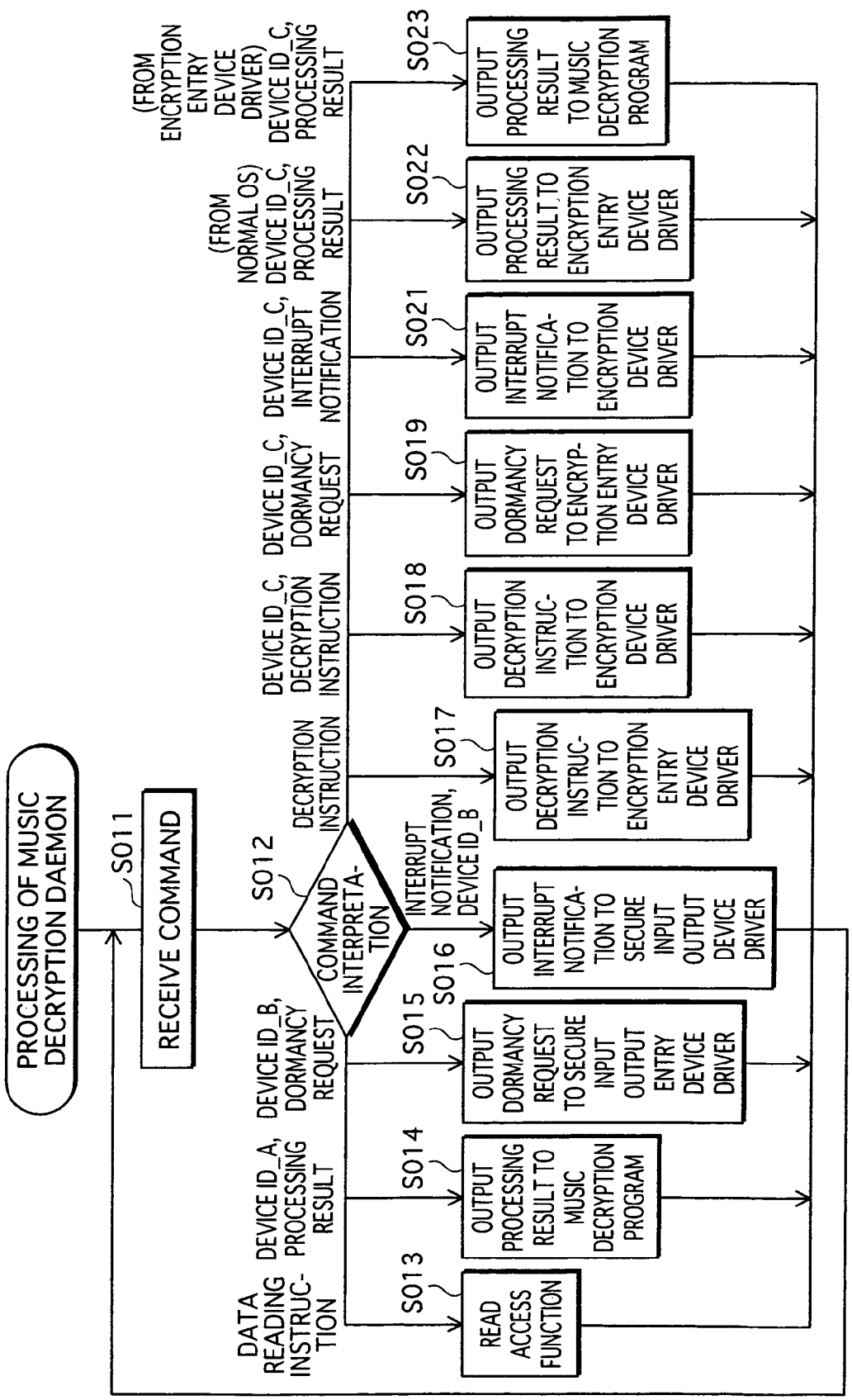
FIG. 12 is a flow chart that shows the operation of a music decryption daemon 156.

The music decryption daemon 156 receives the data reading instruction and the decryption instruction from the music decryption program 176 via the secure OS 171 and the normal OS 151. Further, the music decryption daemon 156 receives various types of instructions and data from the normal input output device driver 157, the secure input output entry device driver 158, the encryption entry device driver 159, the secure input output device driver 178, and the encryption device driver 179. The music decryption daemon 156 performs various types of processing based on the received instructions and data. The following describes the processing performed by the music decryption daemon 156, with reference to the flow chart in FIG. 12. It should be noted that, although omitted from FIG. 9, each of all the commands and pieces of data received by the music decryption daemon 156 contains a handle value "1", as identification information that indicates the music decryption daemon 156 as the receiver.

The music decryption daemon 156 receives various types of instructions and data via the secure OS 171 (Step S011). The music decryption daemon 156 makes a judgment on each of the received instructions (Step S012). In the case where a received instruction is a data reading instruction, the music decryption daemon 156 calls an access function in the library 152 (Step S013).

When having received the device ID_A being identification information that indicates an output source of the command and a processing result, the music decryption daemon 156 outputs, by way of an external processing request, the received processing result to the music decryption program 176 (Step S014). At this time, the processing result and the handle value "1" showing the receiver are stored in the data storing portion.

When having received the device ID_B indicating the output source of the command and a dormancy request (Step S012), the music decryption daemon 156 outputs, by way of a system call to the normal OS 151, the received dormancy request to the secure input output entry device driver 158 (Step S015). At this time, the received device ID_B being identification information that indicates the receiver and the handle value "1" being identification information indicating the music decryption daemon 156 itself as the output source of the system call are stored in the data storing portion.

When having received the device ID_B indicating the output source of the command and an interrupt notification (Step S012), the music decryption daemon 156 stores the received interrupt notification, the device ID_B, and the handle value "1" indicating the music decryption daemon 156 itself into the data storing portion of the secure processing request, and outputs it to the normal OS 151 so as to output the received interrupt notification to the secure input output device driver 178 (Step S016).

When having received the decryption instruction from the music decryption program 176 via the secure OS 171 and the normal OS 151, the music decryption daemon 156 outputs the decryption instruction to the encryption entry device driver 159 by way of a system call (Step S017).

When having received the device ID_C and a decryption instruction from the encryption entry device driver 159 by way of a response notification (Step S012), the music decryption daemon 156 outputs the received decryption instruction to the encryption device driver 179 by way of a secure processing request. At this time, the decryption instruction, the received device ID_C and the handle value "1" indicating the music decryption daemon 156 itself are stored into the data storing portion (Step 018).

When having received the device ID_C and a dormancy request from the normal OS 151, the music decryption daemon 156 outputs the received dormancy request to the encryption entry device driver 159 by way of a system call (Step S019). At this time, the received device ID_C being identification information indicating the receiver, the handle value "1" indicating the music decryption daemon 156 itself, and the dormancy request are stored into the data storing portion.

When having received the device ID_C and an interrupt notification from the encryption entry device driver 159 by way of a response notification (Step S012), the music decryption daemon 156 outputs the received interrupt notification to the encryption device driver 179 by way of a secure processing request (Step S021). The received device ID_C, the interrupt notification, and the handle value "1" that indicates the music decryption daemon 156 itself are stored into the data storing portion.

When having received the device ID_C and a processing result from the normal OS 151, the music decryption daemon 156 outputs the received processing result to the encryption entry device driver 159 by way of a system call (Step S022).

When having received the device ID_C and a processing result from the encryption entry device driver 159 by way of a response notification, the music decryption daemon 156 outputs the received processing result to the music decryption program 176 by way of a secure processing request (Step S023).

<The Normal Input Output Device Driver 157>

The normal input output device driver 157 pre-stores therein a device ID_A as identification information that indicates the normal input output device driver 157 itself.

The normal input output device driver 157 is a program that controls the normal input output device 132 that constitutes the input output unit 116.

Further, the normal input output device driver 157 stores therein an exclusion flag. While the normal input output device 132 is operating, the normal input output device driver 157 sets the exclusion flag to be "1", whereas while the normal input output device 132 is not operating, the normal input output device driver 157 sets the exclusion flag to be "0". In the case where the exclusion flag is set to be "1" when the normal input output device driver 157 receives an input output processing instruction, the normal input output device driver 157 outputs an error notification indicating that the normal input output device 132 is operating and that the processing cannot be accepted.

<The Secure Input Output Entry Device Driver 158 and the Secure Input Output Device Driver 178>

The secure input output device driver 178 and the secure input output entry device driver 158 pre-store therein device ID_B's respectively, which are pieces of identification information identical to each other.

Due to the secure input output device driver 178 and the secure input output entry device driver 158 performing control as operating in a pair, the secure input output device 133 operates normally. Out of the processings to control the secure input output device 133, the secure input output device driver 178 performs some secure processings such as requesting input output processing and obtaining processing results, whereas the secure input output entry device driver 158 performs other processings that do not require a high security level, such as detection of dormancy and interrupts.

In the present embodiment, the secure input output device driver 178 receives a content key reading instruction from the music decryption program 176 via the secure OS 171. After receiving the content key reading instruction, the secure input output device driver 178 instructs the encryption processing device 117 to read a content key. Subsequently, by outputting an external processing request to the secure OS 171, the secure input output device driver 178 outputs a dormancy request to the music decryption daemon 156. At this time, in the data storing portion of the command, the dormancy request, the handle value "1" received from the music decryption program 176 as identification information that indicates the receiver, and the device ID_B being identification information that indicates the secure input output device driver 178 as the output source of the command are stored.

Subsequently, the secure input output device driver 178 receives an interrupt notification from the music decryption daemon 156 via the secure OS 171, and obtains an address at which the content key is stored, as a processing result from the secure input output device 133. The secure input output device driver 178 outputs the obtained processing result to the music decryption program 176 by way of a response notification to the secure OS 171.

The secure input output entry device driver 158 receives a dormancy request from the music decryption daemon 156 via the normal OS 151. Having received the dormancy request, the secure input output entry device driver 158 outputs a dormancy request that contains the handle value "1" and the device ID_B in the data storing portion, to the normal OS 151.

Subsequently, when the dormancy is released by the normal OS 151, the secure input output entry device driver 158 outputs an interrupt notification to the music decryption daemon 156 via the normal OS 151 by way of a response notification. At this time, the dormancy request, the device ID_B, and the handle value "1" are stored in the data storing portion.

<The Encryption Device Driver 179 and the Encryption Entry Device Driver 159>

Each of the encryption device driver 179 and the encryption entry device driver 159 pre-stores therein a device ID_C as a piece of identification information.

Due to the encryption device driver 179 and the encryption entry device driver 159 performing control as operating in a pair, the encryption processing device 117 operates normally. Out of the processings to control the encryption processing device 117, the encryption device driver 179 performs some processings such as requesting decryption processing and obtaining processing results, whereas the encryption entry device driver 159 performs other processings such as exclusion control and notification of dormancy and interrupts.

In the present embodiment, to be more specific, the encryption entry device driver 159 receives a decryption instruction from the music decryption daemon 156 by way of a system call. When having received the decryption instruction, the encryption entry device driver 159 performs exclusion control using an exclusion flag. In other words, when the exclusion flag is "1", the encryption entry device driver 159 outputs an error notification and discontinues the processing thereafter, and when the exclusion flag is "0", the encryption entry device driver 159 changes the exclusion flag to "1".

Subsequently, by outputting to the normal OS 151, a response notification that contains the received decryption instruction, the handle value "1", and the device ID_C owned by the encryption entry device driver 159 itself in the data storing portion, the encryption entry device driver 159 outputs a decryption instruction to the music decryption daemon 156.

Next, the encryption entry device driver 159 receives a dormancy request from the music decryption daemon 156 by way of a system call. Then, the encryption entry device driver 159 outputs a dormancy request to the normal OS 151. At this time, the handle value "1" and the device ID_C that are received as contained in the system call are stored in the data storing portion of the dormancy request.

Subsequently, dormancy is released by the normal OS. When the dormancy is released, the encryption entry device driver 159 outputs an interrupt notification to the music decryption daemon 156 by way of a response notification.

Next, the encryption entry device driver 159 receives a processing result from the music decryption daemon 156 via the normal OS 151. Having received the processing result, the encryption entry device driver 159 releases the exclusion control and puts the exclusion flag back to "0". The encryption entry device driver 159 outputs the received processing result to the music decryption daemon 156 by way of a response notification.

The encryption device driver 179 receives a decryption processing instruction from the music decryption daemon 156 via the secure OS 171 by way of a secure processing request, and requests the encryption processing device 117 to perform decryption. Subsequently, the encryption device driver 179 outputs, to the secure OS 171, an external processing request that contains the device ID_C owned by the encryption device driver 179 itself, the handle value "1" received together with the decryption processing instruction, and a dormancy request in the data storing portion.

Next, the encryption device driver 179 receives an interrupt notification from the music decryption daemon 156 by way of a secure processing request to the secure OS 171 and receives a write-destination address within the buffer 123 from the encryption processing device 117 as a processing result. By outputting an external processing request that contains the received processing result, the handle value "1", and the device ID_C in the data storing portion, to the secure OS 117, the encryption device driver 179 outputs the processing result to the music decryption daemon 156.

<The Normal Switch Device Driver 160 and the Secure Switch Device Driver 180>

Each of the normal switch device driver 160 and the secure switch device driver 180 is a program that, when having received a switching instruction from the normal OS 151 or the secure OS 171, outputs a switching instruction to the switch control unit 106 so that the right to use the CPU 102 is moved from the normal OS 151 to the secure OS 171, or from the secure OS 171 to the normal OS 151.

(a) Switching Processing 1

Figure 13:
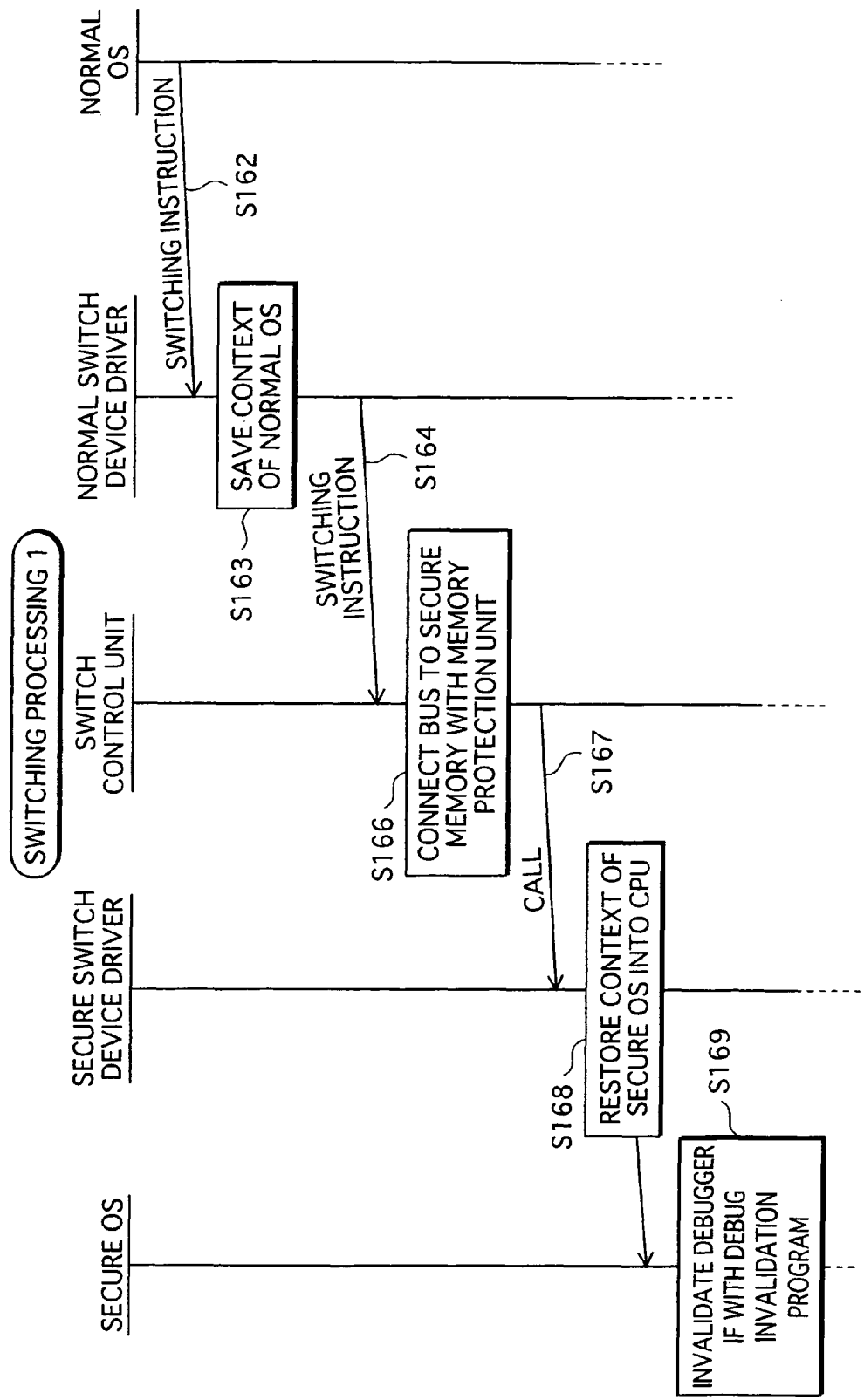
FIG. 13 is a flow chart that shows the switching processing from the normal OS 151 to the secure OS 171.

The following describes the switching processing from the normal OS 151 to the secure OS 171 with reference to FIG. 13. It should be noted that the following description represents the details of the switching processing 1 shown in Step S1028 in FIG. 10 and the flow charts in and after FIG. 16.

The normal switch device driver 160 is called by the normal OS 151 and receives a switching instruction (Step S162). Having received the switching instruction, the normal switch device driver 160 saves the context of the normal OS 151 into the normal memory 111 (Step S163). Subsequently, the normal switch device driver 160 outputs a switching instruction to the switch control unit 106 (Step S164).

After clearing the CPU 102 and the MMU 103, the switch control unit 106 outputs a connection instruction to the memory protection unit 114 and connects the secure memory 113 to the bus 130 (Step S166). Subsequently, the switch control unit 106 calls the secure switch device driver 180 within the secure memory 113 (Step S167).

When having been called, the secure switch device driver 180 restores the context of the secure OS 171 into the CPU 102 (Step S168).

The secure OS 171 invalidates the debugger IF 101 with the debug invalidation program 173 (Step S169).

(b) The Switching Processing 2

Figure 14:
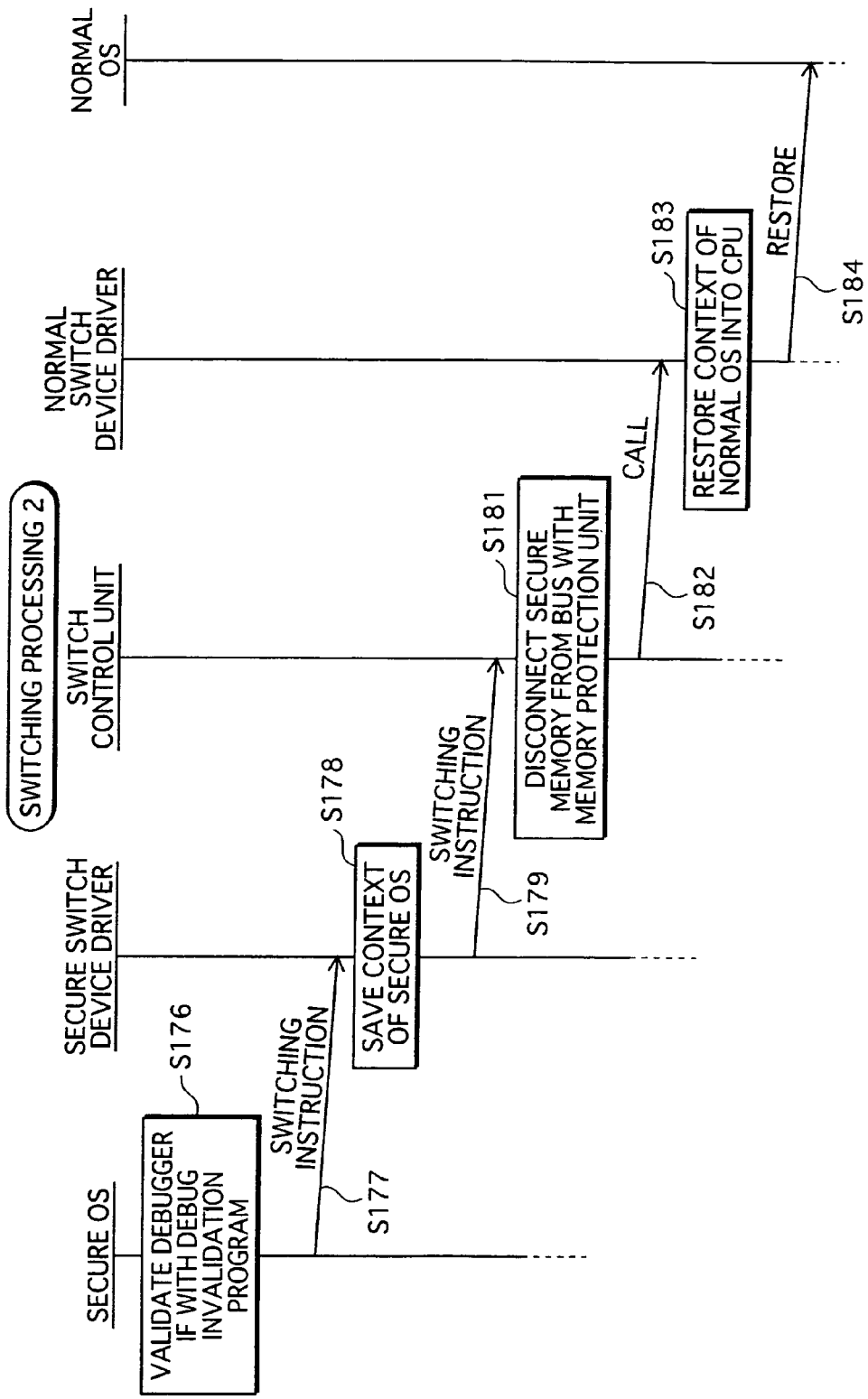
FIG. 14 is a flow chart that shows the switching processing from the secure OS 171 to the normal OS 151.

The following describes the switching processing from the secure OS 171 to the normal OS 151, with reference to the flow chart in FIG. 14. It should be noted that the following description represents the details of the switching processing 2 shown in Step S1062 in FIG. 11 and the flow charts in and after FIG. 16.

The secure OS 171 validates the debugger IF 101 (i.e. makes it valid) with the debug invalidation program 173 (Step S176), calls the secure switch device driver 180, and outputs a switching instruction (Step S177).

The secure switch device driver 180 saves the context of the secure OS 171 (Step S178) and outputs a switching instruction to the switch control unit 106.

The switch control unit 106 receives the switching instruction and, after clearing the CPU 102 and the MMU 103, outputs a disconnection instruction to the memory protection unit 114, so that the secure memory 113 is disconnected from the bus 130 (Step S181). Subsequently, the switch control unit 106 calls the normal switch device driver 160 within the normal memory 111 (Step S182).

The normal switch device driver 160 restores the context of the normal OS 151 into the CPU 102 (Step S183).

It should be noted that, although the debugger IF 101 is validated when the secure OS 171 is switched to the normal OS 151 in the present example, it is not necessary to validate the debugger IF 101. Alternatively, the power source of the mobile phone 100 is turned on, and when the normal OS 151 is switched to the secure OS for the first time, the debugger IF 101 is invalidated with the debug invalidation program 173, and from the next time, even in the switching processing from the secure OS 171 to the normal OS 151 and in the switching processing from the normal OS 151 to the secure OS 171, the debugger IF 101 is kept to be invalidated.

Further, although the debugger IF 101 is invalidated or validated with the debug invalidation program 173 owned by the secure OS 171 in the present embodiment, it is acceptable that the normal OS 151 owns a debug invalidation program. Further, it is acceptable to have an arrangement wherein the debug invalidation program is an independent program that is loaded into the normal memory 111 and is managed by the normal OS 151.

Further, it is acceptable that each of the normal OS 151 and the secure OS 171 owns a debug invalidation program. In such a situation, the debug invalidation program owned by the normal OS 151 invalidates the debugger IF 101, and the debug invalidation program owned by the secure OS 171 validates the debugger IF. Further, conversely, it is acceptable to have an arrangement wherein the debug invalidation program owned by the secure OS 171 invalidates the debugger IF 101, and the debug invalidation program owned by the normal OS 151 validates the debugger IF.

Further, it is acceptable that each of these debug invalidation programs is loaded into the normal memory 111 and the secure memory 113 as an independent program.

<The Normal Interrupt Handler 161 and the Secure Interrupt Handler 181>

The normal interrupt handler 161 is called by the normal OS 151 in the case where an interrupt has occurred during execution of the normal OS 151 and a program controlled by the normal OS 151. When having been called by the normal OS 151 and having received an interrupt occurrence notification, the normal interrupt handler 161 controls the interrupt controller 107 so as to investigate the cause of the interrupt occurrence. Subsequently, the normal interrupt handler 161 outputs identification information that indicates a device that has made the interrupt occur and an interrupt notification to the normal OS 151.

The secure interrupt handler 181 is called by the secure OS 171 in the case where an interrupt has occurred during execution of the secure OS 171 and a program controlled by the secure OS 171. When having been called by the secure OS 171 and having received an interrupt occurrence notification, the secure interrupt handler 181 performs an interrupt mask processing by writing a piece of dummy data to a register for interrupt detection in the CPU 102, and outputs an interrupt occurrence notification to the secure OS 171.

(3) Input Output Unit 116

The input output unit 116 comprises, as shown in FIG. 8, an access unit 131, a normal input output device 132, and a secure input output device 133.

The access unit 131 is connected to the memory card 300 and inputs and outputs information to and from the memory card 300, the normal input output device 132, and the secure input output device 133.

Under the control of the normal input output device driver 157, the normal input output device 132 reads and writes data to and from the normal area 303 of the memory card 300. As an example, when having received a music piece ID as an argument and having received a reading request, the normal input output device 132 reads a piece of encrypted music data that corresponds to the received music piece ID from the normal area 303 and writes the read piece of encrypted music data to the shared memory 112.

After having finished the writing and having received a result request from the normal input output device driver 157, the normal input output device 132 outputs an address within the shared memory 112 at which the piece of encrypted music data has been written, as a processing result.

Under the control of the secure input output device driver 178, the secure input output device 133 performs mutual authentication with the secure processing unit 302 in the memory card 300 based on a CPRM mechanism. Only in the case where the mutual authentication has been successful, the secure input output devices 133 shares a key and securely writes and reads data to and from the secure area 306 using the shared key.

Alternatively, in the case where the authentication has failed, the secure input output device 133 outputs a card error notification indicating that it is impossible to access the memory card 300 to the secure input output device driver 178.

Here, the secure input output device 133 is a device that is used only for accessing the secure area 306 of the memory card 300. Programs that are able to access the secure area 306 of the memory card 300 are limited. Accordingly, since there is no possibility that a plurality of applications request some processing at the same time, it is not necessary to perform exclusion control.

(4) The Encryption Processing Device 117

Under the control of the encryption device driver 179, the encryption processing device 117 performs encryption processing for various types of data. In the present embodiment, the encryption processing device 117 receives, from the encryption device driver 179, an address within the shared memory 112 at which a piece of encrypted music data is stored and an address within the secure memory 113 at which the content key is stored, and is instructed to decrypt the piece of encrypted music data. The encryption processing device 117 performs a decryption algorithm D1 on the encrypted music data using the content key so as to generate music data, and writes the generated music data to the buffer 123. The encryption processing device 117 outputs the write-destination address to the encryption device driver 179 as a processing result. The decryption algorithm D1 is for decrypting an encryption text generated with an encryption algorithm E1.

Here, the encryption processing device 117 is a device for decrypting various types of encrypted data and performs decryption of encrypted contents transmitted from a content distribution server, as well. Accordingly, there is a possibility that a plurality of different programs may request the encryption processing device 117 to perform decryption processing. Thus, it is necessary to have exclusion control.

(5) The CPU 102

The CPU 102 includes an instruction fetching unit, an instruction decoder, a functional unit, a program counter, a register, and the like. The CPU 102 fetches an instruction from a program within the normal memory 111 or the secure memory 113, decodes the fetched instruction, and executes the decoded instruction.

(6) The MMU 103

The MMU 103 realizes a virtual memory function by converting a logical address into a physical address.

(7) The Debugger IF 101 and the Interrupt Controller 107

The debugger IF 101 is an interface for connecting the mobile phone 100 with an external debugger.

The interrupt controller 107 detects various types of interrupts and outputs an interrupt occurrence notification to the register for interrupt detection in the CPU 102.

(8) The Switch Control Unit 106 and the Memory Protection Unit 114

The switch control unit 106 receives a switching instruction from the normal switch device driver 160 within the normal memory 111 or the secure switch device driver 180 within the secure memory 113 and connects or disconnects the bus 130 with or from the secure memory 113 with the use of the memory protection unit 114. The detailed operations of the switch control unit 106 and the memory protection unit 114 are described above in the description of (a) the switching processing 1 and (b) the switching processing 2.

(9) The Wireless Communication Control Unit 118, the Communication Unit 121, and the Antenna 122

The communication unit 121 performs information transmission/reception between the wireless communication control unit 118 and an external device connected to the mobile phone network or the Internet 20, via the antenna 122.

The wireless communication control unit 118 includes a base band unit, a modulating and demodulating unit, and an amplifier. The wireless communication control unit 118 performs signal processing of various types of information that is transmitted and received via the communication unit 121 and the antenna 122.

(10) The Buffer 123, the Encoding Processing Unit 124, and the D/A Converting Unit 126

The buffer 123 temporarily stores therein music data.

The encoding processing unit 124 performs a decryption processing on the music data stored in the buffer 123 according to an encoding technique such as the MP3, and outputs the result to the D/A converting unit 126.

The D/A converting unit 126 converts the music data decrypted by the encoding processing unit 124 into analog audio signals and outputs the analogue audio signals to the speaker 120.

(11) The Input Unit 108, the Display Unit 109, the Microphone 119, and the Speaker 120

The input unit 108 includes various types of buttons such as ten keys and a confirm button and receives user operations on the buttons.

The display unit 109 includes a VRAM and a liquid crystal display and displays various screen displays.

The microphone 119 detects audio and outputs the detected audio to the wireless communication control unit 118.

The speaker 120 receives analog audio signals from the wireless communication control unit 118 and the D/A converting unit 126 and outputs audio based on the received audio signals.

1.3 The Operations of the Mobile Phone 100 and the Memory Card 300

The flow chart shown in FIGS. 15 through 35 is a flow chart that shows the operation of the mobile phone 100. FIGS. 36 through 40 represents a sequence diagram that shows the giving and receiving of commands between programs related to the operation of the mobile phone 100. The following describes the operation of the mobile phone 100, with reference to the flow chart and the sequence diagram.

It should be noted that some of the processings that correspond in the sequence diagram and the flow chart have step numbers in common. Also, as mentioned in the description of the normal OS 151 and the secure OS 171, each of the programs within the normal memory 111 and the secure memory 113 requests the normal OS 151 and the secure OS 171 to relay commands and data to another program, by way of a system call, a response notification, an external processing request, and a secure processing request. In FIGS. 15 through 40 and the description below, system calls, response notifications, external processing requests, and secure processing requests are not mentioned, but only identification information, data, and commands which each of the programs outputs as storing them in the data storing portions of such commands are described.

(1) The Operation of the Mobile Phone 100

Figure 15:
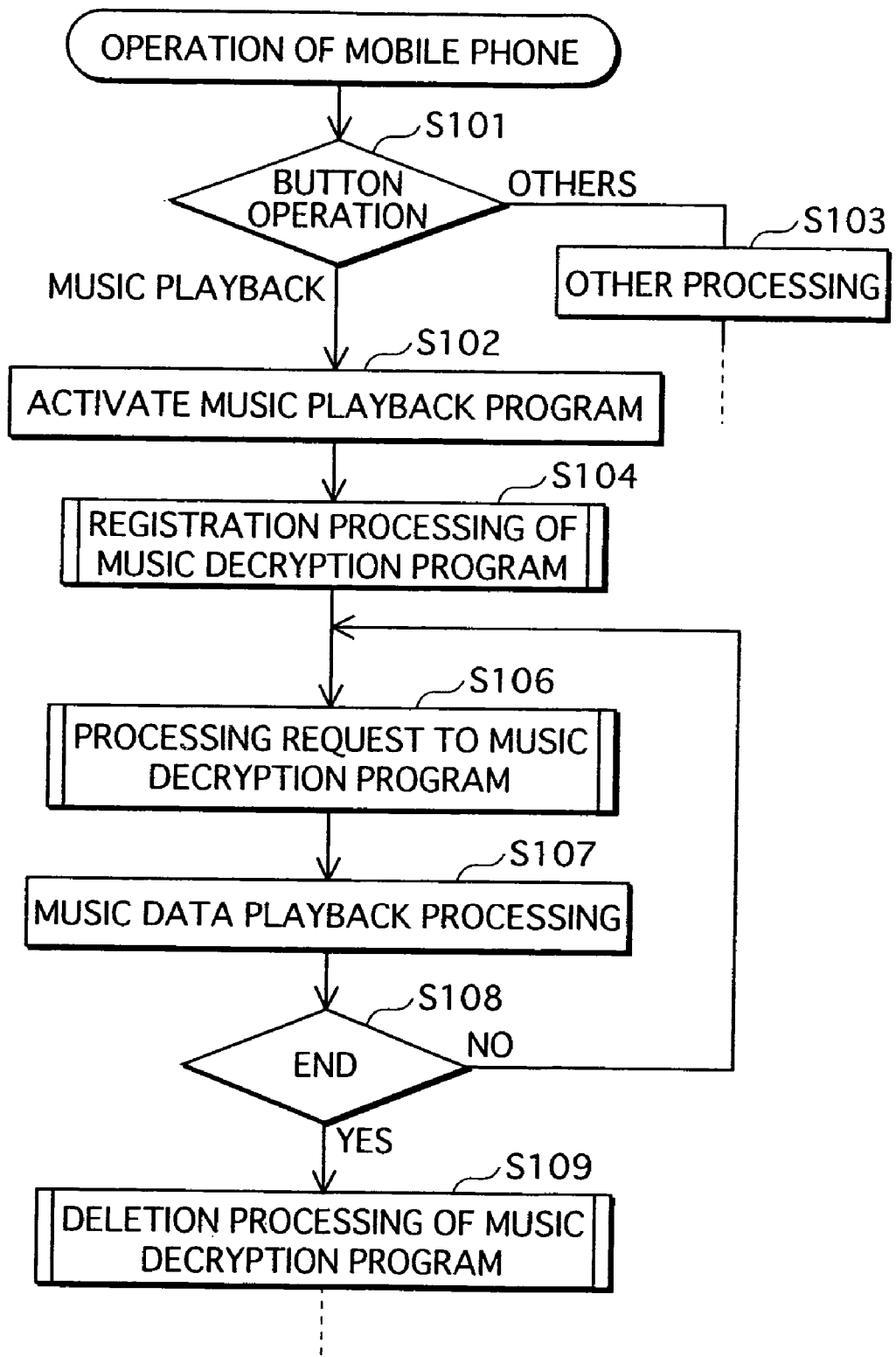
FIG. 15 is a flow chart that shows the operation of the mobile phone 100.

The following describes the operation of the mobile phone 100, with reference to the flow chart in FIG. 15.

The mobile phone 100 receives a user operation on buttons through the input unit 108 (Step S101). In the case where the received operation indicates music playback, the mobile phone 100 activates the music playback program 153 (Step S102). When the received button operation indicates other types of processing, the mobile phone 100 performs the indicated processing (Step S103).

Subsequently, the mobile phone 100 performs registration processing of the music decryption program (Step S104). Next, the mobile phone 100 requests the music decryption program 176 to perform decryption processing (Step S106). When the decryption processing by the music decryption program 176 is finished, the mobile phone 100 expands the generated music data using a method according to the MP3, generates analog music data by converting the data into analog data, and outputs the generated analog music data through the speaker 120 (Step S107). Until a button operation indicating that the music playback should be terminated is received through the input unit 108 (Step S108), the processing in Step S106 through 108 is repeated.

When having received a button operation indicating that music playback should be terminated (Step S108: YES), the mobile phone 100 performs deletion processing of the music decryption program (Step S109).

(2) Registration of the Music Decryption Program

Figure 16:
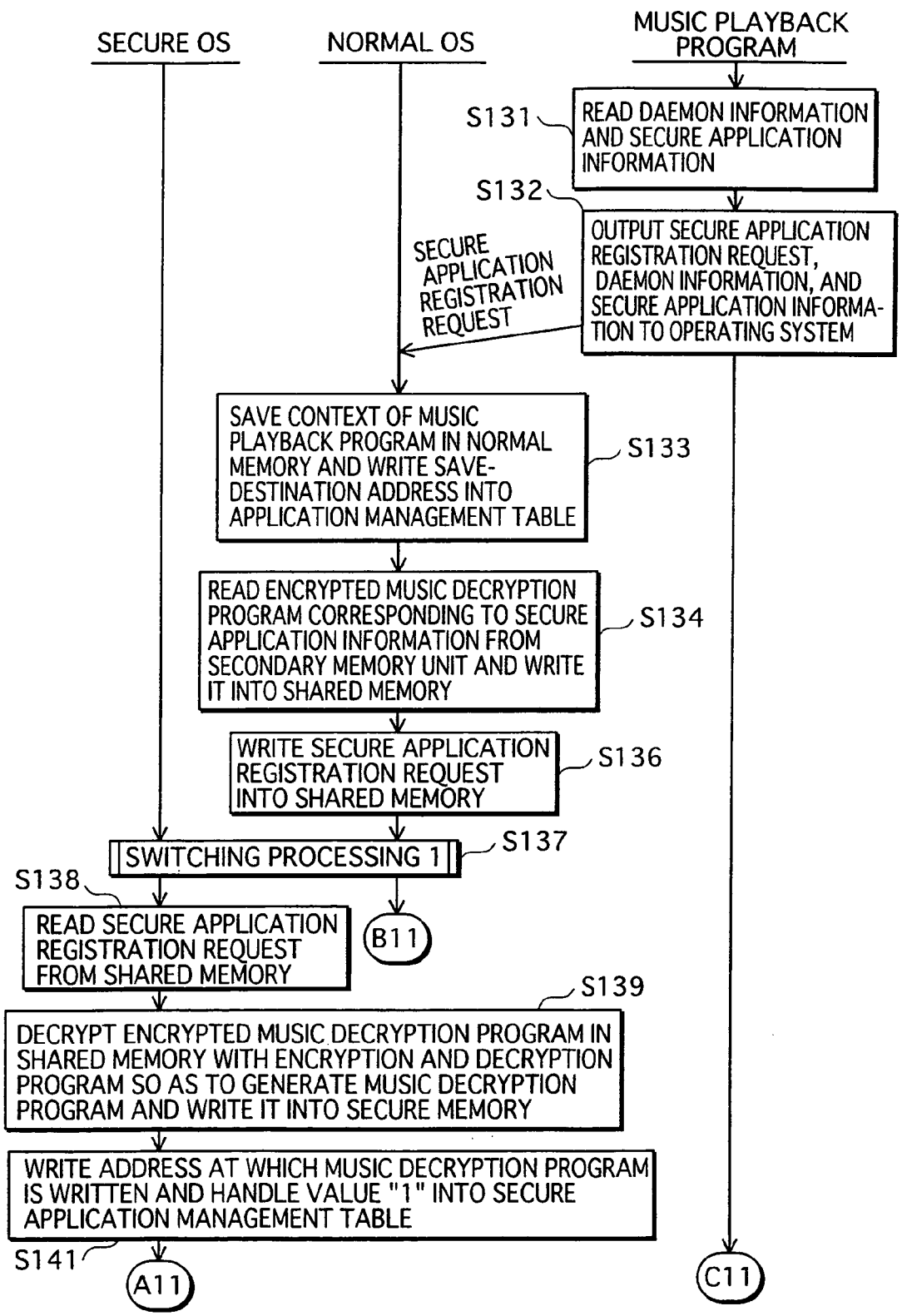
FIG. 16 is a flow chart that shows the operation performed by programs in the registration processing of a music decryption program.
Figure 17:
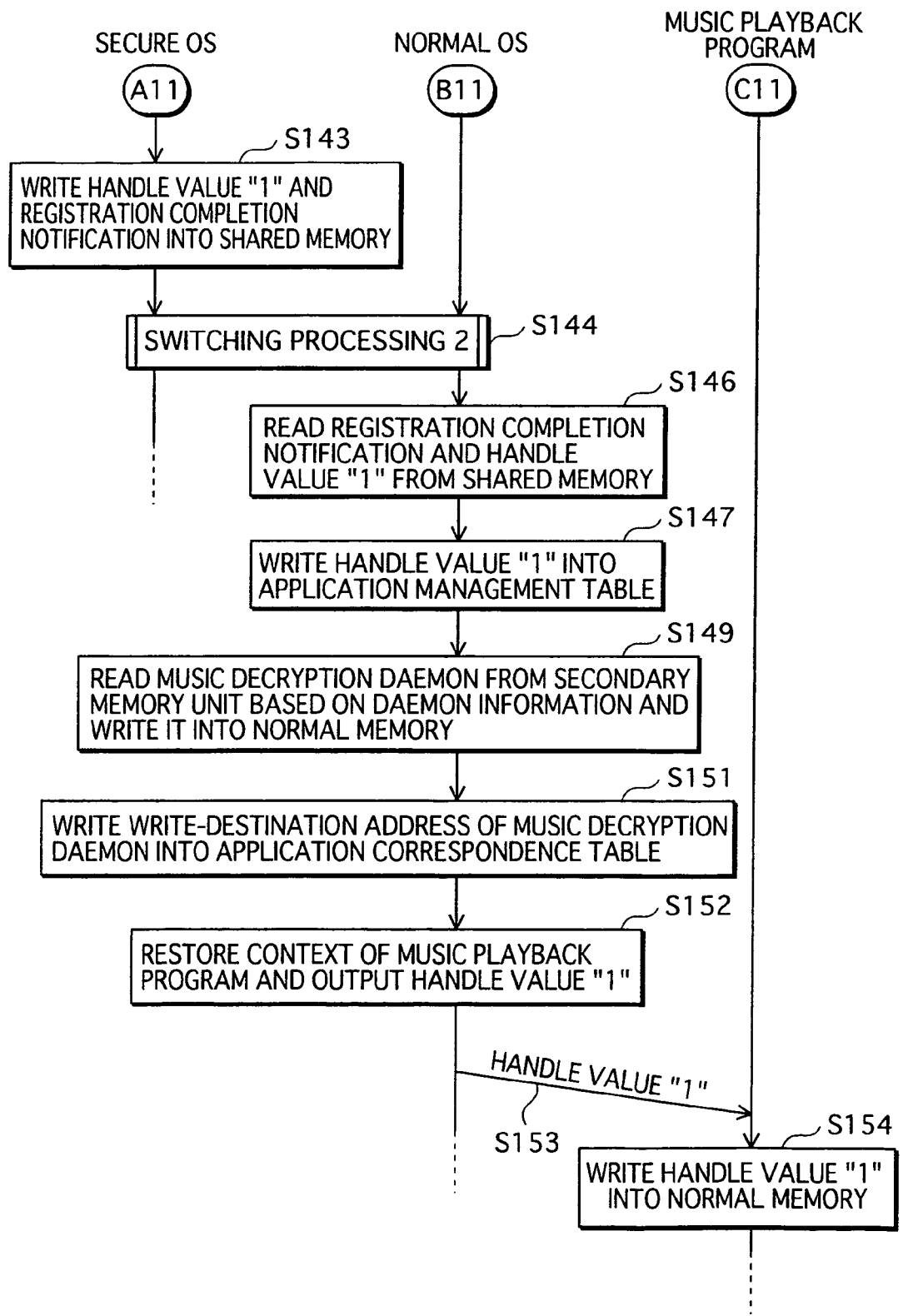
FIG. 17 is a flow chart that shows the operation performed by programs in the registration processing of a music decryption program and is continued from FIG. 16.
Figure 18:
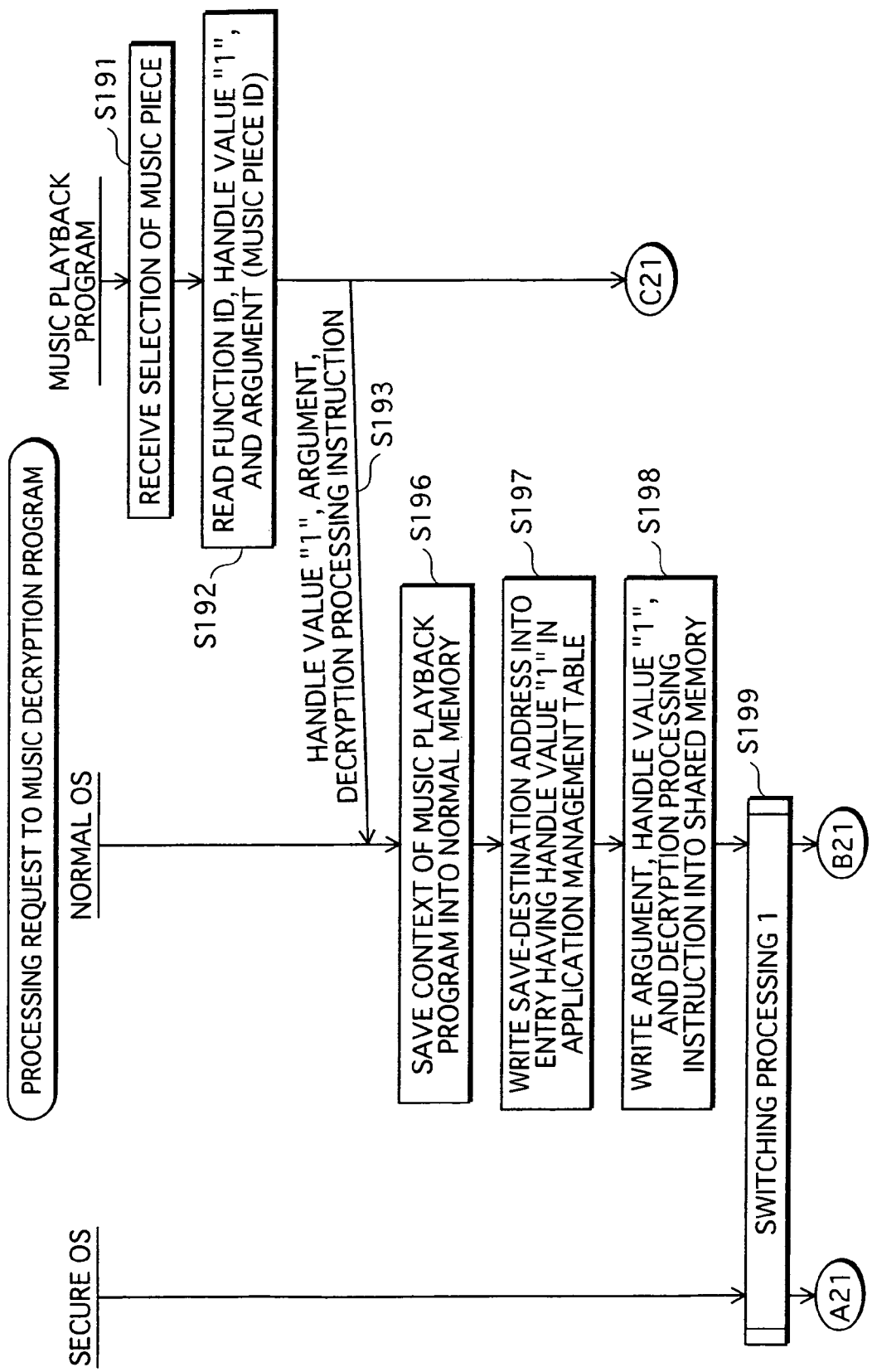
FIG. 18 is a flow chart that shows the operation performed by programs related to a processing request made to the music decryption program 176.
Figure 19:
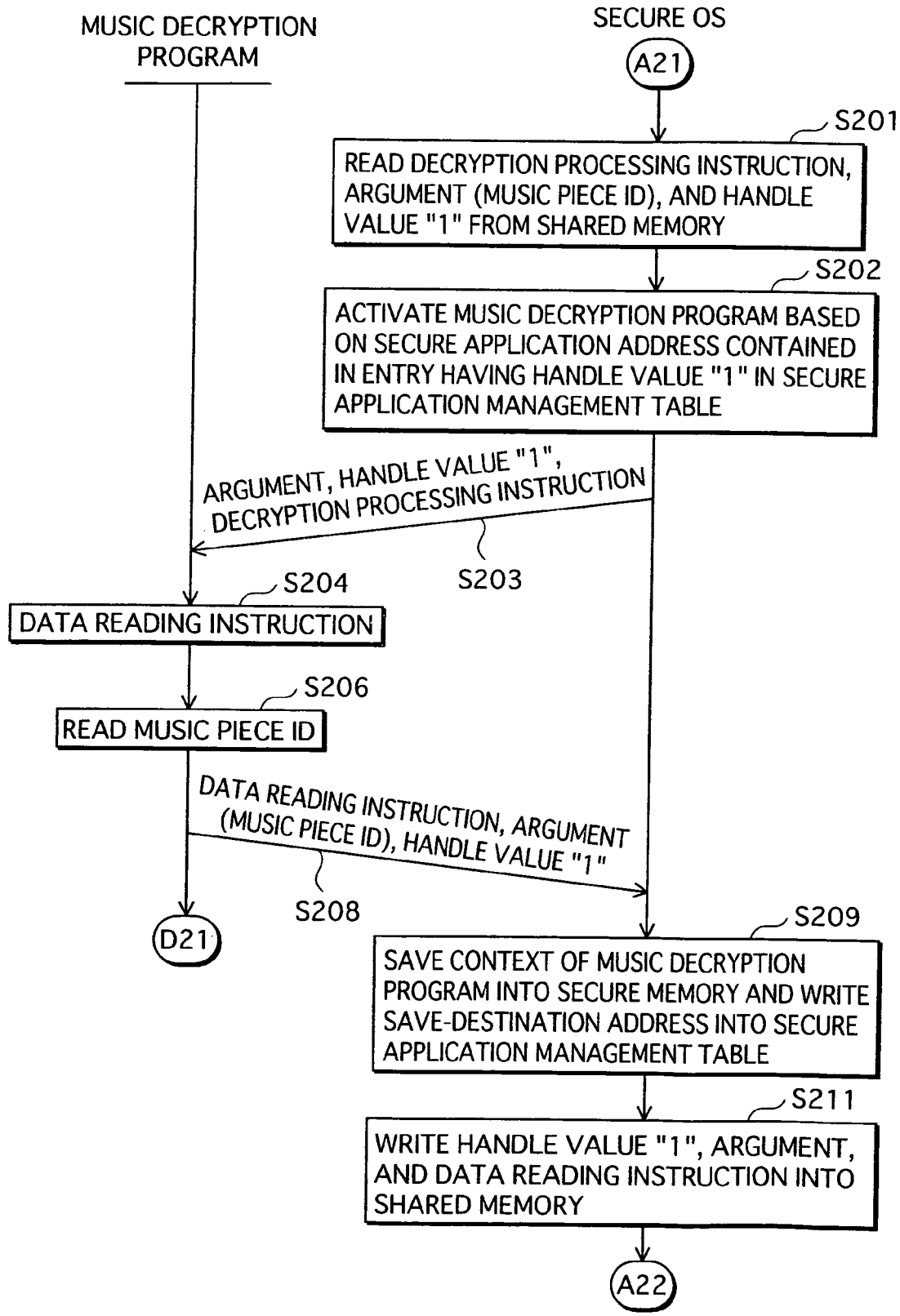
FIG. 19 is a flow chart that shows the operation performed by programs related to a processing request made to the music decryption program 176 and is continued from FIG. 18.
Figure 20:
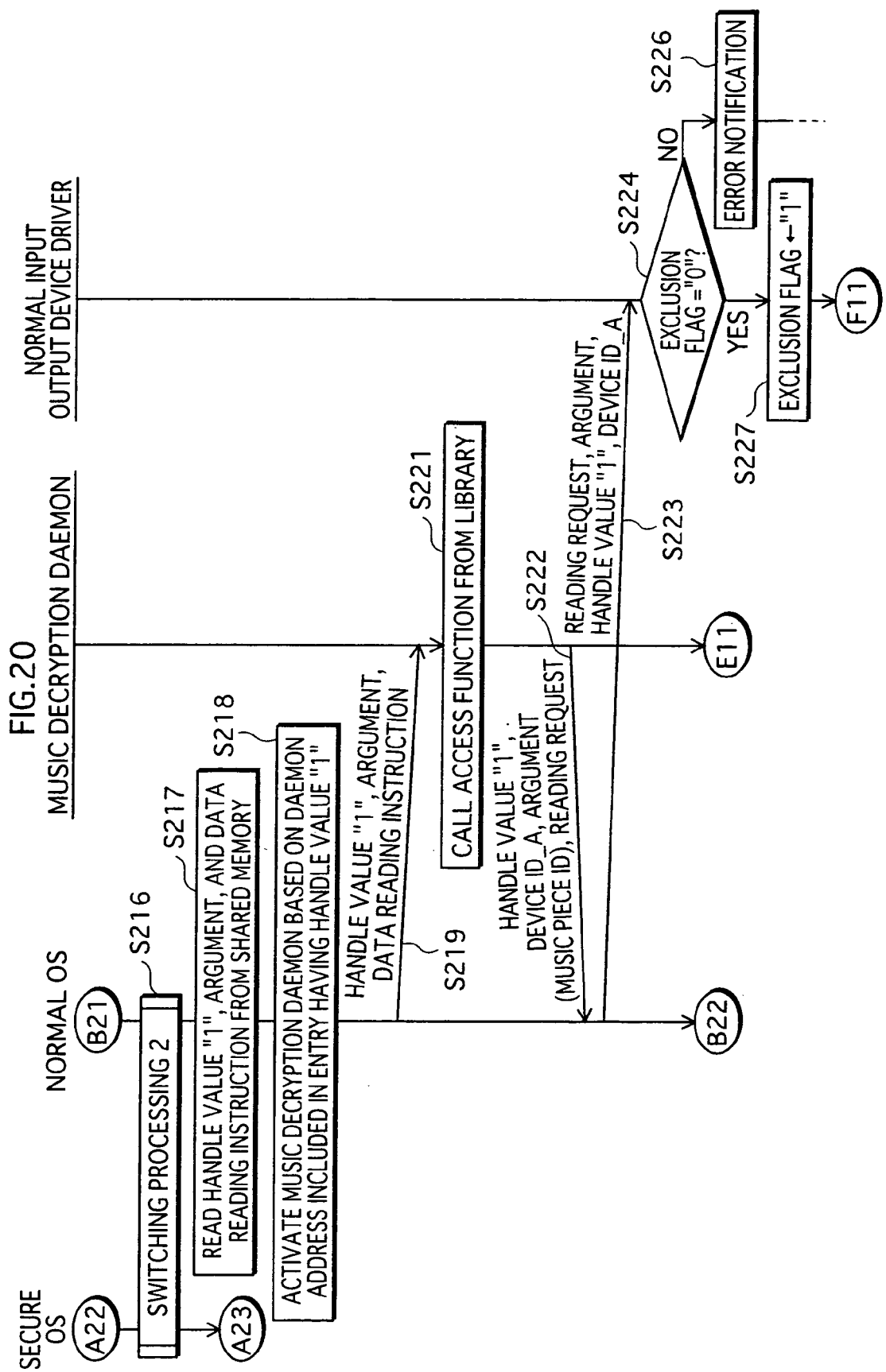
FIG. 20 is a flow chart that shows the operation performed by programs related to a processing request made to the music decryption program 176 and is continued from FIG. 19.
Figure 21:
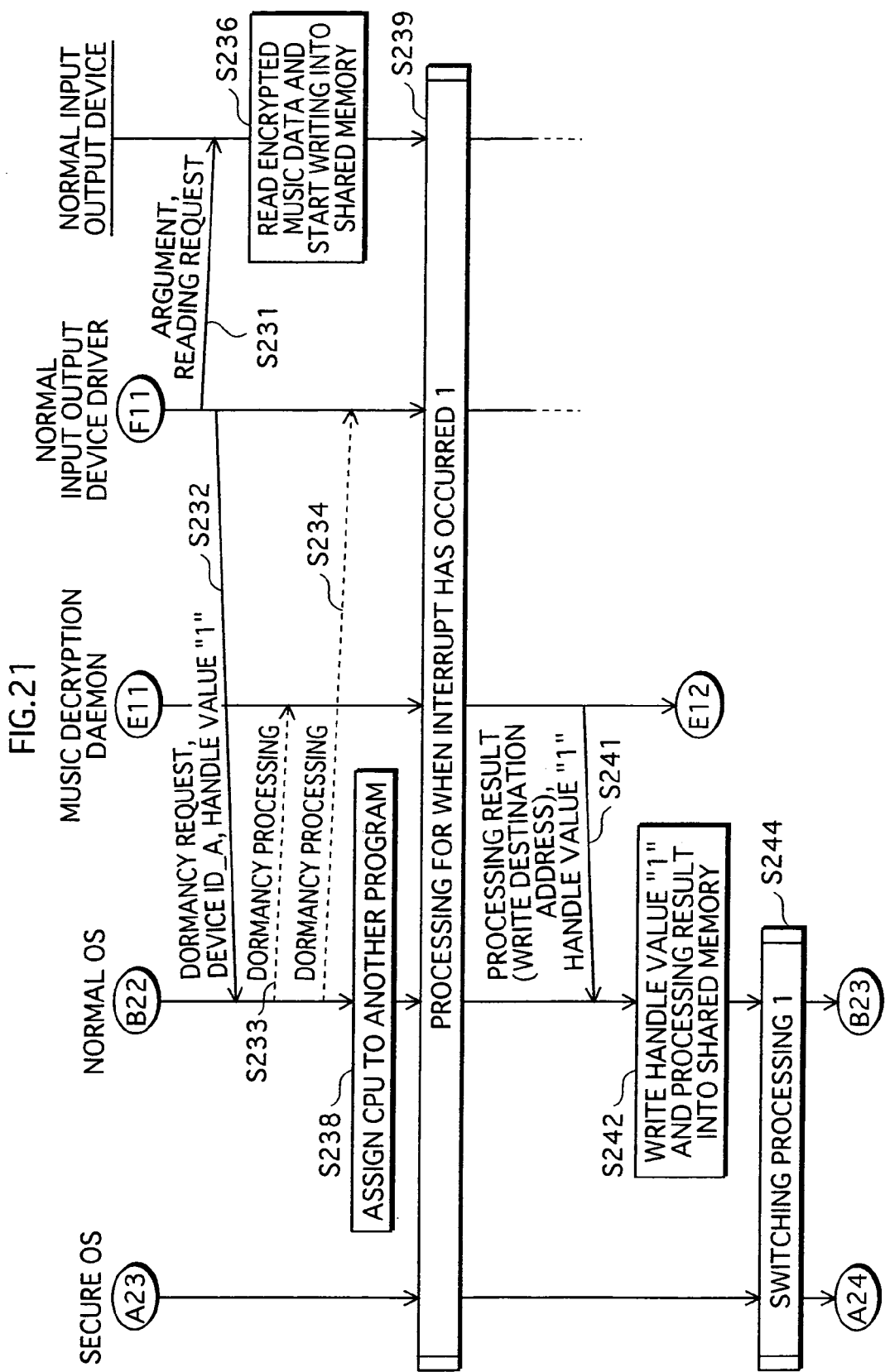
FIG. 21 is a flow chart that shows the operation performed by programs related to a processing request made to the music decryption program 176 and is continued from FIG. 20.
Figure 22:
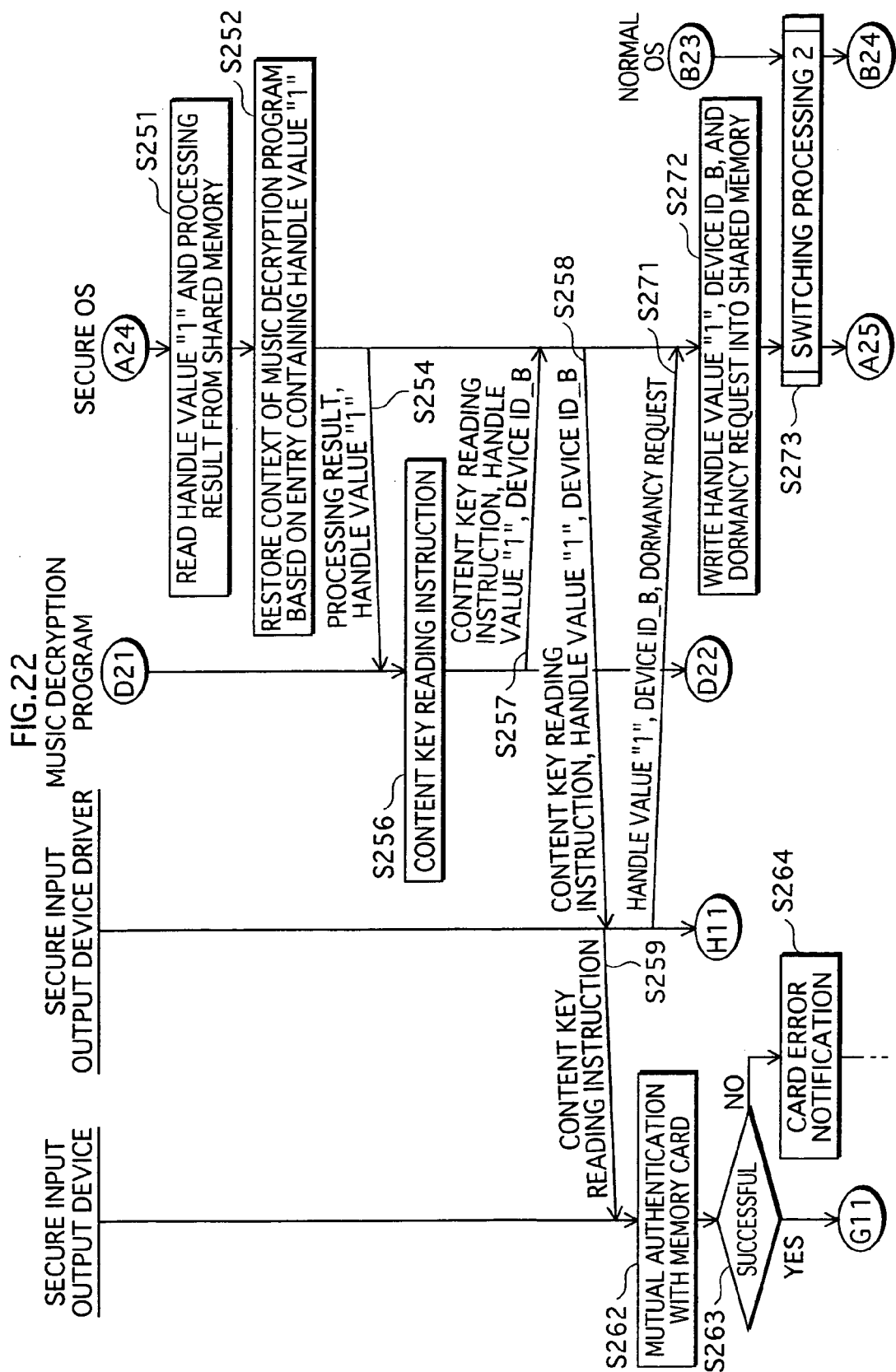
FIG. 22 is a flow chart that shows the operation performed by programs related to a processing request made to the music decryption program 176 and is continued from FIG. 21.
Figure 23:
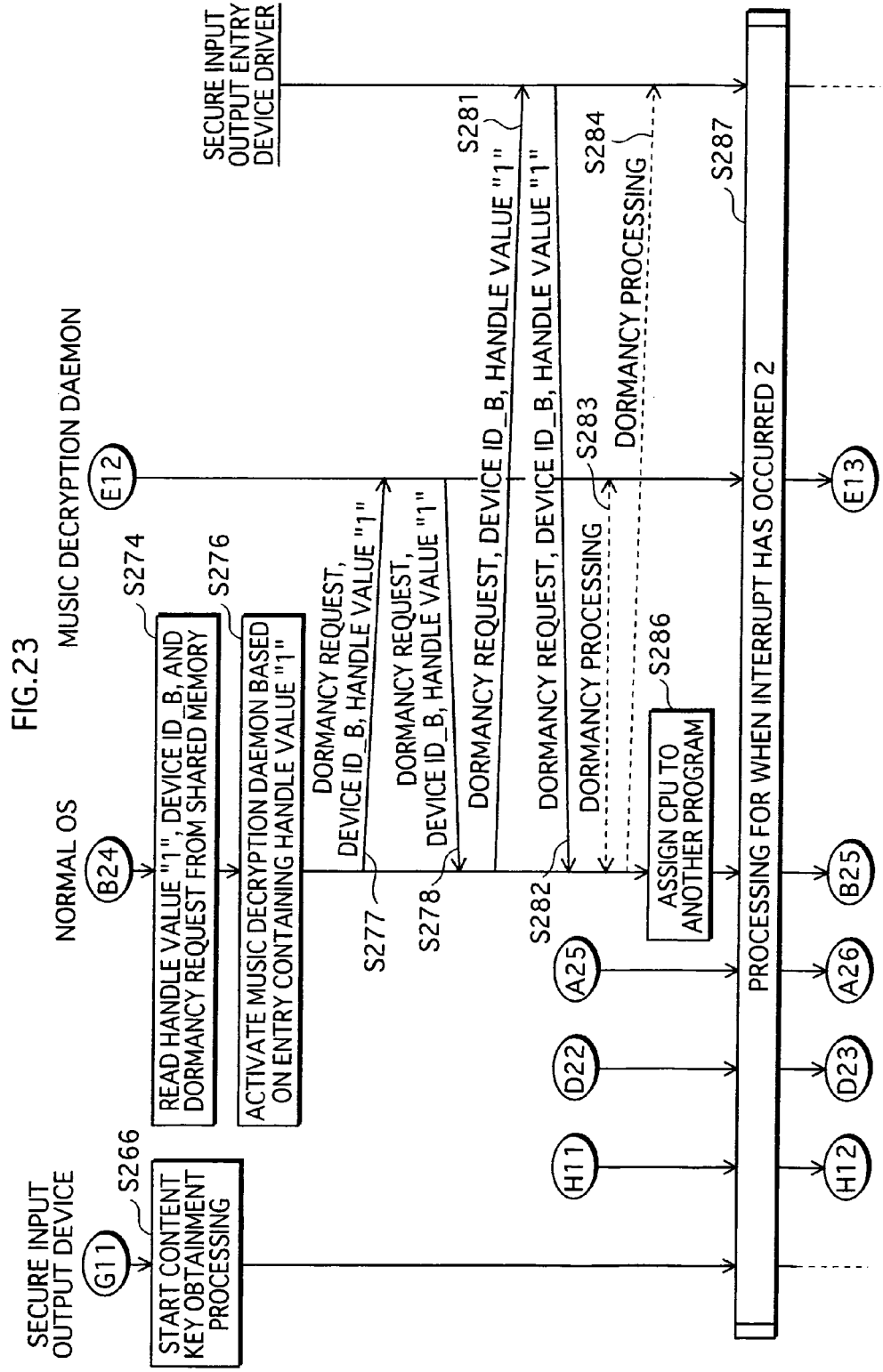
FIG. 23 is a flow chart that shows the operation performed by programs related to a processing request made to the music decryption program 176 and is continued from FIG. 22.
Figure 24:
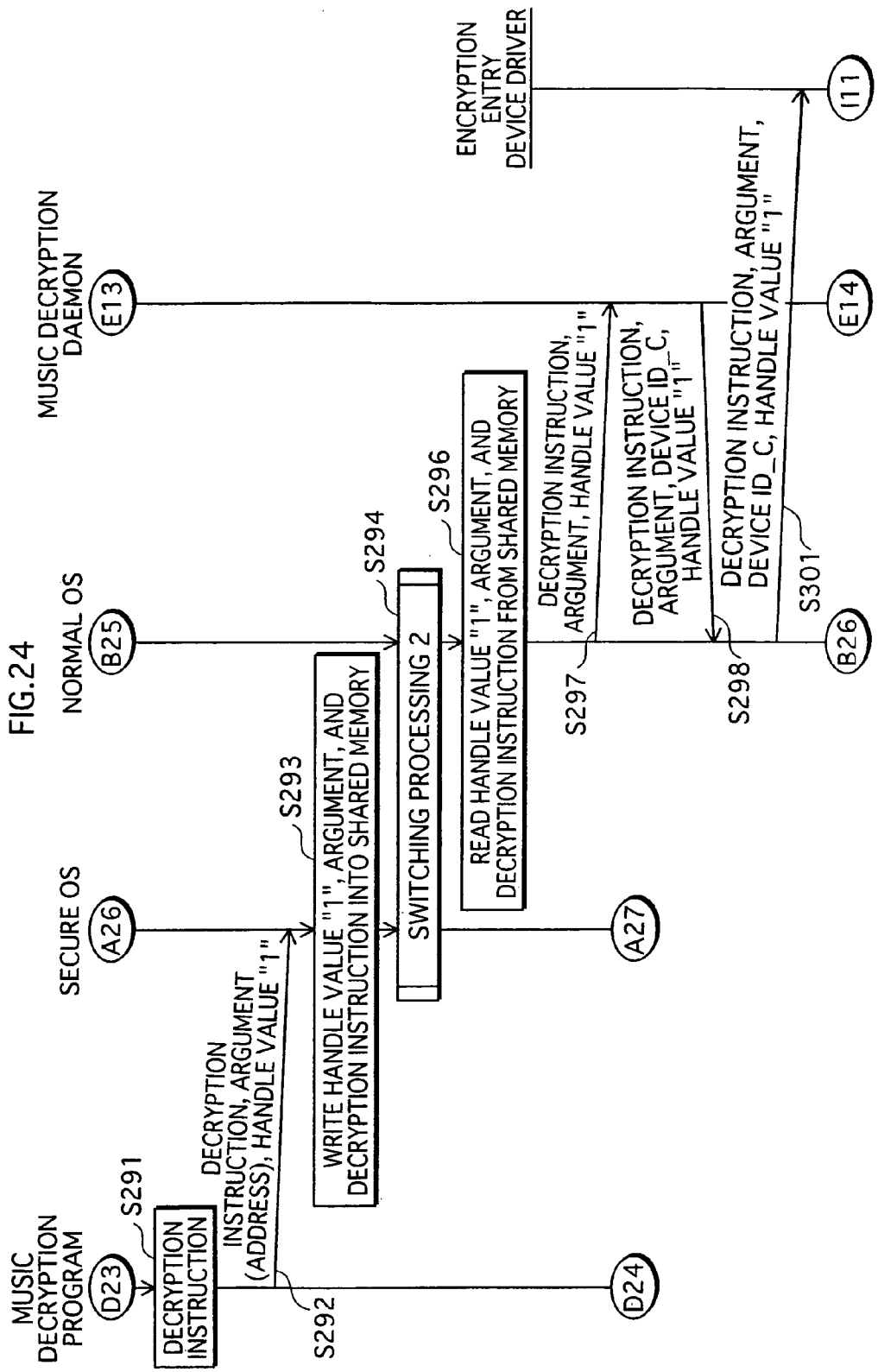
FIG. 24 is a flow chart that shows the operation performed by programs related to a processing request made to the music decryption program 176 and is continued from FIG. 23.
Figure 25:
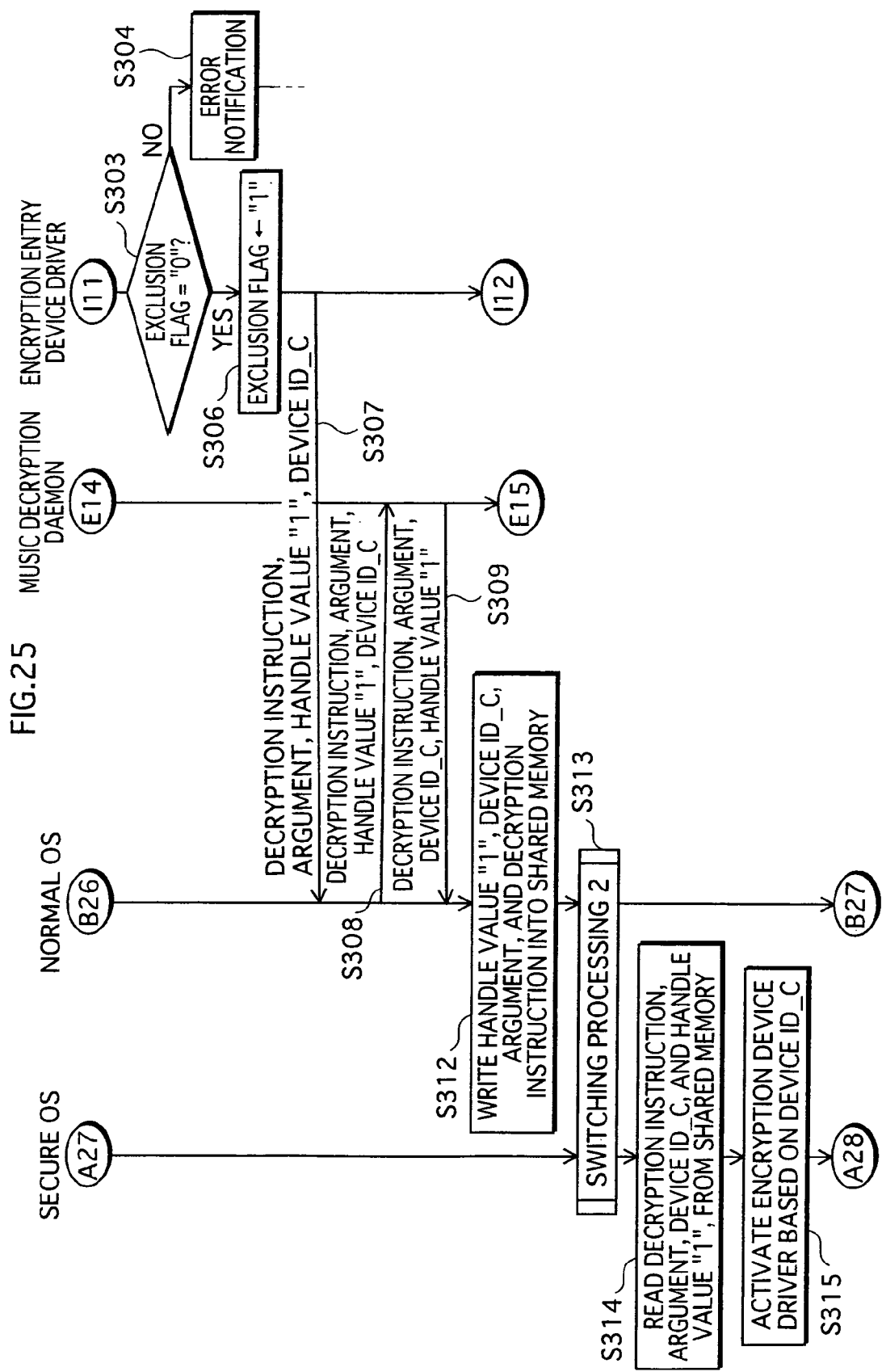
FIG. 25 is a flow chart that shows the operation performed by programs related to a processing request made to the music decryption program 176 and is continued from FIG. 24.

FIGS. 16 and 17 represents a flow chart that shows in detail the operation of the programs during the registration processing of the music decryption program. This flowchart is in correspondence with the sequence in Steps S132 to 153 shown in FIG. 36. The following describes registration processing of the music decryption program, with reference to the flow chart in FIGS. 16 and 17 and the sequence diagram in FIG. 36.

The music playback program 153 reads daemon information and secure application information that are pre-coded (Step S131). The music playback program 153 outputs the secure application registration request and the read daemon information and secure application information to the normal OS 151 (Step S132).

Having received the secure application registration request, the normal OS 151 saves the context of the music playback program 153 and writes the save destination address as the application context address in the entry 167 of the application management table (Step S133). Subsequently, the normal OS 151 reads an encrypted music decryption program 141 that is in correspondence with the received secure application information from the secondary memory unit 104, and writes the read encrypted music decryption program 141 to the shared memory 112 (Step S134). Next, the normal OS 151 writes the secure application registration request to a command area of the shared memory 112 (Step S136), and the procedure advances to the switching processing 1 (Step S137).

When the switching processing 1 is finished, the secure OS 171 reads the secure application registration request from the shared memory 112 (Step S138). Subsequently, the secure OS 171 decrypts the encrypted music decryption program within the shared memory 112 with the use of an encryption and decryption program so as to generate a music decryption program and writes the generated music decryption program to the secure memory 113 (Step S139). The secure OS 171 sets a handle value "1" with the music decryption program, writes "1" as the handle value in the entry 187 of the secure application management table 186, and writes the address within the secure memory 113 at which the music decryption program 176 is written as a secure application address (Step S141).

Next, the secure OS 171 writes a registration completion notification and the handle value "1" to the shared memory 112 (Step S143), and the procedure advances to the switching processing 2 (Step S144).

The normal OS 151 reads the registration completion notification and the handle value "1" from the shared memory 112 (Step S146) and writes the read handle value "1" into the entry 167 of the application management table 166 (Step S147). The normal OS 151 reads the music decryption daemon 142 from the secondary memory unit 104 based on the daemon information, and writes the read music decryption daemon 142 to the normal memory 111 (Step S149). The normal OS 151 writes the write-destination address within the normal memory 111 at which the music decryption daemon 156 has been written, into the entry 167 of the application management table 166 (Step S151).

Subsequently, the normal OS 151 restores the context of the music playback program 153 into the CPU 102 based on the application context address in the entry 167 (Step S152), and outputs the received handle value "1" to the music playback program 153 (Step S153).

The music playback program 153 writes the received handle value "1" to a storage area of the music playback program 153 itself within the normal memory 111 (Step S154).

(3) Processing Request to the Music Decryption Program

Figure 42:
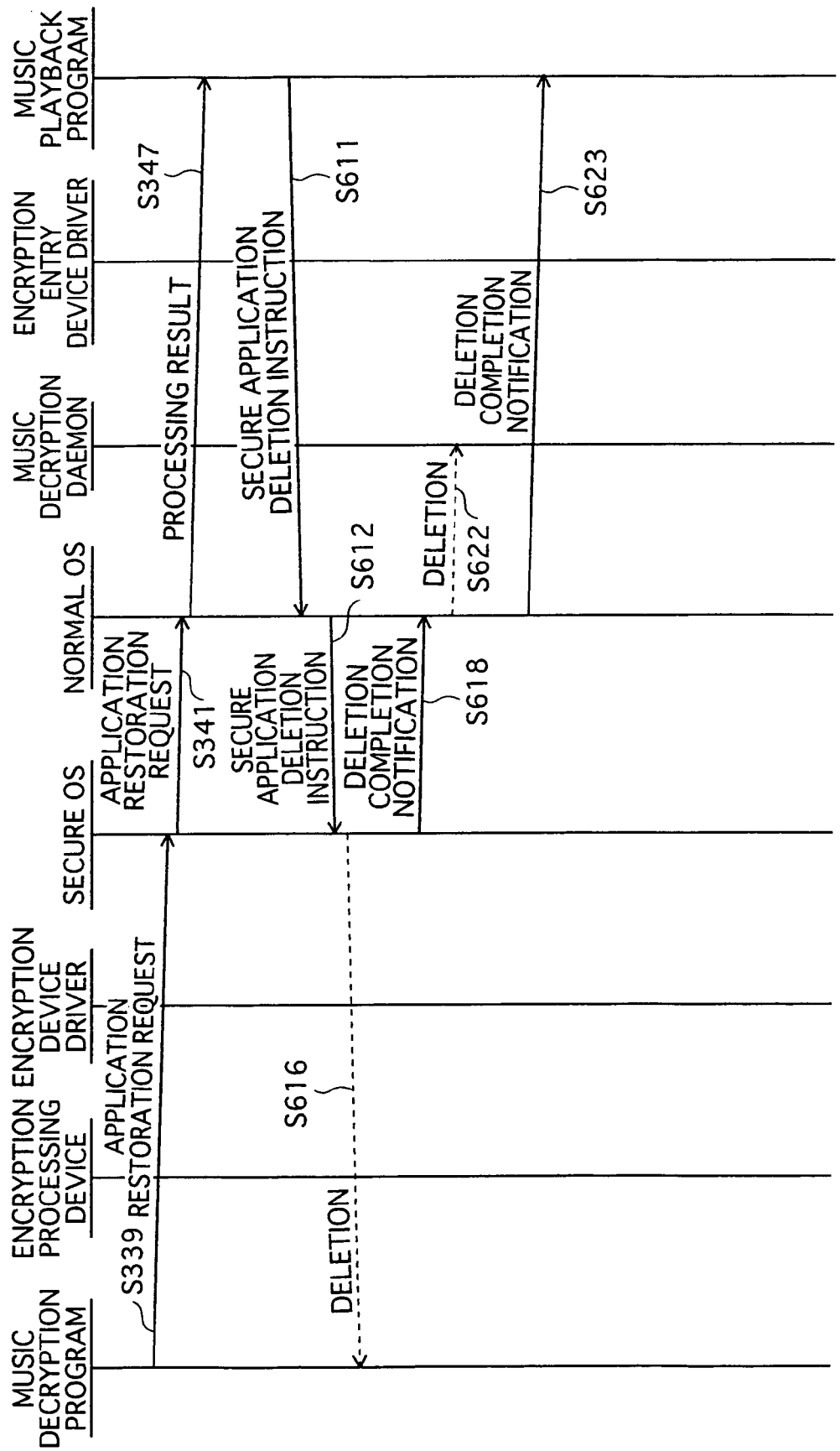
FIG. 42 shows a command transfer between programs during an operation of the mobile phone 100 and is continued from FIG. 41.

The flow chart in FIGS. 18 through 27 show the operation of each of the programs, in a case where the music decryption program 176 decrypts the encrypted music data upon a request from the music playback program 153. This flow chart is in correspondence with Step S193 in FIG. 36 through Step S347 in FIG. 42.

The music playback program 153 displays a selection screen that contains a list of music pieces and receives a selection of a music piece from the user (Step S191), and reads the music piece ID that indicates the received music piece and the handle value "1" (Step S192). The music playback program 153 uses the read music piece ID as an argument and outputs the argument, the handle value "1", and a decryption processing instruction to the normal OS 151 (Step S193).

The normal OS 151 saves the context of the music playback program 153 into the normal memory 111 (Step S196), and writes the save destination address into the entry 167 that contains the handle value "1" in the application management table 166 (Step S197). Subsequently, the normal OS 151 writes the received argument, handle value "1", and decryption processing instruction to the shared memory 112 (Step S198), and performs the switching processing 1 (Step S199).

When the switching processing 1 is finished (Step S199), the secure OS 171 reads the argument, the handle value "1", and the decryption processing instruction from the shared memory 112 (Step S201). The secure OS 171 activates the music decryption program 176 based on the secure application address in the entry 187 that contains the read handle value "1" in the secure application management table 186 (Step S202), and outputs the read argument, handle value "1", decryption processing instruction to the music decryption program 176 (Step S203).

The music decryption program 176 receives the argument and the decryption processing instruction from the secure OS 171 and stores therein the received argument, which is the music piece ID. Subsequently, the CPU 102 executes the music decryption program 176 (the data reading step) (Step S204). The music decryption program 176 reads the music piece ID (Step S206), uses the read music piece ID as an argument, and outputs a data reading instruction, the argument, and the handle value "1" to the secure OS 171 (Step S208).

The secure OS 171 receives the data reading instruction, the argument, and the handle value "1" from the music decryption program 176 and saves the context of the music decryption program 176 into the secure memory 113, and writes the save destination address into the entry 187 of the application management table 186 (Step S209). Subsequently, the secure OS 171 writes the received data reading instruction, argument, handle value "1" to the shared memory 112 (Step S211), and the procedure advances to the switching processing 2 (Step S216).

When the switching processing 2 is finished (Step S216), the normal OS 151 reads the data reading instruction, the argument, and the handle value "1" from the shared memory 112 (Step S217). The normal OS 151 selects the entry 167 that contains the handle value "1" in the application management table 166 and activates the music decryption daemon 156 based on the daemon address contained in the selected entry 167 (Step S218). The normal OS 151 outputs the read data reading instruction, argument, and handle value "1" to the music decryption daemon 156 (Step S219).

The music decryption daemon 156 receives the data reading instruction, the argument, and the handle value "1". When having received the data reading instruction, the music decryption daemon 156 calls an access function stored in the library 152 and outputs the argument and the handle value "1" (Step S221). The access function called by the music decryption daemon 156 outputs a reading request, the argument, a device ID_A and the received handle value "1" to the normal OS 151 (Step S222). The normal OS 151 outputs the reading request, the argument, the device ID_A, and the handle value "1" to the normal input output device driver 157 that is in correspondence with the receive device ID_A (Step S223).

The normal input output device driver 157 receives the reading request, the argument, and the handle value "1". Subsequently, the normal input output device driver 157 judges whether or not the exclusion flag is "0" (Step S224). In the case where the exclusion flag is "1" (Step S224: NO), the normal input output device driver 157 outputs an error notification indicating that the normal input output device 132 is in operation and that a new reading request cannot be accepted.

The music decryption daemon 156 receives the error notification via the normal OS 151 and the access function, and outputs a reading request again after a predetermined time has elapsed. Alternatively, it is acceptable to have an arrangement wherein the music decryption daemon 156 outputs the received error notification to the music decryption program 176 via the normal OS 151 and the secure OS 171 so as to have the decryption processing discontinued.

In the case where the judgment result is that the exclusion flag is "0" (Step S224: YES), the exclusion flag is changed to "1" (Step S227), and the normal input output device driver 157 outputs the received argument to the normal input output device 132 and instructs that data should be read out (Step S231).

The normal input output device 132 receives the argument (music piece ID) and the reading request and starts reading the encrypted music data 304 that is in correspondence with the received music piece ID, from the normal area 303 of the memory card 300 and starts writing the read encrypted music data 304 to the shared memory 112 (Step S236).

The normal input output device driver 157 outputs a reading request to the normal input output device 132 (Step S231) and outputs, to the normal OS 151, a dormancy request that contains the device ID_A owned by the normal input output device driver 157 itself and the received handle value "1" (Step S232).

The normal OS 151 receives the dormancy request and puts the music decryption daemon 156 that is in correspondence with the handle value "1" and the normal input output device driver 157 that is in correspondence with the device ID_A into a dormancy state (Step S233 and Step S234). Subsequently, the normal OS 151 performs task scheduling and assigns the CPU 102 to another program that is in an executable state (Step S238).

When the processing by the normal input output device 132 is finished, an interrupt occurs, and the music decryption daemon 156 obtains a processing result (Step S239). The processing for when an interrupt has occurred 1 in Step S239 will be described later. The processing in Step S239 corresponds to the sequence in Steps S463 through S478 shown in FIG. 37.

In the processing for when an interrupt has occurred 1 (Step S239), the music decryption daemon 156 obtains a write-destination address within the shared-memory 112 for the encrypted music data, as a processing result by the normal input output device 132. The music decryption daemon 156 outputs the obtained processing result and the handle value "1" to the normal OS 151 (Step S241). The normal OS 151 writes the received processing result and the handle value "1" to the shared memory 112 (Step S242) and performs the switching processing 1 (Step S244).

When the switching processing 1 (Step S244) is finished, the secure OS 171 reads the handle value "1" and the processing result from the shared memory 112 (Step S251). The secure OS 171 selects the entry 187 that contains the read handle value "1" from the secure application management table 186 and restores the context of the music decryption program 176 into the CPU 102 based on the secure application context address in the entry 187 (Step S252). Subsequently, the secure OS 171 outputs the read processing result and the handle value "1" to the music decryption program 176 (Step S254).

The music decryption program 176 receives the write-destination address of the encrypted music data as a processing result and stores the received write-destination address into the storage area of the music decryption program 176 itself.

Next, the CPU 102 executes the music decryption program 176 (the content key reading step) (Step S256). The music decryption program 176 outputs a system call that contains a content key reading instruction, the device ID_B, and the handle value "1" indicating the music decryption program 176 itself, to the secure OS 171 (Step S257).

The secure OS 171 receives the content key reading instruction, the device ID_B, and the handle value "1" and outputs the received content key reading instruction, device ID_B, and the handle value "1" to the secure input output device driver 178 that is in correspondence with the received device ID_B (Step S258).

The secure input output device driver 178 receives the content key reading instruction, the device ID_B, and the handle value "1" and outputs the content key reading instruction to the secure input output device 133 (Step S259).

The secure input output device 133 receives the content key reading instruction and subsequently, performs mutual authentication with the secure processing unit 302 of the memory card 300 (Step S262). When the authentication has been successful (Step S263: YES), the secure input output device 133 starts obtaining the content key (Step S266).

When the authentication has failed, the secure input output device 133 outputs a card error notification and discontinues the obtainment process of the content key (Step S264). In such a case, the music decryption daemon 156 and the music decryption program 176 discontinues the decryption processing. The music playback program 153 displays a screen which notifies that reading from the memory card 300 is not possible.

The secure input output device driver 178 then outputs a dormancy request, the received handle value "1", and the device ID_B that indicates the secure input output device driver 178 itself to the secure OS 171 (Step S271); It should be noted that the dormancy request outputted here is not for requesting the secure OS 171 to perform dormancy processing but is a command to be relayed to the music decryption daemon 156 as being stored in the data storing portion of an external processing request.

The secure OS 171 receives the dormancy request, the handle value "1", and the device ID_B from the secure input output device driver 178 and writes the received dormancy request, handle value "1", and device ID¯B to the shared memory 112 (Step S272). Subsequently, the procedure advances to the switching processing 2 (Step S273).

When the switching processing is finished (Step S273), the normal OS 151 reads the dormancy request, the handle value "1", and the device ID_B from the shared memory 112 (Step S274), and activates the music decryption daemon 156 based on the entry 168 that contains the read handle value "1" (Step S276). The normal OS 151 outputs the read dormancy request, device ID_B, and handle value "1" (Step S277).

The music decryption daemon 156 receives the read dormancy request, the device ID_B, and the handle value "1" from the normal OS 151. Having received the dormancy request, the music decryption daemon 156 outputs a system call that contains the dormancy request, the device ID_B, and the handle value "1" (Step S278).

The secure OS 171 outputs the received dormancy request, device ID_B, and handle value "1" to the secure input output entry device driver 158 that is in correspondence with the received device ID_B (Step S281).

The secure input output entry device driver 158 receives the dormancy request from the music decryption daemon 156 via the normal OS 151 and outputs a dormancy request that contains the device ID_B and the handle value "1", to the normal OS 151 (Step S282).

The normal OS 151 receives the dormancy request, the device ID_B, and the handle value "1". Having received the dormancy request, the normal OS 151 performs dormancy processing on the secure input output entry device driver 158 that is in correspondence with the received device ID_B and the music decryption daemon 156 that is in correspondence with the received handle value "1", respectively (Step S283 and Step S284).

Subsequently, the normal OS 151 performs task scheduling and assigns the CPU to another program that is in an executable state (Step S286).

When the obtainment processing of the content key performed by the secure input output device 133 is finished, the music decryption program 176 obtains a processing result from the processing for when an interrupt has occurred 2 (Step S287). The processing for when an interrupt has occurred 2 in Step S287 will be described later. Further, the processing in Step S287 is in correspondence with the processing in Step S512 in FIG. 38 through Step S541 in FIG. 39.

In Step S287, the music decryption program 176 obtains an address within the secure memory 113 at which the content key is stored, as a processing result. Subsequently, the CPU 102 executes the music decryption program 176 (the decryption step) (Step S291). The music decryption program 176 uses the address within the secure memory 113 at which the content key is stored and the address within the shared memory 112 at which the encrypted music data is stored as an argument, and outputs a decryption instruction, the argument, and the handle value "1" to the secure OS 171 (Step S292).

The secure OS 171 receives the decryption instruction, the argument, and the handle value "1" from the music decryption program 176. Subsequently, the secure OS 171 writes the received decryption instruction, argument, and handle value "1" to the shared memory 112 (Step S293), and performs the switching processing 2 (Step S294).

When the switching processing 2 is finished (Step S294), the normal OS 151 reads the decryption instruction, the argument, and the handle value "1" from the shared memory 112 (Step S296). The normal OS 151 activates the music decryption daemon 156 based on the handle value "1" and the application management table 166, and outputs the read decryption instruction, argument, and handle value "1" to the music decryption daemon 156 (Step S297).

The music decryption daemon 156 receives the decryption instruction, the argument, and the handle value "1" from the normal OS 151. When having received the decryption instruction, the music decryption daemon 156 outputs the received decryption instruction, argument, the device ID_C, and the handle value "1" to the normal OS 151 (Step S298).

The normal OS 151 receives the decryption instruction, the argument, the device ID_C, and the handle value "1" from the music decryption daemon 156 and outputs the received decryption instruction, argument, device ID_C, and the handle value "1" to the encryption entry device driver 159 that is in correspondence with the received device ID_C (Step S301).

The encryption entry device driver 159 receives the argument, the decryption instruction, the device ID_C, and the handle value "1" from the music decryption daemon 156 via the normal OS 151. When having received the decryption instruction, in the case where the exclusion flag is "1" (Step S303: NO), the encryption entry device driver 159 outputs an error notification which indicates that the encryption processing device 117 is already in operation and that a new processing request cannot be accepted (Step S304). At this time, the music decryption daemon 156 that has received the error notification outputs a decryption instruction again after a predetermined time has elapsed.

In the case where the exclusion flag is "0" (Step S303: YES), the encryption entry device driver 159 changes the exclusion flag to "1" (Step S306), and outputs the received argument, decryption instruction, handle value "1", and device ID_C to the normal OS 151 (Step S307).

The normal OS 151 calls the music decryption daemon 156 that is in correspondence with the received handle value "1" and outputs the received decryption instruction, argument, handle value "1", and device ID_C (Step S308).

The music decryption daemon 156 receives the decryption instruction, the argument, the handle value "1", and the device ID_C from the encryption entry device driver 159 via the normal OS 151. Subsequently, the music decryption daemon 156 outputs the received decryption instruction, argument, device ID_C, and handle value "1" to the normal OS 151 (Step S309).

The normal OS 151 receives the decryption instruction, the argument, the device ID_C, and the handle value "1" from the music decryption daemon 156, writes the received decryption instruction, argument, device ID_C, and handle value "1" to the shared memory 112 (Step S312) and performs the switching processing 2 (Step S313).

When the switching processing 2 is finished (Step S313), the secure OS 171 reads the decryption instruction, the argument, the device ID_C, and the handle value "1" from the shared memory 112 (Step S314). The secure OS 171 activates the encryption device driver 179 based on the read device ID_C (Step S315) and outputs the read decryption instruction, argument, and handle value "1" to the encryption device driver 179 (Step S316).

The encryption device driver 179 receives the decryption instruction, the argument, the device ID_C, and the handle value "1" from the secure OS 171, outputs the received argument to the encryption processing device 117, and instructs the encryption processing device 117 to perform decryption process (Step S317).

When having been instructed to perform decryption process by the encryption device driver 179, the encryption processing device 117 reads a content key from the secure memory 113 and performs the decryption algorithm D1 on the encrypted music data within the shared memory 112, using the read content key, so as to generate music data, and outputs the generated music data to the buffer 123 (Step S318).

After instructing the encryption processing device 117 to perform the decryption process, the encryption device driver 179 outputs a dormancy request, the handle value "1" received from the secure OS 171, and the device ID_C indicating the encryption device driver 179 itself, to the secure OS 171 (Step S321). It should be noted that the dormancy request outputted here is not for requesting the secure OS 171 to perform dormancy processing but is a command to be relayed to the music decryption daemon 156 as being stored in the data storing portion of an external processing request.

The secure OS 171 receives the dormancy request, the handle value "1", and the device ID_C from the encryption device driver 179 and writes the received dormancy request, handle value "1", and device ID_C to the shared memory 112 (Step S322). Then, the switching processing 2 is performed (Step S323).

When the switching processing 2 is finished (Step S323), the normal OS 151 reads the handle value "1", the device ID_C, and the dormancy request from the shared memory 112 (Step S326). The normal OS 151 activates the music decryption daemon 156 based on the read handle value "1" and the application management table 166 and outputs the read dormancy request, handle value "1", and device ID_C to the music decryption daemon 156 (Step S327).

The music decryption daemon 156 receives the dormancy request, the handle value "1", and the device ID_C from the normal OS 151 and outputs the received dormancy request, device ID_C, and handle value "1" that indicates the music decryption daemon 156 itself to the normal OS 151 (Step S328). The normal OS 151 outputs the received dormancy request, device ID_C, and handle value "1" to the encryption entry device driver 159 that is in correspondence with the received device ID_C (Step S329).

The encryption entry device driver 159 receives the dormancy request, the device ID_C, and the handle value "1" from the music decryption daemon 156 via the normal OS 151. Subsequently, the encryption entry device driver 159 outputs the dormancy request, the received handle value "1", and the device ID_C owned by the encryption entry device driver 159 itself, to the normal OS 151 (Step S332).

The normal OS 151 receives the dormancy request, the handle value "1", and the device ID_C from the encryption entry device driver 159, and puts the music decryption daemon 156 that is in correspondence with the received handle value "1" into a dormancy state (Step S333). Subsequently, the normal OS 151 puts the encryption entry device driver 159 that is in correspondence with the received device ID_C into a dormancy state (Step S334). The normal OS 151 then performs task scheduling and assigns the CPU to a program that is in an executable state (Step S336).

When the decryption processing by the encryption processing device 117 is finished, the music decryption program 176 receives a processing result by the encryption processing device 117 due to the processing for when an interrupt has occurred 3 (Step S337). Explanation of Step S337 will be provided later. It should be noted that Step S337 corresponds to Step S552 in FIG. 37 through Step S606 in FIG. 38.

The music decryption program 176 obtains the write-destination address within the buffer 123 for the music data as a processing result by the encryption processing device 117. Subsequently, the CPU 102 executes the music decryption program 176 (the music data output step) (Step S338). The music decryption program 176 takes the write-destination address of the music data as a processing result and outputs the processing result, an application restoration request, and the handle value "1" to the secure OS 171 (Step S339).

The secure OS 171 receives the application restoration request, the processing result and the handle value "1" and writes the received application restoration request, processing result, and handle value "1" to the shared memory 112 (Step S341). Subsequently, the secure OS 171 performs the switching processing 2 (Step S342).

When the switching processing 2 is finished (Step S342), the normal OS 151 reads the application restoration request, processing result, and handle value "1" from the shared memory 112 (Step S344). The normal OS 151 restores the context of the music decryption program 176 based on the entry 167 containing the handle value "1" in the application management table 166 (Step S346). Subsequently, the normal OS 151 outputs the read processing result to the music decryption program 176 (Step S347).

(4) Processing for When an Interrupt Has Occurred 1

Figure 28:
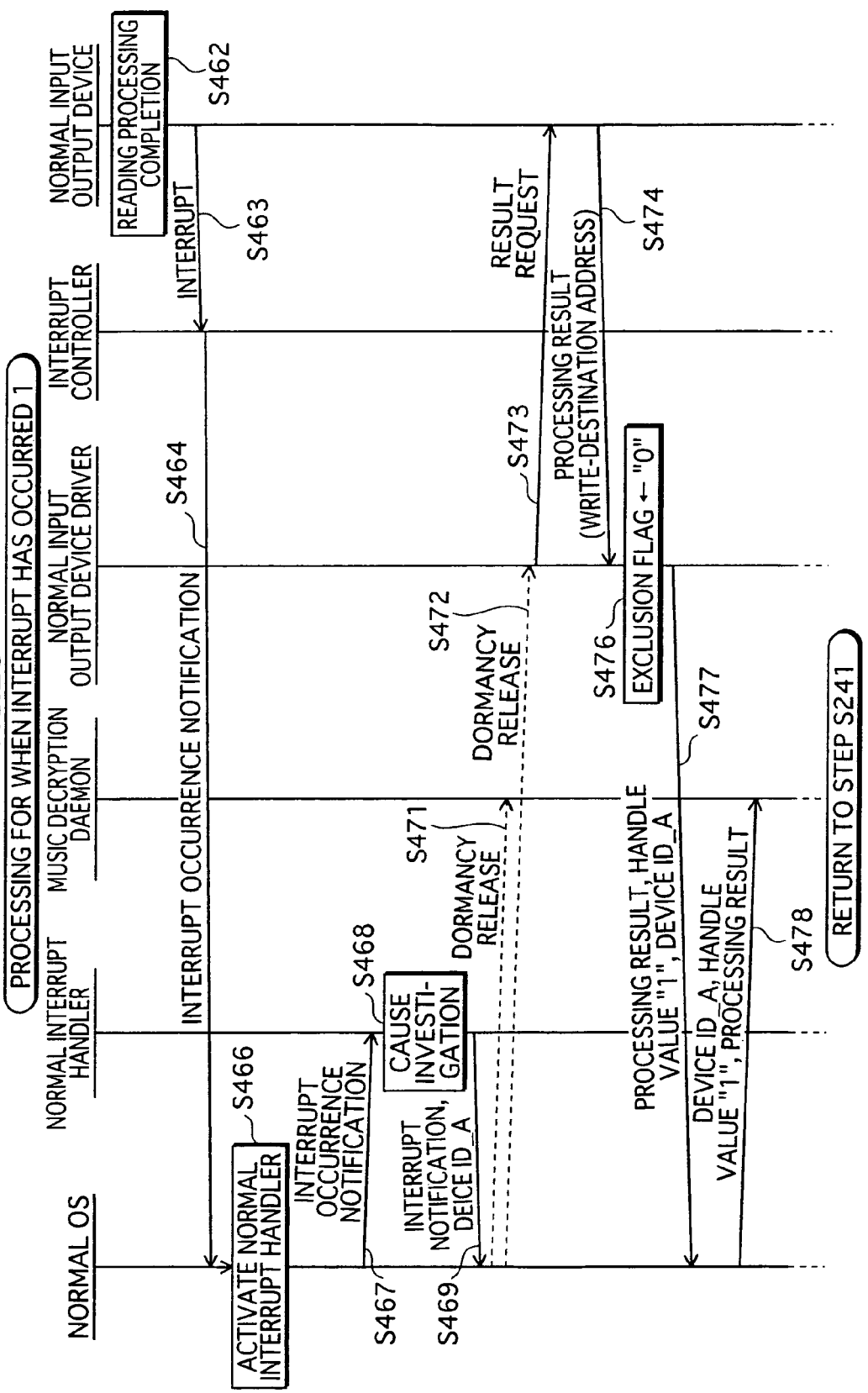
FIG. 28 is a flow chart that shows the processing performed when an interrupt by the normal input output device 132 occurs during the execution of the normal OS 151 and shows in detail Step S239 in FIG. 21.

The following describes the processing for when an interrupt has occurred 1, with reference to the flow chart in FIG. 28. This flow chart shows the details of Step S239 in FIG. 21 and corresponds to the sequence in Steps S463 to S478 in FIG. 37.

When the reading of the encrypted music data is finished (Step S462), the normal input output device 132 makes an interrupt occur (Step S463).

The interrupt controller 107 detects the occurrence of the interrupt and outputs an interrupt occurrence notification to the normal OS 151 (Step S464). Having received the interrupt occurrence notification, the normal OS 151 activates the normal interrupt handler 161 based on the interrupt table (Step S466). Subsequently, the normal OS 151 outputs an interrupt occurrence notification to the normal interrupt handler 161 (Step S467).

The normal interrupt handler 161 controls the interrupt controller 107 so as to investigate the cause of the interrupt (Step S468). Subsequently, the normal interrupt handler 161 outputs a device ID_A that is in correspondence with the normal input output device 132 having made the interrupt occur and an interrupt notification to the normal OS 151 (Step S469).

The normal OS 151 receives the interrupt notification and the device ID_A from the normal interrupt handler 161. The normal OS 151 releases dormancy of the normal input output device driver 157 corresponding to the received device ID_A and the music decryption daemon 156 which has undergone the dormancy processing together with the normal input output device driver 157 (Step S471, Step S472), and assigns the CPU 102 to the normal input output device driver 157.

The normal input output device driver 157 is released from the dormancy, and outputs a result request to the normal input output device 132 (Step S473), and obtains a write-destination address of the encrypted music data in the shared memory 112, from the normal input output device 132, as a processing result (Step S474). Having obtained the processing result, the normal input output device driver 157 sets the exclusion flag to be "0" (Step S476) and outputs the obtained processing result, the handle value "1" received as identification information indicating the output source of the reading request, and the device ID_A indicating the normal input output device driver 157 itself, to the normal OS 151 (Step S477). The normal OS 151 outputs the received processing result, handle value "1", device ID_A to the music decryption daemon 156 that is in correspondence with the handle value "1" (Step S478).

(5) Processing for When an Interrupt Has Occurred 1-2

The processing for when an interrupt has occurred 1 mentioned above describes an operation to be performed in the case where an interrupt has occurred during execution of the normal OS 151 or a program that is in the normal memory 111 and is managed by the normal OS 151. In this section, description is provided, with reference to the flow chart in FIG. 29, for an operation to be performed in the case where an interrupt has occurred during execution of the secure OS 171 or a program managed by the secure OS 171.

When the reading of the encrypted music data is finished (Step S491), the input output device 132 makes an interrupt occur (Step S492).

The interrupt controller 107 detects the interrupt and outputs an interrupt occurrence notification to the secure OS 171 (Step S493).

The secure OS 171 receives an interrupt occurrence notification from the interrupt controller 107. Having received the interrupt occurrence notification, the secure OS 171 activates the secure interrupt handler 181 (Step S494) and outputs an interrupt occurrence notification (Step S496).

The secure interrupt handler 181 receives the interrupt occurrence notification and performs an interrupt mask processing on the CPU 102 (Step S497) and outputs an interrupt occurrence notification to the secure OS 171 (Step S498).

The secure OS 171 receives the interrupt occurrence notification from the secure interrupt handler 181 and writes the received interrupt occurrence notification to the shared memory 112 (Step S499). Subsequently, the secure OS 171 and the normal OS 151 perform the switching processing 2 (Step S501).

When the switching processing 2 is finished (Step S501), the normal OS 151 reads the interrupt occurrence notification from the shared memory 112 and releases the interrupt mask of the CPU (Step S502).

Here, since the interrupt controller 107 has not been cleared, the interrupt controller 107 keeps outputting the interrupt occurrence notification. The processing in and after Step S502 is the same as the processing in and after Step S464 in FIG. 28.

(6) Processing for When an Interrupt has Occurred 2

Figure 30:
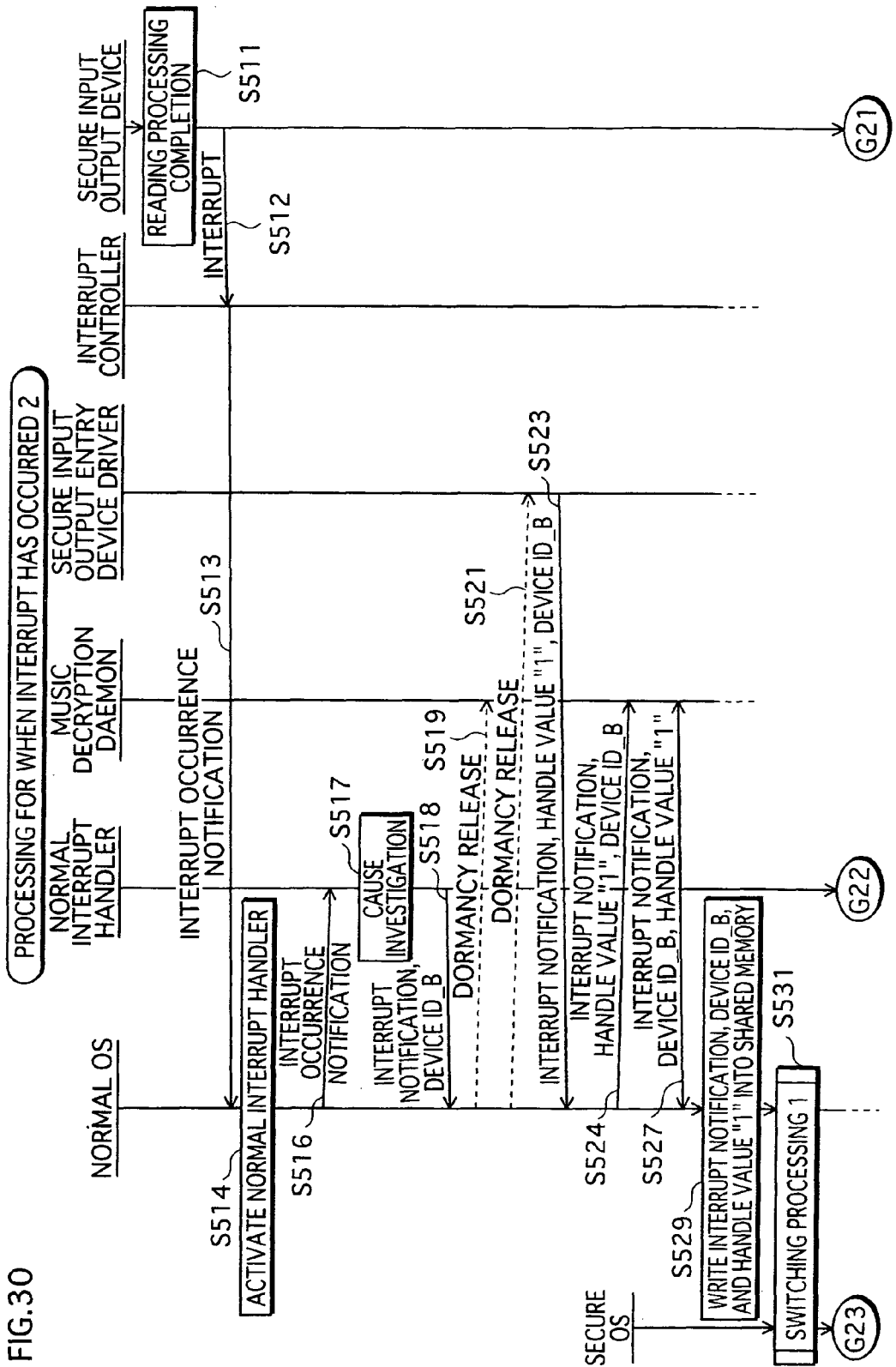
FIG. 30 is a flow chart that shows the processing performed when an interrupt by the secure device 133 occurs during the execution of the normal OS 151 and shows in detail Step S287 in FIG. 23.
Figure 31:
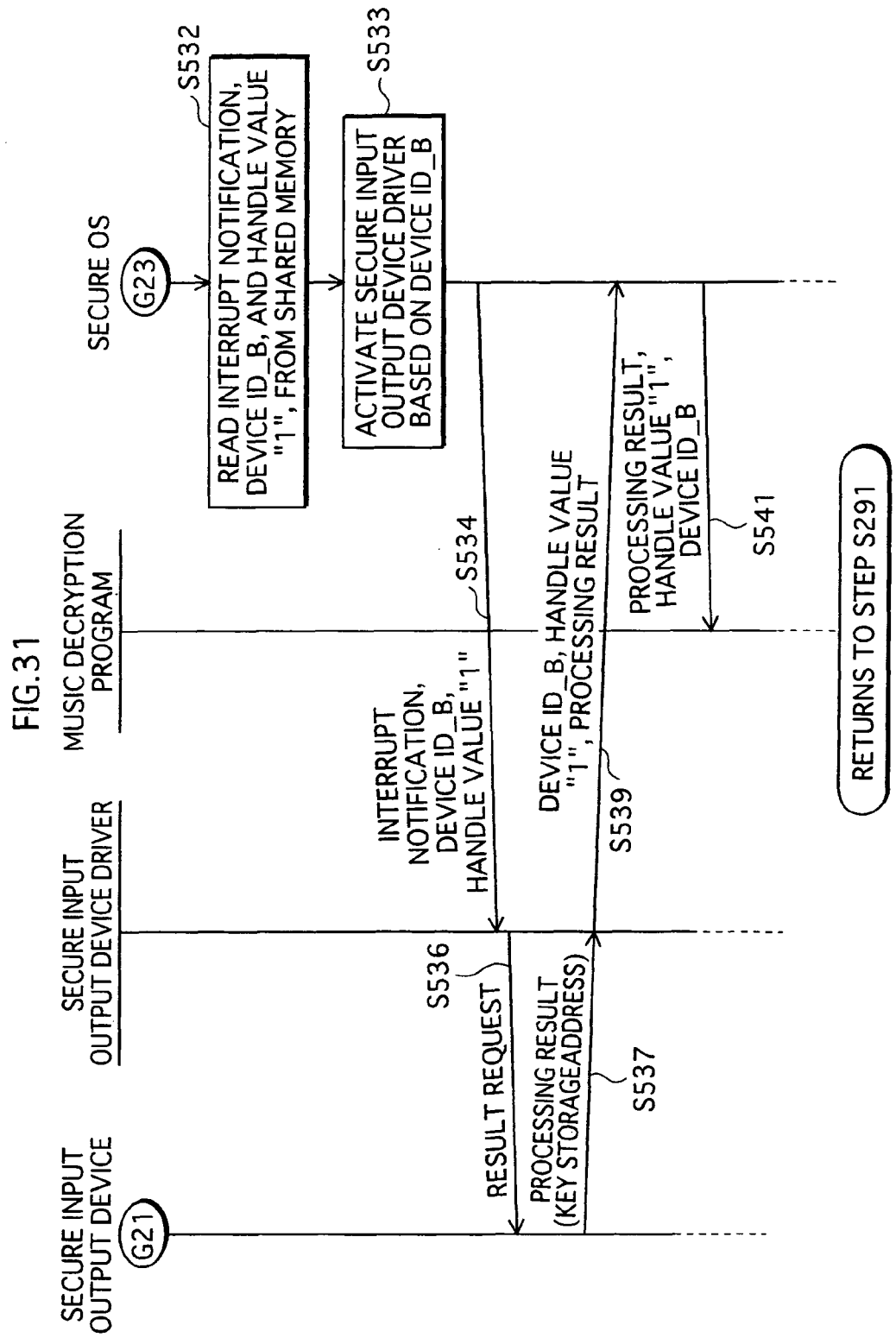
FIG. 31 is a flow chart that shows the processing performed when an interrupt by the secure device 133 occurs during the execution of the normal OS 151 and is continued from FIG. 30.

The following describes the processing for when an interrupt has occurred 2, with reference to the flow chart in FIGS. 30 and 31. This flow chart shows the details of Step S287 in FIG. 23 and corresponds to the sequence in Step S512 in FIG. 38 to Step S541 in FIG. 39.

When the reading of the content key is finished (Step S511), the secure input output device 133 makes an interrupt occur (Step S512).

The interrupt controller 107 detects the occurrence of the interrupt and outputs an interrupt occurrence notification to the normal OS 151 (Step S513).

The normal OS 151 receives the interrupt occurrence notification from the interrupt controller 107 and activates the normal interrupt handler 161 (Step S514). Subsequently, the normal OS 151 outputs the interrupt occurrence notification to the normal interrupt handler 161 (Step S516).

The normal interrupt handler 161 receives the interrupt occurrence notification and investigates the cause of the interrupt occurrence (Step S517). The normal interrupt handler 161 detects that the secure input output device 133 has made the interrupt occur and outputs the device ID_B that is in correspondence with the secure input output device 133 and an interrupt notification to the normal OS 151 (Step S518).

The normal OS 151 receives the interrupt notification and the device ID_B from the normal interrupt handler 161. Subsequently, the normal OS 151 releases the dormancy of the secure input output entry device driver 158 corresponding to the received device ID_B and the music decryption daemon 156 which has undergone the dormancy processing together with the secure input output entry device driver 158 (Step S519, Step S521), and assigns the CPU 102 to the secure input output entry device driver 158.

The secure input output entry device driver 158 is released from the dormancy and outputs the interrupt notification, the handle value "1" received as identification information indicating the output source of the dormancy request, and the device ID_B owned by the secure input output entry device driver 158 itself, to the normal OS 151 (Step S523).

The normal OS 151 outputs the received interrupt notification, handle value "1", and device ID_B to the music decryption daemon 156 that is in correspondence with the received handle value "1" (Step S524).

The music decryption daemon 156 receives the interrupt notification, handle value "1", and device ID_B and outputs the received interrupt notification, the device ID_B, and the handle value "1" indicating the music decryption daemon 156 itself, to the normal OS 151 (Step S527).

The normal OS 151 receives the interrupt notification, device ID_B, and the handle value "1" from the music decryption daemon 156 and writes the received interrupt notification, device ID_B, and handle value "1" to the shared memory 112 (Step S529), and the procedure advances to the switching processing 1 (Step S531).

When the switching processing 1 is finished, the secure OS 171 reads the interrupt notification, device ID_B, and handle value "1" from the shared memory 112 (Step S532), and activates the secure input output device driver 178 based on the read device ID_B (Step S533). Subsequently, the secure OS 171 outputs the read interrupt notification, device ID_B, and handle value "1" to the secure input output device driver 178 (Step S534).

The secure input output device driver 178 receives the interrupt notification, device ID_B, and handle value "1" and requests a processing result from the secure input output device 133 (Step S536). The secure input output device driver 178 receives a content key storing address within the secure memory 113 from the secure input output device 133 as a processing result (Step S537) and outputs a response notification containing the received processing result, the handle value "1", and the device ID_B to the secure OS 171 (Step S539).

The secure OS 171 outputs the received processing result, handle value "1", and device ID_B to the music decryption program 176 that is in correspondence with the received handle value "1" (Step S541).

Figure 26:
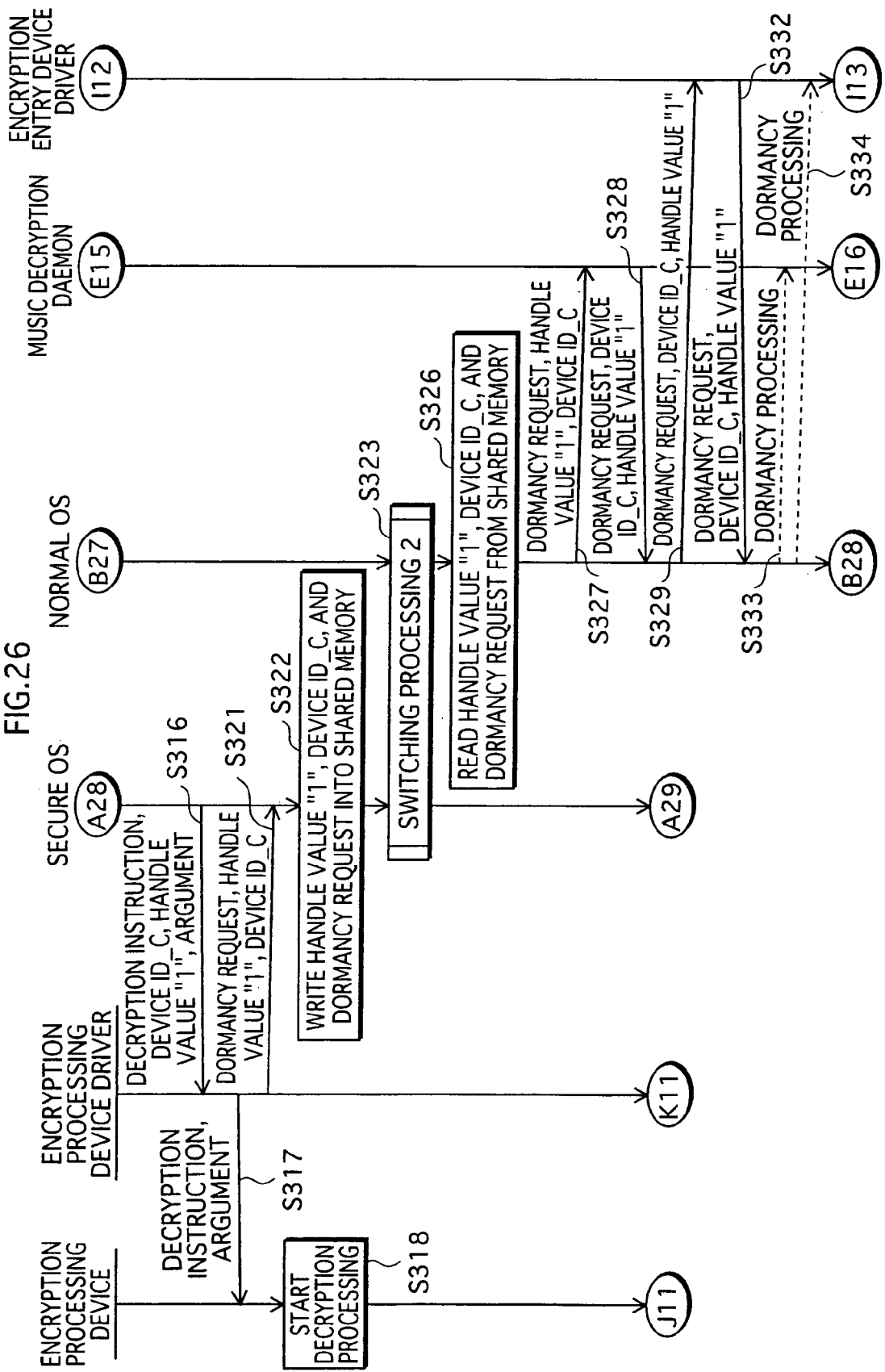
FIG. 26 is a flow chart that shows the operation performed by programs related to a processing request made to the music decryption program 176 and is continued from FIG. 25.
Figure 27:
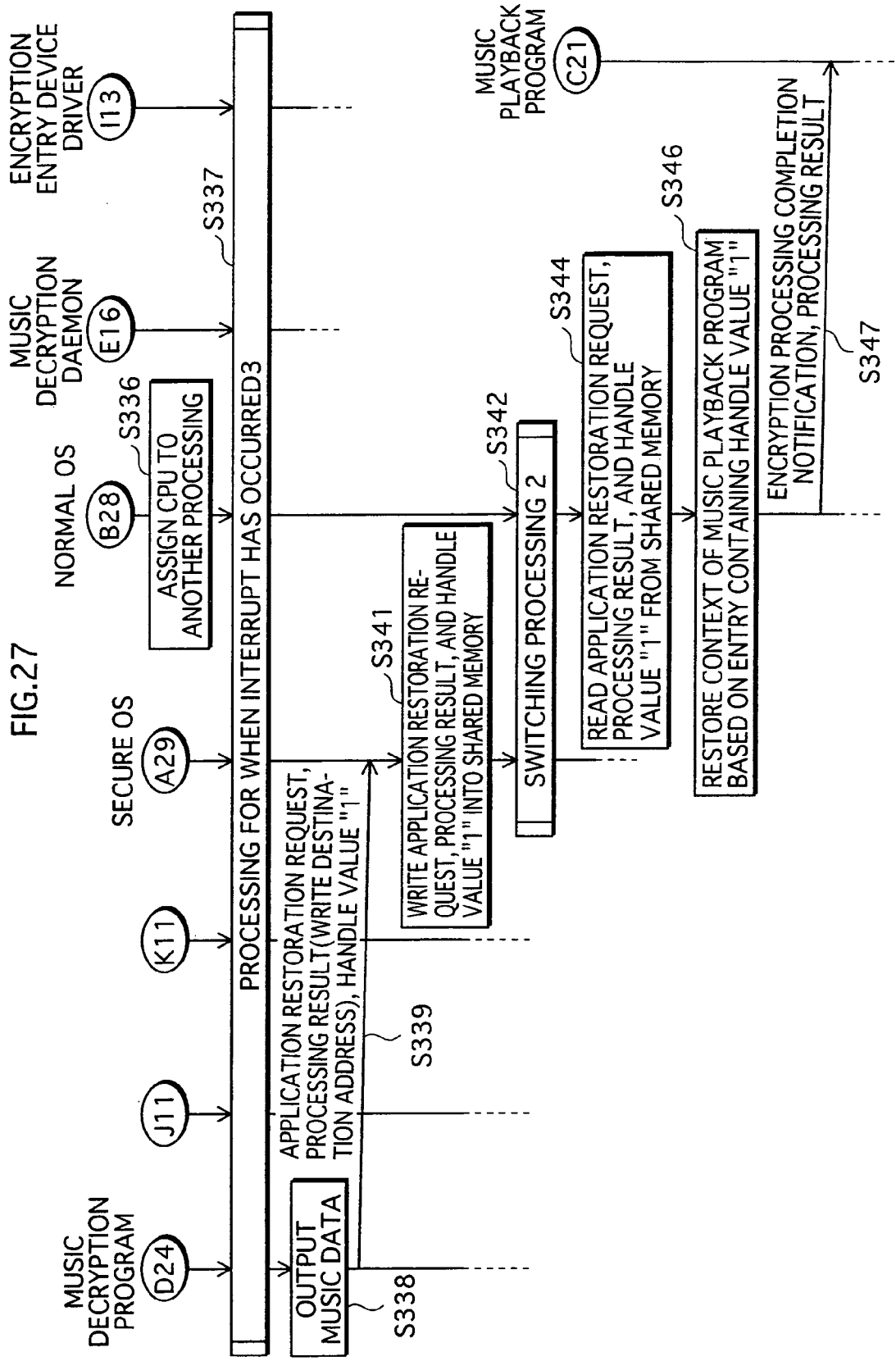
FIG. 27 is a flow chart that shows the operation performed by programs related to a processing request made to the music decryption program 176 and is continued from FIG. 26.

So far, in the description with reference to FIGS. 30 and 31, explanation is provided for the operation to be performed in the case where an interrupt has occurred during execution of the normal OS 151 or a program that is in the normal memory 111 and is managed by the normal OS 151. The operation to be performed in the case where an interrupt has occurred during execution of the secure OS 171 or a program managed by the secure OS 171 is almost the same as the aforementioned "Processing for when an interrupt has occurred 1-2". The difference is that the normal input output device in FIG. 26 is replaced with the secure input output device. The processing in and after Step S502 is continued to Step S513 in FIG. 30.

(7) Processing for When an Interrupt Has Occurred 3

Figure 32:
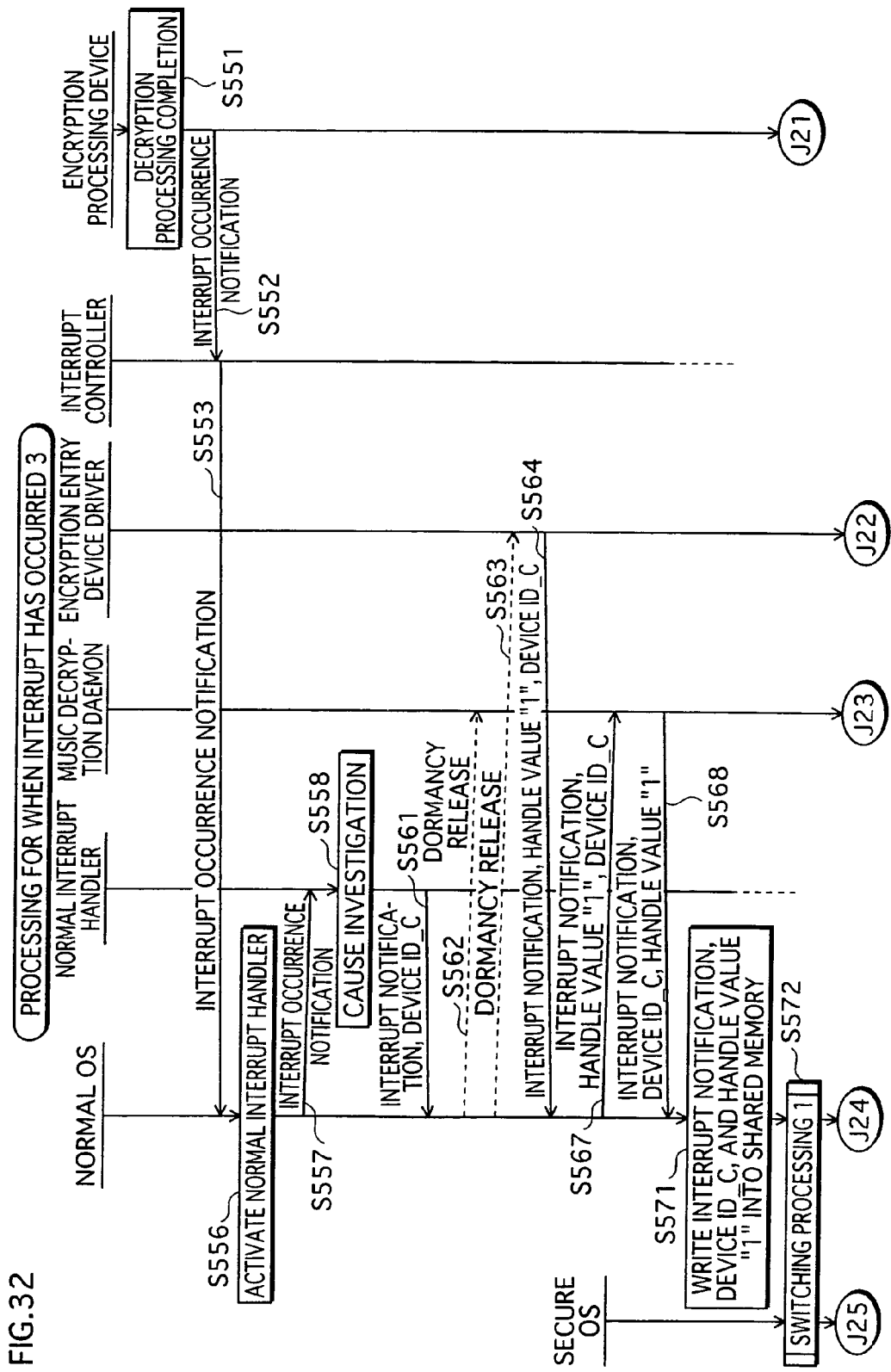
FIG. 32 is a flow chart that shows the processing performed when an interrupt by the encryption processing device 117 occurs during the execution of the normal OS 151 and shows in detail Step S337 in FIG. 27.
Figure 33:
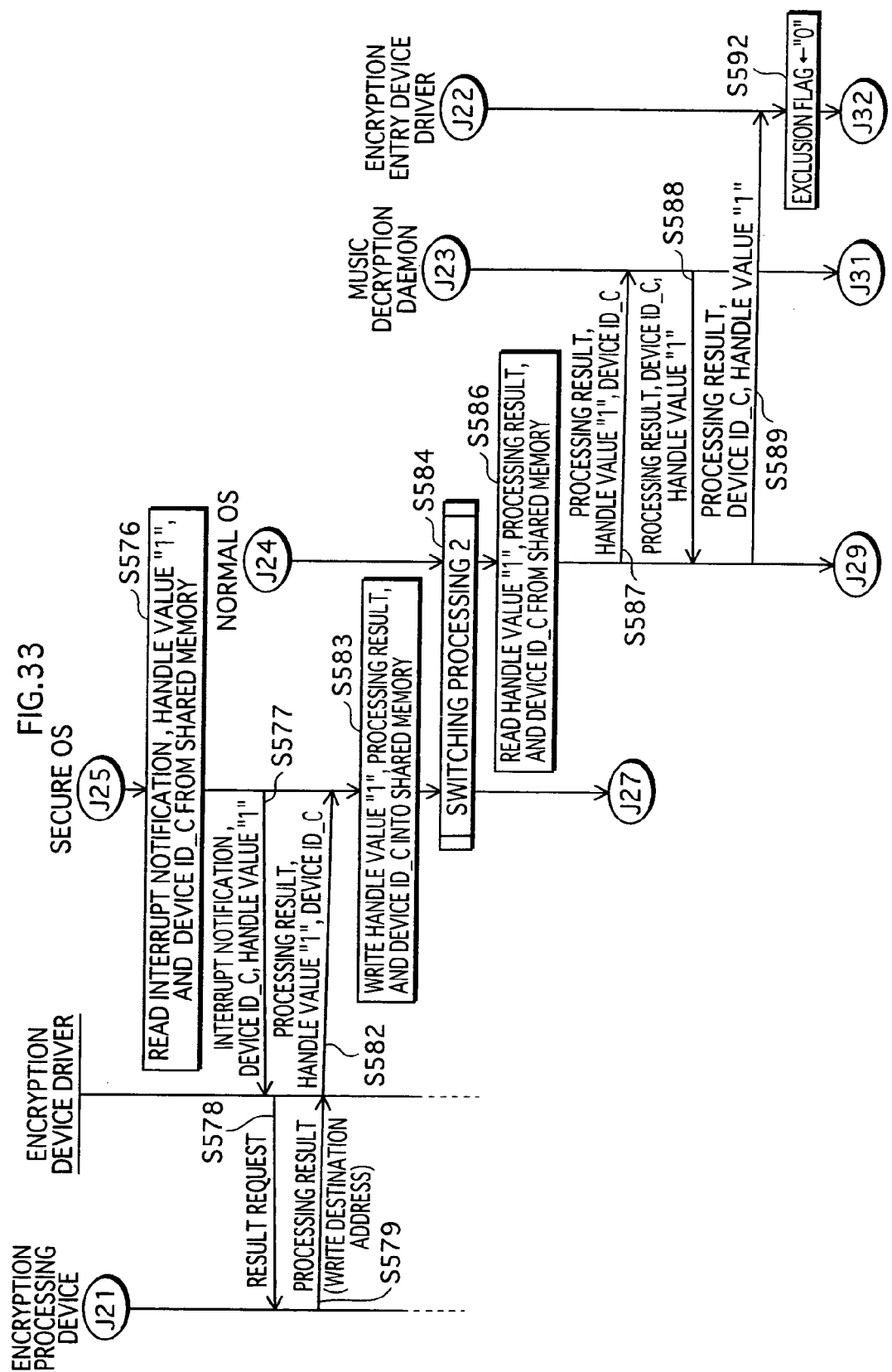
FIG. 33 is a flow chart that shows the processing performed when an interrupt by the encryption processing device 117 occurs during the execution of the normal OS 151 and is continued from FIG. 32.
Figure 34:
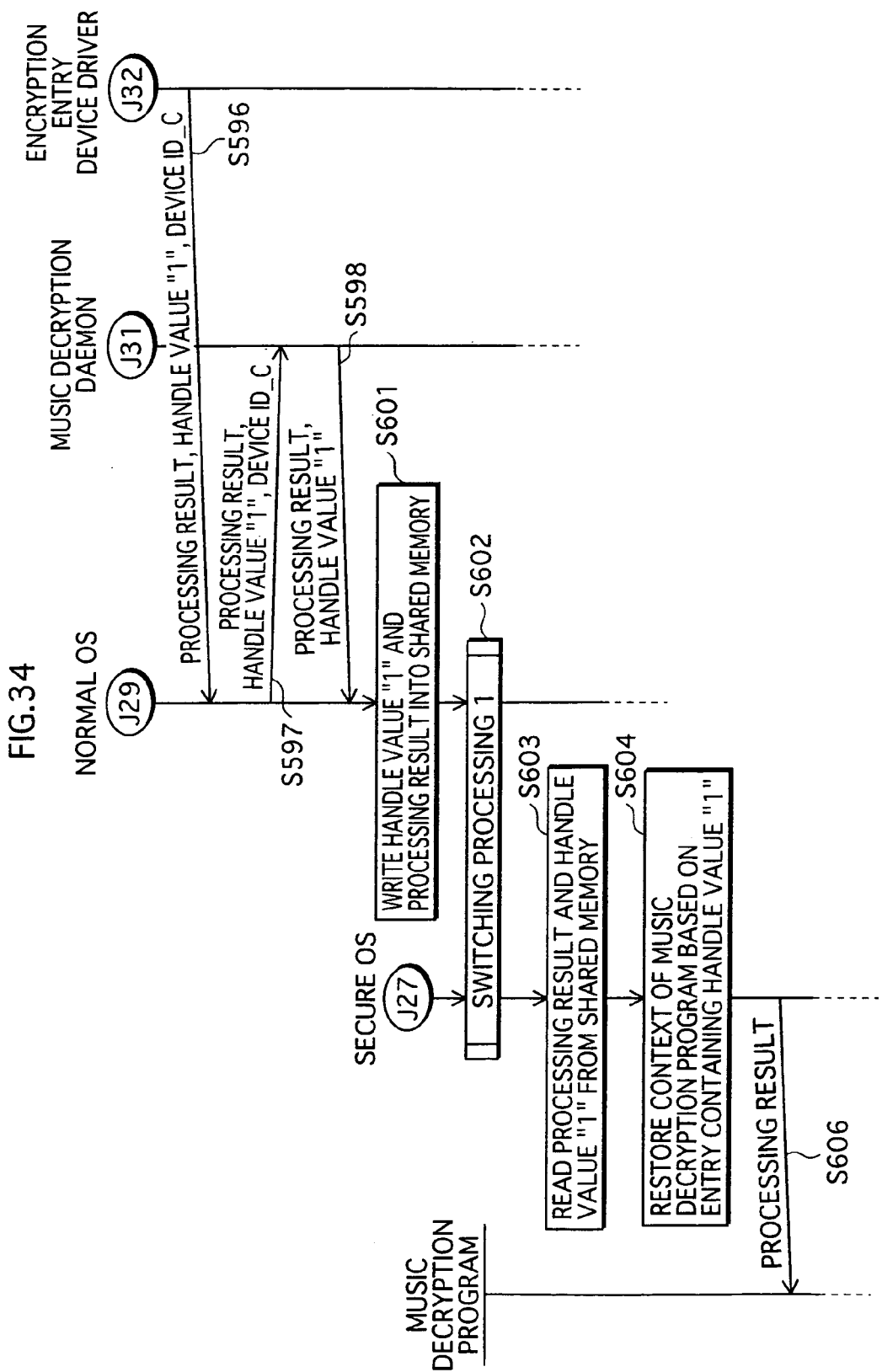
FIG. 34 is a flow chart that shows the processing performed when an interrupt by the encryption processing device 117 occurs during the execution of the normal OS 151 and is continued from FIG. 33.
Figure 41:
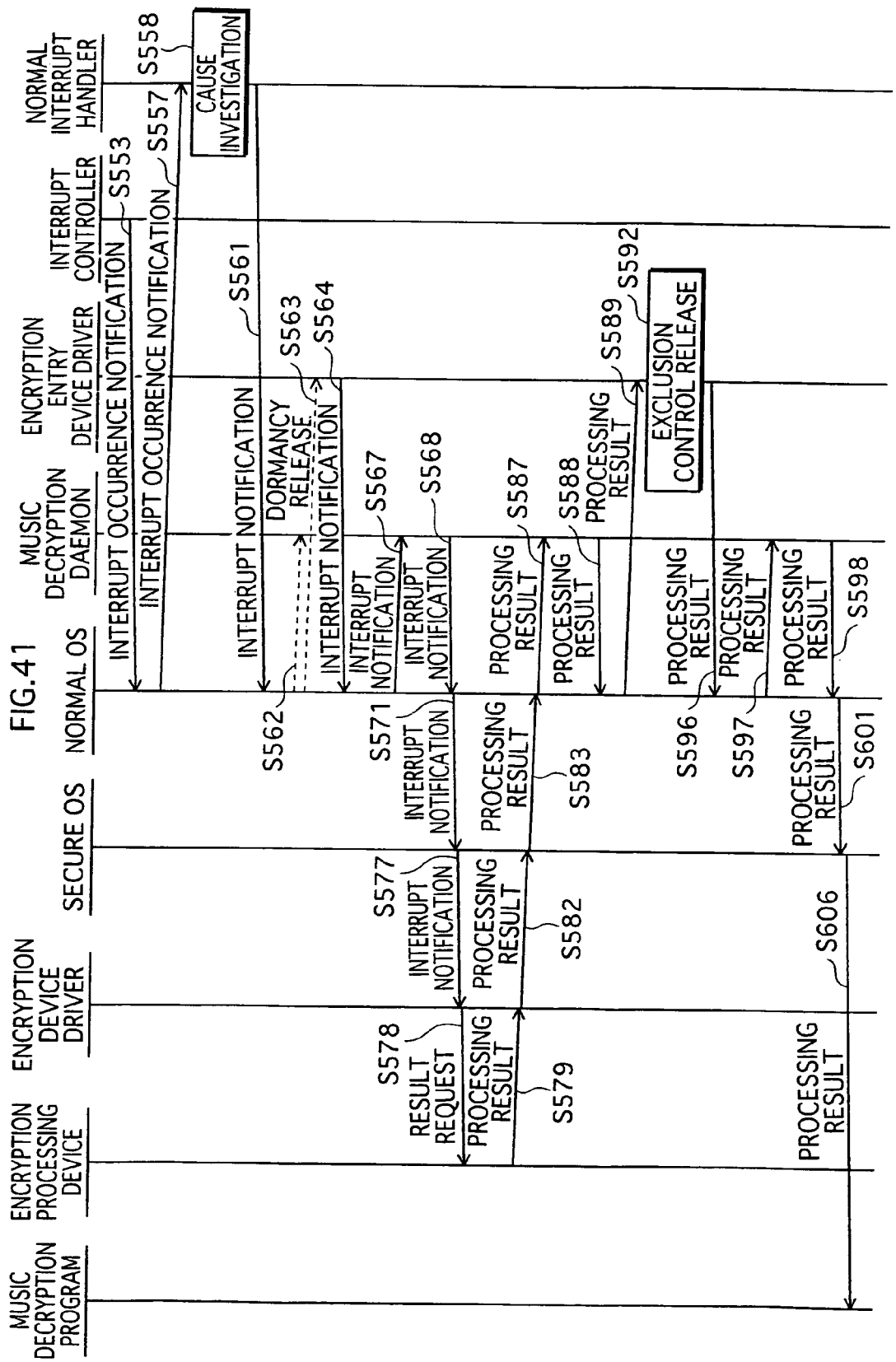
FIG. 41 shows a command transfer between programs during an operation of the mobile phone 100 and is continued from FIG. 40.

The following describes the processing for when an interrupt has occurred 3, with reference to the flow chart in FIGS. 32 to 34. This flow chart shows the details of Step S337 in FIG. 27. The processing for when an interrupt has occurred 3 corresponds to the sequence in Step S552 in FIG. 40 to Step S606 in FIG. 41.

When the decryption of the encrypted music data is finished, the encryption processing device 117 makes an interrupt occur (Step S552).

The interrupt controller 107 detects the occurrence of the interrupt and outputs an interrupt occurrence notification to the normal OS 151 (Step S553).

The normal OS 151 receives the interrupt occurrence notification from the interrupt controller 107, activates the normal interrupt handler 161 (Step S556) and outputs an interrupt occurrence notification to the normal interrupt handler 161 (Step S557).

The normal interrupt handler 161 receives the interrupt occurrence notification and investigates the cause of the interrupt occurrence (Step S558). The normal interrupt handler 161 detects that the encryption processing device 117 has made the interrupt occur and outputs the device ID_C and an interrupt notification to the normal OS 151 (Step S561).

The normal OS 151 receives the interrupt notification and the device ID_C from the normal interrupt handler 161. The normal OS 151 releases the dormancy of the encryption entry device driver 159 that is in correspondence with the received device ID_C and the music decryption daemon 156 that has undergone the dormancy processing together with the encryption entry device driver 159 (Step S562, Step S563), and assigns the CPU 102 to the encryption entry device driver 159.

The encryption entry device driver 159 is released from the dormancy and outputs the interrupt notification, the handle value "1", and the device ID_C indicating the encryption entry device driver 159 itself, to the normal OS 151 (Step S564).

The normal OS 151 receives the interrupt notification, the handle value "1", and the device ID_C, and outputs the interrupt notification, the handle value "1", and the device ID_C to the music decryption daemon 156 that is in correspondence with the received handle value "1" (Step S567).

The music decryption daemon 156 receives the device ID_C and the interrupt notification from the encryption entry device driver 159 via the normal OS 151. Subsequently, the music decryption daemon 156 outputs the received interrupt notification, the device ID_C, and the handle value "1" that is in correspondence with the music decryption daemon 156 itself, to the normal OS 151 (Step S568).

The normal OS 151 receives the interrupt notification, the device ID_C, and the handle value "1" from the music decryption daemon 156 and writes the received interrupt notification, device ID_C, and handle value "1" to the shared memory 112 (Step S571).

Subsequently, the normal OS 151 and the secure OS 171 perform the switching processing 1 (Step S572).

When the switching processing is finished, the secure OS 171 reads the interrupt notification, device ID_C, and handle value "1" from the shared memory 112 (Step S576). The secure OS 171 activates the encryption device driver 179 based on the read device ID_C and outputs the read interrupt notification, device ID_C, and handle value "1" (Step S577).

The encryption device driver 179 receives interrupt notification, device ID_C, and handle value "1" and requests a processing result from the encryption processing device 117 (Step S578) and obtains the writing destination address within the buffer 123 for the music data as a processing result (Step S579).

The encryption device driver 179 outputs the obtained processing result, the received handle value "1" and the device ID_C indicating the encryption device driver 179 itself, to the secure OS 171 (Step S582).

The secure OS 171 receives the processing result, handle value "1", and device ID_C from the encryption device driver 179 and writes the received processing result, handle value "1", and device ID_C to the shared memory 112 (Step S583).

Subsequently, the secure OS 171 and the normal OS 151 perform the switching processing 2 (Step S584).

When the switching processing 2 is finished, the normal OS 151 reads the handle value "1", processing result, and device ID_C from the shared memory 112 (Step S586). The normal OS 151 activates the music decryption daemon 156 based on the read handle value "1" and outputs the read processing result, handle value "1" and device ID_C to the music decryption daemon 156 (Step S587).

The music decryption daemon 156 receives the processing result, handle value "1", and device ID_C from the normal OS 151 and outputs a system call containing the received processing result, the device ID_C, and the handle value "1" indicating the music decryption daemon 156 itself to the normal OS 151 (Step S588).

The normal OS 151 outputs the received processing result, device ID_C, and handle value "1" to the encryption entry device driver 159 that is in correspondence with the device ID_C (Step S589).

The encryption entry device driver 159 receives the processing result, device ID_C, and handle value "1" from the music decryption daemon 156 via the normal OS 151 and changes the exclusion flag to "0" (Step S592). Subsequently, the encryption entry device driver 159 outputs the received processing result, handle value "1" and device ID_C to the music decryption daemon 156 (Step S597) by way of a response notification to the normal OS 151 (Step S596).

The music decryption daemon 156 receives the processing result, handle value "1", and device ID_C from the music decryption daemon 156 via the secure OS 171. Subsequently, the music decryption daemon 156 outputs the received processing result and handle value "1" to the normal OS 151 (Step S598).

The normal OS 151 receives the processing result and handle value "1" from the music decryption daemon 156 and writes the received processing result and handle value "1" to the shared memory 112 (Step S601).

Subsequently, the normal OS 151 and the secure OS 151 perform the switching processing 1 (Step S602).

When the switching processing 1 is finished, the secure OS 171 reads the handle value "1" and processing result from the shared memory 112 (Step S603). The secure OS 171 restores the context of the music decryption program 176 based on the entry 187 that contains the handle value "1" in the secure application management table 186 (Step S604), and outputs the read processing result to the music decryption program 176 (Step S606).

Figure 29:
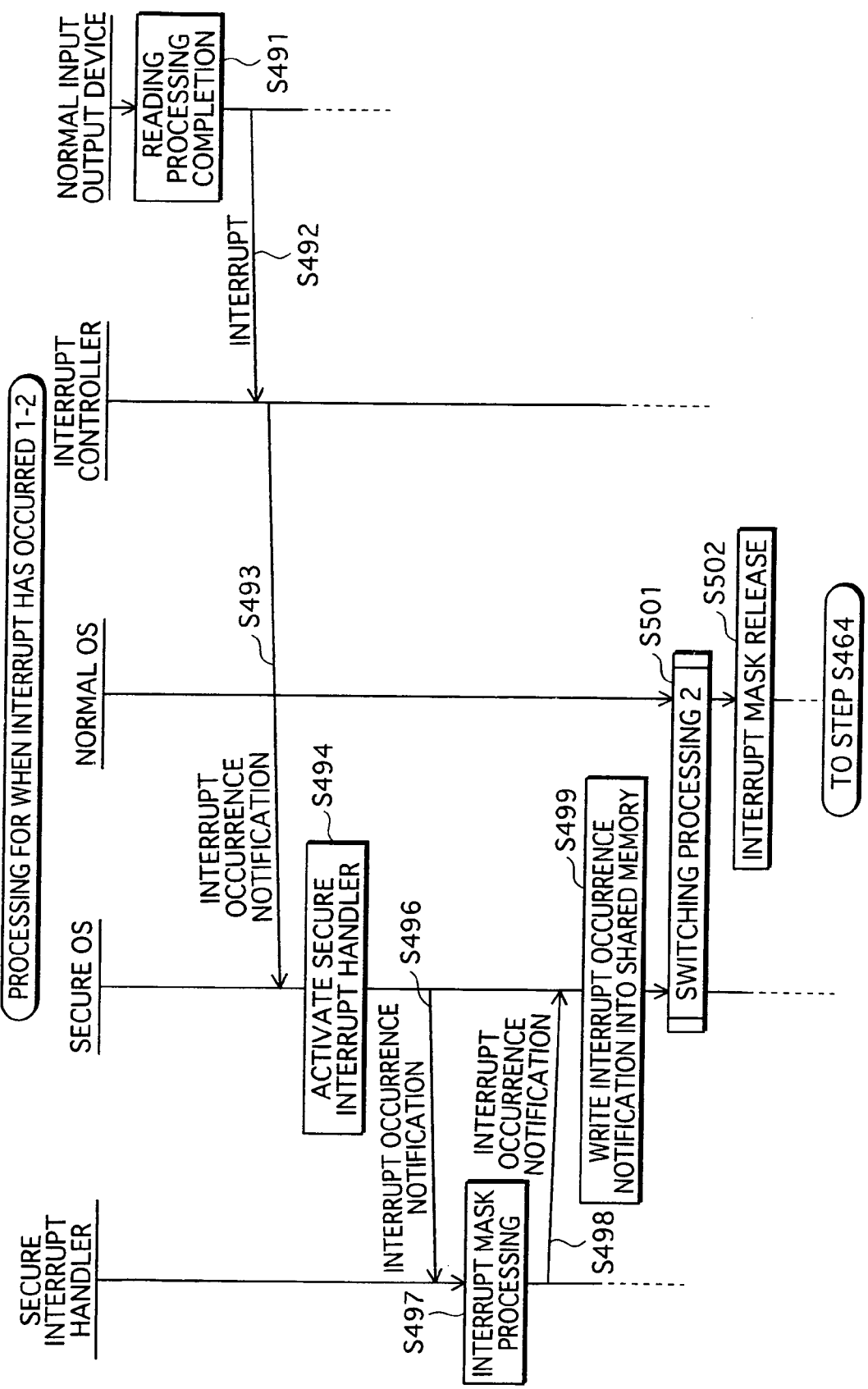
FIG. 29 is a flow chart that shows the processing performed when an interrupt by the normal input output device 132 occurs during the execution of the secure OS 171.

So far, in the decryption with reference to FIGS. 32 to 34, explanation is provided for the operation to be performed in the case where an interrupt has occurred during execution of the normal OS 151 or a program that is in the normal memory 111 and is managed by the normal OS 151. The operation to be performed in the case where an interrupt has occurred during execution of the secure OS 171 or a program managed by the secure OS 171 is almost the same as the aforementioned "Processing for when an interrupt has occurred 1-2". The difference is that the normal input output device in FIG. 29 is replaced with the encryption processing device. The processing in and after Step S502 is continued to Step S553 in FIG. 32.

(7) Deletion of the Music Decryption Program

Figure 35:
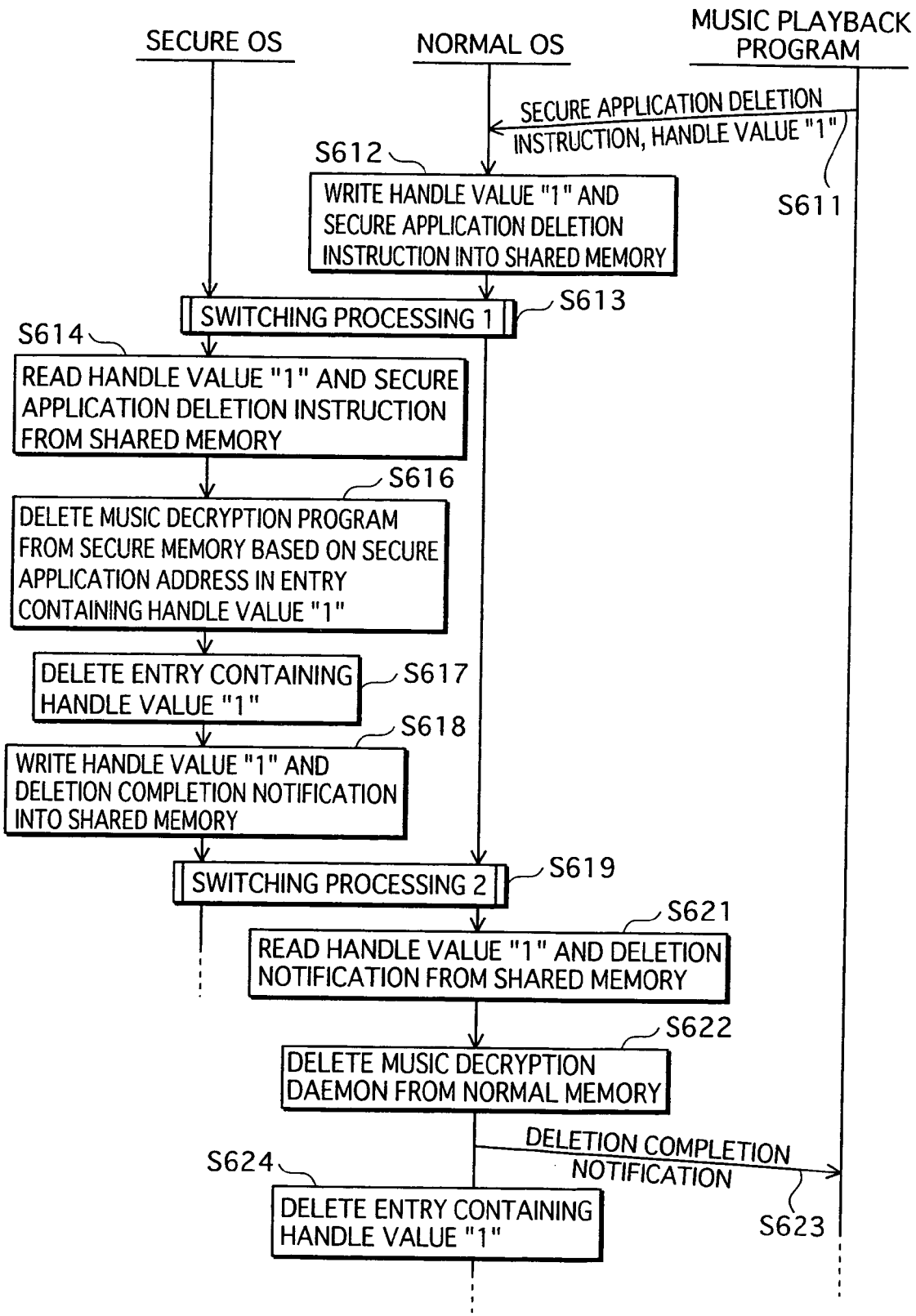
FIG. 35 is a flow chart that shows the deletion processing of the music decryption program 176.
Figure 36:
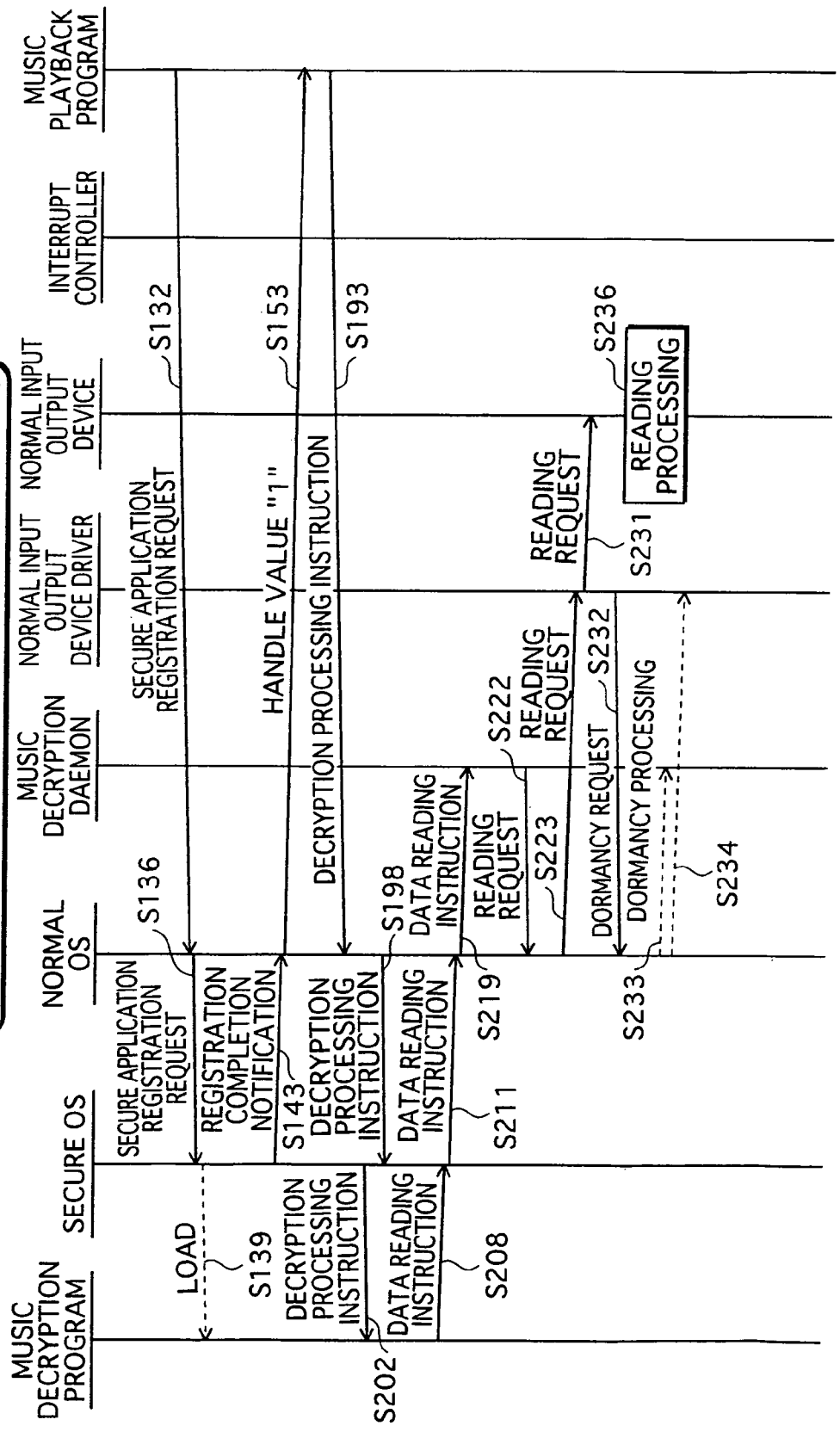
FIG. 36 shows a command transfer between programs during an operation of the mobile phone 100.
Figure 37:
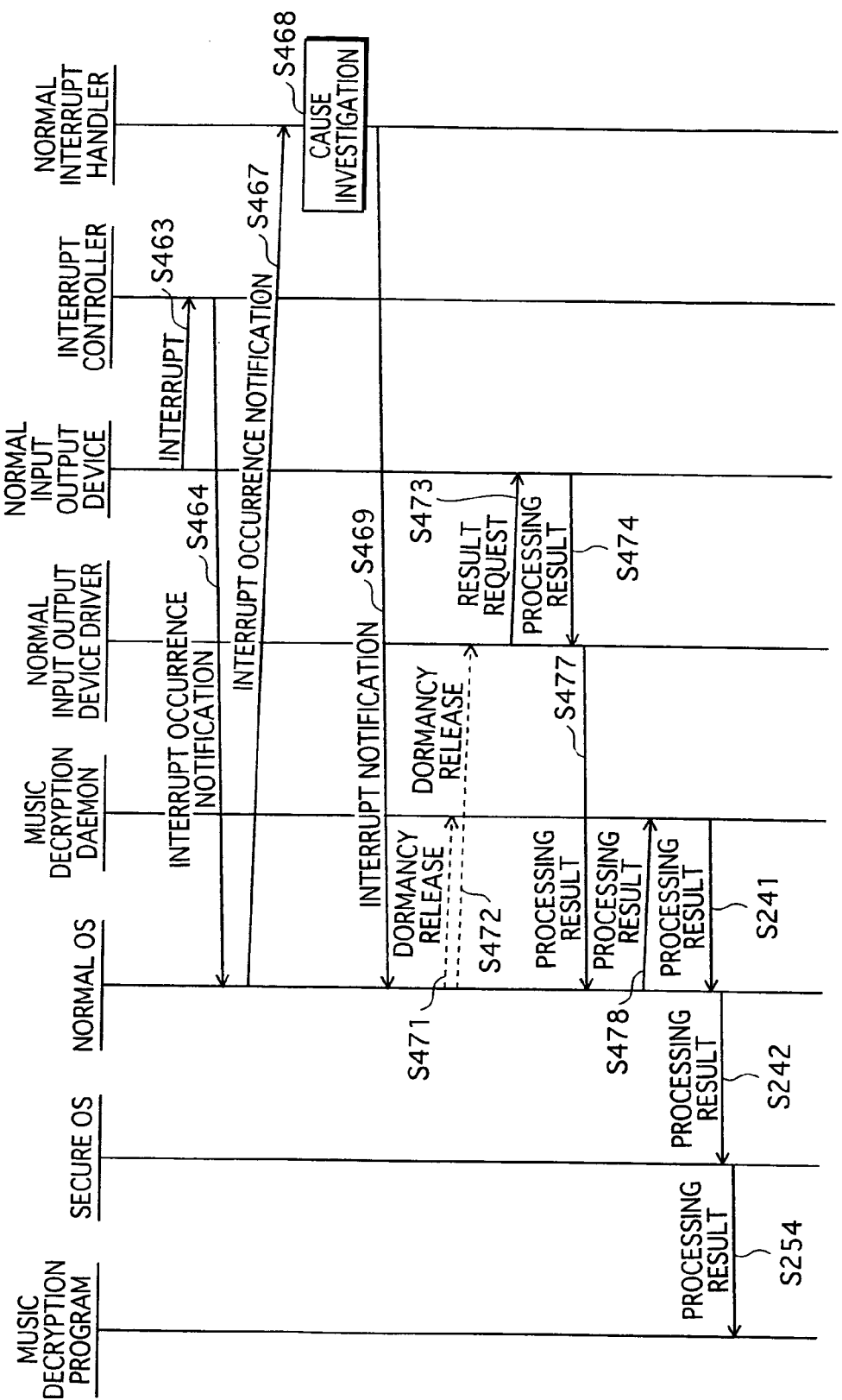
FIG. 37 shows a command transfer between programs during an operation of the mobile phone 100.
Figure 38:
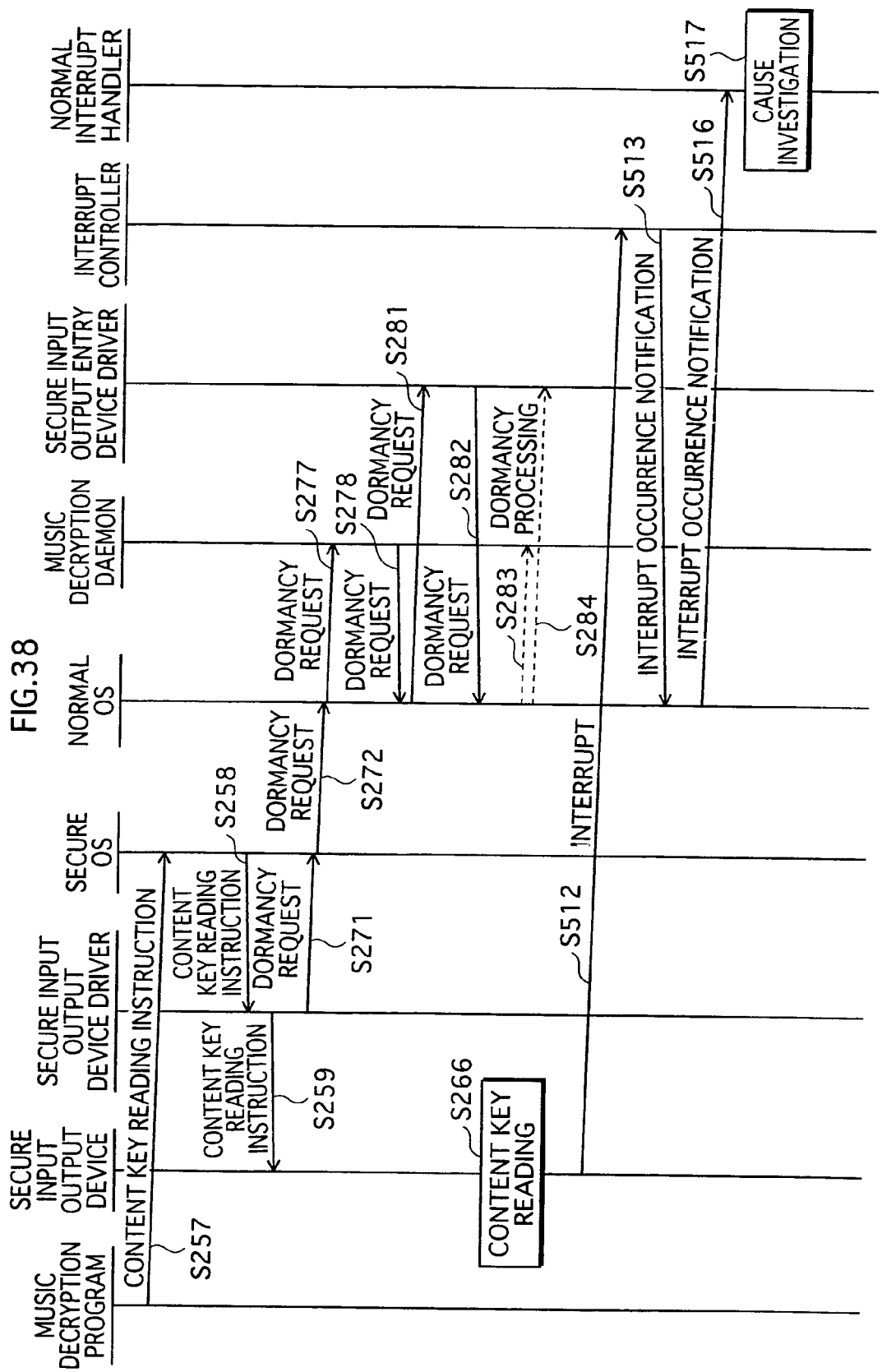
FIG. 38 shows a command transfer between programs during an operation of the mobile phone 100 and is continued from FIG. 37.
Figure 39:
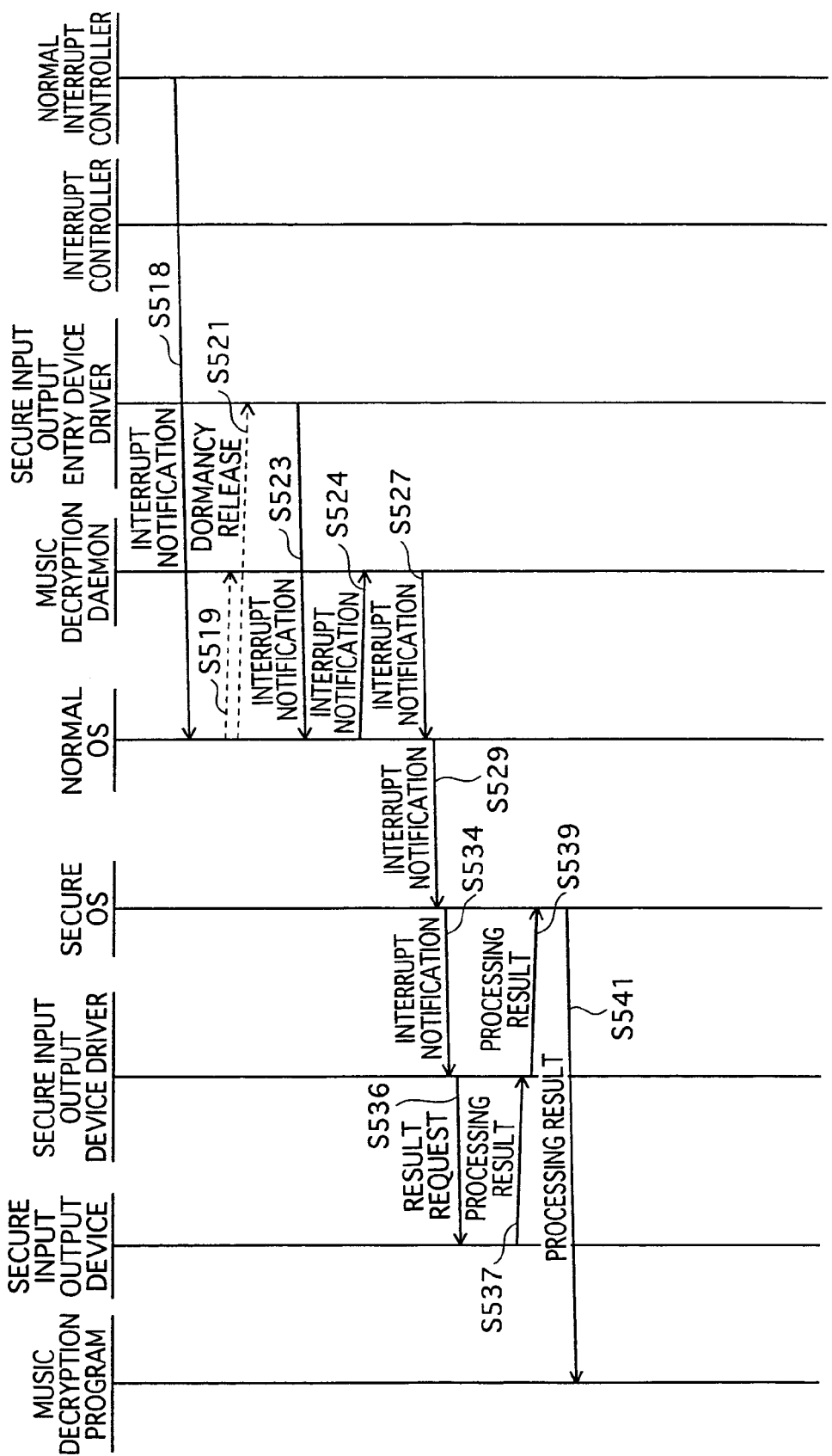
FIG. 39 shows a command transfer between programs during an operation of the mobile phone 100 and is continued from FIG. 38.
Figure 40:
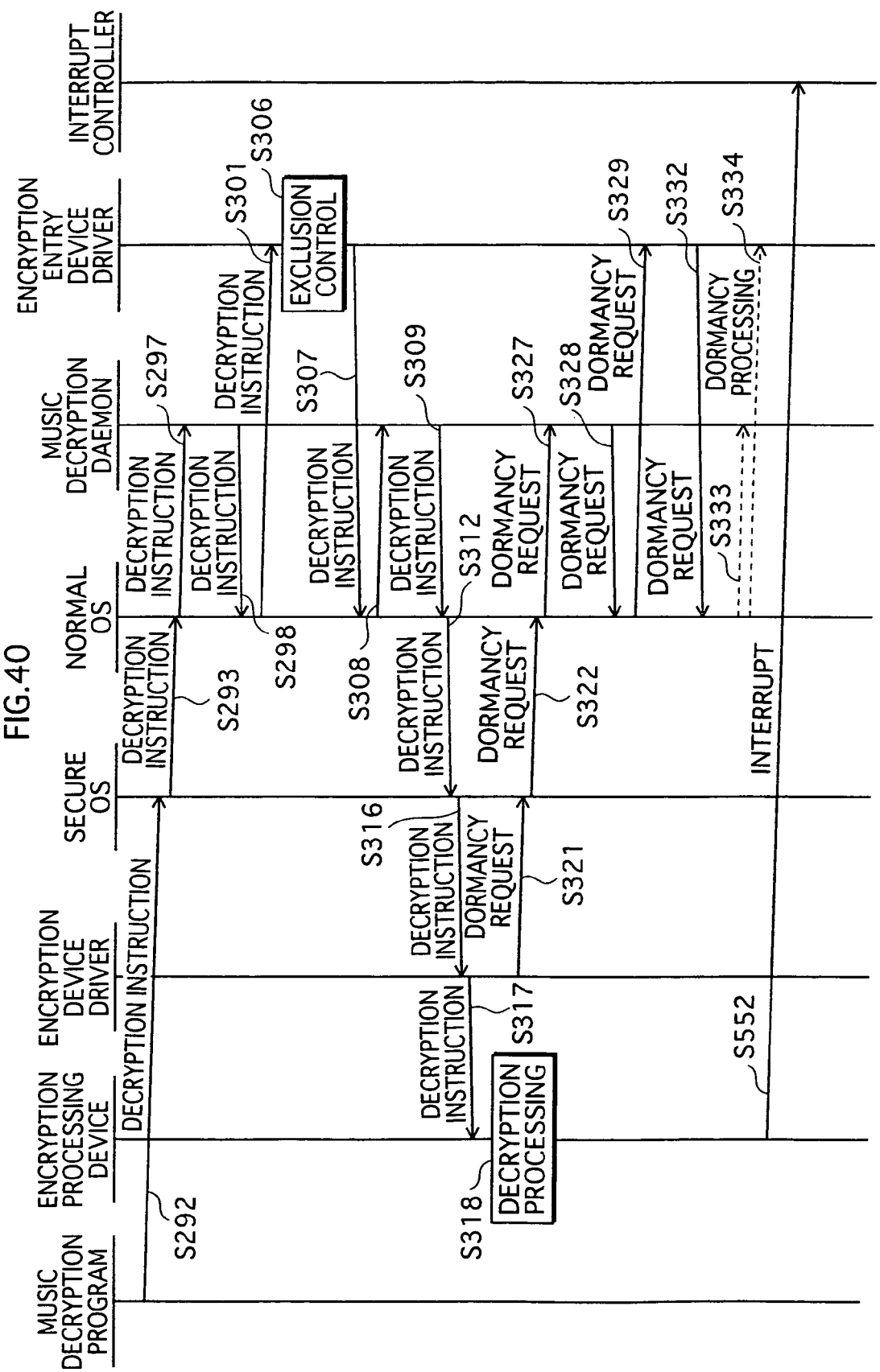
FIG. 40 shows a command transfer between programs during an operation of the mobile phone 100 and is continued from FIG. 39.

The following describes the deletion processing of the music decryption program, with reference to the flow chart in FIG. 35. This flow chart shows the details of Step S109 in FIG. 15. The music decryption program deletion processing corresponds to the sequence in Step S611 to S618 in FIG. 42.

The music decryption program 176 outputs a secure application deletion instruction and a handle value "1" to the normal OS 151 (Step S611).

The normal OS 151 receives the handle value "1" and secure application deletion instruction from the music decryption program 176 and writes the received handle value "1" and secure application deletion instruction to the shared memory 112 (Step S612).

Subsequently, the normal OS 151 and the secure OS 171 perform the switching processing 1 (Step S613).

When the switching processing 1 is finished, the secure OS 171 reads the secure application deletion instruction and handle value "1" from the shared memory 112 (Step S614). The secure OS 171 deletes the music decryption program 176 from the secure memory 113 based on the secure application address in the entry that contains the handle value "1" within the secure application management table 186 (Step S616) and deletes the entry 187 containing the handle value "1" from the secure application management table 186 (Step S617).

Subsequently, the secure OS 171 writes the handle value "1" and a deletion completion notification to the shared memory 112 (Step S618).

The secure OS 171 and the normal OS 151 then perform the switching processing 2 (Step S619).

When the switching processing 2 is finished, the normal OS 151 reads the deletion processing completion notification and the handle value "1" from the shared memory 112 (Step S621), and deletes the music decryption daemon 156 from the normal memory 111 based on the handle value "1" and the application management table 166 (Step S622). Subsequently, the normal OS 151 outputs a deletion completion notification to the music playback program 153 (Step S623) and deletes the entry 167 containing the handle value "1" from the application management table 166 (Step S624).

1.3 Summary and Effects

As explained so far, in the mobile phone 100 of the present invention, the music playback program 153 to be loaded into the normal memory 111 and executed requests the music decryption program 176 which is loaded into the secure memory 113 and executed to perform a processing that requires protection, to be more specific, the processing of decrypting encrypted music data.

The music decryption program 176 operates in a pair with the music decryption daemon 156 within the normal memory 111. Out of a sequence of processing related to the decryption of the encrypted music data, the music decryption program 176 is in charge of some processing that requires protection whereas the music decryption daemon 156 is in charge of other processing that does not require protection.

Since the sequence of processing is divided between the two, the program size of the music decryption program 176 itself is reduced, and also the data and variables held by the music decryption program 176 are also reduced. Further, the music decryption daemon 156 uses a function stored in a library within the normal memory 111 upon a request from the music decryption program 176. Consequently, there is no need to provide a library within the secure memory.

Thus, with regard to the sequence of decryption processing performed by the music decryption program 176 and the music decryption daemon 156, the capacity of the secure memory 113 that needs to be reserved is reduced, and it is possible to reduce the load on the protection mechanism which protects the secure memory 113.

As for the processing related to controlling the encryption processing device 117 which is managed by the secure OS 117 and needs to be protected, some of the processings that do not require protection, namely exclusion control, and notifications of dormancy and interrupt, are performed by the encryption entry device driver 159 which is loaded into the normal memory 111 and executed.

As the operation is observed along the lapse of time, the normal OS 151 causes the encryption entry device driver 159 to make a transition into an execution state by way of a system call from the music decryption daemon 156. The encryption entry device driver 159 performs exclusion control and calls the music decryption daemon 156. The music decryption daemon 156 calls the encryption device driver 179 via the normal OS 151 and the secure OS 171. The secure OS 171 causes the encryption device driver 179 to make a transition into an execution state. After instructing the encryption processing device 117 to perform decryption processing, the encryption device driver 179 outputs a dormancy request. The encryption entry device driver 159 receives the dormancy request via the secure OS 171, the normal OS 151, and the music decryption daemon 156 and requests the normal OS 151 to perform the dormancy processing. The normal OS 151 causes the encryption entry device driver 159 to make a transition into a dormancy state.

Subsequently, the processing by the encryption processing device 117 is finished and an interrupt occurs. The normal OS 151 releases the dormancy of the music decryption daemon 156 and causes the music decryption daemon 156 to make a transition into an execution state. The encryption entry device driver 159 outputs an interrupt notification, and the music decryption daemon 156 outputs an interrupt notification to the encryption device driver 179 via the normal OS 151 and the secure OS 171. The normal OS 151 assigns the CPU 102 to the encryption device driver 179 and puts the encryption device driver 179 into an execution state.

As explained above, the encryption device driver 179 and the encryption entry device driver 159 make the state transitions in correspondence with each other. Accordingly, the normal OS 151 is able to manage the state of use of the encryption processing device 117 managed by the secure OS 171 via the encryption entry device driver 159.

As for the secure input output device 133, which is a device managed by the secure OS 171, the normal OS 151 is able to, in the similar manner, monitor and control the operation of the secure input output device 133 by way of controlling the secure input output entry device driver 158.

1.4 Other Operations of the Mobile Phone 100

The following describes an initial operation and construction of a virtual memory space performed by the mobile phone 100.

(1) Boot Program

Figure 43:
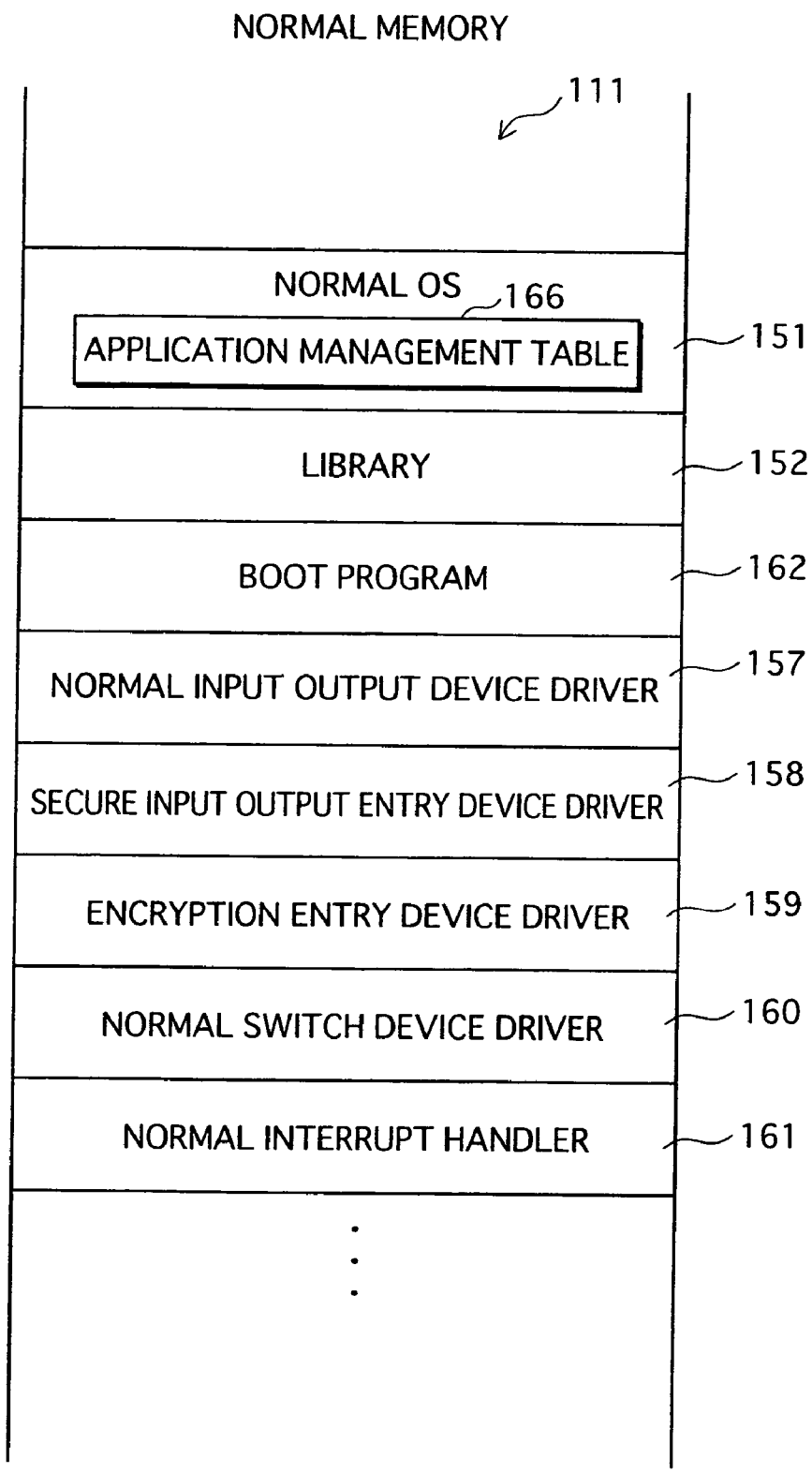
FIG. 43 shows an example of information stored in the normal memory 111.

FIG. 43 shows an example of data stored in the normal memory 111. The drawing shows the state of the inside of the normal memory 111 immediately after the mobile phone 100 is activated.

The normal OS 151, the library 152, the normal input output device driver 157, the secure input output entry device driver 158, the encryption entry device driver 159, the normal switch device driver 160, and the normal interrupt handler 161 are the same as described earlier.

The boot program 162 is pre-stored in a ROM that constitutes the normal memory 111. Although not specifically shown in the drawing, the boot program 162 is a program that is read and executed by an activation unit included in the mobile phone 100.

The activation unit reads the boot program 162 from the normal memory 111 immediately after the power source of the mobile phone 100 is tuned on and operates according to the read boot program 162. The following describes the boot program in terms of the operation of the activation unit in accordance with the boot program 162.

At first, the boot program 162 clears the register of the CPU 102 and the MMU 103 and outputs an initialization request to the switch control unit 106. The boot program 162 receives an initialization completion notification which notifies that the initialization of the programs within the secure memory 113 is completed from the switch control 106 and then loads the normal OS 151, the normal switch device driver 160, and the like into the normal memory 111 and initializes them.

(2) The Initialization Operation of the Mobile Phone 100

Figure 44:
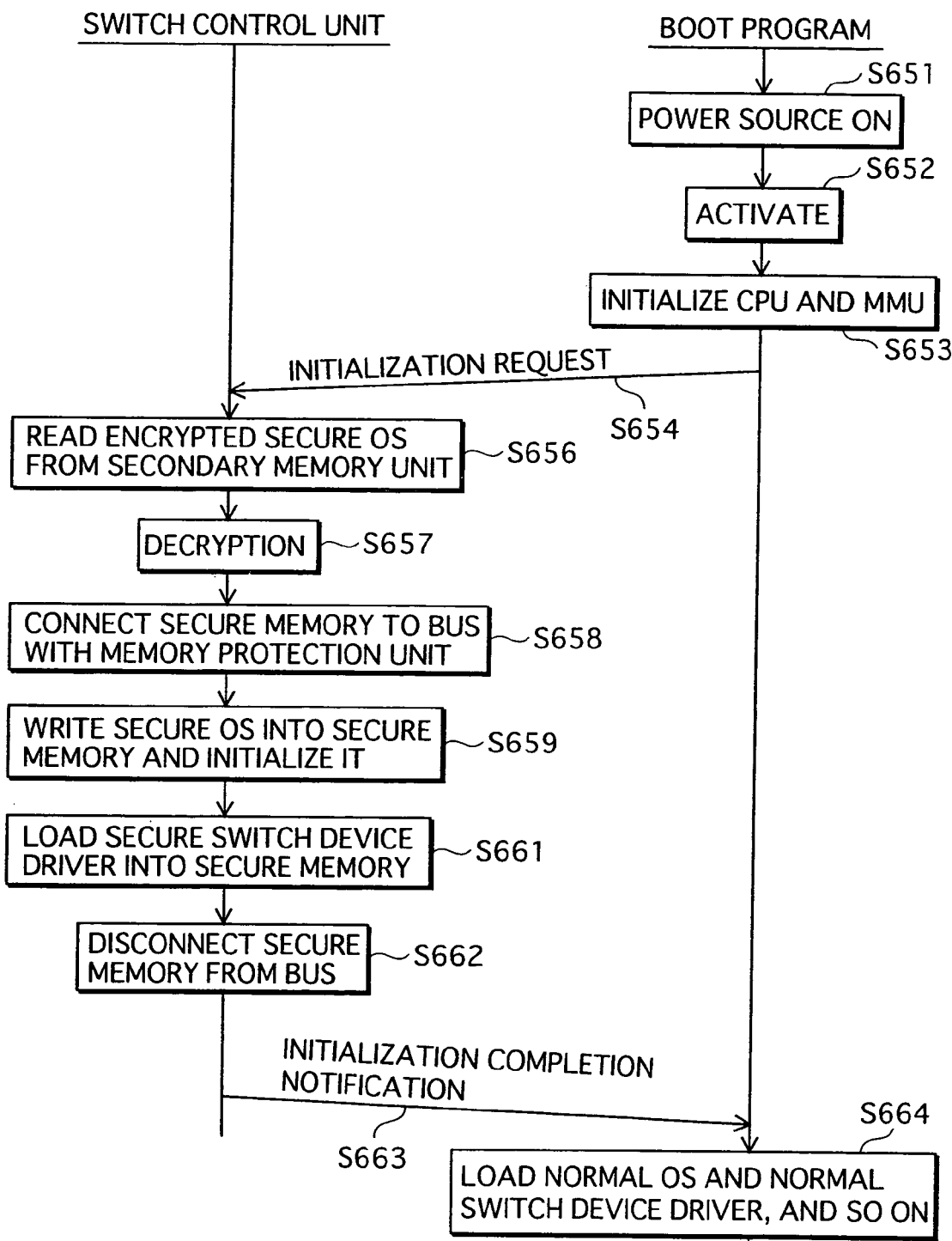
FIG. 44 shows a flow chart that shows the operation performed when the mobile phone 100 is activated.

The mobile phone 100 is initialized by the switch control unit 106 and the boot program when being activated. The following describes the operation of the mobile phone 100 when being activated, with reference to the flow chart in FIG. 44.

When the power source of the mobile phone 100 is turned on and the power supply is started (Step S651), the activation unit activates the boot program 162 (Step S652). The boot program 162 firstly performs initialization by clearing the registers of the CPU 102 and the MMU 103 (Step S653). Subsequently, the activation unit outputs an initialization request to the switch control unit 106 (Step S654).

The switch control unit 106 receives the initialization request and reads an encrypted secure OS from the secondary memory unit 104 (Step S656) and decrypts the read encrypted secure OS so as to generate a secure OS (Step S657). Subsequently, the switch control unit 106 connects the bus 130 to the secure memory 113 via the memory protection unit 114 (Step S658) and writes the generated secure OS to the secure memory 113 and initializes the secure OS (Step S659). Then, the switch control unit 106 reads a secure switch device driver from the secondary memory unit 104 and loads the read secure switch device driver into the secure memory 113 (Step S661).

Then, the switch control unit 106 disconnects the secure memory 113 from the bus 130 via the memory protection unit 114 (Step S662) and outputs an initialization completion notification to the boot program 162 (Step S663).

The boot program 162 receives the initialization completion notification from the switch control unit 106 and then loads programs such as the normal OS 151 and the normal switch device driver 160 into the normal memory and initializes these programs (Step S664).

It should be noted that in the description above, the encrypted secure OS and the secure switch device driver are stored in the secondary memory unit 104; however, it is acceptable to have an arrangement wherein the encrypted secure OS and the secure switch device driver are stored in an external recording medium.

(3) The Initialization Operation by the Normal OS 151 and the Secure OS 171

The normal input output device driver 157, the secure input output entry device driver 158, and the encryption entry device driver 159 are programs being resident in the normal memory 111 under the management of the normal OS 151.

Further, the secure input output device driver 178 and the encryption device driver 179 are programs being resident in the secure memory 113 under the management of the secure OS 171.

The boot program 162 loads the normal OS 151, the normal switch device driver 160, and the like into the normal memory 111, and after initializing these loaded programs, activates the normal OS 151.

When being activated, the normal OS 151 firstly searches the programs loaded in the normal memory 111 and judges whether or not the normal input output device driver 157, the secure input output entry device driver 158, and the encryption entry device driver 159 have been laded. If they have not been loaded, the normal OS 151 reads and loads them from the secondary memory unit 104.

When the normal OS 151 loads the secure input output entry device driver 158 and the encryption entry device driver 159, the secure OS 171 loads the secure input output device driver 178 and the encryption device driver 179 into the secure memory 113 as well.

Since this operation performed by the normal OS 151 and the secure OS 171 is similar to the registration processing of the music decryption program, which is described earlier, only brief explanation is provided here. It should be noted that the secondary memory unit 104 pre-stores therein each device driver and an encrypted entry device driver that is obtained by encrypting an entry device driver.

When it is judged that the secure input output entry device driver has not been loaded, the normal OS 151 reads the secure input output entry device driver from the secondary memory unit 104 and writes the read secure input output entry device driver to the normal memory 111. The normal OS 151 stores therein the write-destination address and the secure input output entry device driver 158 in correspondence with each other. Subsequently, the normal OS 151 writes a device driver registration request to instruct loading of the device driver and the device ID_B indicating the secure input output device driver, to the shared memory 112. The normal OS 151 then outputs a switching instruction to the normal switch device driver 160.

When the switching processing is finished, the secure OS 171 returns to the CPU 102. The normal OS 171 reads the device driver registration request and the device ID_B from the shared memory 112. The secure OS 171 reads the encrypted secure input output entry device driver that is read in correspondence with the device ID_B, decrypts the read encrypted entry device driver with the encryption and decryption program 174 so as to generate a secure input output entry device driver, and writes the generated secure input output entry device driver to the secure memory 113. The secure OS 171 stores therein the write-destination address and the device ID_B in correspondence with each other.

Subsequently, the normal OS 171 writes a device driver registration completion notification to the shared memory 112 and outputs a switching instruction to the secure switch device driver 180.

When the switching processing is finished, the normal OS 151 is restored into the CPU 102 and reads the device driver registration completion notification from the shared memory 112.

Subsequently, the encryption entry device driver is loaded in the same manner.

(4) Virtual Memory Space Constructed by the MMU Control Program 184

Figure 45:
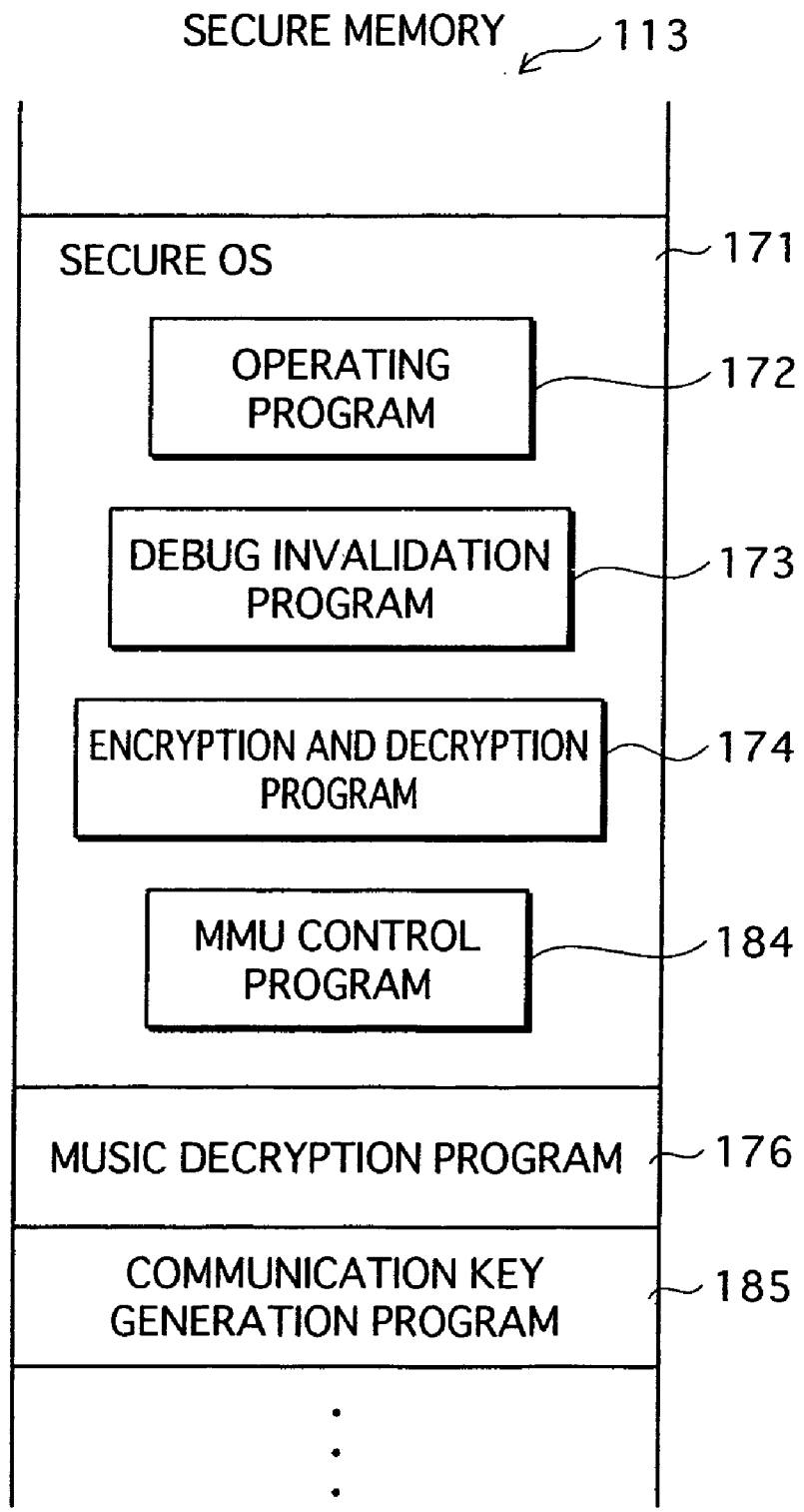
FIG. 45 shows an example of information stored in the secure memory 113.

Although it has not been mentioned so far, the secure OS 171 includes an MMU control program 184 as shown in FIG. 45. The MMU control program 184 is a program executed by the MMU 103 and constructs a virtual memory space by exchanging the physical and logical addresses of the secure memory 113, the shared memory 112, and the secondary memory unit 104.

Figure 46:
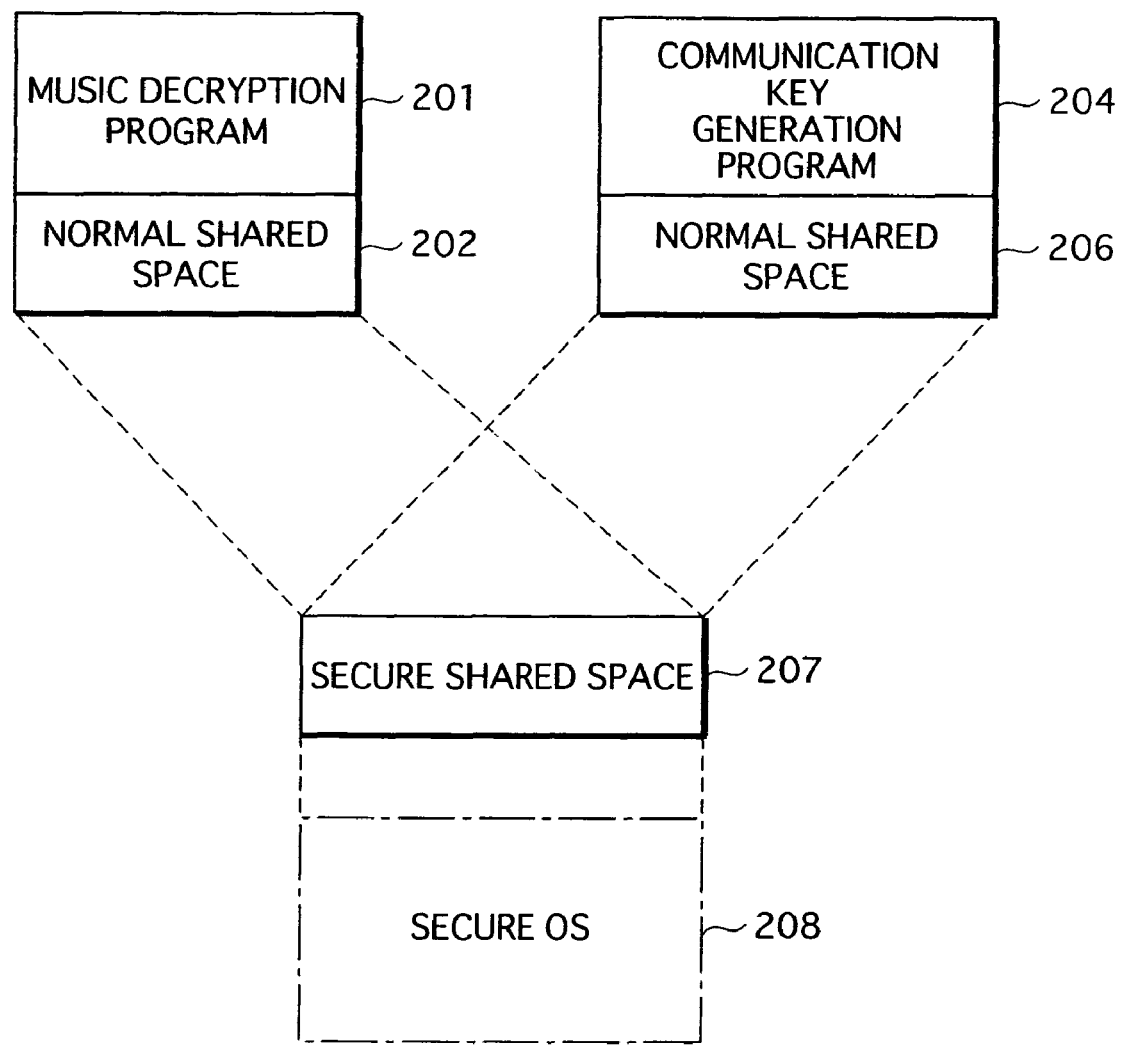
FIG. 46 shows an example of a logical memory space formed by an MMU control program 184.

FIG. 46 shows an example of a virtual memory space realized by the MMU control program 184. As shown in FIG. 45, it is assumed that the music decryption program 176 and a communication key generation program 185 have been loaded into the secure memory 113. The music decryption program 176 and the communication key generation program 185 are secure applications.

The music decryption program 176 and the communication key generation program 185 are loaded into a virtual space 201 and a virtual space 204, respectively. A normal shared space 202 and a normal shared space 206 are assigned to these programs respectively. The normal shared space 202 and the normal shared space 206 are virtual spaces to be shared between the respective program and some programs within the normal memory 111.

The music decryption program 176 is not able to access the virtual space 204 and the normal shared space 206. The communication key generation program 185 is not able to access the virtual space 201 and the normal shared space 202.

Both of the music decryption program 176 and the communication key generation program 185 are able to access the secure shared space 207; however, the secure shared space 207 is a virtual space which none of the programs operating under the management of the normal OS 151 is able to access.

The secure OS 171 has been loaded into the virtual space 208. The secure OS 171 is able to access the virtual spaces 201 and 204; however, the music decryption program 176 and the communication key generation program 185 are not able to access the virtual space 208.

In such a manner, the MMU control program 184 assigns an individual virtual space to each application so that each of the application is not able to access the virtual spaces assigned to other applications.

The MMU control program 184 realizes the aforementioned virtual memory spaces in the secure memory 113, the shared memory 112, and the secondary memory unit 104. It is acceptable to have an arrangement wherein the MMU control program 184 includes an encryption processing program so that data is encrypted when the data stored in the secure memory 113 is paged out into the second memory unit 104 and the data is decrypted when the data is paged in from the secondary memory unit 104 into the secure memory 113.

Further, it is acceptable to have an arrangement wherein the music decryption program 176 and the communication key generation program 185 are able to mutually access the normal shared space of one another.

Figure 47:
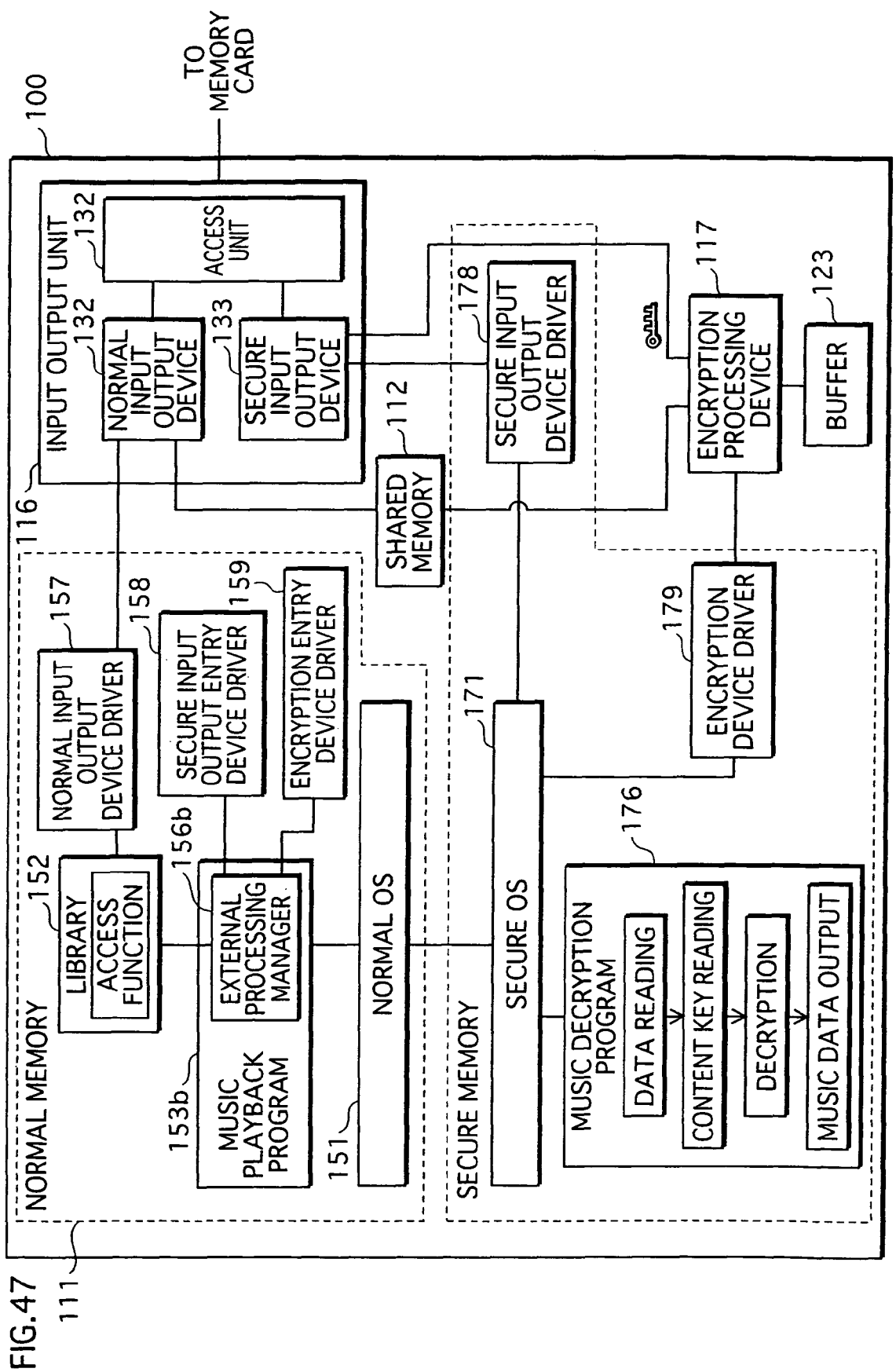
FIG. 47 is a block diagram that shows the correlation among programs in a modification example of the first embodiment.

1.5 Modification Examples of First Embodiment (1) In the first embodiment, the description has been provided for a configuration in which the music decryption program 176 operates in a pair with the music decryption daemon 156 to achieve decryption processing of encrypted music data; however, it is acceptable to have a configuration shown in FIG. 47.

In this configuration, a music playback program 153b has been loaded into the normal memory 111, in place of the music playback program 153. The music playback program 153b is configured to include an external processing manager 156b, which is, like the music decryption daemon 156 described above, in charge of some processings that do not require protection out of the processings related to decryption of encrypted music data. The external processing manager 156b also inputs and outputs various types of information and commands to and from the music decryption program 176 and the normal OS 151.

In this configuration, each of the entries in the application management table 166 is made up of a handle value, and an application context address. When having received a command that contains the handle value "1" which is identification information indicating the receiver, the normal OS 151 restores the context of the music playback program 153b based on the application management table 166 and assigns the CPU 102 to a thread of the external processing manager.

According to this configuration, since the music playback program 153b includes the external processing manager 156b, the music decryption daemon 156 does not need to be loaded into the normal memory when the registration processing of the music decryption program is performed. Consequently, it is possible to make the registration processing described in the first embodiment shorter.

(2) In the present embodiment, the secure input output entry device driver 158 and the secure input output device driver 178 are identified with the same piece of identification information, namely, the device ID_B; however, it is acceptable that they are identified with different pieces of identification information. The same is true with the encryption entry device driver 159 and the encryption device driver 179.

Specifically, each of the normal OS 151 and the secure OS 171 stores a secure device driver management table 231 shown in FIG. 48 as control data in their respective storage area.

The secure device driver management table 231 shown in FIG. 48 includes two pieces of secure device driver management information 232 and 234. Each piece of secure device driver management information is made up of an entry device driver identifier and a secure device driver identifier. The secure device driver identifier is identification information that indicates a device driver controlling a device managed by the secure OS 171. The entry device driver identifier is identification information that indicates a program within the normal memory 111 operating in a pair with the device driver. To be more specific, the secure device driver management information 232 is made up of (i) a device ID_B which is identification information indicating the secure input output entry device driver 158 and (ii) "100" which is identification information indicating the secure input output device driver 178 that operates in a pair with the secure input output entry device driver 158. The secure device driver management information 234 includes (i) a device ID_C which is identification information indicating the encryption entry device driver 159 and (ii) "101" which is identification information indicating the encryption device driver 179 that operates in a pair with the encryption entry device driver 159.

The secure device driver management table 231 is generated when each of the normal OS 151 and the secure OS 171 is activated. The normal OS 151 loads the secure input output entry device driver into the normal memory 111 and writes the device ID_B which is identification information indicating the secure input output entry device driver to the shared memory 112 and then advances to the switching processing.

When the switching processing is finished, the secure OS 171 reads the device ID_B from the shared memory 112, and then reads the encrypted secure device driver from the secondary memory unit 104 to decrypt and load it into the secure memory 113. At this point, the secure OS 171 generates the secure device driver management information 232 which includes the identification information "100" indicating the loaded secure input output device driver and the received device ID_B, and writes the generated secure device driver management information 232 to the secure memory 113. Subsequently, the secure OS 171 writes the identification information "100" to the shared memory 112 and advances to the switching processing.

When the switching processing is finished, the normal OS 151 reads the identification information "100" from the shared memory 112 and generates secure device driver management information which is made up of the read identification information "100" and the device ID_B that indicates the secure input output entry device driver 158, and writes the generated secure device driver management information to the normal memory 111.

Processing is performed in the same manner for the secure device driver information 234.

The normal OS 151 manages the secure input output entry device driver 158 and the encryption entry device driver 159 with the use of the secure device driver management table 231 generated in the manner described above. Also, the secure OS 171 manages the secure input output device driver 178 and the encryption device driver 179 with the use of the secure device driver management table 231.

(3) In the embodiment described above, the secure OS 171 includes the debug invalidation program; however, it is acceptable to have a configuration in which the secure switch device driver 180 has this function.

In this configuration, every time being called by the switch control unit 106, the secure switch device driver 180 firstly invalidates the debugger IF 101 and secondly restores the context of the secure OS 171.

Further, when having received a switching instruction from the secure OS 171, the secure switch device driver 180 saves the context of the secure OS 171 and then validates the debugger IF 101, and outputs a switching instruction to the switch control unit 106.

Since the debugger IF 101 is revoked before the secure OS 171 is restored into the CPU 102 in such a manner, it is possible to prevent more assuredly the operation of the secure OS 171 from being detected or manipulated by an external debug apparatus.

Further, it is acceptable that, instead of the program in the secure memory 113, the switch control unit 106 invalidates and validates the debugger IF 101.

(4) In the first embodiment, the normal input output device driver 157 and the encryption entry device driver 159 perform exclusion control with the use of the exclusion flag and output an error notification in the case where the exclusion flag is "1"; however, it is also acceptable to have an arrangement wherein the normal input output device driver 157 and the encryption entry device driver 159 stock up processing requests that are received while each of these drivers is in operation.

In such a case, each of the normal input output device driver 157 and the encryption entry device driver 159 includes a queue for storing the received processing requests and, when receiving a processing request, stores the received processing request into the queue instead of checking the exclusion flag.

The normal input output device driver 157 obtains a processing result when the normal input output device 132 has finished the processing. Subsequently, the normal input output device driver 157 reads a next processing request from the queue and outputs the next processing request to the normal input output device 132.

The encryption entry device driver 159 receives the processing result, outputs the received processing result, and reads a next processing request from the queue. Then, the encryption entry device driver 159 outputs the read processing request to the encryption device driver 179.

Further, it is acceptable to provide a buffer area exclusively for the encryption entry device driver 159 instead of the queue so that received processing requests and the priority levels of the received processing requests are written to the buffer area in correspondence with one another.

In such a case, when the encryption processing device 117 has finished the processing, the encryption device driver 179 receives a processing result, reads a processing request whose priority level is high, and outputs the read processing request to the encryption processing device 117.

(5) In the embodiment described above, the secure switch device driver 180 saves and restores the context of the secure OS 171; however, it is acceptable that the normal switch device driver 160 performs these processings.

In such a case, when the switching processing 2 is performed where the secure OS 171 is switched to the normal OS 151, the secure OS 171 outputs a switching instruction to the switch control unit 106. The switch control unit 106 outputs a disconnection instruction to the memory protection unit 114 so that the secure memory 113 is disconnected from the bus 130. Subsequently, the switch control unit 106 calls the normal switch device driver 160. The normal switch device driver 160 saves the context of the secure OS 171 which includes what are stored in the register of the CPU 102 and the MMU 103 into the normal memory 111, clears the CPU 102 and the MMU 103, and restores the context of the normal OS 151.

During the switching processing 1 where the normal OS 151 is switched to the secure OS 171, when having received a switching instruction from the normal OS 151, the normal switch device driver 160 saves the context of the normal OS 151 and clears the CPU 102 and the MMU 103. Subsequently, the normal switch device driver 160 restores the context of the secure OS 171 and outputs a switching instruction to the switch control unit 106.

Since the normal switch device driver 160, which is in the normal memory 111, saves and restores the context of the secure OS 171, it is not necessary to provide the secure switch device driver 180 in the secure memory 113. Accordingly, it is possible to reduce the capacity of the secure memory 113.

(6) In the embodiment above and the modification examples, the mobile phone 100 constructs a virtual memory space with MMU 103; however, it is acceptable not to use the virtual memory space. In such a case, the data and programs stored in the memories are managed with their physical addresses.

Accordingly, in such a configuration, what is stored in the MMU in relation to the saving and restoration of the context does not need to be saved.

Also, in such a case, it is acceptable not to save the context of the secure OS 171. When being called by the switch control unit 106, the secure switch device driver 180 restores the head address of the secure OS 171 into the CPU 102 and activates the secure OS 171 from the beginning.

(7) Further, in the first embodiment, the mobile phone 100 comprises the normal OS 151 to be loaded into the normal memory 111 and the secure OS 171 to be loaded into the secure memory 113 and executed; however, it is acceptable to have a configuration wherein the mobile phone 100 does not comprise the normal OS 151.

As explained with regard to the initial operation of the mobile phone 100, after the power source of the mobile phone 100 is turned on, the boot program 162 is activated at first. After initializing the CPU 102 and the MMU 103, the boot program 162 outputs an initialization request to the switch control unit 106, so that the switch control unit 106 loads the secure OS 171 and the secure switch device driver 180 into the secure memory 113.

The secure OS 171 loads various programs into the secure memory 113 and the normal memory 111.

In place of the normal OS 151, the programs within the normal memory 111 output all the commands including system calls to the normal switch device driver 160.

Having received a command from a program within the normal memory 111, the normal switch device driver 160 writes the received command to a predetermined storage area and performs the switching processing. The secure OS 171 is restored into the CPU 102 and reads the command from the predetermined storage area.

In this manner, the secure OS 171 controls the programs within the normal memory 111 and the secure memory 113.

Alternatively, it is acceptable to have a configuration wherein the mobile phone 100 does not comprise the secure OS 171, conversely. In such a case, either the secure switch device driver 180 or the switch control unit 106 includes a debugger invalidation program.

The programs within the secure memory 113 output all the commands including system calls to the secure switch device driver 180. The secure switch device driver 180 writes a received command to a command area within the shared memory and outputs a switching instruction to the switch control unit 106.

When being restored into the CPU 102, the normal OS 151 reads the command outputted by the program within the secure memory 113, from the command area within the shared memory 112.

It is acceptable that the normal OS 151 controls the programs within the normal memory ill and the secure memory 113 in this manner.

(8) In the embodiment and modification examples described above, the switch control unit 106 and the memory protection unit 114 protect the programs and data within the secure memory 113 from external accesses, by disconnecting the secure memory 113 from the bus 130.

Instead of this configuration, it is acceptable to have an arrangement wherein the data within the secure memory 113 is protected by being encrypted and decrypted by the memory protection unit 114. The switch control unit 106 instructs the memory protection unit 114 to perform encryption or decryption, instead of giving a connection instruction or a disconnection instruction.

The memory protection unit 114 encrypts or decrypts the data within the secure memory 113 according to the instruction from the switch control unit 106.

Alternatively, it is acceptable to have an arrangement wherein not all the data within the secure memory 113 is encrypted, but only the code portion, the data portion, or the stack portion of the music playback program 153 is encrypted, if necessary. The same is true with the secure OS 171, the encryption device driver 179, the secure input output device driver 178 and the like.

(9) In the embodiment and modification examples described above, the normal OS 151 manages the application management table 166 and calls a program (for example, the music decryption daemon 156) that is in correspondence with an application or a secure application, with the use of the application management table 166; however, it is acceptable to have an arrangement wherein, in the case where there are a large number of applications like the music playback program 153 that request the secure application to perform a processing, another program being different from the normal OS 151 is provided that manages the application management table 166 and calls programs. This program is called a daemon control program.

In such a case, when being called by the switch control unit 106, the normal switch device driver 160, in place of the normal OS 151, activates the daemon control program. The daemon control program reads a command from the shared memory 112 and calls a corresponding program based on the identification information included in the read command.

Further, applications and programs including the music decryption daemon 156, in place of the normal OS 151, output a secure processing request to the daemon control program.

The daemon control program writes the received secure processing request to the shared memory 112 and outputs a switching instruction to the normal switch device driver 160.

(10) So far, the description has been provided using the mobile phone 100 as an embodiment of the present invention; however, it is acceptable to apply the present invention to an information processing apparatus having similar functions, such as a personal computer.

In such a case, each of the normal memory ill and the secure memory 113 is configured to include a RAM and a hard disk.

In the description above, the secure OS 171 and the music decryption program 176 are encrypted and stored in the secondary memory unit 104; however, it is acceptable to have an arrangement wherein the secure OS 171 and the music decryption program 176 are stored in a hard disk portion of the secure memory 113.

2. Second Embodiment

The following describes the second embodiment of the present invention.

Figure 49:
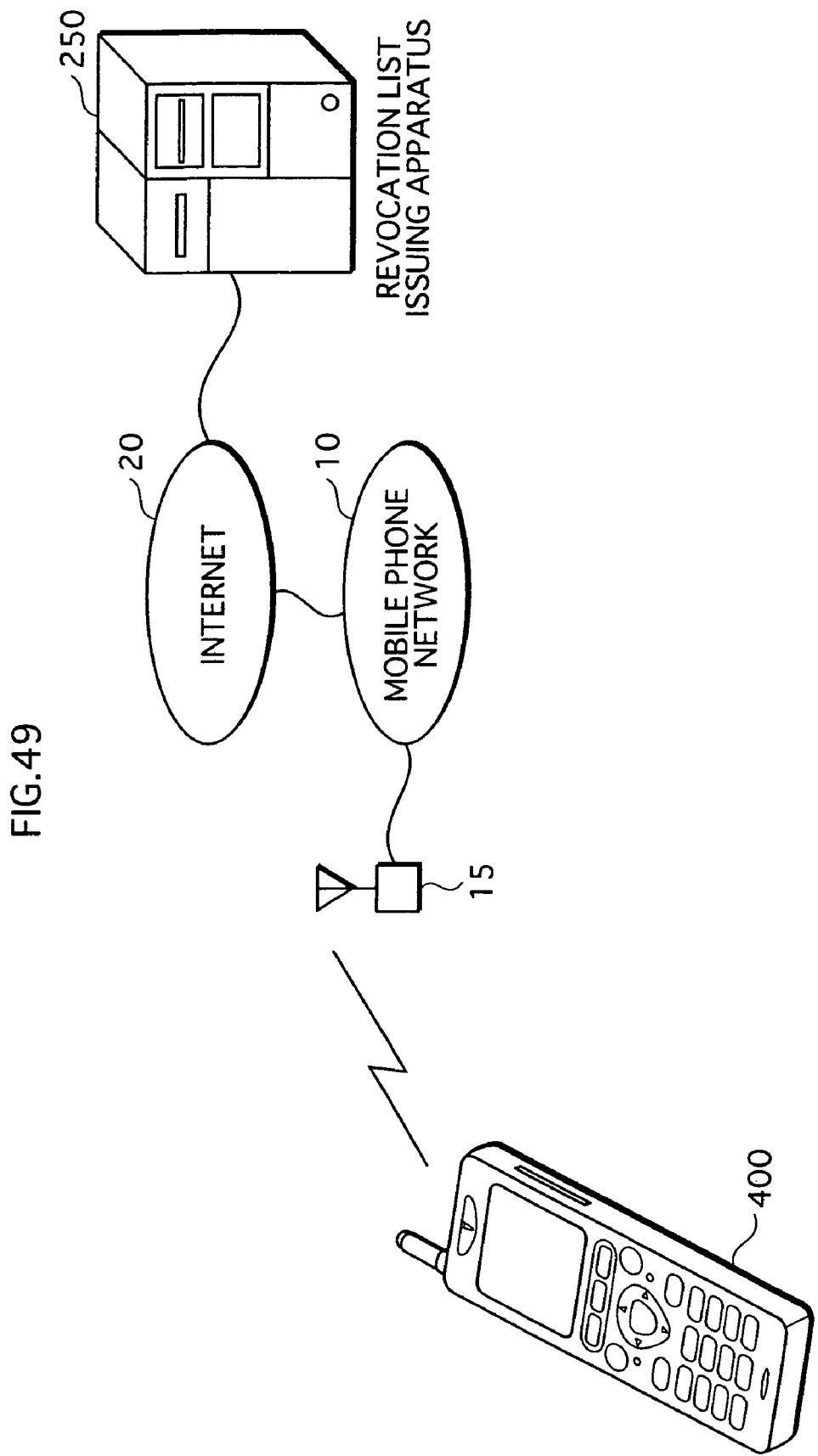
FIG. 49 shows an example of use of the mobile phone 400 in the second embodiment.

FIG. 49 shows an example of use of the mobile phone 400 according to the second embodiment of the present invention. The mobile phone 400 is connected to a revocation list issuing apparatus 250 via a base station 15, a mobile phone network 10, and the Internet 20.

The revocation list issuing apparatus 250 manages information related to revoked programs, generates a revocation list showing these revoked programs, and transmits the generated revocation list to the mobile phone 400 via the Internet 20.

The mobile phone 400 receives the revocation list from the revocation list issuing apparatus 250 and judges where or not each of the programs stored in the mobile phone 400 has been revoked based on the received revocation list.

2.1 The Revocation List Issuing Apparatus 250

Figure 50:
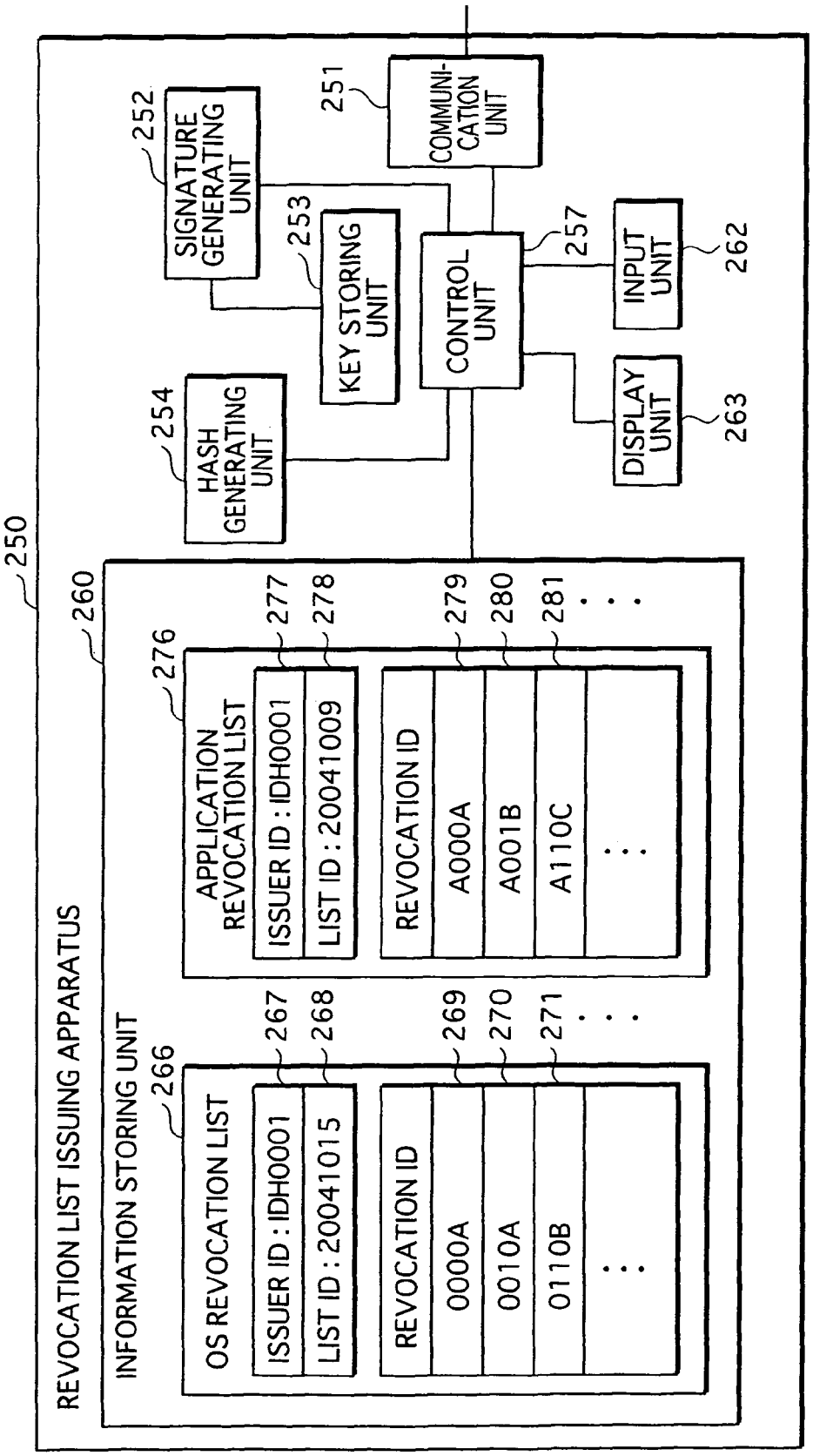
FIG. 50 is a block diagram that shows the configuration of a revocation list issuing apparatus 250.

The revocation list issuing apparatus 250 comprises, as shown in FIG. 50, a communication unit 251, a signature generating unit 252, a key storing unit 253, a hash generating unit 254, a control unit 257, an information storing unit 260, an input unit 262, and a display unit 263.

More specifically the revocation list issuing apparatus 250 is a computer system that includes a microprocessor, a RAM and a ROM. Computer programs are stored in the RAM and the ROM, and the revocation list issuing apparatus 250 achieves its functions when the microprocessor operates according to the computer programs.

(1) The Information Storing Unit 260

The information storing unit 260 stores therein an OS revocation list 266 and an application revocation list 276, as shown in FIG. 50.

The OS revocation list 266 includes an issuer ID 267, a list ID 268, and revocation IDs, 269, 270, 271, and so on.

The issuer ID 267 indicates the issuer of the OS revocation list and, for example, may indicate the apparatus ID of the revocation list issuing apparatus 250 or identification information of the manager of the revocation list issuing apparatus 250.

The list ID 268 is information showing the age of the OS revocation list 266. In the present example, a date "20041015" on which the OS revocation list 266 was generated is used as the list The revocation IDs 269, 270, 271, and so on are pieces of identification information of operating systems that have been revoked.

The application revocation list 276 includes an issuer ID 277, a list ID 278, and revocation IDs 279, 280, 281, and soon. The issuer ID 277 is information that indicates the issuer of the application revocation list, and for example, may indicate the apparatus ID of the revocation list issuing apparatus 250 or identification information of the manager of the revocation list issuing apparatus 250.

The list ID 278 is information showing the age of the application revocation list 276. In the present example, a date "20041009" on which the application revocation list 276 was generated is used as the list ID 278.

The revocation IDs 279, 280, 281, and so on are pieces of identification information of applications that have been revoked.

(2) The Communication Unit 251

The communication unit 251 is connected to the Internet 20 and performs information transmission/reception between the control unit 257 and an external device connected to the Internet 20. In the present example, the external device is the mobile phone 400.

(3) The Hash Generating Unit 254

The hash generating unit 254 receives the OS revocation list 266 and a hash generation instruction from the control unit 257. Also, the hash generating unit 254 receives the application revocation list 276 and a hash generation instruction.

When having received a hash generation instruction, the hash generating unit 254 assigns either the OS revocation list 266 or the application revocation list 276 that has been received into a hash function and generates OS digest data or application digest data having 160 bytes. In the present case, SHAR-1 is used as the hash function, as an example. Since the hash function SHA-1 is a publicly-known technique, explanation thereof will be omitted. It is also acceptable to use other hash functions.

The hash generating unit 254 outputs the generated OS digest data or application digest data to the control unit 257.

(4) The Key Storing Unit 253 and the Signature Generating Unit 252

The key storing unit 253 stores therein an issuing apparatus secret key unique to the revocation list issuing apparatus 250 and an issuing apparatus public key that is in correspondence with the issuing apparatus secret key.

The signature generating unit 252 receives the OS digest data or the application digest data from the control unit 257 and is instructed to generate a signature.

When having received the OS digest data and being instructed to generate a signature, the signature generating unit 252 reads the issuing apparatus secret key from the key storing unit 253, generates a piece of signature data by employing a signature generation algorithm S on the received OS digest data, with the use of the read issuing apparatus secret key, and outputs the generated piece of signature data to the control unit 257. The signature generation algorithm S uses, for example, an Elliptic Curve DSA signature, a RSA (Rivest Shamir Adleman) signature, or the like.

When having received the application digest data and being instructed to generate a signature, the signature generating unit 252 generates signature data and outputs the generated signature data to the controlling unit 257, in the same manner.

(5) The Control Unit 257

The control unit 257 receives, from the mobile phone 400 via the communication unit 251 and the Internet 20, a list request for requesting that a most updated OS revocation list and a most updated application revocation list should be transmitted.

Having received the list request, the control unit 257 reads the OS revocation list 266 from the information storing unit 260, outputs the read OS revocation list 266 to the hash generating unit 254, and outputs a hash generation instruction. Subsequently, the control unit 257 receives the OS digest data from the hash generating unit 254 and outputs the received OS digest data to the signature generating unit 252 so as to instruct generation of a signature. The control unit 257 then receives a piece of signature data from the signature generating unit 252 and appends the received signature data to the OS revocation list 266 so as to generate an OS revocation list to which a signature is appended (hereafter, simply referred to as "OS revocation list with signature").

The control unit 257 performs in the same manner with the application revocation list 276 and instructs the hash generating unit 254 and the signature generating unit 252 to generate a piece of signature data. The control unit 257 appends the generated signature data to the application revocation list 276 so as to generate an application revocation list to which a signature is appended (hereafter, simply referred to as "application revocation list with signature").

Subsequently, the control unit 257 transmits the generated OS revocation list with signature and the generated application revocation list with signature to the mobile phone 400 via the communication unit 251 and the Internet 20.

Further, the control unit 257 receives various instructions and data from the user via the input unit 262 and operates according to the received instructions.

(6) The Input Unit 262 and the Display Unit 263

The input unit 262 receives inputs of instructions and data from the user of the revocation list issuing apparatus 250 and outputs the received instructions and data to the control unit 257.

The display unit 263 displays various types of screens according to instructions from the control unit 257.

2.2 The Mobile Phone 400

The hardware configuration of the mobile phone 400 is almost the same as the configuration of the mobile phone 100 shown in FIG. 2. The mobile phone 400 comprises a debugger IF, a CPU, an MMU, a secondary memory unit, a switch control unit 106, an interrupt controller, an input unit, a display unit, a normal memory, a shared memory, a secure memory 413, a memory protection unit 414, an input output unit, an encryption processing device, a wireless communication control unit, a microphone, a speaker, a communication unit, a buffer, an encoding processing unit, and a D/A converting unit.

Since the elements other than the secure memory 413 and the memory protection unit 414 are the same as those in the mobile phone 100, detailed description will be omitted. Only the parts that are different from those in the mobile phone 100 will be explained.

(1) The Secure Memory 413

Figure 51:
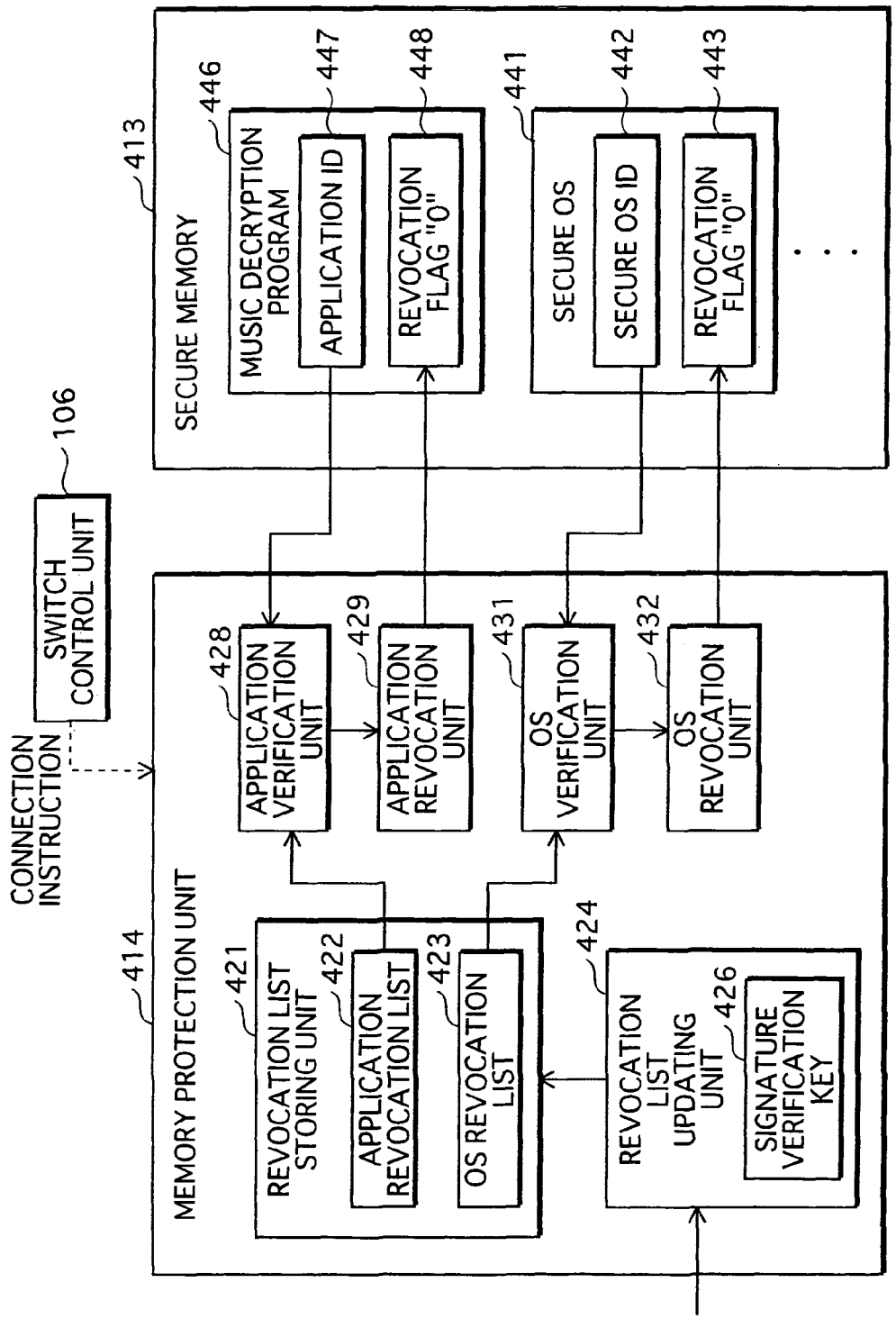
FIG. 51 is a block diagram that shows the configurations of a memory protection unit 414 and a secure memory 413 included in the mobile phone 400.

The secure memory 413 stores therein, as shown in FIG. 51, various programs such as a music decryption program 446 and a secure OS 441.

The music decryption program 446 includes, like the music decryption program 176 in the first embodiment, a procedure for decrypting encrypted music data, but the explanation of this procedure will be omitted.

The music decryption program 446 includes an application ID 447 and a revocation flag 448 in the header portion. The application ID 447 is identification information that is unique to the music decryption program 446. The revocation flag 448 is a flag that indicates whether or not the music decryption program 446 has been revoked. The revocation flag "1" indicates that the music decryption program 446 has been revoked, whereas the revocation flag "0" indicates that the music decryption program 446 has not been revoked.

The secure OS 441 is a piece of basic software that performs the same processing as the secure OS 171 in the first embodiment; therefore, explanation of the operation of the secure OS 441 will be omitted. It should be noted, however, when activating each application within the secure memory 413 or restoring each application within the secure memory 413 into the CPU, the secure OS 441 reads the revocation flag in the header portion of the application and if the revocation flag is set to be "1", the secure OS 441 discontinues the activation or the restoration of the application.

The secure OS 441 includes a secure OS ID 442 and a revocation flag 443 in the header portion.

The secure OS ID 442 is identification information that is in correspondence with the secure OS 441. The revocation flag 443 is a flag that indicates whether or not the secure OS 441 has been revoked. The revocation flag "1" indicates that the secure OS 441 has been revoked, whereas the revocation flag "0" indicates that the secure OS 441 has not been revoked.

In the present embodiment, a secure switch device driver which is loaded into the secure memory 413 and performs a switching processing reads the revocation flag 443 of the secure OS 441 before restoring the context of the secure OS 441 into the CPU and if the revocation flag is set to be "1", discontinues the restoration of the secure OS 441.

(2) The Memory Protection Unit 414

The memory protection unit 414 comprises, as shown in FIG. 51, a revocation list storing unit 421, a revocation list updating unit 424, an application verification unit 428, an application revocation unit 429, an OS verification unit 431, and an OS revocation unit 432.

<The Revocation List Storing Unit 421>

The revocation list storing unit 421 stores therein an application revocation list 422 and an OS revocation list 423.

The application revocation list 422 and the OS revocation list 423 have the same configurations as the application revocation list 276 and the OS revocation list 266 that are stored in the information storing unit 260 of the revocation list issuing apparatus 250, respectively.

<The Revocation List Updating Unit 424>

The revocation list updating unit 424 pre-stores therein a signature verification key 426. The signature verification key 426 is a key identical to the issuing apparatus public key stored in the key storing unit 253 of the revocation list issuing apparatus 250.

The revocation list updating unit 424 receives a connection instruction which instructs that the secure memory 413 should be connected to the bus 130, from the switch control unit 106. Having received the connection instruction, the revocation list updating unit 424 transmits, to the revocation list issuing apparatus 250, a list request requesting that a most updated application revocation list and a most updated OS revocation list should be transmitted, via the wireless communication control unit and the communication unit.

Subsequently, the revocation list updating unit 424 receives the OS revocation list with signature and the application revocation list with signature from the revocation list issuing apparatus 250, via the wireless communication control unit and the communication unit.

The revocation list updating unit 424 performs signature verification on the piece of signature data in the received OS revocation list with signature, with the use of the signature verification key. More specifically, the revocation list updating unit 424 performs a signature verification algorithm V on the piece of signature data with the use of the signature verification key so as to generate check data. The signature verification algorithm V is an algorithm used for verifying pieces of signature data generated with the signature generation algorithm S.

Subsequently, the revocation list updating unit 424 assigns the received OS revocation list into a hash function so as to generate OS digest data. The revocation list updating unit 424 compares the generated check data and the digest data. In the case where they are identical to each other, the revocation list updating unit 424 judges that the signature verification has been successful. In the case where they are not identical to each other, the revocation list updating unit 424 judges that the signature verification has failed. If the signature verification has failed, the revocation list updating unit 424 discontinues the comparison of the list IDs and the updating of the OS revocation list, which will be described later.

The revocation list updating unit 424 performs a signature verification on the received application revocation list with signature in the same manner. If the signature verification has failed, the revocation list updating unit 424 discontinues the comparison of the application IDs and the updating of the application revocation list, which will be described later.

Subsequently, the revocation list updating unit 424 compares the list ID included in the received OS revocation list with the list ID included in the OS revocation list 423 stored in the revocation list storing unit 421. In the case where these list IDs are identical to each other, the revocation list updating unit 424 deletes the received OS revocation list. In the case where the list ID of the received OS revocation list has a newer date than the list ID of the OS revocation list 423 stored in the revocation list storing unit 421, the revocation list updating unit 424 updates the OS revocation list 423 stored in the revocation list storing unit 421 with the received OS revocation list.

As for the application revocation list also, the revocation list updating unit 424 compares the received application revocation list with the application revocation list 422 stored in the revocation list storing unit 421 to judge which is newer. In the case where the application revocation list 422 is older, the revocation list updating unit 424 updates the application revocation list 422 stored in the revocation list storing unit 421 with the received application revocation list.

<The OS Verification Unit 431 and the OS Revocation Unit 432>

The OS verification unit 431 reads the secure OS ID 442 from the header portion of the secure OS 441. Subsequently, the OS verification unit 431 reads the OS revocation list 423 from the revocation list storing unit 421 and judges whether or not the read secure OS ID 442 is included in the revocation IDs shown in the OS revocation list 423. In the case where the secure OS ID 442 is included in the OS revocation list 423, the OS verification unit 431 judges that the secure OS 441 is invalid (i.e. the secure OS 441 should be revoked), and instructs the OS revocation unit 432 to revoke the secure OS 441.

In the case where the secure OS ID 442 is not included in the OS revocation list 423, the OS verification unit 431 judges that the secure OS 441 is valid (i.e. the secure OS 441 does not have to be revoked).

When being instructed by the OS verification unit 431 to perform revocation processing, the OS revocation unit 432 changes the revocation flag in the header portion of the secure OS 441 to "1".

<The Application Verification Unit 428 and the Application Revocation Unit 429>

The application verification unit 428 reads the application ID 447 from the header portion of the music decryption program 446 within the secure memory 413. Subsequently, the application verification unit 428 reads the application revocation list 422 from the revocation list storing unit 421 and judges whether or not the application ID 447 is included in the application revocation list 422. In the case where the application ID 447 is included in the application revocation list 422, the application verification unit 428 judges that the music decryption program 446 is an invalid program and instructs the application revocation unit 429 to revoke the music decryption program 446.

In the case where the application ID 447 is not included in the application revocation list, the application verification unit 428 judges that the music decryption program 446 is a valid program.

When being instructed by the application verification unit 428 to perform the revocation processing, the application revocation unit 429 sets the revocation flag of the music decryption program 446 to be "1".

In the case where a plurality of applications exist in the secure memory 413, the application verification unit 428 and the application revocation unit 429 repeats, for each of all the applications, the judgment of whether or not the application is invalid and the setting of the revocation flag if the application is invalid, in the same manner as described above.

(3) The Verification Operation of the Memory Protection Unit

Figure 52:
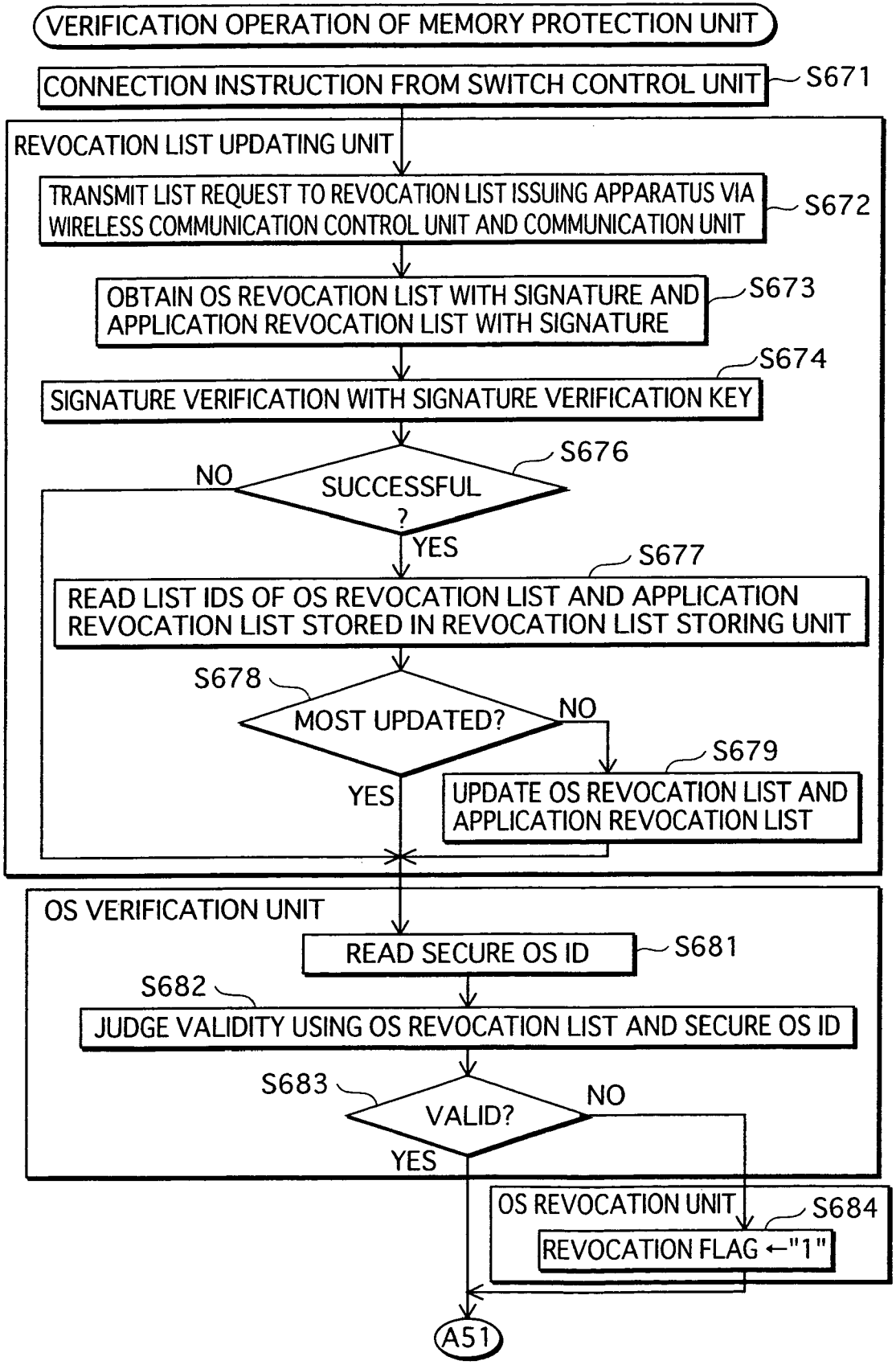
FIG. 52 is a flow chart that shows the operation performed by the memory protection unit 414.
Figure 53:
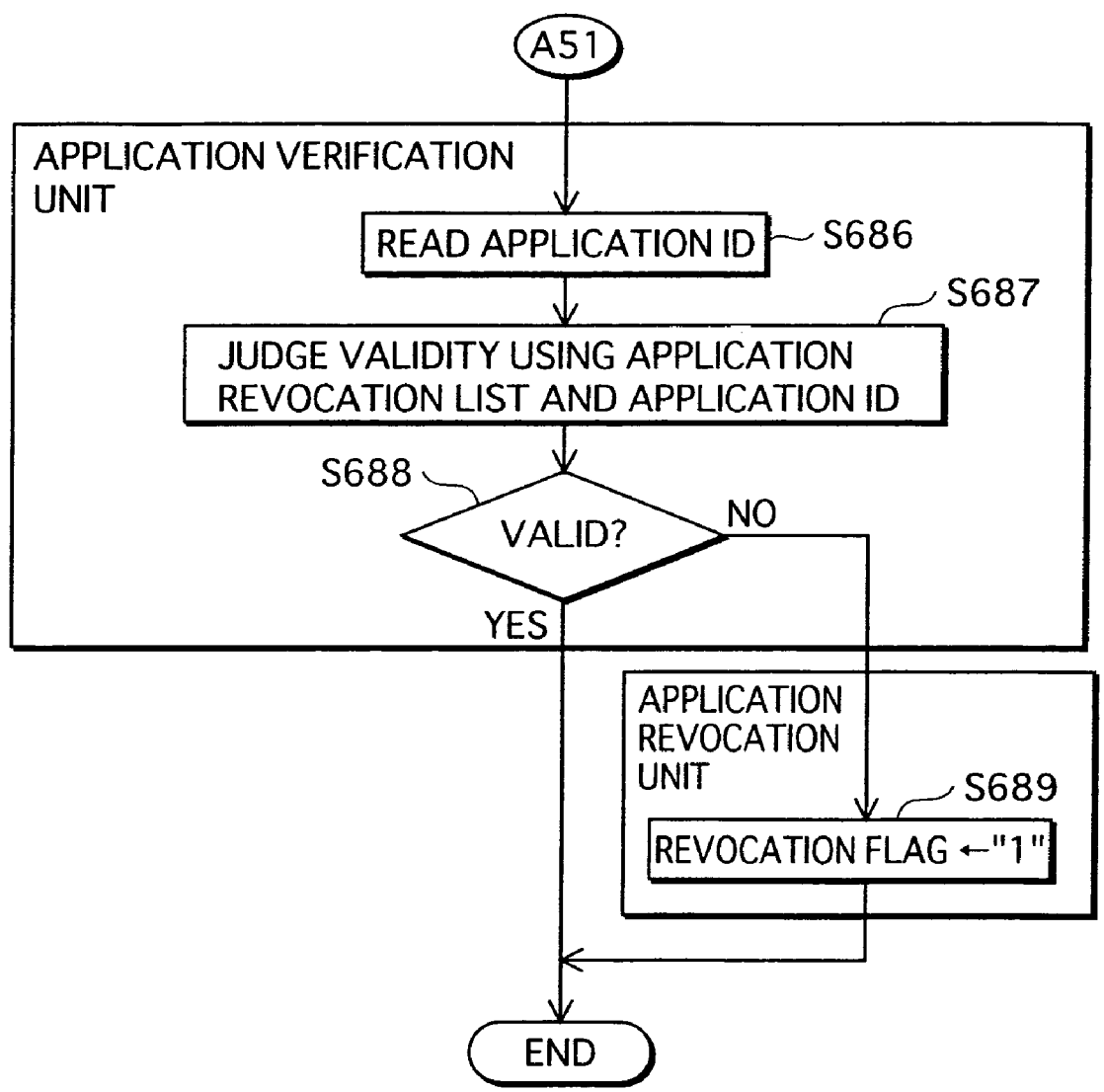
FIG. 53 is a flow chart that shows the operation performed by the memory protection unit 414 and is continued from FIG. 52.

The following describes the verification operation on a program by the memory protection unit 414, with reference to the flow chart shown in FIGS. 52 to 53.

The memory protection unit 414 receives a connection instruction from the switch control unit 106 (Step S671). Having received the connection instruction, the revocation list updating unit 424 transmits a list request to the revocation list issuing apparatus 250 via the wireless communication control unit 118 and the communication unit 121 (Step S672). Subsequently, the revocation list updating unit 424 obtains the OS revocation list with signature and the application revocation list with signature via the communication unit and the wireless communication control unit (Step S673).

The revocation list updating unit 424 reads the signature verification key 426 and performs the signature verification on the obtained OS revocation list with signature and application revocation list with signature, with the use of the read signature verification key (Step S674). In the case where the signature verification has failed (Step S676: NO), the procedure advances to Step S681 which is performed by the OS verification unit 431.

In the case where the signature verification has been successful (Step S676: YES), the revocation list updating unit 424 reads the list IDs of the OS revocation list 423 and the application revocation list 422 stored in the revocation list storing unit 421 (Step S677). The revocation list updating unit 424 compares the list ID of the read OS revocation list 423 with the list ID of the received OS revocation list as well as compares the list ID of the application revocation list 422 with the list ID of the received application revocation list. Accordingly, the revocation list updating unit 424 judges whether or not the OS revocation list 423 and the application revocation list 422 are the most updated ones (Step S678). In the case where the judgment result is that at least one of them is not the most updated one (Step S678: NO), the revocation list updating unit 424 updates the OS revocation list 423 and/or the application revocation list 422 stored in the revocation list storing unit 421, which are/is not the most updated ones/one, with the received OS revocation list and/or the received application revocation list (Step S679), respectively.

In the case where the judgment result is that they are both the most updated ones (Step S678: YES), the processing in Step S679 will be omitted.

When the processing by the revocation list updating unit 424 in Steps S672 through S679 is finished, the OS verification unit 431 reads the secure OS ID 442 from the secure memory 413 (Step S681) and judges whether the secure OS 441 is invalid or valid based on whether the read secure OS ID 442 is registered in the OS revocation list 423 (Step S682).

In the case where the judgment result is that the secure OS 441 is valid (Step S683: YES), the procedure advances to the processing in Step S686 to be performed by the application verification unit 428.

In the case where the judgment result is that the secure OS 441 is invalid (Step S683: NO), the OS revocation unit 432 sets the revocation flag 443 of the secure OS 441 to be "1" (Step S684).

When the processing up to Step S684 performed by the OS verification unit 431 and the OS revocation unit 432 is finished, the application verification unit 428 reads the application ID 447 of the music decryption program 446 within the secure memory 413 (Step S686) and judges whether the music decryption program 446 is valid or invalid based on whether the read application ID is registered in the application revocation list 422 (Step S687).

In the case where the judgment result is that the music decryption program 446 is valid (Step S688: YES), the verification processing is finished. In the case where the judgment result is that the music decryption program 446 is invalid (Step S688: NO), the application revocation unit 429 sets the revocation flag of the music decryption program 446 to be "1" (Step S689).

2.3 Summary and Effects

As explained so far, the mobile phone 400 of the present embodiment obtains an OS revocation list and an application revocation list that are most updated at the time, from the revocation list issuing apparatus 250. The mobile phone 400 judges whether the secure OS 441 stored in the mobile phone 400 and each of the applications loaded into the secure memory 413 such as the music decryption program 446 is valid or invalid based on the obtained OS revocation list and the obtained application revocation list and discontinues execution of the programs that have been revoked.

With this arrangement, in the case where it is learned in a post-factum manner that a program needs to be revoked after the mobile phone 400 is sold, it is possible to suspend the execution of the program and thereby possible to prevent unauthorized use of data through execution of an invalid program.

2.4 Modification Example 1 of the Second Embodiment

It is acceptable to configure the second embodiment as below:

(1) The Revocation List Issuing Apparatus 250

The revocation list issuing apparatus 250 stores therein the OS revocation list and the application revocation list, and the OS revocation list is configured to include a certificate ID of a secure OS certificate (to be described later) of each revoked operating system, instead of the revocation IDs 269, 279, 271, and so on.

Also, the application revocation list is configured to include a certificate ID of an application certificate (to be described later) of each revoked application, instead of the revocation IDs 279, 280, 281, and so on.

(2) The Mobile Phone 400

The mobile phone 400 comprises a memory protection unit 454 instead of the memory protection unit 414 and comprises a secure memory 453 instead of the secure memory 413. Instead of the memory protection unit 414 judging whether programs within the secure memory 413 are valid or invalid based on the IDs that are unique to the programs, the memory protection unit 454 judges whether programs within the secure memory 453 are valid or invalid based on the certificates that are unique to the programs.

The following describes the configuration to achieve this function.

(2-1) The Secure Memory 453

Figure 54:
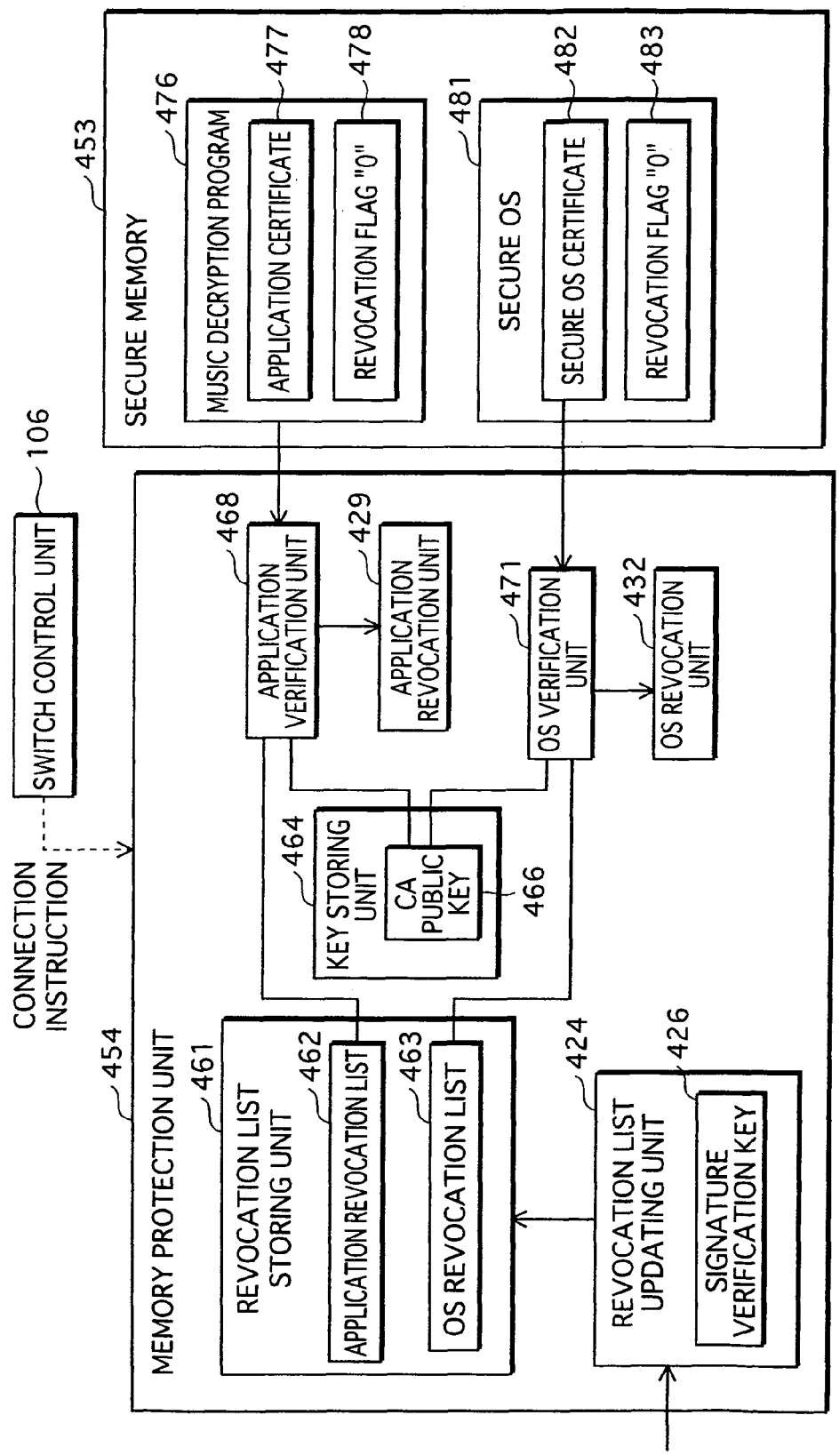
FIG. 54 is a block diagram that shows the configurations of the memory protection unit 454 and the secure memory 453 in a modification example of the second embodiment.

The secure memory 453 includes, for example, the music decryption program 476 and the secure OS 481, as shown in FIG. 54.

The secure OS 481 includes a secure OS certificate 482 and a revocation flag 483 in the header portion.

Figure 55:
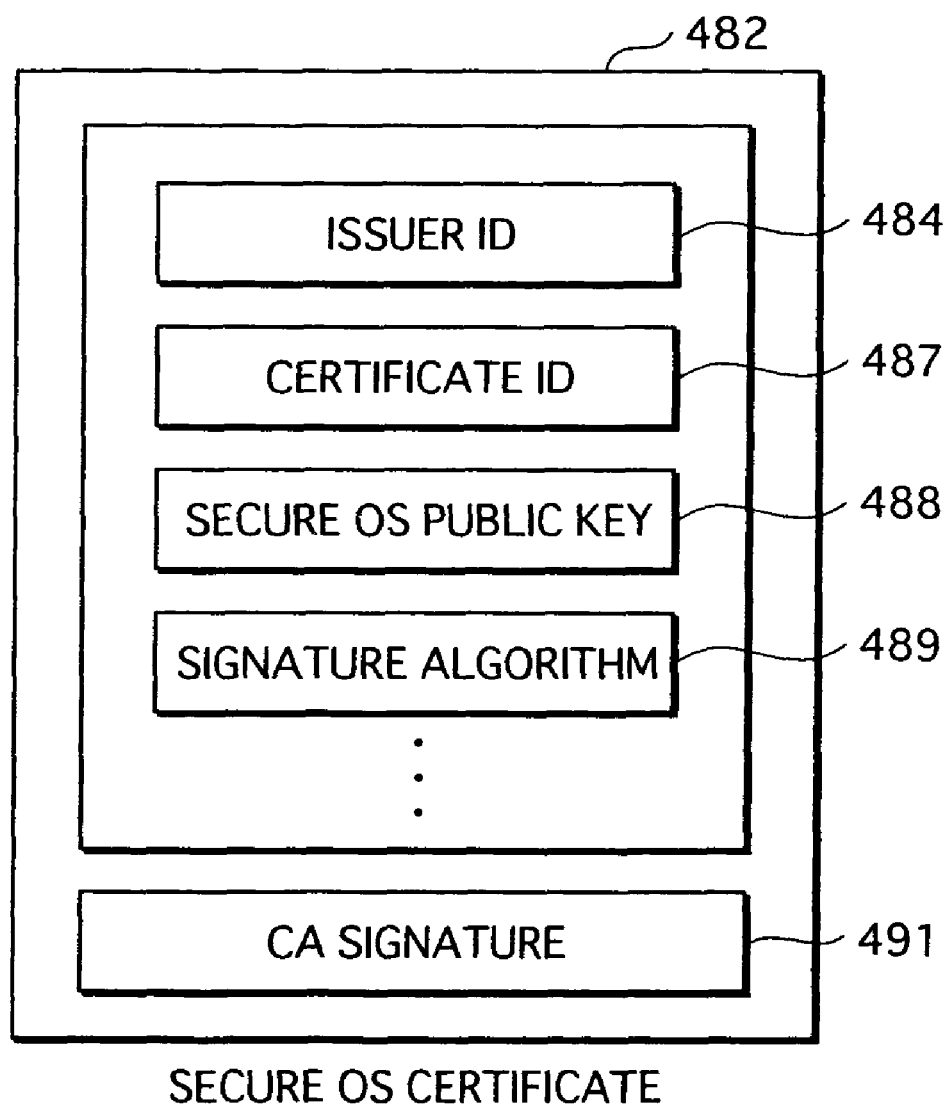
FIG. 55 shows the detail of a secure OS certificate.

The secure OS certificate 482 is a public key certificate in accordance with X. 509 and, as shown in FIG. 55, is configured to include an issuer ID 484, a certificate ID 487, a secure OS public key 488, a signature algorithm 489, and a CA signature 491.

The issuer ID 484 is an identifier of the certificate authority (hereafter simply referred to as CA) being the issuer of the secure OS certificate 482. The secure OS public key 488 is a public key that is unique to the secure OS 481 and is certified to be valid by the secure OS certificate 482. The signature algorithm 489 is identification information that indicates an algorithm used for generation of the CA signature 491. The CA signature 491 is a piece of signature data generated by performing the algorithm S1 indicated by the signature algorithm 489 on the aforementioned issuer ID 484, the certificate ID 487 and so on, with the use of the secret key of the CA, which is the issuer of the secure OS certificate 482.

The revocation flag 483 indicates whether the secure OS 481 is valid or invalid.

The music decryption program 476 includes an application certificate 477 and a revocation flag 478 in the header portion.

The application certificate 477 is configured to have an application public key in place of the secure OS public key 488 shown in FIG. 55.

The revocation flag 478 indicates whether the music decryption program 476 is invalid or valid.

(2-2) The Memory Protection Unit 454

The memory protection unit 454 comprises, as shown in FIG. 54, a revocation list storing unit 461, a revocation list updating unit 424, a key storing unit 464, an application verification unit 468, an application revocation unit 429, an OS verification unit 471, and an OS revocation unit 432.

Since the operations of the revocation list updating unit 424, the OS revocation unit 432, the application revocation unit 429 are the same as those of the revocation list updating unit 424, the OS revocation unit 432, and the application revocation unit 429 in the second embodiment described above, explanation thereof will be omitted.

<The Revocation List Storing Unit 461>

The revocation list storing unit 461 includes an OS revocation list 463 and an application revocation list 462, as shown in FIG. 54.

The OS revocation list 463 is configured in the same manner as the OS revocation list stored in the revocation list issuing apparatus 250 and includes certificate IDs of revoked operating systems.

The application revocation list 462 is configured in the same manner as the application revocation list stored in the revocation list issuing apparatus 250 and includes certificate IDs of revoked applications.

<The Key Storing Unit 464>

The key storing unit 464 stores therein a CA public key 466. The CA public key 466 is a public key of the CA which is the issuer of the secure OS certificate 482 and the application certificate 477. The CA public key 466 is a key that is to be paired up with the secret key of the CA used in the generation of the CA signatures included in the secure OS certificate 482 and the application certificate 477.

<The OS Verification Unit 471>

The OS verification unit 471 reads the secure OS certificate 482 included in the secure OS 481 from the secure memory 453, when the updating processing of the OS revocation list and the application revocation list by the revocation list updating unit 424 has finished. The OS verification unit 471 reads the CA public key 466 from the key storing unit 464 and performs signature verification by performing the signature verification algorithm V1 on the CA signature 491 included in the secure OS certificate 482, with the use of the read CA public key 466. The signature verification algorithm V1 is an algorithm for verifying the signature data generated with the signature generation algorithm S1.

In the case where the result shows that the signature verification has failed, the OS verification unit 471 discontinues the processing thereafter and instructs the OS revocation unit 432 to revoke the secure OS 481.

In the case where the result shows that the signature verification has been successful, the OS verification unit 471 then judges whether or not the secure OS 481 is invalid or valid based on whether or not the certificate ID 487 included in the secure OS certificate 482 is registered in the OS revocation list 463. In the case where the certificate ID 487 is registered, the OS verification unit 471 judges that the secure OS 481 is an invalid program and instructs the OS revocation unit 432 to revoke the secure OS 481.

In the case where the certificate ID 487 is not registered, the OS verification unit 471 judges that the secure OS 481 is a valid program.

It should be noted that, in the present embodiment, the signature verification processing is performed on the secure OS certificate 482, and in the case where the signature verification has been successful, it is judged whether or not the certificate ID 487 is registered in the OS revocation list 463; however, it is acceptable to have an arrangement wherein it is judged whether or not the certificate ID 487 is registered in the OS revocation list 463, and in the case where the certificate ID 487 is not registered, the signature verification processing is performed.

<The Application Verification Unit 468>

When the verification processing of the secure OS 481 by the OS verification unit 471 has finished, the application verification unit 468 reads the application certificate 477 included in the music decryption program 476 from the secure memory 453. The application verification unit 468 reads the CA public key 466 from the key storing unit 464 and performs signature verification processing by performing the signature verification algorithm V1 on the CA signature included in the application certificate 477, with the use of the read CA public key 466.

In the case where the result shows that the signature verification has failed, the application verification unit 468 discontinues the processing thereafter and instructs the application revocation unit 429 to revoke the music decryption program 476.

In the case where the result shows that the signature verification has been successful, the application verification unit 468 then judges whether or not the music decryption program 476 is invalid or valid based on whether or not the certificate ID included in the application certificate 477 is registered in the application revocation list 462. In the case where the certificate ID is registered, the application verification unit 468 judges that the music decryption program 476 is an invalid program and instructs the application revocation unit 429 to revoke the music decryption program 476.

In the case where the certificate ID is not registered, the application verification unit 468 judges that the music decryption program 476 is a valid program.

It should be noted that it is acceptable to reverse the order of the signature verification processing and the judgment processing of whether the certificate ID is registered in the application revocation list 462.

2.5 Modification Example 2 of the Second Embodiment

It is acceptable to have an arrangement wherein the music decryption program 476 in the modification example 1 includes a plurality of certificates having a hierarchical structure.

Figure 56:
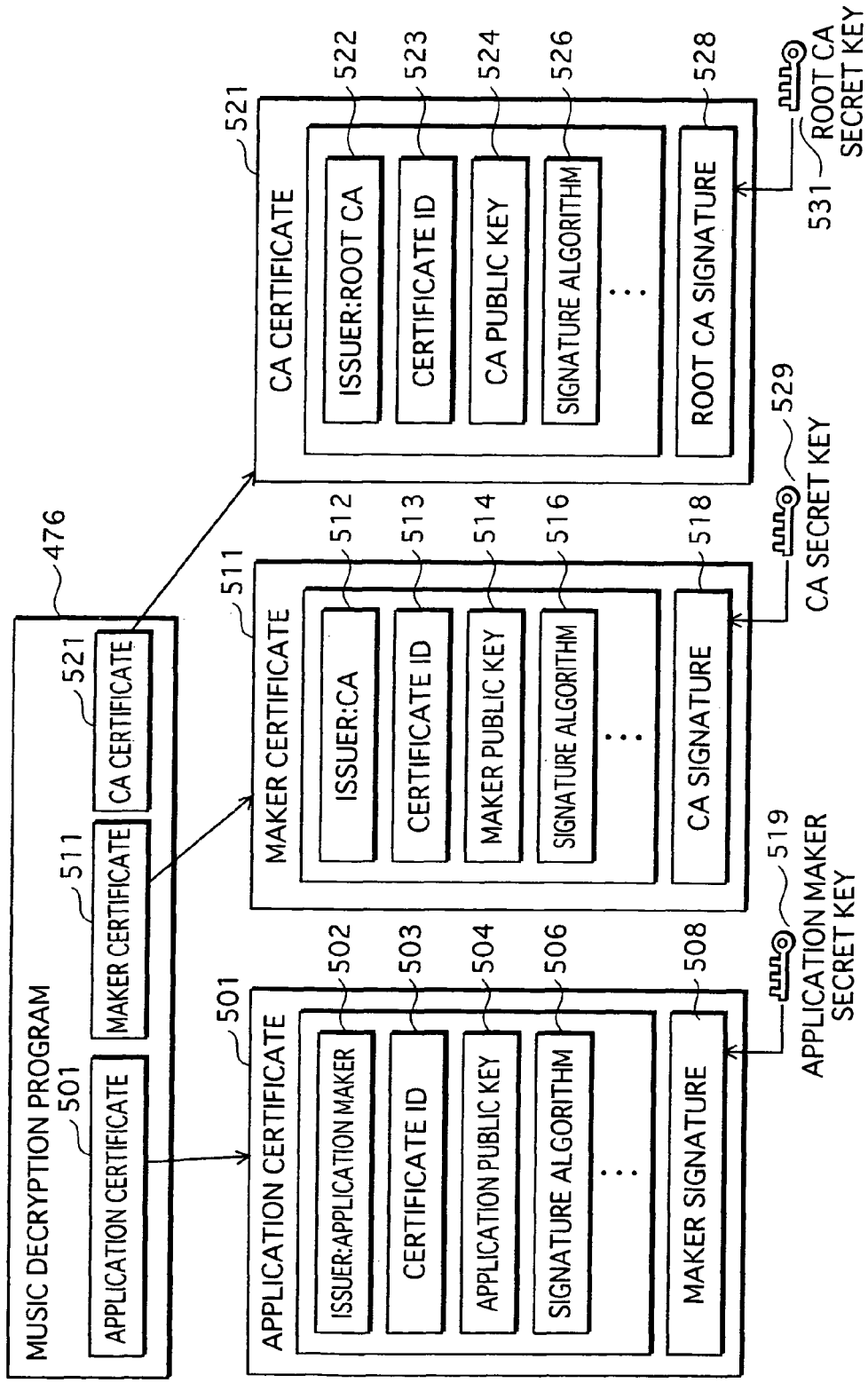
FIG. 56 shows the configurations of, and the correlation among, an application certificate 501, a maker certificate 511, a CA certificate included in the music decryption program 476, in a modification example of the second embodiment.

FIG. 56 shows the configuration of the plurality of certificates included in the music decryption program 476 and the hierarchical structure of these certificates.

The music decryption program 476 comprises, as shown in FIG. 56, an application certificate 501, a maker certificate 511, and a CA certificate 521.

The application certificate 501 is configured to include an issuer 502, a certificate ID 503, an application public key 504, a signature algorithm 506, and a maker signature 508.

The issuer 502 is identification information that indicates the application maker which is the issuer of the application certificate 501. FIG. 56 shows "APPLICATION MAKER" for the convenience of explanation. The certificate ID 503 is identification information that is unique to the application certificate 501. The application public key 504 is a public key that is unique to the music decryption program 476 and is certified to be valid by the application certificate 501. The signature algorithm 506 is identification information indicating the signature generation algorithm used for the generation of the maker signature 508. The maker signature 508 is a piece of signature data generated by performing the signature generation algorithm S2 on the pieces of information included in the application certificate 501 such as the issuer 502, the certificate ID 503, the application public key 504, and the signature algorithm 506, with the use of the application maker secret key 519 that is unique to the manufacturing maker of the music decryption program 476.

The maker certificate 511 is configured to include an issuer 512, a certificate ID 513, a maker public key 514, a signature algorithm 516, and a CA signature 518.

The issuer 512 is identification information that indicates the CA which is the issuer of the maker certificate 511. FIG. 56 shows "CA" for the convenience of explanation. The certificate ID 513 is identification information that is unique to the maker certificate 511. The maker public key 514 is a public key of the manufacturing maker of the music decryption program 476 and is certified to be valid by the maker certificate 511. The maker public key 514 is a key that is in correspondence with the application maker secret key 519. The signature algorithm 516 is identification information indicating the signature generation algorithm used for the generation of the CA signature 518. The CA signature 518 is a piece of signature data generated by performing the signature generation algorithm S3 on the pieces of information included in the maker certificate 511 such as the issuer 512, the certificate ID 513, the maker public key 514, and the signature algorithm 516, with the use of the CA secret key 529.

The CA certificate 521 is configured to include an issuer 522, a certificate ID 523, a CA public key 524, a signature algorithm 526, and a root CA signature 528.

The issuer 522 is identification information that indicates the root CA which is the issuer of the CA certificate 521. FIG. 56 shows "ROOT CA" for the convenience of explanation. The certificate ID 523 is identification information that is unique to the CA certificate 521. The CA public key 524 is a public key of the CA and is certified to be valid by the CA certificate 521. The CA public key 524 is a key that is in correspondence with the CA secret key 529. The signature algorithm 526 is identification information indicating the signature generation algorithm used for the generation of the root CA signature 528. The root CA signature 528 is a piece of signature data generated by performing the signature generation algorithm S4 on the pieces of information included in the CA certificate 521 such as the issuer 522, the certificate ID 523, the CA public key 524, and the signature algorithm 526, with the use of the root CA secret key 531. The root CA secret key 531 is a secret key that is unique to the root CA.

Here, for example, the CA may be a selling company of the mobile phone 400, and the root CA may be an official certificate issuing organization. Further, it is acceptable to have an arrangement wherein the OS certificate 482 of the secure OS 481 controlling the music decryption program 476, a certificate assigned to the mobile phone 400, or a certificate of the manufacturing maker of the secure OS 481 is used in place of the maker certificate 511.

In the present modification example, the key storing unit 464 stores therein the root CA public key instead of the CA public key 466. The root CA public key is a key that is in correspondence with the root CA secret key 531. Further, the revocation list storing unit 461 stores therein the maker revocation list and the CA revocation list in addition to the application revocation list 462. The maker revocation list is a list that includes certificate IDs of revoked maker certificates. The CA revocation list is a list that includes certificate IDs of revoked CA certificates.

The application verification unit 468 firstly reads the CA certificate 521 and the root CA public key and performs signature verification by performing the signature verification algorithm V4 on the root CA signature 528 included in the CA certificate 521, with the use of the read root CA public key. The signature verification algorithm V4 is an algorithm for verifying signature data generated with the signature generation algorithm S4.

In the case where the signature verification has failed, the application verification unit 468 discontinues the processing thereafter and instructs the application revocation unit 429 to revoke the music decryption program 476.

In the case where the signature verification has been successful, the application verification unit 468 judges whether or not the certificate ID 523 included in the CA certificate 521 is registered in the CA revocation list. In the case where the certificate ID 523 is registered, the application verification unit 468 discontinues the processing thereafter and instructs the application revocation unit 429 to revoke the music decryption program 476.

If the certificate ID 523 is not registered, the application verification unit 468 then reads the maker certificate 511 and performs signature verification by performing the signature verification algorithm V3 on the CA signature 518 included in the read maker certificate 511, with the use of the CA public key 524 included in the CA certificate 521. The signature verification algorithm V3 is an algorithm for verifying signature data generated with the signature generation algorithm S3.

In the case where the signature verification has failed, the application verification unit 468 discontinues the processing thereafter and instructs the application revocation unit 429 to revoke the music decryption program 476.

In the case where the signature verification has been successful, the application verification unit 468 judges whether or not the certificate ID 513 included in the maker certificate 511 is registered in the maker revocation list. In the case where the certificate ID 513 is registered, the application verification unit 468 discontinues the processing thereafter and instructs the application revocation unit 429 to revoke the music decryption program 476.

In the case where the certificate ID 513 is not registered, the application verification unit 468 reads the application certificate 501 and performs signature verification by performing the signature verification algorithm V2 on the maker signature 508 included in the read application certificate 501, with the use of the maker public key 514 included in the maker certificate 511. The signature verification algorithm V2 is an algorithm for verifying signature data generated with the signature generation algorithm S2.

In the case where the signature verification has failed, the application verification unit 468 discontinues the processing thereafter and instructs the application revocation unit 429 to revoke the music decryption program 476.

In the case where the signature verification has been successful, the application verification unit 468 then judges whether or not the certificate ID 503 included in the application certificate 501 is registered in the application revocation list 462. In the case where the certificate ID 503 is registered, the application verification unit 468 instructs the application revocation unit 429 to revoke the music decryption program 476.

In the case where the certificate ID 503 is not registered, the application verification unit 468 judges that the music decryption program 476 is a valid program.

Since the verification processing is performed in the double or triple manner, it is possible to maintain a high security level. Further, since the use of the maker certificate is introduced, it is possible to revoke all the programs developed by a specific maker.

It is acceptable to perform verification processing also on the secure OS 481 in the same manner, with the use of a plurality of certificates.

Figure 57:
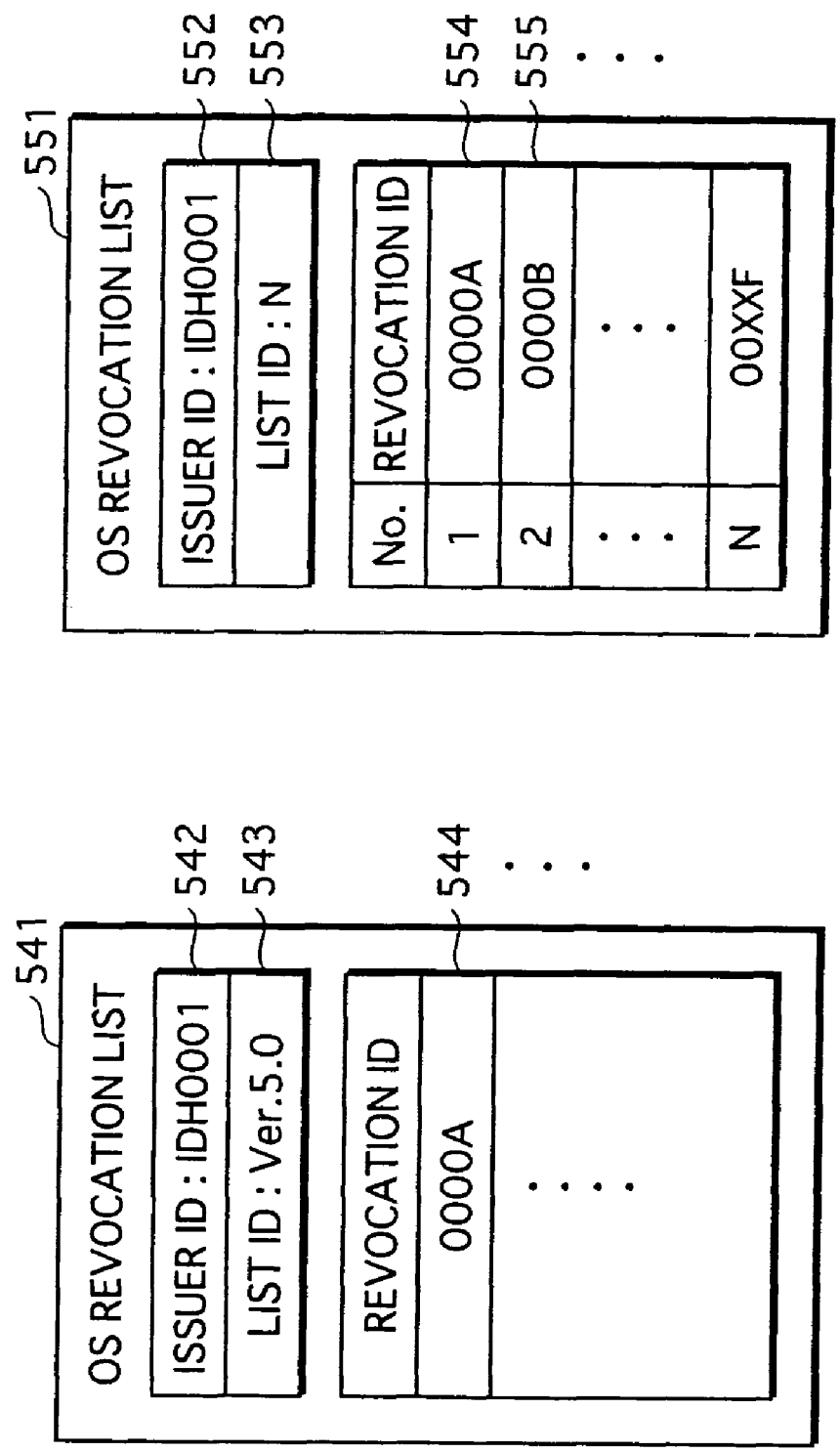
FIG. 57 shows an example of a configuration of an OS revocation list.

2.6 Other modification examples (1) In the second embodiment described above, the OS revocation list includes a date on which the OS revocation list is generated as the list ID; however it is acceptable that the OS revocation list includes a version number as the list ID 543, like the OS revocation list 541 shown in FIG. 57. Version information is a number that indicates the generation of each OS revocation list, and the larger the value is, the newer the OS revocation list is.

Further, as shown in the OS revocation list 551, it is acceptable that the OS revocation list includes the total number of the revocation IDs as the list ID 553. Since there is no possibility that the total number of the revoked programs decreases, by using the total number of the revocation IDs as the list ID, it is possible to make a judgment on the basis that the larger the value of the list ID is, the newer the OS revocation list is.

(2) In the description above, the revocation list issuing apparatus 250 generates the OS revocation list and the application revocation list; however, it is acceptable to have an arrangement wherein the application revocation list and the OS revocation list are issued by different sources.

For example, the OS revocation list may be generated and issued by a revocation list issuing apparatus managed by an operating system development company. The application revocation list may be generated an issued by a revocation list issuing apparatus managed by an application development company.

(3) In the embodiment and modification examples described above, it is acceptable to have an arrangement wherein the OS verification unit verifies the secure applications, whereas the application verification unit verifies the secure OS.

In the case where the development company of the secure applications is different from that of the secure OS, it is possible to enhance the safety level by performing mutual verification in this manner.

(4) Further, the application revocation list and the OS revocation list transmitted by the revocation list issuing apparatus 250 are always the most updated ones, and there is no possibility that the application revocation list 422 and the OS revocation list 423 stored in the revocation list storing unit 421 are newer than the transmitted ones. Accordingly, it is acceptable to have an arrangement wherein the revocation list updating unit 424 omits the comparison of the list IDs described above when performing the updating of the application revocation list and the OS revocation list, and updates the application revocation list 422 and the OS revocation list 423 with the application revocation list and the OS revocation list received from the revocation list issuing apparatus 250 unconditionally if the signature verification has been successful.

(5) In the embodiment described above, when the switch control unit 106 outputs a connection instruction, the verification processing is performed on the programs stored in the secure memory 413; however, the timing at which the verification processing is performed is not limited to this example, and it is acceptable to perform the verification processing when the power source of the mobile phone 400 is turned on or when each of the programs is activated.

3. Third Embodiment

The following describes the third embodiment of the present invention.

The mobile phone in the present embodiment is connected to a revocation list issuing apparatus via a mobile phone network and the Internet, like in the second embodiment.

3.1 The Revocation List Issuing Apparatus

The revocation list issuing apparatus according to the present embodiment comprises, like the revocation list issuing apparatus 250 in the second embodiment, a communication unit, a signature generating unit, a key storing unit, a hash generating unit, a control unit, an information storing unit 610, an input unit, and a display unit.

The configurations and the operations of the communication unit, the signature generating unit, the key storing unit, the hash generating unit, the input unit, and the display unit are similar to those of the communication unit 251, the signature generating unit 252, the key storing unit 253, the hash generating unit 254, the input unit 262, and the display unit 263 included in the revocation list issuing apparatus 250. The hash-generating unit generates OS digest data from an OS matrix revocation list (to be described later) and also generates application digest data from an application matrix revocation list (to be described later) instead of the OS revocation list and the application revocation list. Explanation of these elements will be omitted. Description will be provided only for the information storing unit 610 and the control unit which form the feature of the present embodiment.

(1) The Information Storing Unit 610

Figure 58:
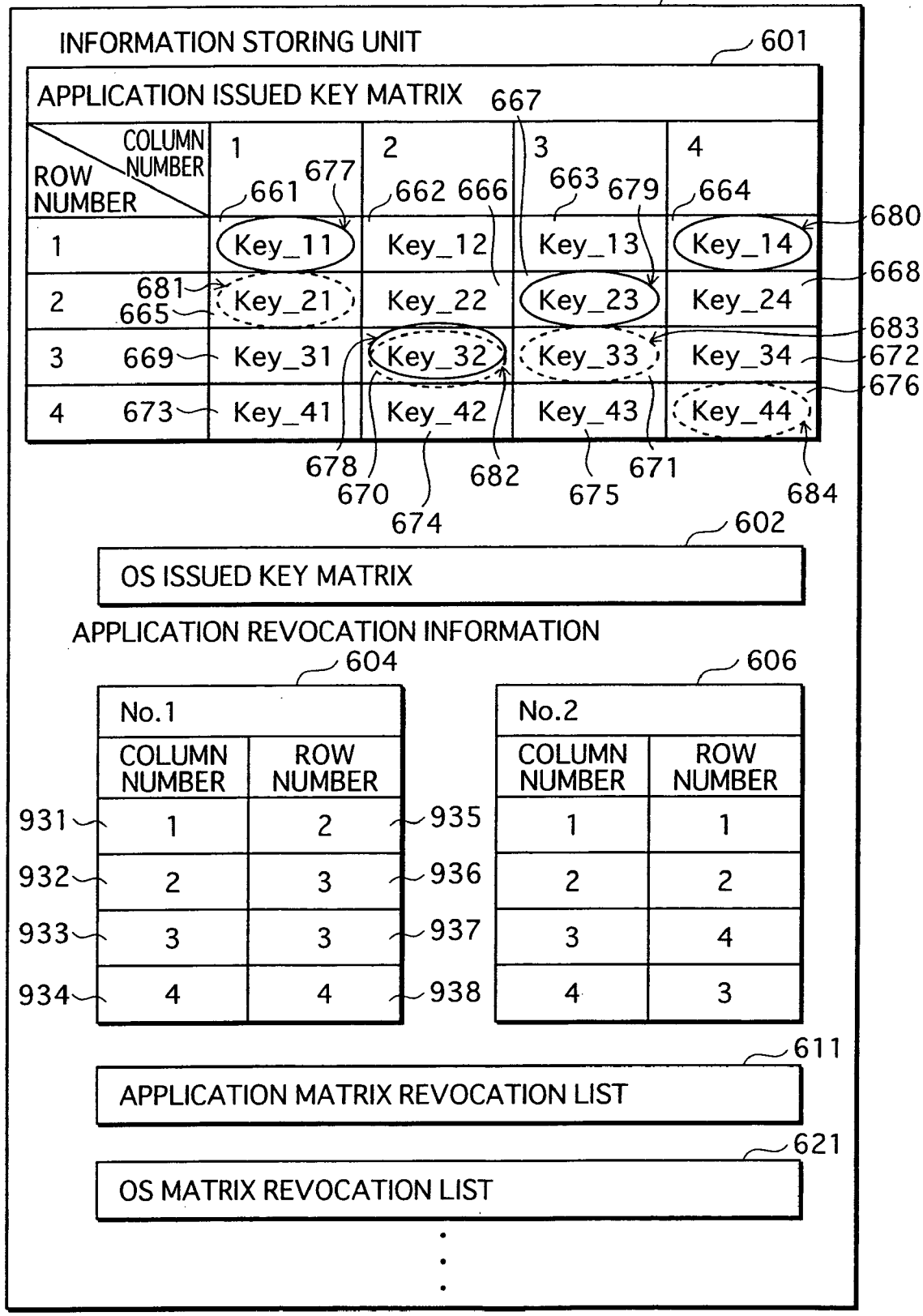
FIG. 58 shows an example of information stored in the information storing unit 610 of the revocation list issuing apparatus in the third embodiment.

The information storing unit 610 stores therein, as shown in FIG. 58, an application issued key matrix 601, an OS issued key matrix 602, pieces of application revocation information 604, 606, and so on, the application matrix revocation list 611, and the OS matrix revocation list 621.

<The Application Issued Key Matrix 601 and the OS Issued Key Matrix 602>

As shown in FIG. 58, in the application issued key matrix 601, sixteen issued keys such as Key_11, Key_12, Key_13 and so on are arranged as the matrix elements of a matrix having four rows by four columns. Each of these issued keys is a piece of key data having a 64-bit length and being generated with the use of a pseudo random number, for example.

In the application issued key matrix 601, the row numbers "1", "2", "3", and "4" are arranged vertically from the top, and the column numbers "1", "2", "3", and "4" are arranged horizontally from the left.

The matrix element 661 in correspondence with the row number "1" and the column number "1" is the issued key, Key_11. The matrix element 662 in correspondence with the row number "1" and the column number "2" is the issued key, Key_12. The matrix element 663 in correspondence with the row number "1" and the column number "3" is the issued key, Key_13. The matrix element 664 in correspondence with the row number "1" and the column number "4" is the issued key, Key_14.

Likewise, the matrix elements 665 to 668 that are in correspondence with the row number "2" and the column numbers "1" through "4" respectively are the issued keys, Key_21, Key_22, Key_23, and Key_24. The matrix elements 669 to 672 that are in correspondence with the row number "3" and the column numbers "1" through "4" respectively are the issued keys, Key_31, Key_32, Key_33, and Key_34. The matrix elements 673 to 676 that are in correspondence with the row number "4" and the column numbers "1" through "4" respectively are the issued keys, Key_41, Key_42, Key_43, and Key_44.

In the present embodiment, four issued keys each selected from a different one of the columns in the application issued key matrix 601 are assigned to each secure application. The combination of four issued keys is different for each of the applications.

For example, four issued keys such as Key_11, Key_32, Key_23, and Key_14 being shown with solid-line circles 677, 678, 679, and 680 in the application issued key matrix 601 are assigned to the music decryption program (to be described later) to be executed on the mobile phone. Further, four issued keys such as Key_21, Key_32, Key_33, and Key_44 being shown with broken-line circles 681, 682, 683, and 684 are assigned to another secure application (called Application B) being different from the music decryption program.

The OS issued key matrix 602 has the similar configuration as the application issued key matrix 601. Sixteen issued keys are arranged as the matrix elements of a matrix having four rows by four columns.

<The Application Revocation Information 604, 606, . . . . >

In order to simplify the explanation of the application revocation information 604, 606 and so on, description is firstly provided for an application unique key matrix and an OS unique key matrix.

FIG. 59 shows the application unique key matrix 592 included in an encrypted music decryption program 591 (to be described later) and the OS unique key matrix 597 included in an encrypted secure OS 596 (to be described later) that are stored in the mobile phone of the present embodiment.

The application unique key matrix 592 is in one-to-one correspondence with the music decryption program generated by decrypting the encrypted music decryption program 591 and includes four issued keys assigned to the music decryption program. The application unique key matrix 592 includes four pieces of key information 901, 902, 903, and 904. Each piece of key information includes a column number, a row number, and an issued key. The key information 901 includes the issued key, Key_11 which is assigned to the music decryption program out of the matrix elements on the first column of the application issued key matrix 601, and the row number "1" and the column number "1" that are in correspondence with the Key_11 in the application issued key matrix 601. The key information 902 includes the issued key, Key_32 which is assigned to the music decryption program out of the matrix elements on the second column of the application issued key matrix 601, and the row number "3"

and the column number "2" that are in correspondence with the Key_32 in the application issued key matrix 601. The key information 903 includes the issued key, Key_23 which is assigned to the music decryption program out of the matrix elements on the third column of the application issued key matrix 601, and the row number "2" and the column number "3" that are in correspondence with the Key_23 in the application issued key matrix 601. The key information 904 includes the issued key, Key_14 which is assigned to the music decryption program out of the matrix elements on the fourth column of the application issued key matrix 601, and the row number "1" and the column number "4" that are in correspondence with the Key_14 in the application issued key matrix 601.

The OS unique key matrix 597 has the same configuration as the application unique key matrix and includes the pieces of key information 906, 907, 908, and 909. Each piece of key information includes a column number, a row number, and an issued key.

Four issued keys each selected from a different one of the columns in the OS issued key matrix 602 are assigned to the secure OS generated by decrypting the encrypted secure OS 596 according to the present embodiment. The combination of four issued keys is different for each operating system.

Each piece of key information 906 to 909 includes unique keys each selected from a different one of the columns of the OS unique key matrix 602 and assigned to a secure OS, as well as a column number and a row number in the OS unique key matrix 602 that are in correspondence with the unique key.

Each of the pieces of application revocation information 604, 606, and so on is obtained by extracting the column numbers and the row numbers from pieces of key information in the application unique key matrix for revoked applications.

For example, the application revocation information 604 is in correspondence with the aforementioned Application B. The application revocation information 604 includes, as shown in FIG. 58, four column numbers, namely "1"_931, "2"_932, "3"_933, and "4"_934, and the row numbers 935 to 938 that are in correspondence with these column numbers respectively. The column number "1"_931 and the row number "2"_935 are in correspondence with the issued key Key_21 that is selected from the first column of the application issued key matrix 601 and is assigned to Application B. The column number "2"_932 and the row number "3"_936 are in correspondence with the issued key Key_32 that is selected from the second column of the application issued key matrix 601 and is assigned to Application B. In the same manner, the column number "3"_933 and the row number "3"_937 are in correspondence with the issued key Key_33. The column number "4" and the row number "4" are in correspondence with the issued key Key_44.

Also, although not shown in the drawing specifically, the information storing unit 610 stores therein OS revocation information obtained by extracting column numbers and row numbers from pieces of key information in the OS unique key matrix for revoked operating systems.

<The Application Matrix Revocation List 611 and the OS Matrix Revocation List 621>

The application matrix revocation list 611 includes, as shown in FIG. 60, sixteen matrix elements 911 to 926 that are arranged in a matrix having four rows by four columns. For the convenience of explanation, a matrix element positioned at the row i, column j will be referred to as a variable Mij.

The variable Mij is generated by performing an encryption algorithm E2 on a decryption key for decrypting encrypted applications including the encrypted music decryption program 591, with the use of an issued key positioned at the row i, the column j of the application issued key matrix 601. The expression "Enc (Key_ij, decryption key)" denotes a result obtained by encrypting the decryption key using the issued key Key_ij. For example, the variable M11 which is the matrix element 911 with the row number "1" and the column number "1" is obtained by encrypting the decryption key using the issued key Key_11 being the matrix element 661 with the row number "1" and the column number "1".

Here, the application matrix revocation list 611 is generated in the case where the application revocation information 604 is the only piece of application revocation information stored in the information storing unit 610. In such a case the matrix elements M21, M32, M33, and M44 that are in correspondence with the row numbers and the column numbers included in the application revocation information 604 are obtained by encrypting a piece of dummy data "0000", instead of the decryption key, with the use of the issued keys.

The OS matrix revocation list 621 has the same configuration as the application matrix revocation list 611 and includes sixteen matrix elements that are arranged in a matrix having four rows by four columns. The matrix element positioned at the row i, the column j is obtained by encrypting the decryption key for decrypting encrypted operating systems including the encrypted secure OS 596, with the use of the issued key positioned at the row i, column j of the OS issued key matrix 602. It should be noted, however, that matrix elements that are in correspondence with the row numbers and the column numbers included in the OS revocation information are each obtained by encrypting apiece of dummy data instead of the decryption key.

Further, although not shown in the drawing specifically, each of the application matrix revocation list 611 and the OS matrix revocation list includes a list ID that shows the age of the list.

(2) The Control Unit

The control unit receives a list request from the mobile phone via the Internet. When having received the list request, the control unit reads the OS matrix revocation list 621 and the application matrix revocation list 611 from the information storing unit 610 and transmits, to the mobile phone, an OS matrix revocation list with signature and an application matrix revocation list with signature to which signatures generated by the hash generating unit and the signature generating unit are appended. Since these generation and transmission are the same as the generation and the transmission of the OS revocation list with signature and the application revocation list with signature performed by the control unit 257 in the second embodiment, detailed description thereof will be omitted.

Further, the control unit receives, from the user via the input unit, an input of a new piece of application revocation information and an instruction that an application matrix revocation list should be generated. According to a received instruction, the control unit generates a new application matrix revocation list.

Further, the control unit receives an input of a new piece of OS revocation information and an instruction that an OS matrix revocation list should be generated. According to a received instruction, the control unit generates a new OS matrix revocation list.

Figure 61:
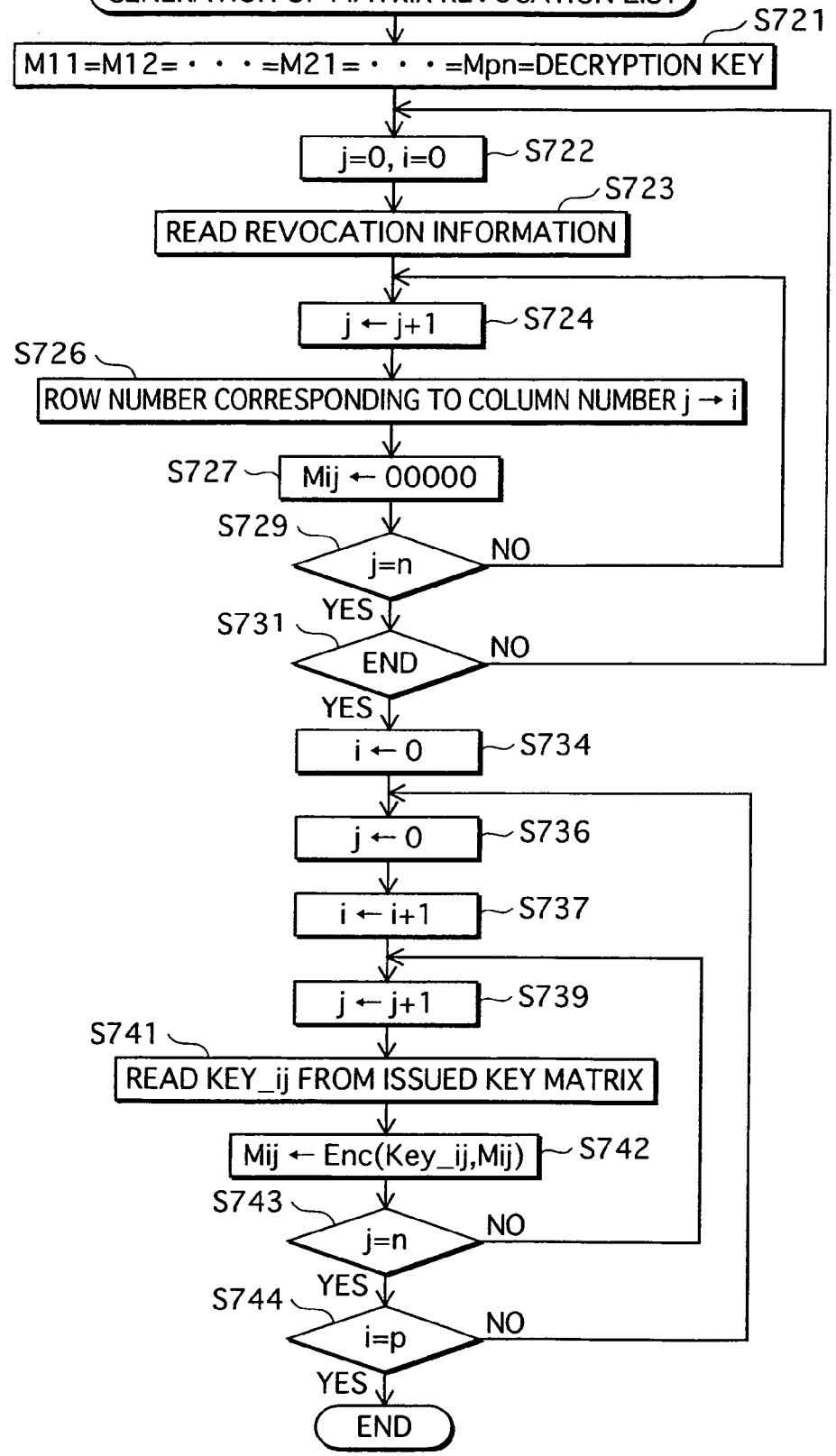
FIG. 61 is a flow chart that shows the processing procedure to generate an application matrix revocation list.

The following describes the operation for generating an application matrix revocation list, with reference to the flow chart in FIG. 61. It should be noted, in the present embodiment, in each of the application issued key matrix 601 and the application matrix revocation list, sixteen elements are arranged in a matrix having four rows by four columns; however, the present invention is not limited to this example. In the flow chart, in order to be more general, description is provided for a case where elements are arranged in a matrix having p rows by n columns, where p and n are integers being 1 or larger.

Firstly, the control unit assigns a decryption key to each of the "p×n" pieces of matrix elements, M11, M12, . . . Mpn (Step S721). Each of the variable j in which the column number is stored and the variable i in which the row number is stored is initialized with 0 (Step S722).

Secondly, the control unit reads the application revocation information (Step S723), and adds 1 to the variable j (Step S724). The control unit then extracts a row number that is in correspondence with the column number j in the read application revocation information, and assigns the extracted row number to the variable i (Step S726).

Subsequently, the control unit assigns dummy data "0000" to the matrix element Mij (Step S727). Then, the control unit judges whether or not the variable j=n is satisfied (Step S729). In the case where j=n is not satisfied (Step S729: NO), the procedure returns to Step S724, and the processing in Steps S724 to S729 is repeated until j=n is satisfied.

In the case where the judgment result is that the variable j=n is satisfied (Step S729: YES), the control unit judges whether or not all pieces of application revocation information stored in the information storing unit 610 have been read (Step S731). In the case where not all pieces have been read (Step S731: NO), the procedure returns to Step S722 and the processing in Steps S722 through 731 is repeated for a next piece of application revocation information.

In the case where it is judged that all pieces of application revocation information have been read (Step S731: YES), the control unit assigns 0 to the variable i (Step S734), and assigns 0 to the variable j (Step S736). Subsequently, the control unit adds 1 to the variable i (Step S737), and adds 1 the variable j (Step S739).

The control unit reads the issued key Key_ij from an intersection of the row i and the column j of the application issued key matrix 601 (Step S741). The control unit then generates Enc (Key_ij, Mij) by performing the encryption algorithm E2 on the matrix element Mij with the use of the read issued key, Key_ij, and assigns the generated Enc (Key_ij, Mij) to Mij (Step S742).

In the case where the variable j=n is satisfied (Step S743: YES), the procedure advances to Step S744. In the case where the variable j=n is not satisfied (Step S743: NO), the procedure returns to Step S739 and the processing in Steps S739 to S743 is repeated until the variable j=n is satisfied.

Subsequently, in the case where the variable i=p is satisfied (Step S744: YES), the generation processing of the application matrix revocation list is finished.

In the case where the variable i=p is not satisfied (Step S744: NO), the procedure returns to Step S736, and the processing in Steps S736 to S744 is repeated until i=p is satisfied.

It should be noted that the OS matrix revocation list is generated in the same manner with the use of the OS issued key matrix and the OS revocation information.

3.2 The Mobile Phone

The mobile phone in the present embodiment has a similar configuration to the mobile phone 400 according to the second embodiment. Accordingly, explanation of the same elements as in the second embodiment will be omitted. Description will be provided for only the features of the present embodiment.

(1) The Secure Memory 613

Figure 62:
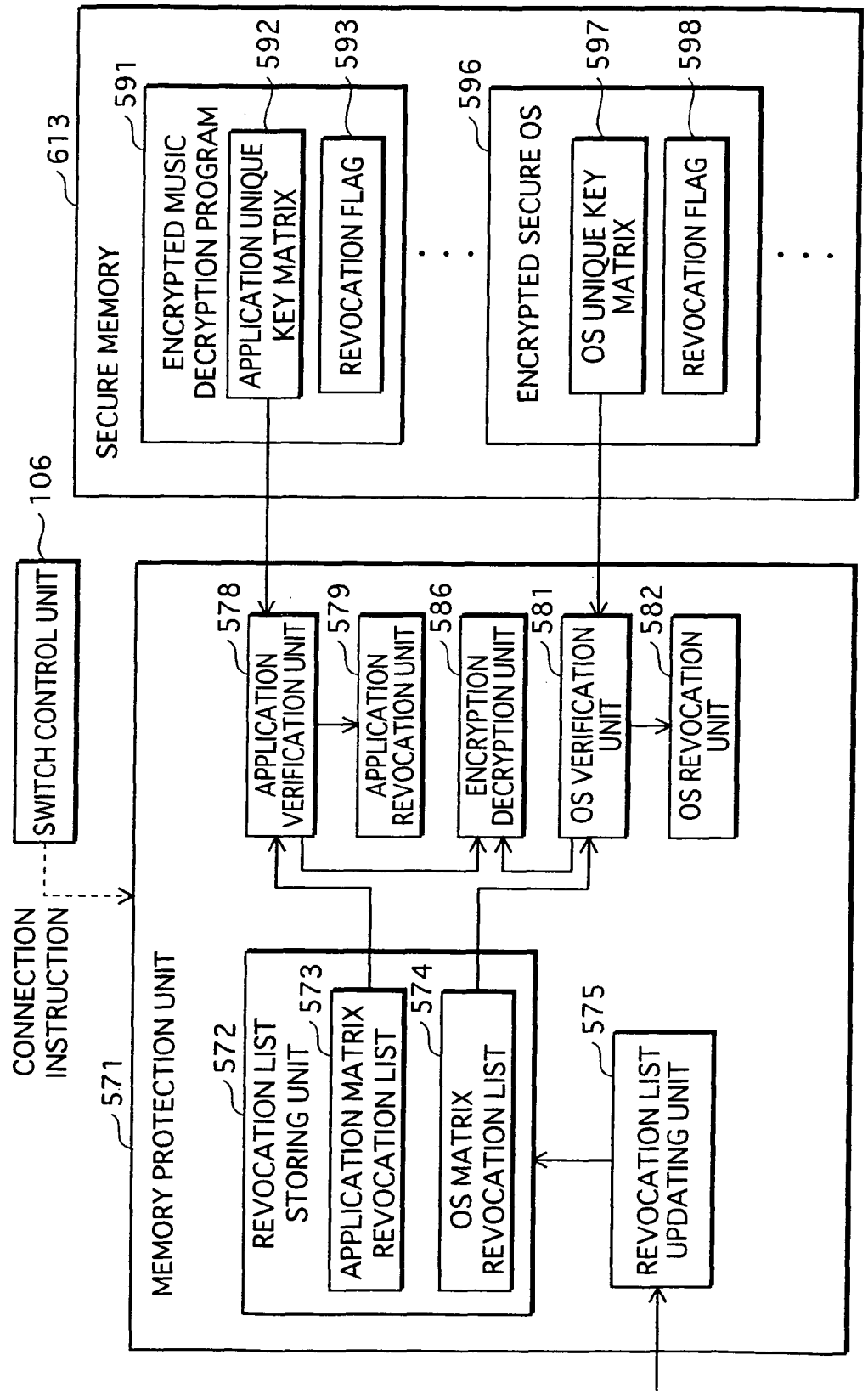
FIG. 62 is a block diagram that shows the configurations of a memory protection unit 571 and a secure memory 613 included in a mobile phone in the third embodiment.

The secure memory 613 stores therein, for example, an encrypted music decryption program 591 and an encrypted secure OS 596, as shown in FIG. 62.

The encrypted music decryption program 591 is generated by performing the encryption algorithm E3 on a music decryption program which includes a music decryption procedure that is the same as the one included in the music decryption program 446 of the second embodiment. Further, the encrypted music decryption program 591 includes, in the header portion, the application unique key matrix 592 that is unique to the music decryption program and a revocation flag 593. The description of the application unique key matrix 592 has already been provided. The revocation flag 593 is a flag that indicates whether the music decryption program is invalid or valid. In the case where the revocation flag 593 is "0", the music decryption program is valid, whereas in the case where the revocation flag 593 is "1", the music decryption program is invalid.

The encrypted secure OS 596 is generated by performing the encryption algorithm E3 on a secure OS having the same operating function as the secure OS 441 of the second embodiment. The encrypted secure OS 596 includes, in the header portion, the OS unique key matrix 597 that is unique to the secure OS and a revocation flag 598. The description of the OS unique key matrix 597 has already been provided.

The revocation flag 598 is a flag that indicates whether the secure OS is invalid or valid. In the case where the revocation flag 598 is "0", the secure OS is valid. In the case where the revocation flag 598 is "1", the secure OS is invalid.

(2) The Memory Protection Unit 571

The memory protection unit 571 comprises, as shown in FIG. 62, a revocation list storing unit 572, a revocation list updating unit 575, an application verification unit 578, an application revocation unit 579, an OS verification unit 581, an OS revocation unit 582, and an encryption decryption unit 586.

The revocation list storing unit 572 stores therein an application matrix revocation list 573 and an OS matrix revocation list 574. The application matrix revocation list 573 and the OS matrix revocation list 574 have the same configurations as the application matrix revocation list 611 and the OS matrix revocation list stored in the information storing unit 610 of the revocation list issuing apparatus.

The operation of the revocation list updating unit 575 is the same as the revocation list updating unit 424 of the second embodiment. The revocation list updating unit 575 updates the application matrix revocation list and the OS matrix revocation list instead of the application revocation list and the OS revocation list.

Since the operations of the application revocation unit 579 and the OS revocation unit 582 are the same as those of the application revocation unit 429 and the OS revocation unit 432 in the second embodiment, description will be omitted.

<The Application Verification Unit 578 and the OS Verification Unit 581>

The application verification unit 578 generates a decryption key for the encrypted music decryption program 591 with the use of the application unique key matrix 592 included in the encrypted music decryption program 591 and the application matrix revocation list 573 included in the revocation list storing unit 572. In the case where the decryption key has been correctly generated, the application verification unit 578 judges that the music decryption program is valid. In the case where the decryption key has not been correctly generated, the application verification unit 578 judges that the music decryption program is invalid. The procedure of the verification processing for the music decryption program above will be described in detail later.

Having judged that the music decryption program is valid, the application verification unit 578 outputs the generated decryption key to the encryption decryption unit 586 and instructs the encryption decryption unit 586 to decrypt the encrypted music decryption program 176.

Having judged that the music decryption program is invalid, the application verification unit 578 instructs the application revocation unit 579 to perform revocation.

The OS verification unit 581 judges whether the secure OS generated by decrypting the encrypted secure OS 596 is valid or invalid, in the same manner as the application verification unit 578. In the present example, the OS unique key matrix 597 and the OS matrix revocation list 574 are used in place of the application unique key matrix 592 and the application matrix revocation list 573.

<The Encryption Decryption Unit 586>

The encryption decryption unit 586 receives a decryption key for the encrypted secure OS 596 from the OS verification unit 581 and is instructed to perform decryption. When being instructed to perform decryption, the encryption decryption unit 586 performs a decryption algorithm D3 on the encrypted secure OS 596 within the secure memory 613, with the use of the received decryption key, so as to generate a secure OS.

Further, the encryption decryption unit 586 receives a decryption key for the encrypted music decryption program 591 from the application verification unit 578 and is instructed to perform decryption. The encryption decryption unit 586 performs the decryption algorithm D3 on the encrypted music decryption program 591 with the use of the received decryption key, so as to generate a music decryption program.

Here, D3 is an algorithm for decrypting an encrypted data generated with the encryption algorithm E3 and is, for example, DES, AES (Advanced Encryption Standard), or the like.

Further, the encryption decryption unit 586 detects a disconnection instruction outputted from the switch control unit 576 to instruct that the secure memory 613 should be disconnected from the bus 130. When having detected a disconnection instruction, the encryption decryption unit 586 encrypts the music decryption program and the secure OS with the use of the received decryption key so as to generate the encrypted music decryption program 591 and the encrypted secure OS 596.

(3) The Verification Operation Performed by the Memory Protection Unit 571

Figure 63:
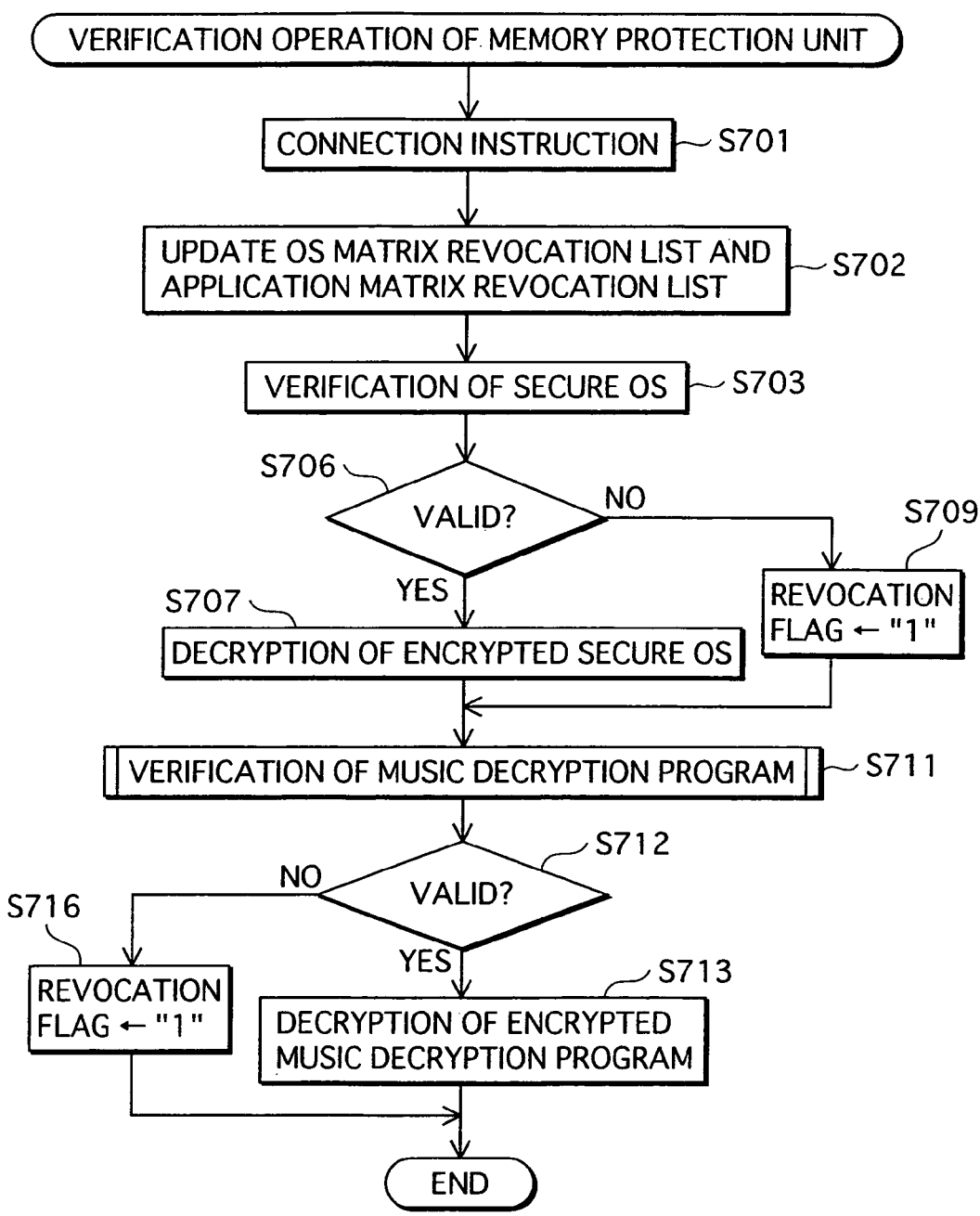
FIG. 63 is a flow chart that shows a verification operation performed by the memory protection unit 571.

The following describes the verification operation performed by the memory protection unit 571 on programs within the secure memory 613, with reference to the flow chart in FIG. 63.

The memory protection unit 571 receives a connection instruction (Step S701). When the memory protection unit 571 has received the connection instruction, the revocation list updating unit 575 obtains the most updated application matrix revocation list and the most updated OS matrix revocation list from the revocation list issuing apparatus via the internet and updates the application matrix revocation list 573 and the OS matrix revocation list 574 that are stored in the revocation list storing unit 572 (Step S702). The processing in Step S702 performed by the revocation list updating unit 575 is the same as the processing in Steps S672 through S679 (FIG. 49) performed by the revocation list updating unit 424 in the second embodiment. The differences are that the OS revocation list is replaced with the OS matrix revocation list, and the application revocation list is replaced with the application matrix revocation list.

Subsequently, the OS verification unit 581 verifies the secure OS (Step S703). In the case where the OS verification unit 581 judges that the secure OS is valid, (Step S706: YES), the OS verification unit 581 instructs the encryption decryption unit 586 to decrypt the encrypted secure OS 596. The encryption decryption unit 586 decrypts the encrypted secure OS 596 so as to generate the secure OS (Step S707).

In the case where the OS verification unit 581 judges that the secure OS is invalid (Step S706: NO), the OS verification unit 581 instructs the OS revocation unit 582 to set the revocation flag 598 to be "1" (Step S709).

Subsequently, the application verification unit 578 verifies if the music decryption program is valid or invalid (Step S711). In the case where the application verification unit 578 judges that the music decryption program is valid (Step S712: YES), the encryption decryption unit 586 decrypts the encrypted music decryption program 591 so as to generate the music decryption program (Step S713).

In the case where the application verification unit 578 judges that the music decryption program is invalid (Step S712: NO), the application revocation unit 579 sets the revocation flag 593 to be "1" (Step S716).

(4) The Verification Processing of the Music Decryption Program

Figure 64:
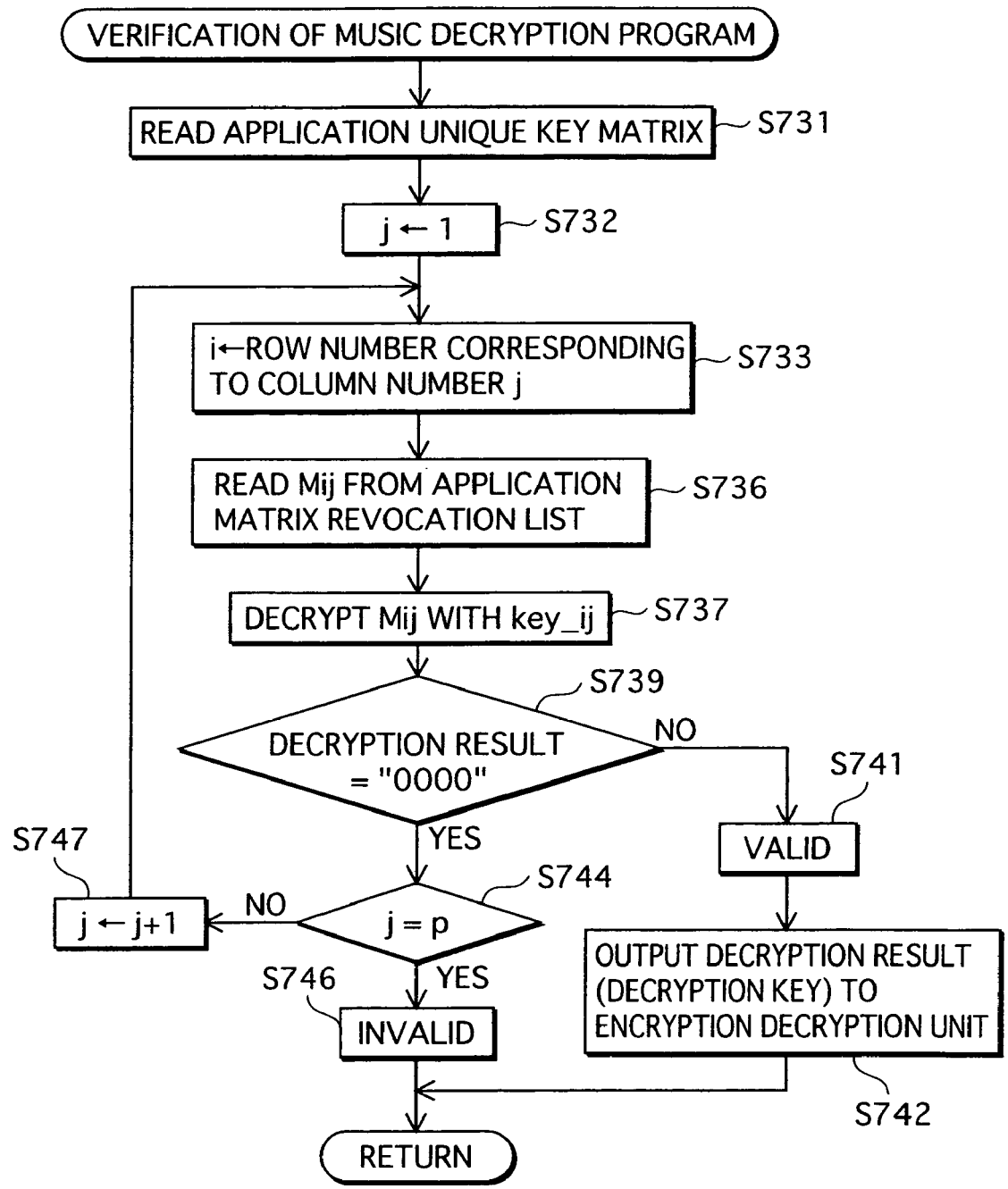
FIG. 64 is a flow chart that shows a verification operation for a music decryption program 592, performed by the application verification unit 578.

The following describes the verification processing of the music decryption program, which is performed by the application verification unit 578, with reference to the flow chart in FIG. 64. This is the detail of the processing in Step S711 in FIG. 63. In the present embodiment, the application matrix revocation list 573 is made up of a matrix having four rows by four columns. The application unique key matrix 592 is configured to include four piece of key information; however, in this description, explanation is provided for a case where, more generally, the application matrix revocation list 573 is made up of a matrix having n rows by p columns, and the application unique key matrix 592 includes p pieces of key information.

The application verification unit 578 reads the application unique key matrix 592 (Step S731). For the convenience of explanation, a variable i indicating the row number and a variable j indicating the column number are used in the explanation.

The application verification unit 578 assigns 1 to the variable j (Step S732) and assigns a row number that corresponds to the column number j in the application unique key matrix 592 to the variable i (Step S733).

Subsequently, the application verification unit 578 reads the matrix element Mij from the application matrix revocation list 573 (Step S736). The application verification unit 578 extracts an issued key, Key_ij from the application unique key matrix 592 and performs the decryption algorithm D2 on the read matrix element Mij with the use of the extracted issued key Key_ij so as to perform decryption (Step S737). In the case where the decryption result is not "0000", (Step S739: NO), the application verification unit 578 judges that the music decryption program is valid (Step S741), and outputs the decryption result, that is a decryption key for the encrypted music decryption program 591, to the encryption decryption unit 586 (Step S742).

In the case where the processing result is "0000" (Step S739: YES), the application verification unit 578 subsequently judges whether or not the variable j=p is satisfied. In the case where j=p is not satisfied (Step S744: NO), 1 is added to the variable j (Step S747), and the procedure returns to Step S733.

In the case where the variable j=p is satisfied (Step S744: YES), the application verification unit 578 judges that the music decryption program is invalid (Step S746).

It should be noted that the verification processing of the secure OS performed by the OS verification unit 581 in Step S703 is obtained by, in the flow chart in FIG. 61, replacing the application unique key matrix with the OS unique key matrix and replacing the application matrix revocation list with the OS matrix revocation list; therefore, explanation thereof will be omitted.

3.3 Summary and Effects

As explained so far, in the third embodiment, the encrypted music decryption program 591 and the encrypted secure OS 596 within the secure memory 613 in the mobile phone include the application unique key matrix 592 and the OS unique key matrix 597 that are unique to the encrypted music decryption program 591 and the encrypted secure OS 596 respectively.

The memory protection unit 571 judges whether the music decryption program is valid or invalid based on the application matrix revocation list 573 and the application unique key matrix 592. Only in the case where the music decryption program is valid, it is possible to generate a decryption key from the application matrix revocation list 573.

Also for the secure OS, in the same manner, the memory protection unit 571 judges whether or not the secure OS is valid or invalid using the OS matrix revocation list 574 and the OS unique key matrix.

The following discusses a case where an application manufacturing company encrypts a plurality of application with the use of one encryption key using an encryption method in common and ships the applications.

Out of sixteen keys included in the application issued key matrix 601 shown in FIG. 58, four issued keys, one from each column, are assigned to each of the applications. At this time, the key assignment is arranged so that different applications do not have an exactly same combination of four issued keys. For example, the issued keys Key_11, Key_32, Key_23, and Key_14 are assigned to the music decryption program of the present embodiment, and these issued keys are included in the application unique key matrix 592 of the encrypted music decryption program 591.

The issued keys Key_21, Key_32, Key_33, and Key_44 are assigned to an application (called Application B) that is shipped from the same manufacturing company as the music decryption program, and these four issued keys are included in the application issued key matrix of the encrypted application B.

Here, in the case where that it is found after the shipment that Application B is a program that should be revoked, application revocation information 604 is added to the revocation list issuing apparatus. The application revocation information 604 is made up of row numbers and column numbers that correspond to the four issued keys assigned to Application B. The application matrix revocation list 611 generated based on the application revocation information 604 includes, as shown in FIG. 60, pieces of dummy data in the matrix element M21, M32, M33, and M44; therefore, it is not possible to generate a decryption key from the four issued keys assigned to the encrypted Application B.

As shown in FIG. 58, Key_32 is assigned to the music decryption program, too, but according to the verification processing explained with reference to the flow chart in FIG. 64, it is possible to generate a decryption key from the other issued keys.

As explained so far, by having an arrangement wherein a plurality of issued keys are assigned to each application and a decryption key is generated with the use of an application revocation list and issued keys, it is possible to revoke only applications that should be revoked even if the applications are encrypted using a method in common.

Further, the encryption decryption unit 586 encrypts the applications including the secure OS and the music decryption program once again when the secure memory 613 is disconnected from the bus. Accordingly, while the programs within the normal memory are using the CPU, it is possible to protect the programs within the secure memory 613 in the more assured manner. Further, when such a configuration is used, the memory protection unit does not need to physically disconnect the bus from the secure memory 613.

3.4 Modification Examples (1) In the third embodiment, every time the memory protection unit 571 receives a connection instruction from the switch control unit 106, the memory protection unit 571 obtains the most updated OS matrix revocation list and the most updated application matrix revocation list via the communication control unit and updates these lists so as to verify the programs within the secure memory 613; however, the timing at which the OS matrix revocation list and the application matrix revocation list are updated and the timing at which the programs within the secure memory 613 are verified are not limited to this example.

For example, the updating processing and the verification processing may be performed when the mobile phone is activated or may be performed regularly, for example once a day. Alternatively, it is acceptable to have an arrangement wherein the OS matrix revocation list and the application matrix revocation list are updated when the mobile phone is activated, and the programs are verified when a connection instruction is received after the mobile phone is activated.

Alternatively, it is acceptable to have an arrangement wherein when each program is activated, for example, when a switching processing for switching from the normal OS to the secure OS is performed, the secure OS is verified, whereas when the secure OS activates the music decryption program, the music decryption program is verified.

Further, in the embodiment described above, the memory protection unit 571 transmits a list request to the revocation list issuing apparatus so as to obtain the most updated OS matrix revocation list and the most updated application matrix revocation list; however, it is acceptable to have an arrangement wherein the most updated lists are transmitted from the revocation list issuing apparatus to the mobile phone when a program that should be revoked is newly found and a new OS matrix revocation list and a new application matrix list are generated.

(2) In the embodiment described above, the mobile phone obtains the most updated OS matrix revocation list and the most updated application matrix revocation list via the Internet; however, it is acceptable to have an arrangement wherein the mobile phone obtains the most updated lists from a recording medium such as a memory card.

(3) So far, the description has been provided using a mobile phone as an embodiment of the present invention; however, it is acceptable to embody the present invention as a communication device which is part of a LAN as described below.

It is acceptable that one of the devices included in the LAN obtains a most updated revocation list and distributes the most updated revocation list to the other devices.

Figure 65:
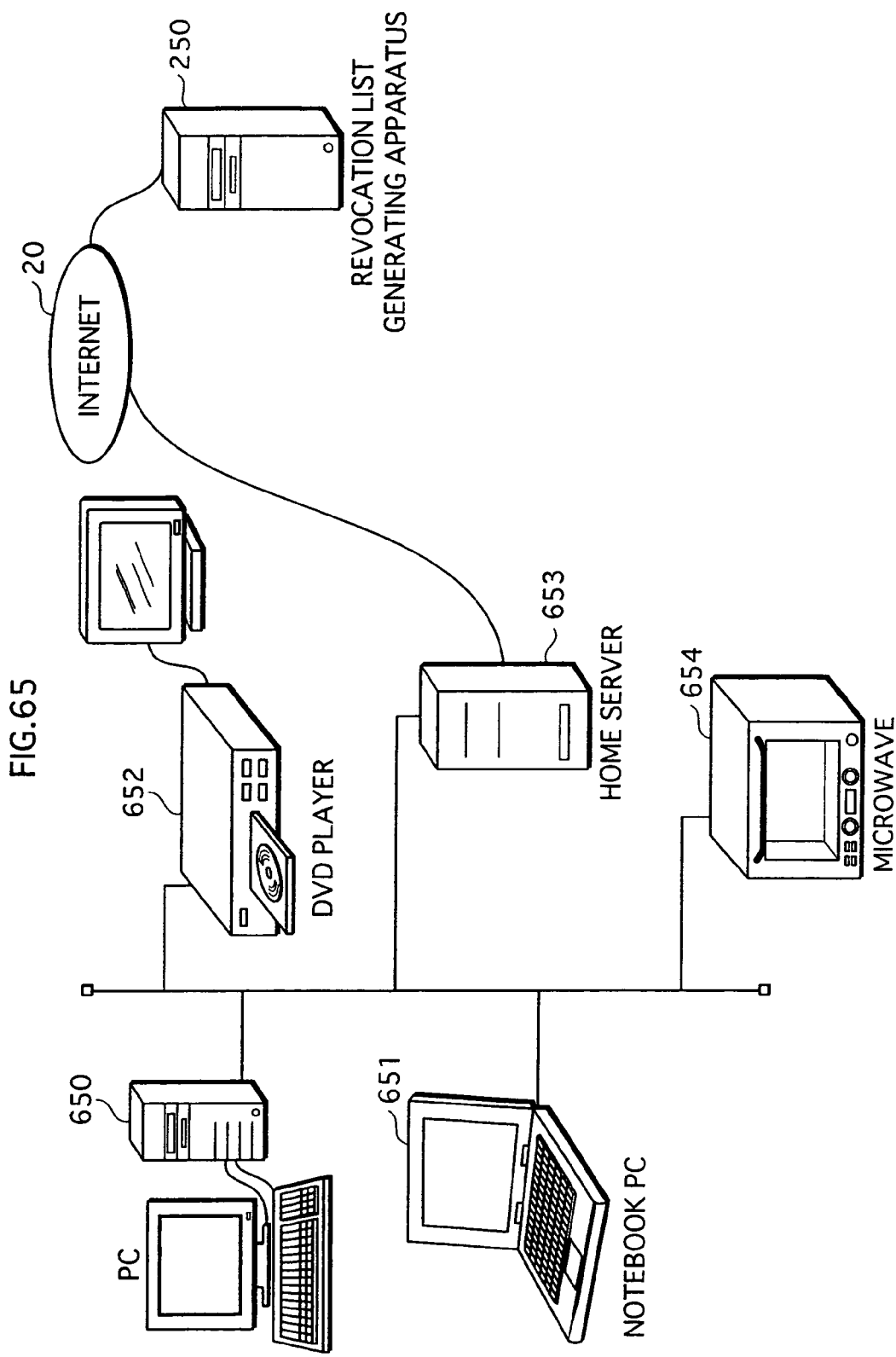
FIG. 65 is a configuration diagram that shows the configuration of a home network in a modification example of the third embodiment.

For example, these devices may form a home network, as shown in FIG. 65. The home network is constituted by connecting a PC (personal computer) 650, a notebook PC 651, a DVD player 652, a home server 653, and a microwave 654 via a bus.

Each of the devices include a secure memory which normal operating systems and applications are not able to directly access and has a function of verifying validity of applications and operating systems that are to be loaded into the secure memory and executed.

The home server 653 is connected to the Internet 20 and regularly requests for an application revocation list and an OS revocation list from the revocation list issuing apparatus 250. The home server 653 obtains a most updated application revocation list and a most updated OS revocation list from the revocation list issuing apparatus 250 via the Internet and outputs the obtained revocation lists to each of the devices included in the home network via the bus.

4. Fourth Embodiment

The following describes the fourth embodiment of the present invention.

4.1 Configuration of the Mobile Phone

The mobile phone of the present embodiment comprises, like the mobile phone 100 of the first embodiment, a debugger IF, a CPU 102, an MMU, a secondary memory u nit, as witch control unit, an interrupt controller, an input unit, a display unit, a normal memory, a shared memory, a secure memory 713, a memory protection unit 701, an input output unit, an encryption processing device, a wireless communication control unit, a microphone, a speaker, a communication unit, an antenna, a buffer, an encoding processing unit, and a D/A converting unit. Each of the circuits is connected to the bus.

In the mobile phone of the present embodiment, the configurations and the operations of the elements other than the memory protection unit 701 and the secure memory 713 are the same as those in the first embodiment; therefore, explanation will be omitted, and description is provided only for the characteristic features of the present embodiment.

(1) The Secure Memory 713

Figure 66:
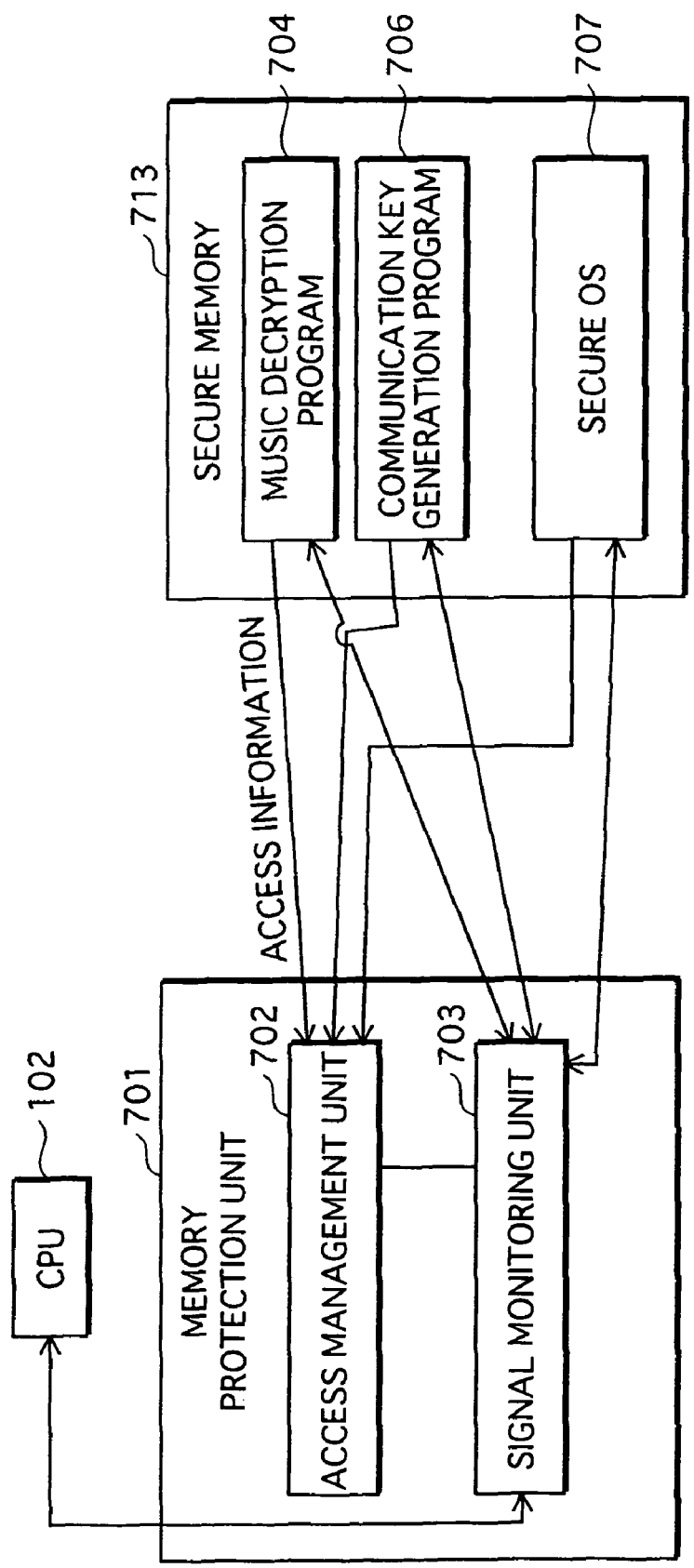
FIG. 66 is a block diagram that shows the configurations of a memory protection unit 701 and a secure memory 713 that are included in a mobile phone in the fourth embodiment.

The secure memory 713 stores therein, as shown in FIG. 66, secure applications such as a music decryption program 704 and a communication key generation program 706, as well as the secure OS 707.

The music decryption program 704 is a secure application that includes a processing procedure for music decryption like the music decryption program 176 of the first embodiment.

The communication key generation program 706 is a secure application that generates an encryption key to be used when the mobile phone transmits and receives contents via the Internet.

The secure OS 707 is an operating system like the secure OS 171 in the first embodiment.

Here, when each program within the secure memory 713 is activated into the secure memory, the program outputs a piece of access information of the program itself to the access management unit 702. Each piece of access information is an address of a memory area which the corresponding program is able to access.

(2) The Memory Protection Unit 701

The memory protection unit 701 is configured to include the access management unit 702 and the signal monitoring unit 703, as shown in FIG. 66.

The access management unit 702 receives pieces of access information from the programs within the secure memory 713 and stores the received pieces of access information in correspondence with the corresponding programs. Further, the access management unit 702 has a counter for counting the number of times of unauthorized accesses for each program.

The signal monitoring unit 703 pre-stores therein the number of times of unauthorized accesses permitted for each program (hereafter simply referred to as "permission number"). The signal monitoring unit 703 monitors the signals on the bus between the secure memory 713 and the CPU and detects addresses within the secure memory 713 being targets of the CPU access.

Subsequently, the signal monitoring unit 703 reads a piece of access information corresponding to the program currently being executed from the access management unit 702 and compares the read piece of access information with the detected address. In the case where the detected address is included in the storage area indicated by the read piece of access information, the signal monitoring unit 703 continues to perform the monitoring.

In the case where the detected address is not included in the storage area, the signal monitoring unit 703 adds 1 to the counter that is stored in correspondence with the corresponding program by the access management unit 702. Subsequently, the signal monitoring unit 703 compares the counter and the stored permission number. In the case where the counter shows a value equal to or smaller than the permission number, the signal monitoring unit 703 continues to perform the monitoring.

In the case where the counter shows a value exceeding the permission number, the signal monitoring unit 703 judges that the corresponding program is invalid.

Here, in the case where the program judged to be invalid is the music decryption program 704, the signal monitoring unit 703 forcefully discontinues the execution of the music decryption program 704 and transfers the execution right of the CPU 102 to the secure OS 707.

In the case where the program judged to be invalid is one of other secure applications, the processing is performed in the same manner.

In the case where the program judged to be invalid is the secure OS 707, the signal monitoring unit 703 forcefully discontinues the execution of the secure OS 707, clears the CPU 102 and the MMU, and outputs a switching instruction to the switch control unit.

4.2 Summary and Effects

As explained so far, the mobile phone of the present invention monitors the operation of each of the programs loaded into the secure memory 713 and discontinues execution of programs that repeatedly perform unauthorized operations. With this arrangement, even if some of the programs in the secure memory 713 should have a defect or should maliciously be tampered with during the execution thereof, it is possible to discontinue the execution of such programs.

4.3 Modification Examples of the Fourth Embodiment (1) In the embodiment described above, the memory protection unit 701 detects unauthorized operations by monitoring signals on the bus, with the use of the signal monitoring unit 703; however, it is acceptable to have an arrangement wherein the memory protection unit 701 regularly monitors the value of the program counter in the CPU.

(2) In the embodiment described above, each of the programs in the secure memory 713 outputs a piece of access information which is different from one program to another to the access management unit 702 when the program is activated. The signal monitoring unit 703 monitors the operations of the programs based on such pieces of access information; however, it is acceptable to have an arrangement wherein the access management unit 702 pre-stores therein information that indicates an access prohibition area within the secure memory 713. In such a case, no matter which program is being executed, when the program attempts to access the prohibition area, the signal monitoring unit discontinues the CPU 102's execution of the program, clears the CPU 102 and the MMU, and outputs a switching instruction to the switch control unit.

(3) In the present embodiment, it is acceptable to have an arrangement, like in the second embodiment, the memory protection unit 701 comprises a revocation list storing unit, an application verification unit, an application revocation unit, an OS verification unit, and an OS revocation unit, so that when having received a connection instruction from the switch control unit, the memory protection unit 701 judges whether or not each of the programs within the secure memory is valid or invalid.

In this arrangement, the signal monitoring unit 703 finds a program that performs an unauthorized operation during the execution thereof and discontinues the operation of the program. Also, the signal monitoring unit 703 adds a secure OS ID or an application ID that corresponds to the program which performs the unauthorized operation to the OS revocation list or the application revocation list stored in the revocation list storing unit.

With this arrangement, it is possible to avoid a situation where an invalid program that has been newly discovered is executed again.

5. Fifth Embodiment

The following describes the fifth embodiment of the present invention.

The mobile phone 750 of the fifth embodiment is operable to have two memory cards mounted thereto. One of the memory cards stores therein an operating system (OS) and various applications. The mobile phone 750 reads and executes these programs. For the convenience of explanation, this memory card will be referred to as a normal memory card 800.

The other of the memory cards stores therein programs each of which performs a processing to be protected and each of which has been encrypted. Each of the programs is made up of a program portion and a data portion. For the convenience of explanation, this memory card will be referred to as a secure memory card 820.

The mobile phone 750 allows each of the programs within the secure memory card 820 to read program portions of other programs, but does not allow each of the programs within the secure memory card 820 to read data portions of other programs.

5.1 The Secure Memory Card 820

Figure 67:
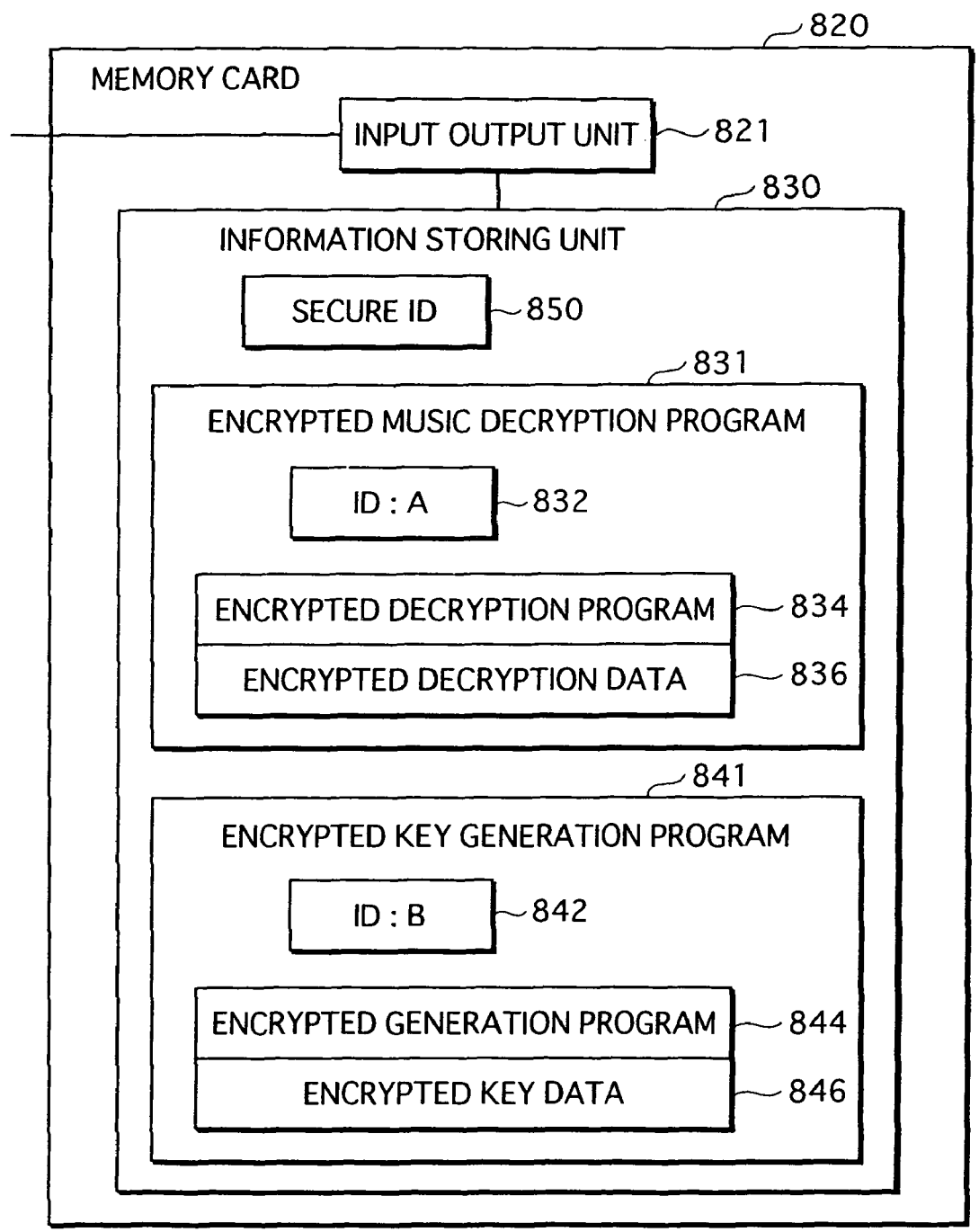
FIG. 67 shows the configuration of a secure memory card 820 and an example of information stored in the secure memory card 820 in the fifth embodiment.

The secure memory card 820 comprises, as shown in FIG. 67, an input output unit 821 and an information storing unit 830.

More specifically, the secure memory card 820 is a computer system that includes a microprocessor, a RAM, and a ROM. The RAM and the ROM store therein computer programs. The secure memory card 820 achieves some of its functions when the microprocessor operates according to the computer programs.

The input output unit 821 inputs and outputs information to and from an external device.

The information storing unit 830 stores therein a secure ID 850, an encrypted music decryption program 831, an encrypted key generation program 841, and the like.

The secure ID 850 is a piece of information that is unique to the secure memory card 820 and indicates that the secure memory card 820 stores therein one or more programs that perform secure processings.

The encrypted music decryption program 831 includes an ID 832 "A", an encrypted decryption program 834, and encrypted decryption data 836. The ID 832 "A" is a piece of identification information that is unique to the encrypted music decryption program 831.

The encrypted decryption program 834 is generated by encrypting a decryption program that includes a procedure for decrypting music data. The encrypted decryption data 836 is obtained by encrypting data such as a parameter that is used by the decryption program during a decryption processing.

The encrypted key generation program 841 is configured to include an ID 842 "B", an encrypted generation program 844, an encrypted key data 846.

The ID 842 "B" is a piece of identification information that is unique to the encrypted key generation program 841. The encrypted generation program 844 is obtained by encrypting a generation program that includes a procedure for generating an encryption key. The encrypted key data 846 is obtained by encrypting data such as a parameter used by the generation program.

5.2 The Normal Memory Card 800

Figure 68:
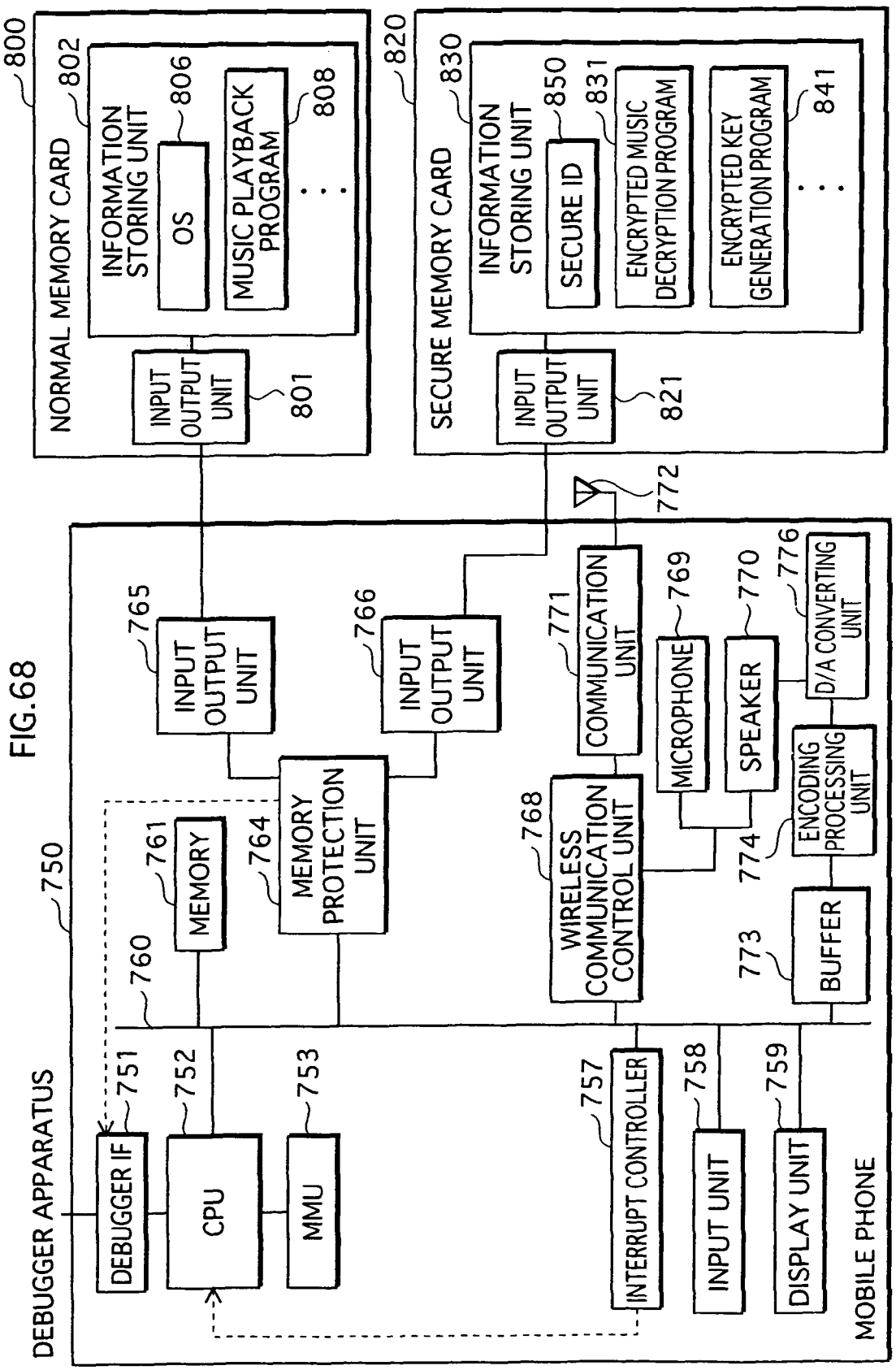
FIG. 68 is a block diagram that shows a mobile phone 750 and the configurations of a normal memory card 800 and a secure memory card 820 to be mounted onto the mobile phone 750 in the fifth embodiment.

The normal memory card 800 is configured to include an input output unit 801 and an information storing unit 802 as shown in FIG. 68.

The input output unit 801 inputs and outputs various types of data to and from the information storing unit 802 and an external device.

The information storing unit 802 stores therein various applications including a music playback program 808 and an OS 806. Each of the programs stored in the information storing unit 802 is made up of a code portion that includes a procedure for the processing executed by the program and a data portion. Each of the programs also has a program ID that is unique to the respective program. For example, the OS 806 has a program ID "OS", whereas the music playback program 808 has a program ID "E".

5.3 The Mobile Phone 750

The mobile phone 750 comprises, as shown in FIG. 68, a debugger IF 751, a CPU 752, an MMU 753, an interrupt controller 757, an input unit 758, a display unit 759, a memory 761, a memory protection unit 764, an input output unit 765, an input output unit 766, a wireless communication control unit 768, a communication unit 771, an antenna 772, a microphone 769, a speaker 770, a buffer 773, an encoding processing unit 774, and a D/A converting unit 776, all of which are connected to one another via a bus 760.

Since the operations and the configurations of the debugger IF 751, the MMU 753, the interrupt controller 757, the input unit 758, the display unit 759, the wireless communication control unit 768, the communication unit 771, the antenna 772, the microphone 769, the speaker 770, the buffer 773, the encoding processing unit 774, and the D/A converting unit 776 are the same as those in the first embodiment, explanation thereof will be omitted. The memory 761 stores therein various types of data and programs. The CPU 752 fetches instructions included in the programs stored in the memory 761, the normal memory card 800, and the secure memory card 820 one by one, and decodes and executes each fetched instruction.

The following describes the memory protection unit 764, the input output unit 765, and the input output unit 766 that are the characteristic features of the present embodiment.

(1) The Input Output Unit 765 and the Input Output Unit 766

Each of the input output unit 765 and the input output unit 766 is connected to one of the two memory cards and inputs and outputs information to and from the memory card and the memory protection unit 764.

(2) The Memory Protection Unit 764

Figure 69:
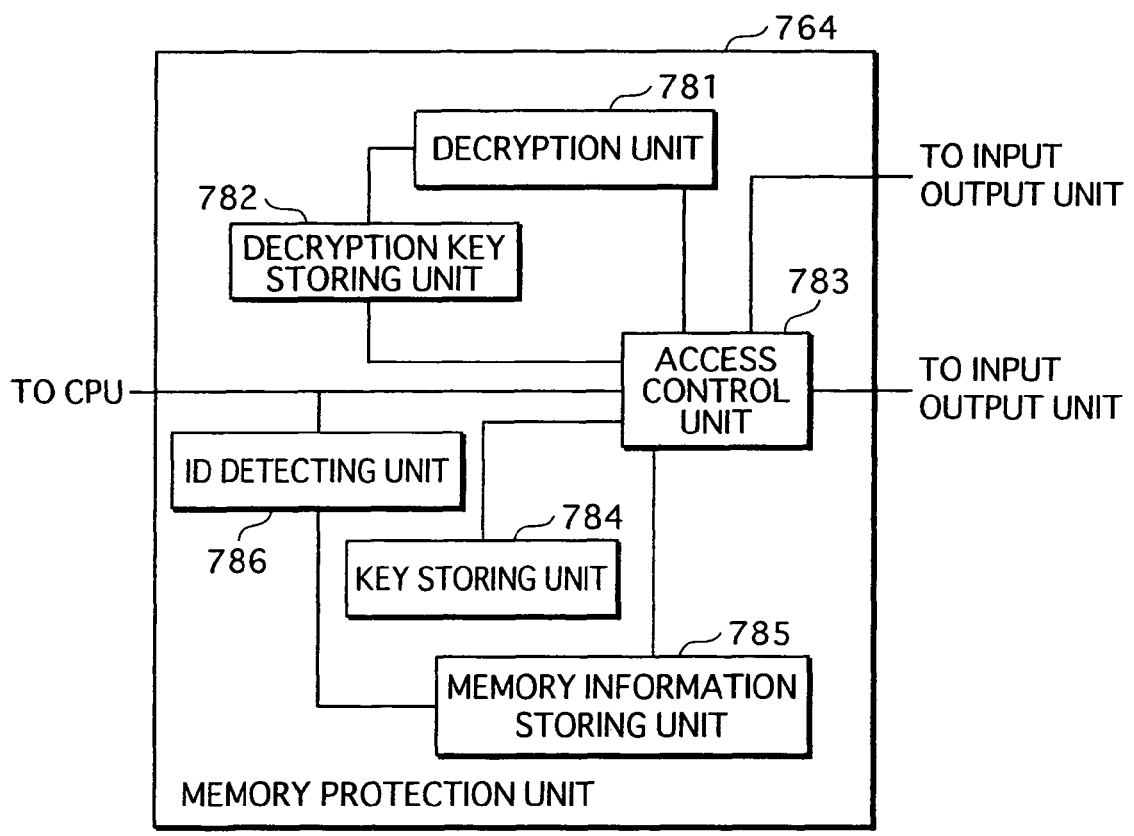
FIG. 69 is a block diagram that shows the configuration of a memory protection unit 764.

The memory protection unit 764 comprises, as shown in FIG. 69, a decryption unit 781, a decryption key storing unit 782, an access control unit 783, a key storing unit 784, a memory information storing unit 785, and an ID detecting unit 786.

(2-1) The Key Storing Unit 784

The key storing unit 784 stores therein a decryption key for the encrypted music decryption program 831 and a decryption key for the encrypted key generation program 841 in correspondence with the program IDs of these programs.

(2-2) The Decryption Unit 781 and the Decryption Key Storing Unit 782

The decryption unit 781 receives a decryption instruction and an encrypted data from the access control unit 783. When having received a decryption instruction, the decryption unit 781 reads a decryption key from the decryption key storing unit 782 and decrypts the encrypted data with the use of the read decryption key so as to generate a plain text. The decryption unit 781 outputs the generated plain text to the CPU 752.

Here, the encrypted data decrypted by the decryption unit 781 is encrypted data that constitutes the encrypted music decryption program 831 and the encrypted key generation program 841 that are stored in the secure memory card 820.

The decryption key storing unit 782 stores therein only one decryption key used by the decryption unit 781.

(2-3) The Memory Information Storing Unit 785

The memory information storing unit 785 stores therein a secure memory information table 811 and a normal memory information table 861, as shown in FIG. 70.

The secure memory information table 811 includes a plurality of pieces of secure memory information 812, 813, and so on. Each piece of secure memory information includes a program ID, a code address, and a data address.

The program IDs are IDs of the programs stored in the secure memory card 820. A code address is an address that indicates an area in which the program portion of each of the encrypted applications in the secure memory card 820 is stored. A data address is an address that indicates an area in which the data portion of each of the encrypted applications is stored.

More specifically, the secure memory information 812 includes the ID "A" 832 of the encrypted music decryption program 831 as a program ID; an address "A000-A111" at which the encrypted decryption program 834 is stored as a code address; and an address "A222-A333" at which the encrypted decryption data 836 is stored, as a data address.

The secure memory information 813 includes the ID "B" 842 of the encrypted key generation program 841 as a program ID; an address "A444-A555" at which the encrypted generation program 844 is stored as a code address; and an address "A666-A777" at which the encrypted key data 846 is stored, as a data address.

The normal memory information table 861 includes a plurality of pieces of normal memory information 862, 863, and so on. Each piece of normal memory information includes a program ID, a code address, and a data address.

The program IDs are IDs of the programs stored in the normal memory card 800. A code address is an address that indicates an area in which the program portion of the program corresponding to the program ID is stored. A data address is an address of an area in which the data portion is stored.

More specifically, the normal memory information 862 corresponds to the OS 806 stored in the normal memory card 800. The normal memory information 863 corresponds to the music playback program 808.

(2-4) The ID Detecting Unit 786

The ID detecting unit 786 constantly monitors a program counter (hereafter simply referred to as a PC) of the CPU 752. While the CPU 752 is executing a program within the secure memory card 820, the ID detecting unit 786 stores therein the program ID of the program being executed by the CPU 752.

Figure 71:
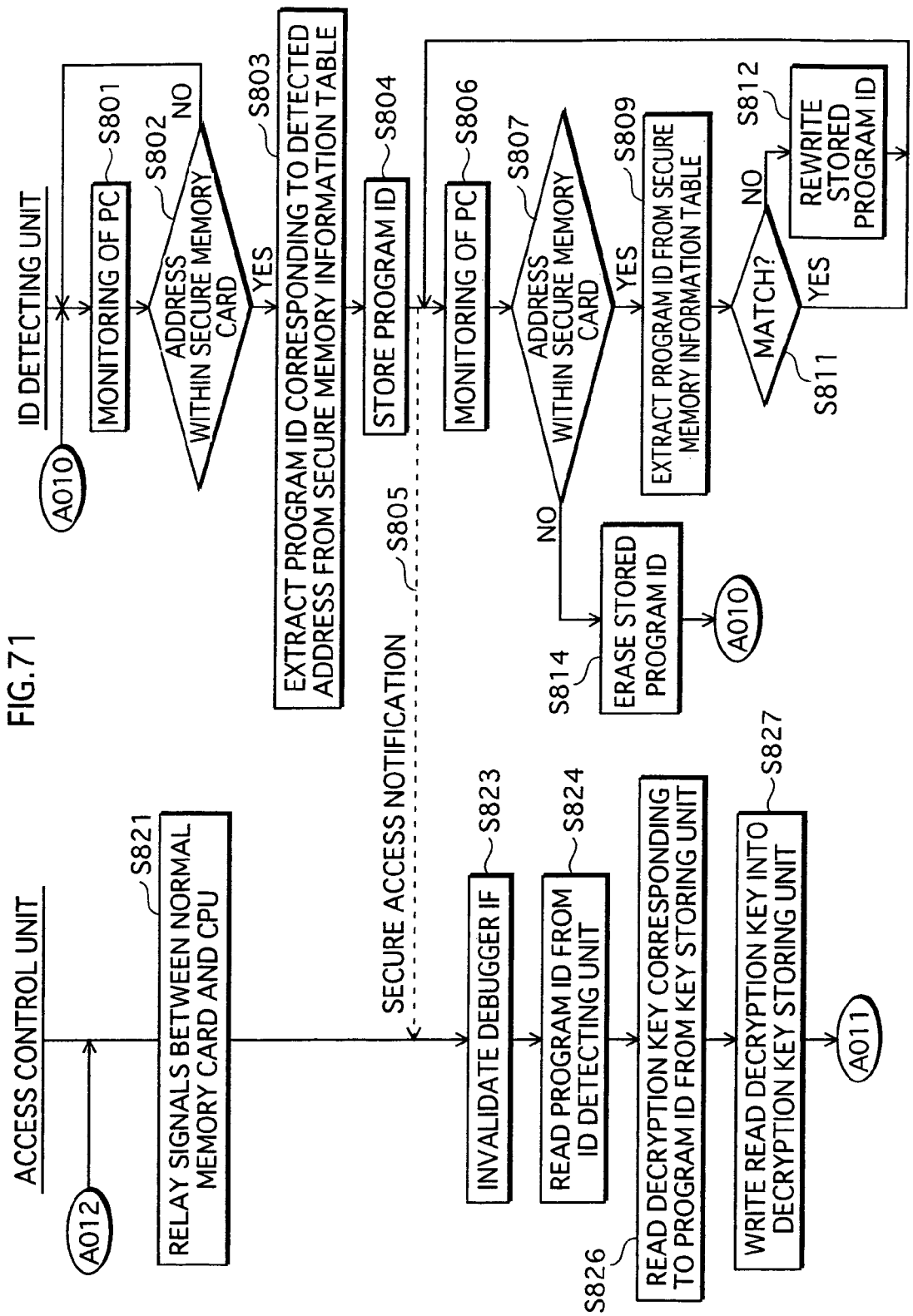
FIG. 71 is a flow chart that shows the operations performed by an access control unit 783 and an ID detecting unit 786.

The following describes the operation of the ID detecting unit 786, with reference to the flow chart in FIG. 71. It should be noted that the explanation starts from Step S801, for the convenience of the explanation. At this time, the CPU 752 is executing a program stored in the normal memory card 800 or in the memory 761.

The ID detecting unit 786 monitors the PC (Step S801) and compares a code address of each program included in the secure memory information table 811 and the normal memory information table 861 stored in the memory information storing unit 785 with the address indicated by the PC, so as to judge whether or not the address indicated by the PC is an address within the secure memory card 820 (Step S802).

In the case where the address is not an address within the secure memory card 820 (Step S802: NO), the ID detecting unit 786 continues to monitor the PC.

In the case where the address is an address within the secure memory card 820 (Step S802: YES), the ID detecting unit 786 selects a piece of secure memory information that corresponds to the address detected from the PC out of the secure memory information table 811 and extracts a program ID included in the selected piece of secure memory information (Step S803). The ID detecting unit 786 stores therein the extracted program ID (Step S804). Subsequently, the ID detecting unit 786 outputs a secure access notification which indicates that the execution of the program in the secure memory card 820 is to be started, to the access control unit 783 (Step S805).

Subsequently, the ID detecting unit 786 monitors the PC (Step S806) and judges whether or not the address stored in the PC is an address within the secure memory card 820 (Step S807).

In the case where the judgment result is that the address is an address within the secure memory card 820 (Step S807: YES), the ID detecting unit 786 selects a piece of secure memory information that corresponds to the address detected from the PC out of the secure memory information table 811 and extracts the program ID included in the selected piece of secure memory information (Step S809). The ID detecting unit 786 then compares the extracted program ID with the program ID stored in the ID detecting unit 786 itself. When the program IDs are identical to each other (Step S811: YES), the procedure returns to Step S806, and the ID detecting unit 786 continues to monitor the PC.

In the case where the program IDs are not identical to each other (Step S811: NO), the ID detecting unit 786 rewrites the stored program ID into the extracted program ID (Step S812), and the procedure returns to Step S806.

In Step S807, in the case where the judgment result is that the address is not an address within the secure memory card 820 (Step S807: NO), the ID detecting unit 786 erases the program ID stored in the ID detecting unit 786 itself (Step S814), and the procedure returns to Step S801.

(2-5) The Access Control Unit 783

The access control unit 783 preliminarily has a secure ID that is identical with a secure ID written in the secure memory card 820.

The access control unit 783 detects that a memory card is mounted via the input output unit 765 and the input output unit 766. When having detected that a memory card is mounted, the access control unit 783 searches the memory card for the secure ID. In the case where the access control unit 783 detects a secure ID 850 which is identical with the secure ID it preliminarily has, the access control unit 783 identifies the memory card as the secure memory card 820. Here, description is provided on an assumption that the input output unit 765 is connected to the normal memory card 800 and the input output unit 766 is connected to the secure memory card 820.

Having detected via the input output unit 765 that the memory card 800 is mounted, the access control unit 783 searches the information stored in the normal memory card 800 via the input output unit 765, generates a normal memory information table, and stores the generated normal memory information table into the memory information storing unit 785.

When having detected via the input output unit 766 that the secure memory card 820 is mounted, the access control unit 783 searches the information stored in the secure memory card 820 via the input output unit 766, generates a secure memory information table, and writes the generated secure memory information table into the memory information storing unit 785.

The access control unit 783 just relays a signal (hereafter, will be referred to as an access signal) outputted from the CPU 752 when the CPU 752 accesses the normal memory card 800, to the normal memory card 800. The access control unit 783 also receives data outputted from the normal memory card 800 and outputs the received data to the CPU 752.

Figure 72:
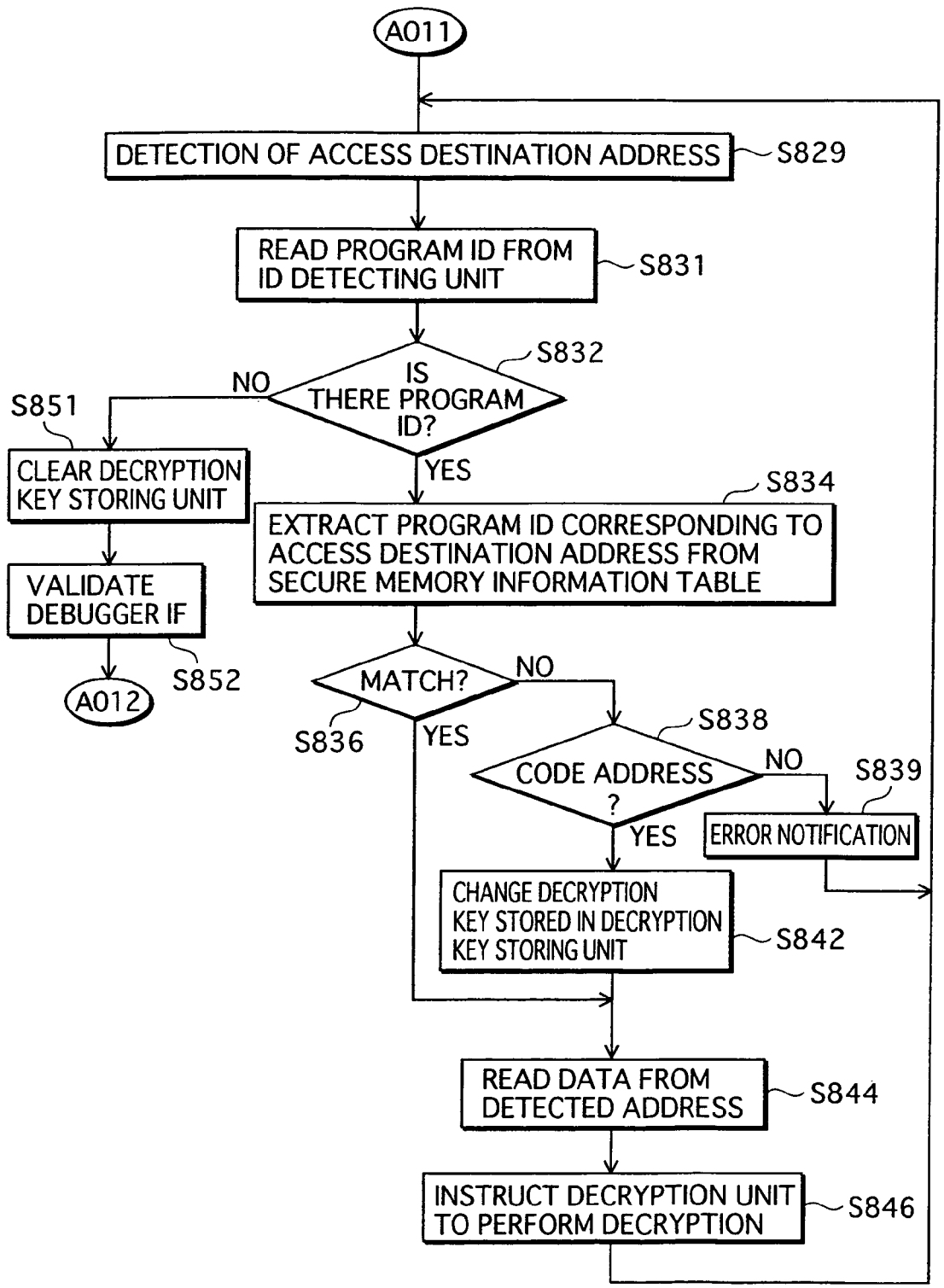
FIG. 72 is a flow chart that shows the operation performed by the access control unit 783 and is continued from FIG. 71.

When the CPU 752 accesses the secure memory card 820, the access control unit 783 extracts an address of the access destination based on the access signal, and either reads data from the secure memory card 820 or prohibits the data from being read from the secure memory card 820, depending on the extracted address. Such an operation of the access control unit 783 is to be described in details, with reference to the flow chart in FIGS. 71 and 72. For the convenience of explanation, the description starts from Step S821. At this time, the CPU 752 is executing a program in the normal memory card 800 or in the memory 761.

The access control unit 783 relays inputs and outputs of data between the CPU 752 and the normal memory card 800 (Step S821).

The access control unit 783 receives a secure access notification which indicates that execution of a program within the secure memory card 820 is started, from the ID detecting unit 786 (Step S805).

Having received the secure access notification, the access control unit 783 invalidates the debugger IF 751 (Step S823) and reads a program ID stored in the ID detecting unit 786 (Step S824). The access control unit 783 reads a decryption key that corresponds to the read program ID from the key storing unit 784 (Step S826) and writes the read decryption key to the decryption key storing unit 782 (Step S827)

Subsequently, the access control unit 783 receives the access signal outputted from the CPU 752 and detects the address of the access destination based on the received access signal (Step S829).

Having detected the address of the access destination, the access control unit 783 reads a program ID from the ID detecting unit 786 (Step S831). Having read the program ID (Step S832: YES), the access control unit 783 selects apiece of secure memory information that includes the detected access destination address either in the code address or in the data address, from the secure memory information table 811, and extracts a program ID from the selected piece of secure memory information (Step S834).

The access control unit 783 compares the extracted program ID with the program ID read from the ID detecting unit 786. In the case where the program IDs are identical to each other (Step S836: YES), the procedure advances to Step S844.

In the case where the program IDs are not identical to each other (Step S836: NO), the access control unit 783 further judges whether the detected address is included in the code address or included the data address of the selected piece of secure memory information (Step S838). In the case where judgment result is that the detected address is included in the data address (Step S838: NO), the access control unit 783 outputs an error notification indicating that access is not permitted to the CPU 752, and the procedure returns to Step S829.

In the case where the judgment result is that the detected address is included in the code address (Step S838: YES), the access control unit 783 reads a decryption key that corresponds to the extracted program ID from the key storing unit 784 and changes the decryption key stored in the decryption key storing unit 782 to the read decryption key (Step S842).

Subsequently, the access control unit 783 reads the information stored in the storage area corresponding to the detected address via the input output unit 766 (Step S844). The access control unit 783 instructs the decryption unit 781 to decrypt the read information (Step S846) and the procedure returns to Step S829.

In Step S832, in the case where no program ID is stored in the ID detecting unit 786 (Step S832: NO), the access control unit 783 erases the decryption key stored in the decryption key storing unit 782 (Step S851), and validates the debugger IF 751 (Step S852), and the procedure returns to Step S821.

5.4 Summary and Effects

As explained so far, the mobile phone of the present invention executes programs stored in the normal memory card and the secure memory card. The programs stored in the secure memory card are encrypted in advance.

The memory protection unit 764 manages an area which a program being stored in the secure memory card 820 and being executed by the CPU 752 is permitted to access and an area which such a program is prohibited from accessing.

The following description discusses a case where a music decryption program is executed. The CPU 752 is able to access the area in which the encrypted decryption program 834 of the encrypted music decryption program 831 is stored and the area in which the encrypted generation program 844 of the encrypted key generation program 841 is stored, but is not able to access the area in which the encrypted key data 846 of the encrypted key generation program 841 is stored.

In this manner, each of the applications within the secure memory card 820 is able to avoid a situation where other applications access the data portion of the application without authority so as to read and change the data.

Further, since the information stored in the secure memory card 820 is encrypted, it is not possible to decode the stored information even if an access is made to the secure memory card 820 while the CPU 752 is executing a program other than the programs within the secure memory card 820. Accordingly, it is possible to protect the data stored in the secure memory card 820 from unauthorized accesses.

5.5 Modification Examples of the Fifth Embodiment

According to the embodiment described above, in the case where the CPU 752 attempts to access the data portion of an application while executing another secure application within the secure memory card 820, the access control unit 783 outputs an error notification to the CPU 752; however, like in the fourth embodiment, it is acceptable to have an arrangement wherein the access control unit 783 transfers the execution right of the CPU 752 to another program, e.g. the OS 806. In such a case the access control unit 783 erases the decryption key stored in the decryption key storing unit 782 and sets the address at which the OS 806 is stored into the program counter of the CPU 782.

6. Other Modification Examples

So far, the present invention has been explained in terms of the first through fifth embodiments; however, the present invention is not limited to these embodiments. The following cases are also included in the present invention.

(1) The present invention may be methods for executing the first through third embodiments and the modification examples.

(2) The present invention may be construed as a compute program for realizing these methods with the use of a computer or may be construed as digital signals converted from such a computer program.

Additionally, it is acceptable that the present invention is construed as a computer-readable recoding medium e.g. a flexible disk, a hard disk, a CD-ROM, an MO, a DVD, a DVD-ROM, a DVD-RAM, a BD (Blu-ray Disc) or a semiconductor memory, that records such a computer program or such digital signals thereon; or that the present invention is construed as such a computer program or such digital signals recorded on such a recording medium.

Further, the present invention may be realized through transmission of such a computer program or such digital signals via telecommunication lines, wireless or wired communication lines, a network such as the Internet, data broadcast, or the like.

Further, it is acceptable to consider that the present invention is a computer system that includes a microprocessor and a memory, wherein the memory stores therein the computer program mentioned above, and the microprocessor operates according to the computer program.

Furthermore, it is acceptable to execute the aforementioned program or digital signals on a dependent computer system by delivering the program or digital signals recorded on the aforementioned recording medium or via the aforementioned network or the like.

(3) It is acceptable to combine any of the embodiments and the modification examples described above.

INDUSTRIAL APPLICABILITY

The apparatuses and recording media pertaining to the present invention can be administratively, continuously, and repeatedly used in an industry which deals with information that needs to be protected, for example an industry related to creation and distribution of contents including images and audio and an industry that manufactures and sells electric devices that deals with such information. Further, the apparatuses and recording media pertaining to the present invention can be administratively, continuously, and repeatedly manufactured and sold by an electric device manufacturing industry.

The invention claimed is:

1. A data processing apparatus that executes programs while switching between a secure mode and a normal mode, the secure mode being a mode in which use of a secure resource to be protected is permitted and the normal mode being a mode in which only use of a normal resource outside of protection is permitted, the data processing apparatus comprising:
a normal storing unit storing therein a normal program that includes one or more processing procedures which use the normal resource;
a secure storing unit storing therein a secure program that (i) includes one or more processing procedures which use the secure resource, and (ii) includes a call instruction for calling at least the normal program;
a judgment unit operable to judge, in the secure mode, whether or not an instruction to be executed next is the call instruction;
an output unit operable to output, in the secure mode, in a case where the instruction to be executed next is judged to be the call instruction, a piece of identification information which identifies the normal program to be called by the call instruction;
a switching unit operable to, in the case where the instruction to be executed next is judged to be the call instruction, protect the secure resource and switch from the secure mode to the normal mode;
a receiving unit operable to receive, in the normal mode, the piece of identification information;
a reading unit operable to read, in the normal mode, the normal program identified by the received piece of identification information from the normal storing unit; and
a processing unit operable to operate, in the normal mode, according to the read normal program.

2. The data processing apparatus of claim 1, wherein the switching unit switches from the secure mode to the normal mode by halting a secure operating system that controls the secure program and activating a normal operating system that controls the normal program.

3. The data processing apparatus of claim 2, comprising a shared storage area which is accessible in both the secure mode and the normal mode,
wherein the output unit outputs the piece of identification information in the secure mode, by writing the piece of identification information to the shared storage area, and the receiving unit receives the piece of identification information in the normal mode, by reading the piece of identification information from the shared storage area.

4. The data processing apparatus of claim 3, wherein the reading unit (i) stores therein the piece of identification information in correspondence with a piece of positional information which identifies a location within the normal storing unit at which the normal program is positioned and (ii) reads the normal program from the location identified by the piece of positional information corresponding to the received piece of identification information.

5. The data processing apparatus of claim 3, wherein one of the processing procedures included in the normal program includes a plurality of functions constituting a library, whereas another one of the processing procedures included in the normal program calls one of the plurality of functions, and the processing unit operates according to the one of the plurality of functions called by the another one of the processing procedures in a case where the processing unit operates according to the another one of the processing procedures.

6. The data processing apparatus of claim 2, further comprising:
an instruction obtaining unit operable to obtain, in the secure mode, a writing instruction instructing the secure program to be written to the secure storing unit; and
a secure loading unit operable to, in the secure mode, in a case where the writing instruction has been obtained, write the secure program to the secure storing unit and output a piece of writing completion information which indicates that the writing of the secure program to the secure storing unit is completed,
wherein the switching unit further switches from the secure mode to the normal mode in a case where the piece of writing completion information has been outputted, and the data processing apparatus further comprises a normal loading unit operable to, in the normal mode, receive the piece of writing completion information and write the normal program to the normal storing unit.

7. The data processing apparatus of claim 6, wherein the reading unit further stores therein, in the normal mode, in a case where the normal loading unit has written the normal program to the normal storing unit, the piece of identification information in correspondence with a piece of positional information which identifies a location within the normal storing unit at which the normal program is positioned.

8. The data processing apparatus of claim 6, further comprising:
a deletion instruction obtaining unit operable to obtain, in the secure mode, a deletion instruction instructing the secure program to be deleted; and
a secure deleting unit operable to, in a case where the deletion instruction has been obtained, in the secure mode, delete the secure program from the secure storing unit and output a piece of deletion completion information which indicates that the deletion is completed,
wherein the switching unit further switches from the secure mode to the normal mode in a case where the piece of deletion completion information has been outputted, and the data processing apparatus further comprises a normal deletion unit operable to, in the normal mode, obtain the piece of deletion completion information and delete the normal program from the normal storing unit.

9. The data processing apparatus of claim 2, wherein the reading unit (i) stores therein the piece of identification information in correspondence with a piece of positional information which identifies a location within the normal storing unit at which the normal program is positioned and (ii) reads the normal program from the location identified by the piece of positional information corresponding to the received piece of identification information.

10. The data processing apparatus of claim 2, further comprising:
a boot program storing unit storing therein (i) a boot program, which includes an initialization procedure for initializing one or more devices included in the data processing apparatus comprising the processing unit, and (ii) an activation procedure for activating the secure operating system; and
an initializing unit operable to read the boot program from the boot program storing unit and to initialize the one or more devices according to the read boot program, and after the initialization is completed, to activate the secure operating system.

11. The data processing apparatus of claim 2, further comprising a normal output unit operable to output, in the normal mode, a processing result by the processing unit and a piece of secure identification information that identifies the secure program,
wherein the switching unit further switches, in a case where the processing result has been outputted, from the normal mode to the secure mode,
wherein the data processing apparatus further comprises:
a secure receiving unit operable to, in the secure mode, receive the processing result and the piece of secure identification information; and
a secure reading unit operable to read the secure program identified by the received piece of secure identification information from the normal storing unit, and
wherein the processing unit further operates, in the secure mode, according to the secure program using the processing result.

12. The data processing apparatus of claim 2, wherein the switching unit disconnects the secure resource from the processing unit when switching from the secure mode to the normal mode.

13. The data processing apparatus of claim 2, wherein the switching unit encrypts secure information held by the secure resource when switching from the secure mode to the normal mode.

14. The data processing apparatus of claim 13, wherein the secure information held by the secure resource includes a program that (i) is executed in the secure mode, and (ii) is made up of an instruction code portion, a data portion, and a stack portion, and the switching unit encrypts the instruction code portion when switching from the secure mode to the normal mode.

15. The data processing apparatus of claim 13, wherein the secure information held by the secure resource includes a program that (i) is executed in the secure mode, and (ii) is made up of an instruction code portion, a data portion, and a stack portion, and the switching unit encrypts the data portion when switching from the secure mode to the normal mode.

16. The data processing apparatus of claim 13, wherein the secure information held by the secure resource includes a program that (i) is executed in the secure mode, and (ii) is made up of an instruction code portion, a data portion, and a stack portion, and the switching unit encrypts the stack portion when switching from the secure mode to the normal mode.

17. The data processing apparatus of claim 2, further comprising a debug receiving unit operable to receive a debug actuation signal from a debug apparatus that monitors and controls an operation of the processing unit,
wherein the switching unit connects the processing unit to the debug receiving unit when switching from the secure mode to the normal mode and disconnects the processing unit from the debug receiving unit when switching from the normal mode to the secure mode.

18. The data processing apparatus of claim 1, wherein the reading unit (i) stores therein the piece of identification information in correspondence with a piece of positional information which identifies a location within the normal storing unit at which the normal program is positioned and (ii) reads the normal program from the location identified by the piece of positional information corresponding to the received piece of identification information.

19. The data processing apparatus of claim 1,
wherein the data processing apparatus is operable to switch between a first operating system and a second operating system and to execute and manage processes generated in the first and second operating systems by causing each of the processes generated in the first and second operating systems to make a state transition into one of an execution state, an execution wait state, and a halt state,
wherein the data processing apparatus further comprises:
a first generating unit operable to, in the first operating system, generate a first process;
a second generating unit operable to, in the second operating system, generate a second process that is in correspondence with the first process;
a first detecting unit operable to, in the first operating system, detect a state transition of the first process;
a first output unit operable to, in the first operating system, output transition information identifying the detected state transition;
an OS switching unit operable to switch the first operating system to the second operating system;
a second obtaining unit operable to, in the second operating system, obtain the transition information; and
a second transition unit operable to cause the second process to make a state transition according to the obtained transition information.

20. The data processing apparatus of claim 19, further comprising:
a second detecting unit operable to, in the second operating system, detect a state transition of the second process; and
a second output unit operable to, in the second operating system, output transition information identifying the detected state transition,
wherein the OS switching unit further switches the second operating system to the first operating system, and
wherein the data processing apparatus further comprises:
a first obtaining unit operable to obtain, in the first operating system, the transition information; and
a first transition unit operable to cause the first process to make a state transition according to the obtained transition information.

21. The data processing apparatus of claim 20, further comprising a shared storage area which is accessible by both the first operating system and the second operating system,
wherein the first output unit outputs the transition information by writing the transition information to the shared storage area, and the second obtaining unit obtains the transition information by reading the transition information from the shared storage area.

22. The data processing apparatus of claim 21, wherein the second output unit outputs the transition information by writing the transition information to the shared storage area, and the first obtaining unit obtains the transition information by reading the transition information from the shared storage area.

23. The data processing apparatus of claim 22, further comprising a device that operates under management of the second operating system,
wherein the second process is a device driving program that controls driving of the device, and the second detecting unit detects the state transition of the second process due to the operation of the device.

24. The data processing apparatus of claim 23, wherein in a case where the first process make a state transition from a halt state to an execution state in the first operating system, the data processing apparatus operates according to the first process which performs an exclusion processing to avoid duplication of processing requests to the device, and in the first operating system, the first output unit outputs the transition information after the exclusion processing is finished.

25. The data processing apparatus of claim 23, further comprising:
an interrupt detecting unit operable to detect an occurrence of interrupts in the first and second operating systems;
an interrupt investigating unit operable to, in a case where an interrupt has been detected in the first operating system, investigate a cause of the occurrence of the detected interrupt; and
an interrupt transition unit operable to, in a case where, in the first operating system, the interrupt investigating unit judges that the interrupt is caused by the device, cause the first process to make a state transition from a halt state to an execution state.

26. The data processing apparatus of claim 25, further comprising a notification unit operable to, in a case where an interrupt has been detected in the second operating system, output a piece of interrupt notification information which indicates a detection of the interrupt,
wherein the OS switching unit switches from the second operating system to the first operating system, the first obtaining unit further obtains, in the first operating system, the piece of interrupt notification information, and in a case where the interrupt investigating unit has obtained the piece of interrupt notification information in the first operating system, the interrupt investigating unit further investigates a cause of the occurrence of the interrupt.

27. The data processing apparatus of claim 26, wherein, when an interrupt has been detected, the notification unit suspends the detection of the interrupts performed by the interrupt detecting unit, and when having obtained the piece of interrupt notification information, the first obtaining unit releases the suspension of the detection of the interrupts performed by the interrupt detecting unit.

28. The data processing apparatus of claim 1,
wherein the data processing apparatus is operable to operate according to a program, and
wherein the data processing apparatus further comprises:
a storing unit storing therein the program including a plurality of processing procedures;
a validity judgment unit operable to judge whether or not the program stored in the storing unit is invalid; and
a revocation unit operable to, in a case where the program is judged to be invalid, revoke the program.

29. The data processing apparatus of claim 28,
wherein the validity judgment unit includes:
a program information obtaining subunit operable to obtain program identification information identifying the program stored in the storing unit;
a revocation information obtaining subunit operable to obtain revocation identification information identifying one or more revoked programs; and a judgment subunit operable to judge whether or not the obtained program identification information matches the revocation identification information, and wherein the validity judgment unit judges that the program is invalid in a case where the obtained program identification information matches the obtained revocation identification information.

30. The data processing apparatus of claim 29,
wherein the program information obtaining subunit includes:
an identification information storing sub-subunit storing therein the program identification information identifying the program; and
a reading sub-subunit operable to read and obtain the program identification information from the identification information storing sub-subunit, and
wherein the revocation information obtaining subunit includes:
a revocation information storing sub-subunit storing therein the revocation identification information identifying the one or more revoked programs; and
a reading sub-subunit operable to read and obtain the revocation identification information from the revocation information storing sub-subunit.

31. The data processing apparatus of claim 28, wherein the validity judgment unit judges whether or not the program is invalid based on a public key certificate certifying validity of a public key assigned to the program.

32. The data processing apparatus of claim 31,
wherein the validity judgment unit includes:
a certificate storing subunit storing therein the public key certificate that includes public key identification information for identifying the public key;
a public key information obtaining subunit operable to obtain the public key identification information out of the public key certificate;
a revocation information storing subunit storing therein revocation identification information which identifies a revoked public key;
a revocation information reading subunit operable to read the revocation identification information from the revocation information storing subunit; and
a judgment subunit operable to judge whether the obtained public key identification information matches the read revocation identification information, and
wherein the validity judgment unit judges that the program is invalid in a case where the obtained public key identification information is judged to match the read revocation identification information.

33. The data processing apparatus of claim 32, wherein the validity judgment unit further includes an updating subunit operable to obtain most updated revocation identification information from an external source and write the obtained most updated revocation identification information to the revocation information storing subunit.

34. The data processing apparatus of claim 33, wherein the updating subunit obtains the most updated revocation identification information every time an access request for accessing the storing unit is detected.

35. The data processing apparatus of claim 33, wherein the updating subunit receives the revocation identification information, (a) from a certificate revocation list issuing apparatus via a network, (b) from a CRL issuing apparatus via a network and a server apparatus, or (c) by reading from a recording medium.

36. The data processing apparatus of claim 33, wherein the updating subunit further obtains, from an external source, signature data generated by computing a digital signature on the most updated revocation identification information, performs a signature verification on the obtained signature data, and writes, in a case where the signature verification has been successful, the obtained revocation identification information to the revocation information storing subunit.

37. The data processing apparatus of claim 31,
wherein the validity judgment unit includes:
a certificate storing subunit storing therein the public key certificate that includes signature data generated by computing a digital signature on at least the public key;
a public key certificate obtaining subunit operable to obtain the public key certificate from the certificate storing subunit; and
a verification subunit operable to verify whether the public key certificate is valid by performing a signature verification on the signature data included in the obtained public key certificate, and
wherein the validity judgment unit judges that the program is invalid in a case where the public key certificate is judged to be not valid.

38. The data processing apparatus of claim 28, wherein the validity judgment unit judges whether or not the program is invalid using at least two public key certificates which certify a validity of at least two public keys, respectively.

39. The data processing apparatus of claim 38,
wherein the at least two public keys include a first public key assigned to the program and a second public key assigned to either the data processing apparatus or an operating system controlling operation of the program,
wherein the validity judgment unit includes:
a certificate storing subunit storing therein (i) a second public key certificate which includes second signature data generated by computing a digital signature on the second public key with use of a secret key from an authorized authentication organization and includes the second public key and (ii) a first public key certificate which includes first signature data generated by computing a digital signature on at least the first public key with use of a secret key of either the data processing apparatus or the operating system and includes the first public key;
a public key certificate obtaining subunit operable to obtain the first public key certificate and the second public key certificate from the certificate storing subunit; and
a verification subunit operable (i) to verify whether or not the obtained second public key certificate is valid by performing a signature verification on the second signature data included in the obtained second public key certificate, with use of the public key from the authorized authentication organization (ii) to obtain, in a case where the obtained second public key certificate is judged to be valid, the second public key out of the second public key certificate, and (iii) to verify whether or not the obtained first public key certificate is valid by performing a signature verification on the first signature data included in the obtained first public key certificate with use of the obtained second public key, and
wherein the validity judgment unit judges that the program is invalid in a case where the second public key certificate is judged to be not valid or where the first public key certificate is judged to be not valid.

40. The data processing apparatus of claim 28, wherein the validity judgment unit judges whether or not the program is invalid every time an access request for accessing the storing unit is detected.

41. The data processing apparatus of claim 40, wherein the validity judgment unit judges whether or not the program is invalid every time an access request for accessing the program stored in the storing unit is detected.

42. The data processing apparatus of claim 28, wherein the validity judgment unit judges whether or not the program is invalid immediately after electric power supply to the data processing apparatus is started.

43. The data processing apparatus of claim 28,
wherein the data processing apparatus is operable to decrypt encrypted programs and execute the decrypted programs,
wherein the storing unit stores therein, in place of the program, an encrypted program generated by performing an encryption algorithm on the program with use of a program key,
wherein the validity judgment unit includes:
an encryption key storing subunit storing therein as many as m encryption keys selected out of as many as p encryption keys;
an encrypted information storing subunit storing therein m pieces of encrypted information generated by encrypting either the program key or predetermined detection information with use of each of the m encryption keys, the m pieces of encrypted information being stored in correspondence with the m encryption keys;
a decryption subunit operable to generate m pieces of decrypted information by performing a decryption algorithm on each of the m pieces of encrypted information with use of a corresponding one of the m encryption keys; and
a judgment subunit operable to judge whether or not all of the m pieces of generated decrypted information are the predetermined detection information, and
wherein the validity judgment unit judges that the program is invalid in a case where all of the m pieces of generated decrypted information are judged to be the predetermined detection information.

44. The data processing apparatus of claim 43,
wherein the p encryption keys are arranged at element positions in a first matrix having n rows by m columns where $p=n*m$,
wherein the m encryption keys are selected from the first matrix so that one encryption key is selected from each column of the first matrix,
wherein the encryption key storing subunit stores therein the element positions at which the encryption keys are arranged in the first matrix, in correspondence with the encryption keys,
wherein the encrypted information storing subunit stores therein the pieces of encrypted information in a second matrix having n rows by m columns at element positions being same as the element positions at which the encryption keys corresponding to the pieces of encrypted information are arranged, and
wherein the decryption subunit reads the element positions that correspond to the encryption keys from the encryption key storing subunit, reads the pieces of encrypted information arranged at the element positions being same as the read element positions in the second matrix stored by the encrypted information storing subunit, and performs the decryption algorithm on the read pieces of encrypted information with use of the read encryption keys.

45. The data processing apparatus of claim 1, further comprising:
a memory unit operable to store data therein;
a processor operable to operate according to a program including a plurality of processing procedures; and
a monitoring unit that is provided between the memory unit and the processor and is operable (i) to judge whether or not transfer data that is outputted from the processor and is to be transferred to the memory unit satisfies a transfer restriction condition, (ii) to inhibit the transfer data from being transferred to the memory unit in a case where the transfer restriction condition is satisfied, and (iii) to allow the transfer data to be transferred to the memory unit in a case where the transfer restriction condition is not satisfied.

46. The data processing apparatus of claim 45, wherein the monitoring unit (i) stores therein transfer restriction conditions, each of the transfer restriction conditions being for a corresponding one of a plurality of application programs, (ii) selects one of the transfer restriction conditions depending on an application program being executed by the processor, and (iii) uses the selected transfer restriction condition as the transfer restriction condition for making the judgment of whether or not the transfer data outputted from the processor to be transferred to the memory unit satisfies the transfer restriction condition.

47. The data processing apparatus of claim 46, wherein each of the transfer restriction conditions is a piece of address range information that identifies a predetermined storage space within the memory unit, and the monitoring unit extracts a piece of address information from the transfer data and inhibits the transfer data from being transferred in a case where the extracted piece of address information is included in a corresponding one of the pieces of address range information.

48. The data processing apparatus of claim 46,
wherein each of the transfer restriction conditions is a limit number identifying an upper limit of how many times accesses are allowed to a predetermined storage space within the memory unit, and
wherein the monitoring unit stores therein an accumulative number of accesses made to the predetermined storage space in history, extracts a piece of address information from the transfer data, adds 1 to the accumulative number in a case where the extracted piece of address information is included in a corresponding one of the pieces of address information, and inhibits the transfer data from being transferred in a case where a number after the addition of 1 to the accumulative number exceeds the limit number.

49. The data processing apparatus of claim 46, wherein the monitoring unit judges if the transfer data satisfies the transfer restriction condition, the transfer data being transferred on a bus connected to the processor.

50. The data processing apparatus of claim 46,
wherein the memory unit stores therein an encrypted code and encrypted data respectively generated by encrypting, with use of an encryption key, a code portion and a data portion of an application program being different from a current program being currently executed by the processor,
wherein each of the transfer restriction conditions is a piece of address range information that identifies a predetermined storage space within the memory unit in which the encrypted data is stored, and wherein the monitoring unit (i) stores therein a decryption key for decrypting the encrypted code and the encrypted data, (ii) extracts a piece of address information from the transfer data, (iii) generates a decrypted code by decrypting the encrypted code stored in a storage space identified by the transfer data with use of the decryption key in a case where the extracted piece of address information is within an address range identifying the storage space in which the encrypted code is stored, and transfers the generated decrypted code to the processor, and (iv) inhibits the transfer data from being transferred in a case where the extracted piece of address information is included in a corresponding one of the pieces of address range information.

51. The data processing apparatus or claim 46, wherein, in the case where the transfer restriction condition is satisfied, the monitoring unit further adds a piece of identification information identifying the program being executed by the processor to a program revocation list.

52. The data processing apparatus of claim 1, further comprising:

a memory unit operable to store data therein;

a processor (i) operable to operate according to a program including a plurality of processing procedures and (ii) having a program counter in which an address of an instruction to be executed next is stored; and a monitoring unit operable to judge whether or not an address stored in the program counter is within a predetermined address range, and to instruct the processor to put a predetermined value into the program counter in a case where the address stored in the program counter is within the predetermined address range, wherein the processor puts the predetermined value into the program counter when having received the instruction from the monitoring unit.

53. A data processing method used by a data processing apparatus that executes programs while switching between a secure mode and a normal mode, the secure mode being a mode in which use of a secure resource to be protected is permitted and the normal mode being a mode in which only use of a normal resource outside of protection is permitted, wherein the data processing apparatus comprises:

a normal storing unit storing therein a normal program that includes one or more processing procedures which use the normal resource; and a secure storing unit storing therein a secure program that (i) includes one or more processing procedures which use the secure resource, and (ii) includes a call instruction for calling at least the normal program, and wherein the data processing method comprises:

a judgment step of, in the secure mode, judging whether or not an instruction to be executed next is the call instruction;

an output step of outputting in the secure mode, in a case where the instruction to be executed next is judged to be the call instruction, a piece of identification information which identifies the normal program to be called by the call instruction;

a switching step of, in the case where the instruction to be executed next is judged to be the call instruction, protecting the secure resource and switching from the secure mode to the normal mode;

a receiving step of, in the normal mode, receiving the piece of identification information;

a reading step of, in the normal mode, reading the normal program identified by the received piece of identification information from the normal storing unit; and a processing step of, in the normal mode, operating according to the read normal program.

54. The data processing method of claim 53, wherein the data processing method is for switching between a first operating system and a second operating system and for executing and managing processes generated in the first and second operating systems by causing each of the processes generated in the first and second operating systems to make a state transition into one of an execution state, an execution wait state, and a halt state, and wherein the data processing method further comprises:

a first generating step of, in the first operating system, generating a first process;

a second generating step of, in the second operating system, generating a second process that is in correspondence with the first process;

a first detecting step of, in the first operating system, detecting a state transition of the first process;

a first output step of, in the first operating system, outputting transition information identifying the detected state transition;

an OS switching step of switching the first operating system to the second operating system;

a second obtaining step of, in the second operating system, obtaining the transition information; and a second transition step of causing the second process to make a state transition according to the obtained transition information.

55. The data processing method of claim 53, wherein the data processing method is to be used by the data processing apparatus, and the data processing apparatus is operable to operate according to a program and further comprises a storing unit storing therein the program including a plurality of processing procedures, and wherein the data processing method further comprises:

a validity judgment step of judging whether or not the program stored in the storing unit is invalid; and a revocation step of, in a case where the program is judged to be invalid, revoking the program.

56. The data processing method of claim 53, wherein the data processing method is to be used by the data processing apparatus, and the data processing apparatus further comprises a memory unit operable to store data therein and a processor operable to operate according to a program including a plurality of processing procedures, and wherein the data processing method further comprises a monitoring step of (i) judging, between the memory unit and the processor, whether or not transfer data outputted from the processor to be transferred to the memory unit satisfies a transfer restriction condition, (ii) inhibiting the transfer data from being transferred to the memory unit in a case where the transfer restriction condition is satisfied, and (iii) allowing the transfer data to be transferred to the memory unit in a case where the transfer restriction condition is not satisfied.

57. A non-transitory computer-readable recording medium having a data processing program recorded thereon, the data processing program being used by a data processing apparatus that executes programs while switching between a secure mode and a normal mode, the secure mode being a mode in which use of a secure resource to be protected is permitted and the normal mode being a mode in which only use of a normal resource outside of protection is permitted, wherein the data processing apparatus comprises:

a normal storing unit storing therein a normal program that includes one or more processing procedures which use the normal resource; and a secure storing unit storing therein a secure program that (i) includes one or more processing procedures which use the secure resource, and (ii) includes a call instruction for calling at least the normal program, and wherein the data processing program causes the data processing apparatus to execute a method comprising:

a judgment step of, in the secure mode, judging whether or not an instruction to be executed next is the call instruction;

an output step of outputting in the secure mode, in a case where the instruction to be executed next is judged to be the call instruction, a piece of identification information which identifies the normal program to be called by the call instruction;

a switching step of, in the case where instruction to be executed next is judged to be the call instruction, protecting the secure resource and switching from the secure mode to the normal mode;

a receiving step of, in the normal mode, receiving the piece of identification information;

a reading step of, in the normal mode, reading the normal program identified by the received piece of identification information from the normal storing unit; and a processing step of, in the normal mode, operating according to the read normal program.

58. The data processing program of claim 57, wherein the data processing program is for switching between a first operating system and a second operating system and for executing and managing processes generated in the first and second operating systems by causing each of the processes generated in the first and second operating systems to make a state transition into one of an execution state, an execution wait state, and a halt state, and wherein the data processing method executed by the data processing apparatus further comprises:

a first generating step of, in the first operating system, generating a first process;

a second generating step of, in the second operating system, generating a second process that is in correspondence with the first process;

a first detecting step of, in the first operating system, detecting a state transition of the first process;

a first output step of, in the first operating system, outputting transition information identifying the detected state transition;

an OS switching step of switching the first operating system to the second operating system;

a second obtaining step of, in the second operating system, obtaining the transition information; and a second transition step of causing the second process to make a state transition according to the obtained transition information.

59. The data processing program of claim 57, wherein the data processing method is to be executed used by the data processing apparatus and the data processing apparatus is operable to operate according to a program and further comprises a storing unit storing therein the program including a plurality of processing procedures, and wherein the data processing method further comprises:

a validity judgment step of judging whether or not the program stored in the storing unit is invalid; and a revocation step of, in a case where the program is judged to be invalid, revoking the program.

60. The data processing program of claim 57, wherein the data processing method is to be executed by the data processing apparatus further comprising a memory unit operable to store data therein and a processor operable to operate according to a program including a plurality of processing procedures, and wherein the data processing method further comprises a monitoring step of (i) judging, between the memory unit and the processor, whether or not transfer data outputted from the processor to be transferred to the memory unit satisfies a transfer restriction condition, (ii) inhibiting the transfer data from being transferred to the memory unit in a case where the transfer restriction condition is satisfied, and (iii) allowing the transfer data to be transferred to the memory unit in a case where the transfer restriction condition is not satisfied.

* * * * *